(12) United States Patent  
Mitlin et al.

(10) Patent No.: US 9,045,335 B2  
(45) Date of Patent: Jun. 2, 2015

(54) KINETIC STABILIZATION OF MAGNESIUM HYDRIDE

(75) Inventors: David Mitlin, Sherwood Park (CA); Beniamin Zahiri, Edmonton (CA); Mohsen Danaie, Edmonton (CA); Babak Shalchi Amirkhiz, Edmonton (CA); XueHai Tan, Edmonton (CA); Erik Luber, Edmonton (CA); Christopher Harrower, Toronto (CA); Peter Kalisvaart, Edmonton (CA)

(73) Assignee: The Governors of the University of Alberta, Edmonton, Alberta (CA)

(*) Notice: Subject to any disclaimer, the term of this patent is extended or adjusted under 35 U.S.C. 154(b) by 202 days.

(21) Appl. No.: 13/817,430

(22) PCT Filed: Aug. 18, 2011

(86) PCT No.: PCT/CA2011/050505
§ 371 (c)(1),
(2), (4) Date: Apr. 17, 2013

(87) PCT Pub. No.: WO2012/021996
PCT Pub. Date: Feb. 23, 2013

(65) Prior Publication Data
US 2013/0210618 A1   Aug. 15, 2013

Related U.S. Application Data

(60) Provisional application No. 61/375,010, filed on Aug. 18, 2010.

(30) Foreign Application Priority Data

Aug. 18, 2010   (CA) .................................. 2712362

(51) Int. Cl.
*B01J 20/04*   (2006.01)
*B01J 20/28*   (2006.01)
(Continued)

(52) U.S. Cl.
CPC .............. *C01B 3/0084* (2013.01); *B01J 20/04* (2013.01); *Y02E 60/324* (2013.01);
(Continued)

(58) Field of Classification Search
CPC ...... B01J 20/04; C01B 3/0005; C01B 3/0031; C01B 3/0078; C01B 3/0084; Y02E 60/324; Y02E 60/327
USPC .......................... 502/302, 306, 328, 340, 341; 423/648.1, 658.2; 96/11, 154
See application file for complete search history.

(56) References Cited

U.S. PATENT DOCUMENTS 6,726,783 B1 *   4/2004   Young et al. ................... 148/420
8,481,151 B2 *   7/2013   Uchiyama et al. .......... 428/304.4
(Continued)

FOREIGN PATENT DOCUMENTS

| CA | 1189499 | 6/1985 |
| CA | 1196055 | 10/1985 |

(Continued)

OTHER PUBLICATIONS

XueHai Tan et al: Nano-Scale Bi-Layer Pd/Ta,Pd/Nb, Pd/Ti and Pd/Fe Catalysts for Hydrogen Sorption in Magnesium Thin Films; International Journal of Hydrogen Energy 35; 2009, pp. 7741-7748.

(Continued)

*Primary Examiner* — Frank Lawrence
(74) *Attorney, Agent, or Firm* — Anthony R. Lambert

(57) ABSTRACT

A hydrogen absorbing and desorbing material formed by co-deposition of magnesium with a catalyst for the kinetic absorption and desorption of hydrogen. A hydrogen absorbing and desorbing material formed of an alloy of magnesium with a catalyst for the kinetic absorption and desorption of hydrogen in which the catalyst for the kinetic absorption and desorption of hydrogen forms a dispersed amorphous or nanocrystalline phase in the magnesium. A hydrogen absorbing and desorbing material having a catalytic surface formed by a process comprising the steps of depositing a layer of tantalum on the hydrogen absorbing and desorbing material and depositing a layer of palladium on the layer of tantalum. A hydrogen absorbing and desorbing material comprises a multilayer film having at least two layers of magnesium and at least two layers of catalyst for the kinetic absorption and desorption of hydrogen, in which the multilayer film comprises alternating layers of magnesium and catalyst.

14 Claims, 72 Drawing Sheets

(51) Int. Cl.
*C01B 3/00* (2006.01)
*B01J 20/02* (2006.01)

(52) U.S. Cl.
CPC ....... *B01J 20/28035* (2013.01); *B01J 20/0211* (2013.01); *B01J 20/0214* (2013.01); *B01J 20/0218* (2013.01); *B01J 20/0229* (2013.01); *B01J 20/0248* (2013.01)

(56) References Cited

U.S. PATENT DOCUMENTS

| 8,758,691 | B2 * | 6/2014 | Uchiyama et al. | 422/91 |
| 2007/0014683 | A1 | 1/2007 | Zhao et al. | |
| 2012/0171461 | A1 * | 7/2012 | Uchiyama et al. | 428/304.4 |

FOREIGN PATENT DOCUMENTS

| CA | 2339958 | 12/2000 |
| CA | 2435965 | 7/2004 |
| CA | 2548093 | 7/2005 |
| EP | 1384792 | 1/2004 |
| JP | 2002105576 | 4/2002 |
| WO | 2006089068 | 8/2006 |
| WO | 2006104274 | 10/2006 |

OTHER PUBLICATIONS

S. Salimi et al: Fabrication of an Aluminum—Carbon Nanotube Metal Matrix Composite by Accumulative Roll-Bonding; J Mater Sci; 2011; 46; pp. 409-415.

Helmut Fritzsche et al; Low Temperature Hydrogen Desorption in MgAl Thin Films Achieved by Using a Nanoscale Ta/Pd Bilayer Catalyst; Applied Physics Letters; 94, 241901; 2009; p. 1-4.

Benjamin Zahiri et al.:Bimetallic Fe—V Catalyzed Magnesium Films Exhibiting Rapid and Cycleable Hydrogenation at 200 C; Applied Physics Letters; 96; 013108; 2010.

J.M. Sanchez et al.; Experimental and Theoretical Determination of the Metastable Fe—V Phase Diagram; The American Physical Society; Physical Review B; vol. 54; No. 13; Oct. 1, 1996.

Pragya Jain et al.: The Effects of Ni and Mg2Ni Interlayer on Hydrogenation Properties of Pd Sandwiched Mg Films; Journal of Alloys and Compounds; 509; 2011; pp. 2105-2110.

W.P. Kalisvaart et al. Hydrogen Storage in Binary and Ternary Mg-Based Alloys: A Comprehensive Experimental Study; International Journal of Hydrogen Energy 35; 2010; pp. 2091-2103.

* cited by examiner

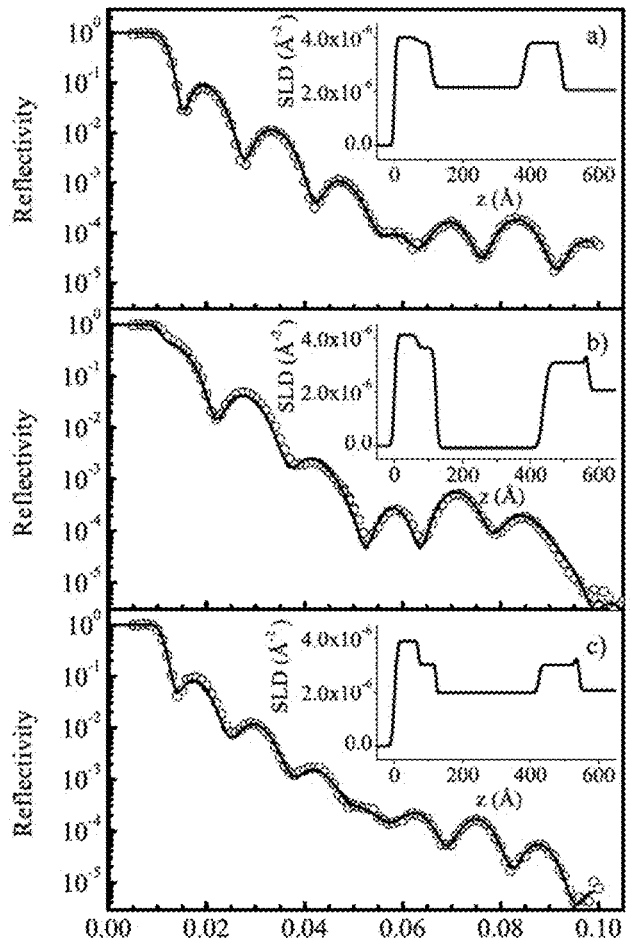
Fig. 22 q (Å⁻¹)
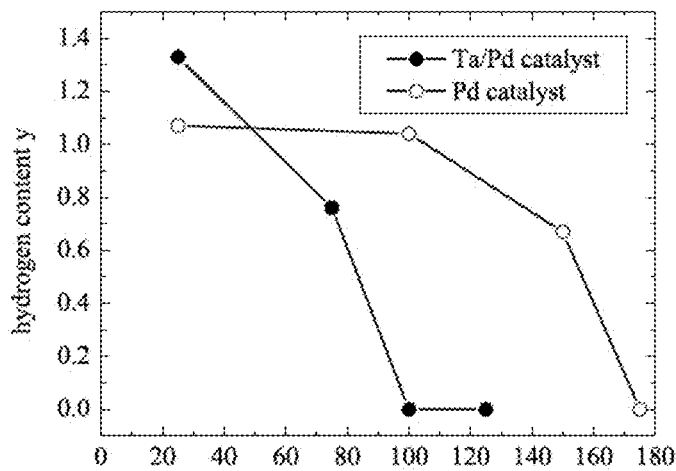
Fig. 23 T (°C)

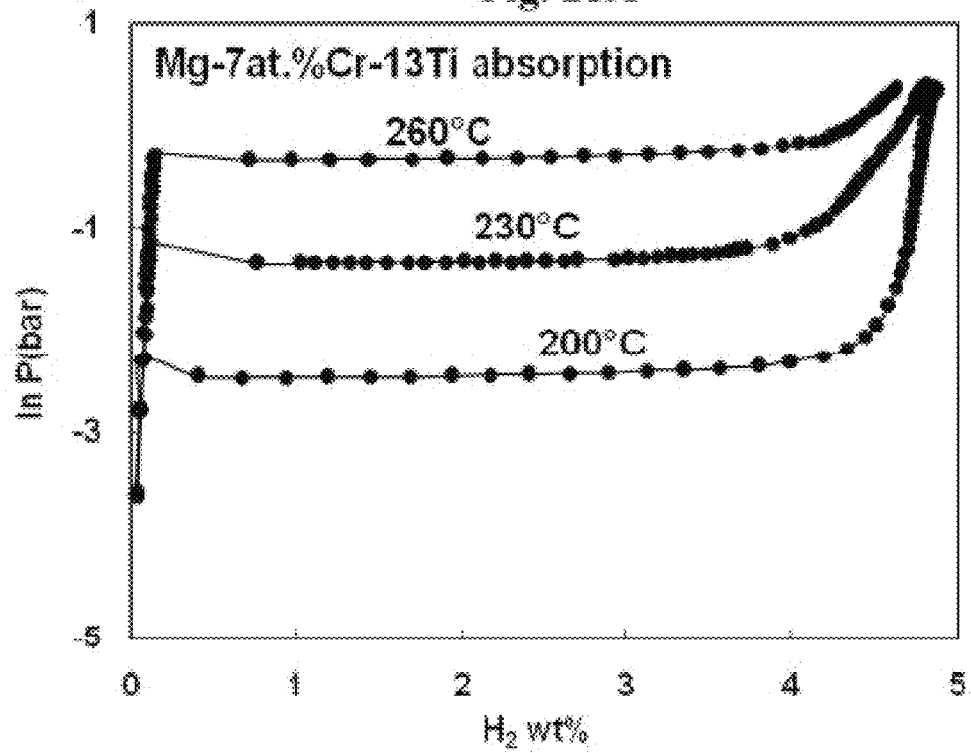
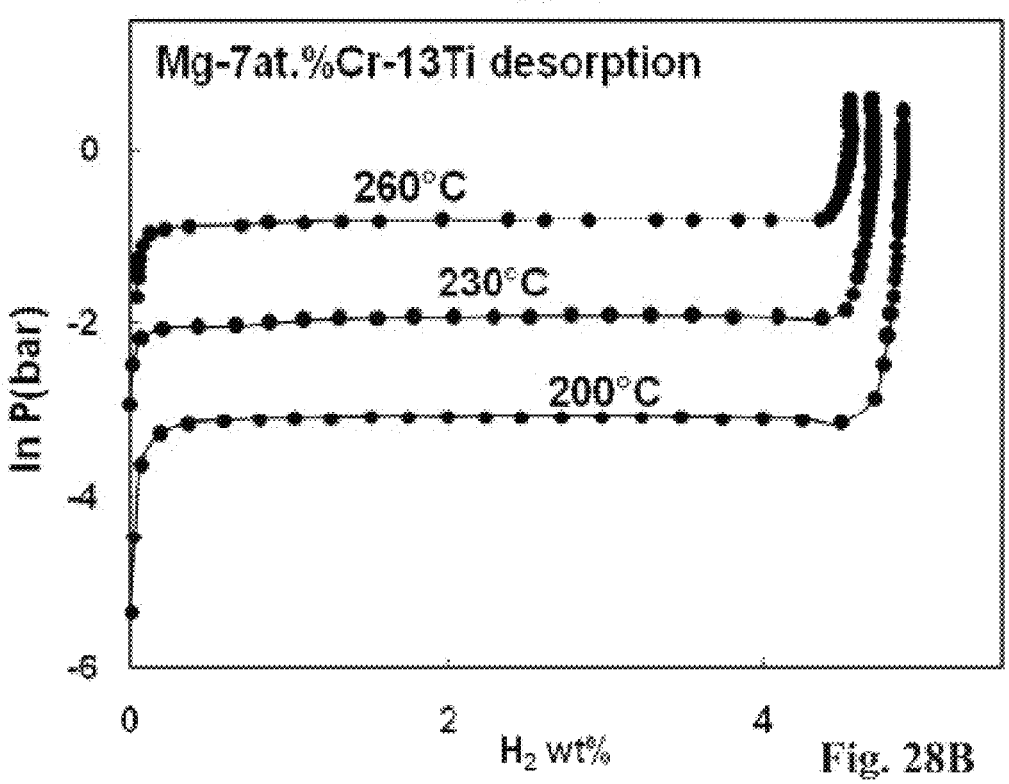

Fig. 32A
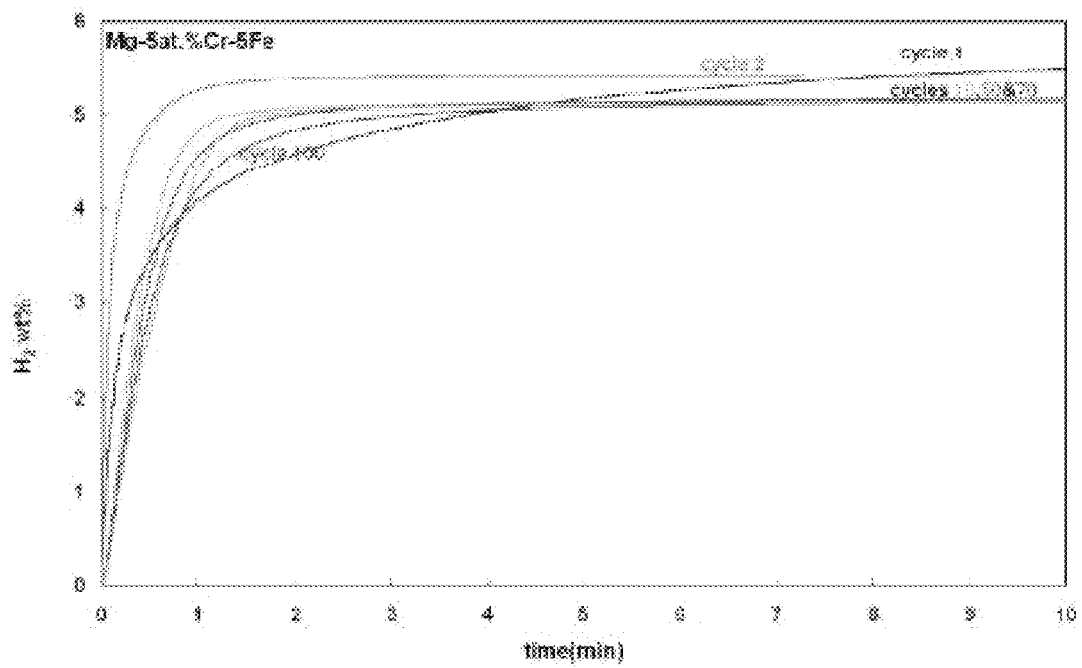
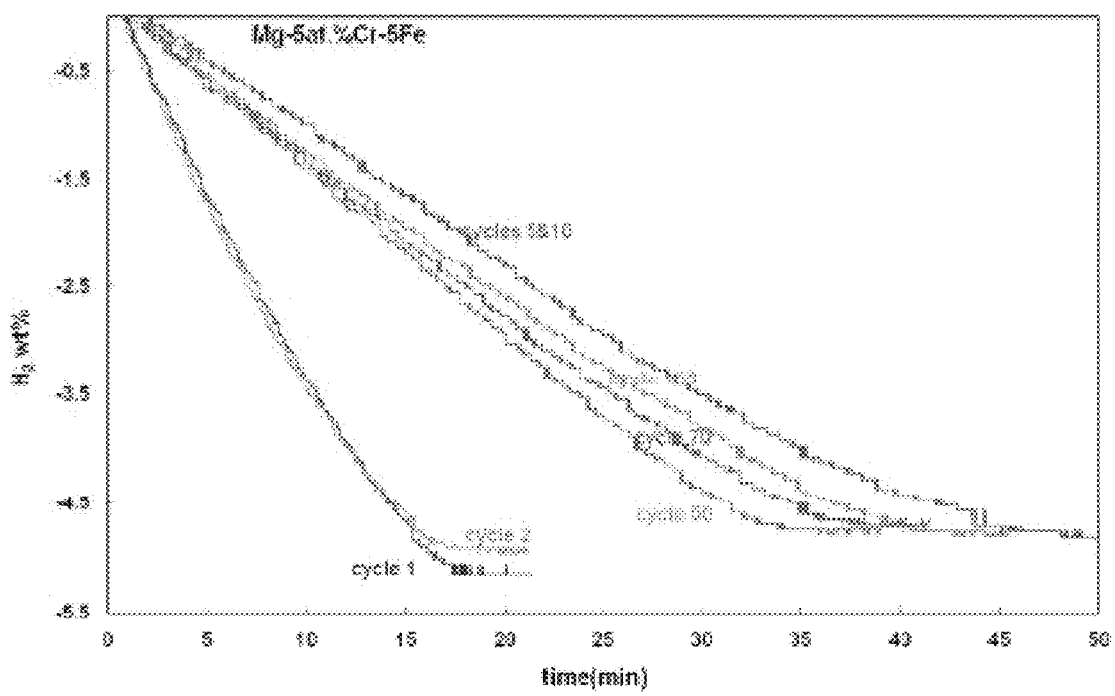
Fig. 32B

Fig. 35A
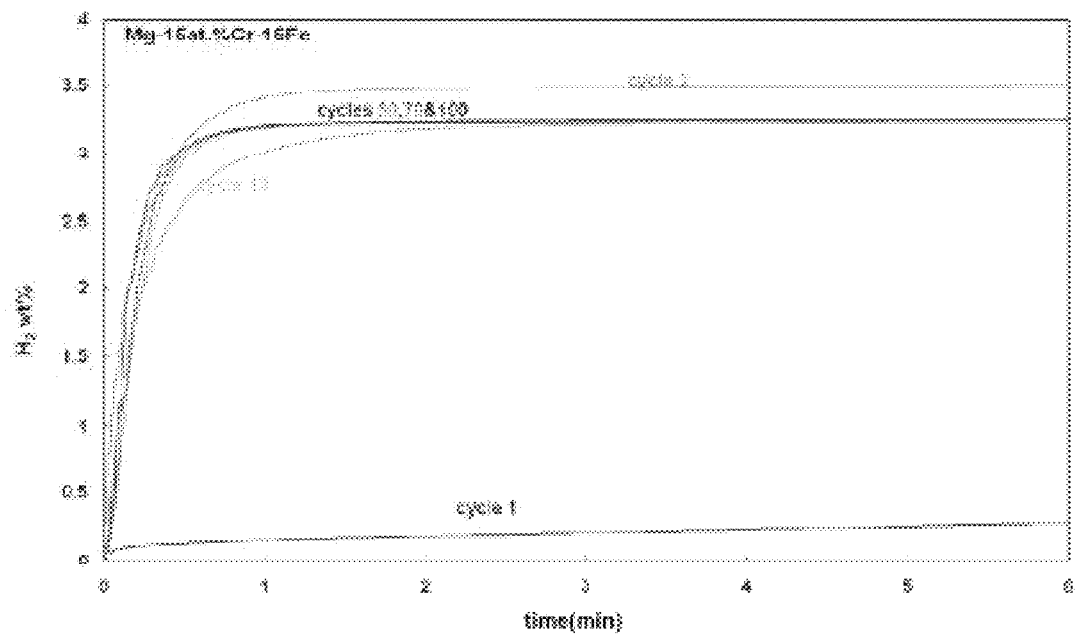
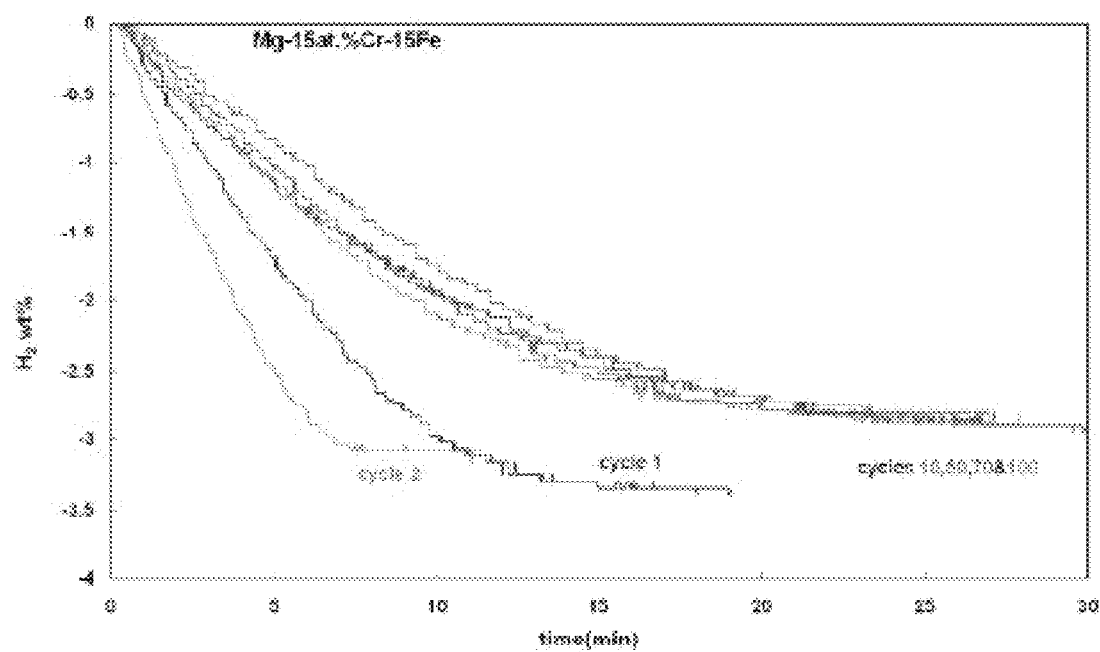
Fig. 35B

Fig. 37A
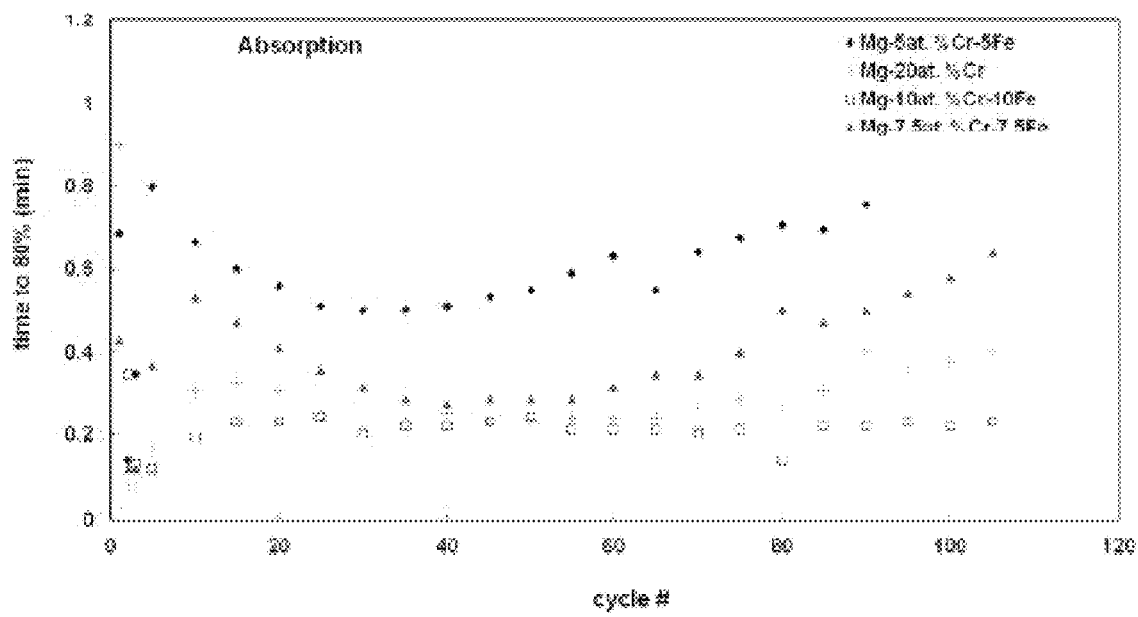
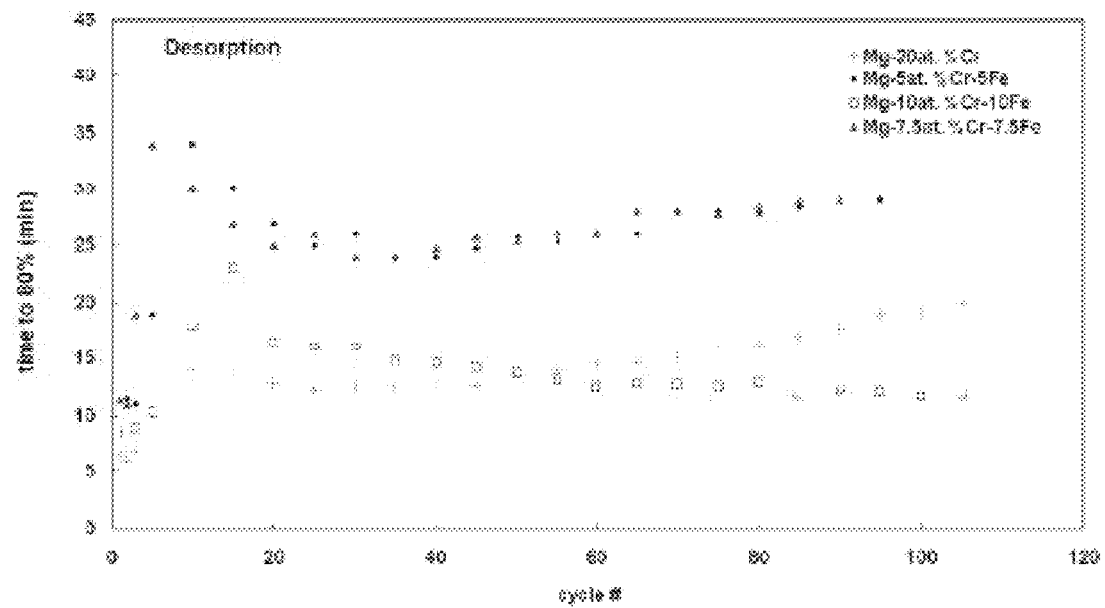
Fig. 37B

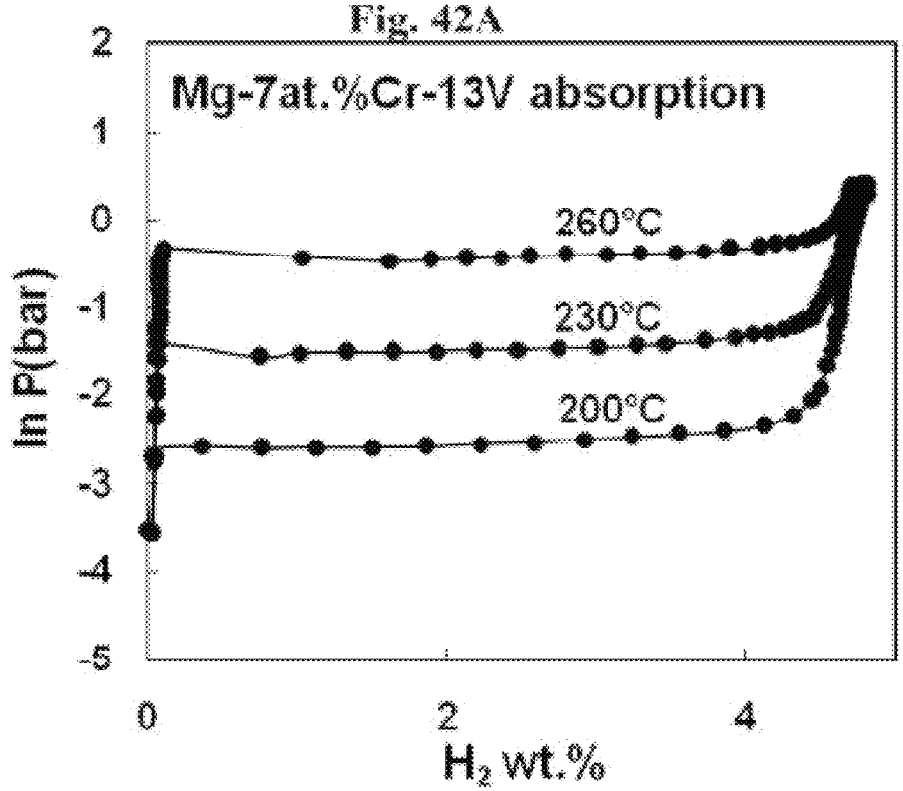
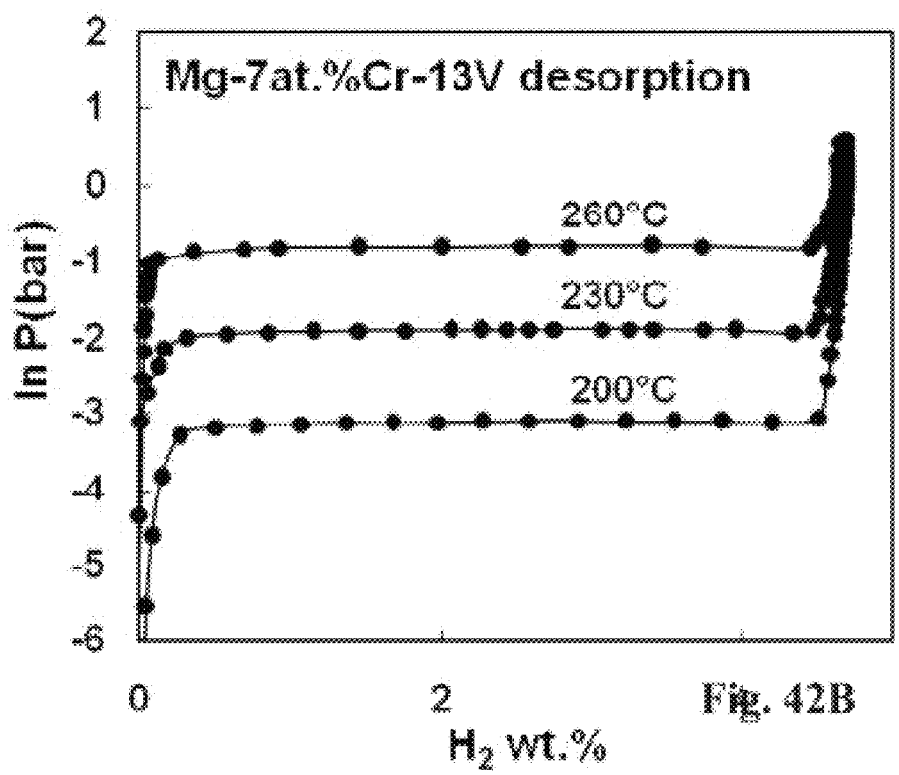

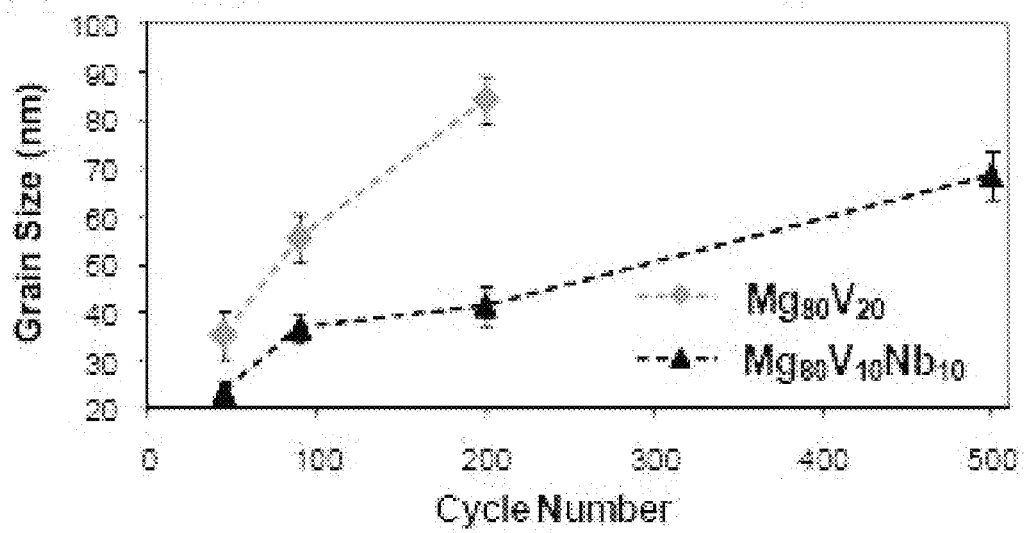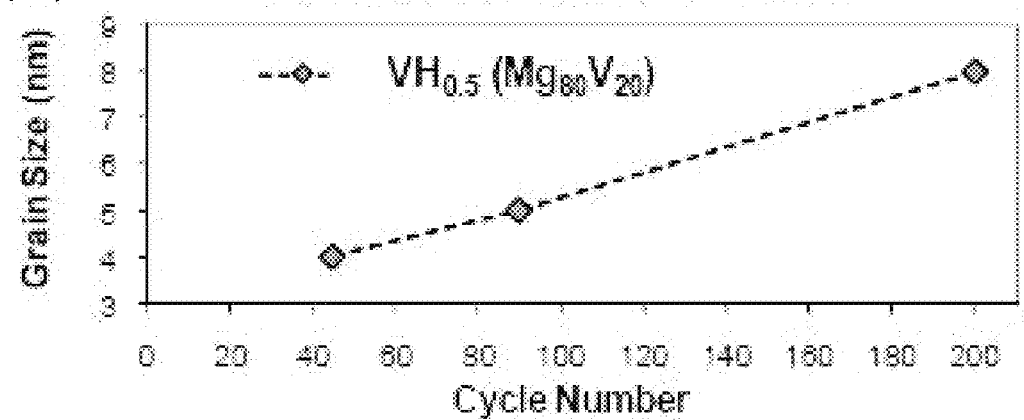
Fig. 61

KINETIC STABILIZATION OF MAGNESIUM HYDRIDE

CROSS-REFERENCE TO RELATED APPLICATIONS

This application claims the benefit under 35 USC 119(e) of U.S. provisional application Ser. No. 61/375,010 filed Aug. 18, 2010 and under 35 USC 119(a) of Canadian patent application no. 2712362 filed Aug. 18, 2010.

BACKGROUND

Magnesium-based thin films and nanostructures are a subject of extensive research as they are becoming increasingly more utilized for optical hydrogen sensing, switchable mirrors and solar absorbers, and as model alloys for designing and understanding bulk hydrogen storage materials.

Magnesium and magnesium oxide are known to have poor activity towards hydrogen dissociation, which is the first step in the absorption process. Because of this, Pd catalyst films are normally deposited on the fresh magnesium surfaces to aid the sorption kinetics. Increasingly, these catalysts consist of bi-layers, consisting of Pd on an oxide or a metallic support. This intermediate layer serves the critical role of reducing the highly deleterious interdiffusion between the Pd and the underlying hydrogen storing material. Bi-layer catalysts may also exhibit enhanced kinetics due to strong metal-support interactions (SMSI), though this effect is less explored for two metals as it is for metals on oxide supports.

Remhof et al. were the first to utilize a metallic (Nb) intermediate layer between the catalytically active palladium cap and the hydrogen storing yttrium phase, though not providing a comparison of the sorption kinetics without it. An early work on oxide-based intermediate layers for hydrogen storing materials was by researchers who examined nano-scale $Y_2O_3$ buffer layers for $YH_x$, and nano-scale $AlO_x$ buffer layers for $LaH_x$ and $YH_x$. In both studies the authors concluded that the presence of an intermediate oxide layer did not impede hydrogen loading. Rather these purposely grown buffer layers had a beneficial role of impeding the interdiffusion of the active base metal and the Pd catalytic cap. The interdiffusion would presumably result in the formation of a discontinuous layer of binary intermetallics, the oxidation of the underlying active metal, and a subsequent loss of hydrogen dissociation catalytic activity. Subsequent studies utilized Ti or Fe underlayers to reduce the interdiffusion of the palladium with the base material and the consequent formation of intermetallics. The base materials tested include pure Mg, a range of Mg—Ni alloys, Y and Mg—Al alloys.

MgAl alloys have attracted interest for their favorable hydrogen storage properties for more than 20 yrs. This relatively simple system, available commercially in ingot form, is attractive due to a combination of the relative low material cost and the environmentally benign nature of the alloy. In general, most studies found MgAl alloys promising; however, the kinetics was still inadequate for the rapid low temperature desorption required of a commercially viable hydrogen storage material for automotive and portable hydrogen applications. Low temperature hydrogen absorption in MgAl thin films has been achieved with a single layer Pd, a bilayer Pd/Ti, and Pd/Fe(Ti) catalysts. However, appreciable hydrogen desorption is only possible at temperatures too high for practical applications.

Binary Mg—Fe and Mg—Ti alloys are a subject of extensive research since they possess significantly accelerated kinetics relative to other Mg-based systems. Both systems show good gravimetric and volumetric hydrogen densities that vary with the alloy content but can be equivalent to or even higher than that of pure Mg. At equilibrium, neither Fe nor Ti has appreciable solubility in Mg, nor do they form any intermediate phases. Upon hydriding Mg—Fe system forms a combination of $Mg_2FeH_6$ and $MgH_2$, the ratio of the two phases depending on the composition. The pure Fe phase does not form a hydride itself. $Mg_2FeH_6$ begins to desorb at an equivalent temperature as $MgH_2$, about 300° C., and has a similar heat of formation (actual reported values vary). In the Mg—Ti alloys the hydrided structure is poorly understood. It appears to be more complex than simply a mixture of the equilibrium $MgH_2$ and $TiH_2$ phases. This is supported by the known stability of binary $TiH_2$, which has a heat of formation of −136 kJ/mol and therefore should not desorb at 300° C.

Though the binary Mg—Fe and Mg—Ti bulk alloys and thin films are fairly well studied, the ternary Mg—Fe—Ti system has not received the same level of attention for hydrogen-related applications.

Researchers have reported significantly accelerated kinetics in binary Mg—Fe and Mg—V systems relative to other Mg-based alloys. Both Mg—Fe and Mg—V show good gravimetric and volumetric hydrogen densities that vary with the alloy content. At equilibrium, neither Fe nor V has appreciable solubility in Mg, nor do they form any intermediate phases. Upon hydriding Mg—Fe system forms a combination of $Mg_2FeH_6$ and $MgH_2$, the ratio of the two phases depending on the composition and synthesis method. The pure Fe phase does not form a hydride itself $Mg_2FeH_6$ has a similar heat of formation as $MgH_2$ (reports vary from 70-80 kJ/mol). Due to the need for Fe diffusion, the sorption cycling kinetics of $Mg_2FeH_6$ are relatively slow. Even under rough vacuum neither $Mg_2FeH_6$ nor $MgH_2$ normally show appreciable desorption below 300° C.

Mg—V powder composites display some of the fastest hydrogen sorption kinetics of any magnesium-based system. The heat of formation for the most commonly reported form of vanadium hydride $VH_{0.5}$ is −35 to −42 kJ/mol H. Thus one would not expect this phase to be stable at the hydrogenation temperatures/pressures utilized for magnesium. Authors did report the presence of $VH_{0.81}$ phase in the hydrogenated Mg—V powders, deduced from x-ray analysis. However the plateau pressure-composition-temperature (PCT) data for the composite was identical to that of $α-MgH_2$.

Binary Mg—Fe and Mg—V bulk alloys (powders) and Mg—Fe thin films are relatively well studied for hydrogen-related applications. However the ternary Mg—Fe—V system, be it in bulk or thin film form, has received little attention. Vanadium is expensive. A more economical bi-metallic catalyst that is comparable or even surpasses vanadium in its performance would be highly sought after.

SUMMARY

This document discloses embodiments relating to uptake, storage and release of hydrogen. In one embodiment magnesium is alloyed with another metal or metals for catalyzing the absorption and desorption of hydrogen by the magnesium. A first embodiment comprises an alloy of magnesium, iron and titanium in which the iron and titanium forms a highly disperse amorphous or nanocrystalline phase. A second embodiment comprises an alloy of magnesium, iron and vanadium in which the iron and vanadium forms a highly disperse amorphous or nanocrystalline phase, and the magnesium may comprise at least 50% of the alloy by atomic percentage. In a further embodiment a palladium-tantalum bilayer catalyst may be used to coat a hydrogen-absorbing metal or alloy to improve the rate of absorption or desorption. In a preferred embodiment, a palladium-tantalum bilayer catalyst may be used to coat an alloy of the first or second embodiments.

Magnesium offers a good material to store hydrogen in a metal hydride form, but it does not take up and release hydrogen well. In order to remedy this deficiency it is desirable to alloy the magnesium with another metal or metals which better interacts with hydrogen, for example with a greater tendency to split hydrogen molecules. In this aspect of this document, in a first embodiment iron and titanium are used together for this purpose, and in a second embodiment iron and vanadium are used together for this purpose. Iron, titanium and vanadium each interact easily with hydrogen. Titanium has a high affinity for hydrogen, so that if it is alloyed alone with magnesium then it will tend to absorb the magnesium itself and not pass it on to the magnesium. Iron has a low affinity for hydrogen, so that it will not absorb enough hydrogen to pass on to the magnesium. Thus iron and titanium each have poor performance if alloyed alone with magnesium. However, in a first embodiment both iron and magnesium are alloyed with the magnesium and the combination of iron and titanium has an intermediate strength of interaction with hydrogen which makes magnesium-iron-titanium alloy more effective for uptake and release of hydrogen than magnesium-iron or magnesium-titanium alloy. Vanadium has relatively good performance compared when alloyed alone with magnesium as compared to for example iron alloyed alone with magnesium, but is expensive. In a second embodiment both iron and vanadium are alloyed with the magnesium. We have found the combination of iron and vanadium alloyed with magnesium to have performance comparable to and in at least some ways superior to vanadium alloyed alone with magnesium, while using less vanadium.

In an embodiment, the structure of the alloy is such that a nanocrystalline or amorphous mixture of a catalyst for the kinetic absorption and desorption of hydrogen, such as iron and titanium or iron and vanadium, is dispersed throughout the magnesium at a fine scale, ie nanoscale. Nanoscale dispersion means that the typical size of features is on a scale of less than 100 nanometers. That is, at least one dimension of the dispersed particles is less than 100 nanometers. This fine dispersion improves the uptake and release of hydrogen, as it improves the typical proximity of the magnesium to the catalyst for the kinetic absorption and desorption of hydrogen. The catalyst for the kinetic absorption and desorption of hydrogen may form a separate phase which dissociates hydrogen and transports it to the hydrogen-storing magnesium phase. The magnesium itself may be in a hexagonal close packed crystal structure with relatively few or no non-magnesium atoms within the crystal structure. Catalyst atoms may be dispersed throughout the crystal structure.

In a preferred embodiment a thin film magnesium-iron-titanium alloy is formed by co-deposition with a nanoscale dispersion of the catalyst for the kinetic absorption and desorption of hydrogen, not a lumpy (microscale) dispersion. In a preferred embodiment an additional catalyst is used on the surface, preferably a palladium bilayer catalyst applied to the surface of the alloy. A thin film may have a thickness in the range of 10 nm to 10 microns.

In a preferred embodiment where the catalyst for the kinetic absorption and desorption of hydrogen comprises iron and titanium, iron and titanium are present in approximately equal quantities in terms of atomic percentage (plus or minus 5% of the FeTi total). This maximizes the proportion of iron and titanium that is present in the form of TiFe phase. However, some TiFe phase may be present if the atomic percent of iron is between 15 and 67 of the FeTi total. Thus an atomic percent of iron in the iron-titanium component of the alloy of between 15 and 67 may be used although an atomic percent of close to 50 is preferable.

The Mg—Fe—Ti forming the alloy may be co-deposited for example on a substrate using any suitable method including physical or chemical vapour deposition, sputtering, evaporation or electrochemical methods. In co-deposition, the Mg, Fe, Ti are combined as fluxes during the deposition process. Various techniques of co-deposition of metal fluxes are known in the art and may be used to yield a dispersion of Fe—Ti in Mg.

In an embodiment where the catalyst for the kinetic absorption and desorption of hydrogen comprises iron and vanadium, preferably the atomic percent of magnesium in the magnesium-iron-vanadium alloy is greater than 50 in order to have a high capacity of hydrogen storage as the hydrogen is stored in the magnesium. In the detailed description tests are described showing the performance of this embodiment. The good results obtained may be due to a nanocrystalline CsCl-type Fe—V phase dispersed through the magnesium, or due to an amorphous Fe—V phase dispersed through the magnesium. If a nanocrystalline CsCl-type phase is responsible, it is likely that a sigma phase would also be effective as the atoms would not have a greatly different an environment in either phase. The ratio of iron and vanadium should be suitable to form a phase that is effective to return the desired results. In order to from a sigma phase, a range of ratios of approximately 3:1 Fe/V through 1:9 Fe/V in atomic percent may be suitable. These numbers are obtained from a Fe-V phase diagram. A similar range of ratios may form a CsCl-type phase, or published documents such as for example "Experimental and theoretical determination of the metastable Fe—V phase diagram" by Sanchez et al. (Physical Review B vol. 54, no. 13 pp. 8958-8961, 1996) may be consulted to better determine the range of parameters under which CsCl-type phase forms. If the good results are due to an amorphous phase then the ratio of iron and vanadium should be suitable to form an amorphous phase. It would be expected in this case that the more of the iron and vanadium is in the amorphous phase, the higher the performance.

The experiments disclosed here measured absorption and desorption from Mg—Fe—V at 200 degrees Celsius but temperatures approximately in the range of 100 degrees to 350 degrees Celsius would also be effective.

The Mg—Fe—V forming the alloy may be co-deposited for example on a substrate using any suitable method including physical or chemical vapour deposition, sputtering, evaporation or electrochemical methods. In co-deposition, the Mg, Fe, V are combined as fluxes during the deposition process. Various techniques of co-deposition of metal fluxes are known in the art and may be used to yield a dispersion of Fe—V in Mg.

In a further embodiment a palladium-tantalum bilayer catalyst is used to enhance absorption and desorption of hydrogen to and from an underlying metal or alloy. A nanoscale layer of palladium at the surface catalyzes the interaction with hydrogen, and an underlying nanoscale layer of tantalum protects the palladium and the underlying metal or alloy from interacting with each other. It is hypothesized that the tantalum layer may also promote better catalytic properties. The nanoscale layers may be made using any suitable method including physical or chemical vapour deposition or electrochemical methods. In particular sputtering, evaporation or electroplating may be used.

While vanadium and niobium work well as the material of an intermediate layer between palladium and an underlying hydrogen absorbing alloy at high temperatures, Tantalum seems to work better than those materials at low temperatures, which are more interesting scientifically and commercially than the higher temperatures at which niobium and vanadium work well. In an embodiment, the palladium and tantalum layers may be present on one or both sides of a thin film.

In an embodiment, disclosed is a hydrogen absorbing and desorbing material formed by co-deposition of magnesium with a catalyst for the kinetic absorption and desorption of hydrogen. In another embodiment, disclosed is a hydrogen absorbing and desorbing material formed of an alloy of magnesium with a catalyst for the kinetic absorption and desorption of hydrogen in which the catalyst for the kinetic absorption and desorption of hydrogen forms a dispersed amorphous or nanocrystalline phase in the magnesium. In another embodiment, disclosed is a hydrogen absorbing and desorbing material formed by co-deposition of magnesium with a catalyst for the kinetic absorption and desorption of hydrogen in which the catalyst for the kinetic absorption and desorption of hydrogen forms a dispersed amorphous or nanocrystalline phase in the magnesium. In another embodiment, disclosed is a hydrogen absorbing and desorbing material comprising a multilayer film having at least two layers of magnesium and at least two layers of catalyst for the kinetic absorption and desorption of hydrogen, in which the multilayer film comprises alternating layers of magnesium and catalyst. In another embodiment, disclosed is a hydrogen absorption material formed of multiple layers, each layer of the multiple layers comprising: a first layer comprising at least magnesium; and a second layer disposed on the first layer, the second layer comprising a binary catalyst for the absorption of hydrogen.

Also disclosed is a hydrogen absorbing and desorbing material formed by co-deposition of magnesium with a catalyst for the kinetic absorption and desorption of hydrogen in which the catalyst for the kinetic absorption and desorption of hydrogen forms a dispersed amorphous or nanocrystalline phase in the magnesium, the catalyst further comprising chromium. Also disclosed is a hydrogen absorbing and desorbing material formed by co-deposition of magnesium with a catalyst for the kinetic absorption and desorption of hydrogen in which the catalyst for the kinetic absorption and desorption of hydrogen forms a dispersed amorphous or nanocrystalline phase in the magnesium, the catalyst further comprising niobium.

In various embodiments, there may be included any one or more of the following features: The catalyst for the kinetic absorption and desorption of hydrogen may comprise two or more of titanium, vanadium, chromium, aluminum, niobium, and iron. The catalyst for the kinetic absorption and desorption of hydrogen may comprise iron. A catalyst for the kinetic absorption and desorption of hydrogen comprises iron and titanium. The atomic percentage of iron may equal the atomic percentage of titanium plus or minus 5 atomic % of the FeTi total. A catalyst for the kinetic absorption and desorption of hydrogen comprises iron and vanadium. At least some of the iron and vanadium may form a dispersed cscl-type phase in the magnesium. At least some of the iron and vanadium may form a dispersed sigma phase in the magnesium. The atomic ratio of iron to vanadium may be between 3:1 and 1:9. The catalyst for the kinetic absorption and desorption of hydrogen may comprise chromium. The catalyst for the kinetic absorption and desorption of hydrogen may comprise iron and chromium. The catalyst for the kinetic absorption and desorption of hydrogen may comprise chromium and vanadium. The atomic percentage of vanadium may equal the atomic percentage of chromium plus or minus 10 atomic % of the CrV total. The catalyst for the kinetic absorption and desorption of hydrogen may comprise chromium and iron. The catalyst for the kinetic absorption and desorption of hydrogen may comprise chromium and titanium. The catalyst for the kinetic absorption and desorption of hydrogen may comprise niobium. The catalyst for the kinetic absorption and desorption of hydrogen may comprise niobium and vanadium. The at least two layers of magnesium may comprise catalyst. The at least two layers of magnesium may be created by co-sputtering magnesium and catalyst. The catalyst in the at least two layers of magnesium may comprise aluminum and titanium. The at least two layers of magnesium may each have a thickness that is less than a mean catalyst particle spacing in the at least two layers of magnesium. The at least two layers of magnesium may each have a thickness and magnesium concentration sufficient to allow adjacent layers of catalyst to constrain $MgH_2$ grain size during use. The at least two layers of magnesium may each have a thickness of 25 nm or less. The at least two layers of magnesium may each have a thickness of 10 nm or less. A thickness of each of the at least two layers of magnesium may be less than or equal to a thickness of the at least two layers of catalyst. The at least two layers of catalyst may each have a thickness of 20 nm or less. The multilayer film may comprise at least 20 layers of magnesium and at least 20 layers of catalyst. The multilayer film may comprise at most 200 layers of magnesium and at most 200 layers of catalyst. The hydrogen absorbing and desorbing material may be formed by accumulative roll bonding. The atomic percentage of titanium may equal the atomic percentage of chromium plus or minus 10 atomic % of the CrTi total. At least 50% of the material by atomic percentage may comprise magnesium. More than 50% of the material by atomic percentage may comprise magnesium. More than $5/7$ of the material by atomic percentage may comprise magnesium. The hydrogen absorbing and desorbing material may comprise a catalytic surface formed by a process comprising the steps of: depositing a layer of tantalum on the hydrogen absorbing and desorbing material; and depositing a layer of palladium on the layer of tantalum. The hydrogen absorbing and desorbing material may comprise a palladium-tantalum bilayer catalyst deposited on the hydrogen absorbing and desorbing material to improve the rate of absorption or desorption of hydrogen in the hydrogen absorbing and desorbing material. The hydrogen absorbing and desorbing material may be formed as a uniform film of catalyst and magnesium. The hydrogen absorbing and desorbing material may comprise an underlayer of the catalyst. The multilayer film may comprise alternating layers of magnesium and catalyst. The catalyst may not comprise aluminum and titanium in combination.

An apparatus is disclosed comprising one or more of a sensor, mirror, solar absorber, hydrogen storage device, heat storage material, heat storage device, energy storage material, energy storage device, or sour natural gas filter comprising an embodiment of the hydrogen absorbing and desorbing material disclosed herein. The sensor may comprise one or more of a corrosion monitor and a pH meter.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 22 is a series of graphs showing the neutron reflectivity curves of a 27 nm thick $Mg_{0.7}Al_{0.3}$ film prepared on a Si(100) wafer with 10 nm Ta buffer layer and capped with a (5 nm Ta/5 nm Pd) bilayer: (a) before hydrogen absorption, (b) after hydrogen absorption, measured at 25° C., and (c) after annealing of 1 h at 100° C., where open circles represent experimental data, the solid lines are fits, and the insets show the corresponding SLD profile;

FIG. 23 is a graph showing the desorption characteristics of a $Mg_{0.7}Al_{0.3}H_y$ film capped with a 10 nm Pd single catalyst layer (open circles), and a (5 nm Ta/5 nm Pd) catalyst bilayer (solid dots);

FIGS. 26A and B are absorption and desorption curves, respectively, for Mg-10 at. % Cr over cycles 1-100. FIGS. 26C and D are absorption and desorption curves, respectively, for Mg-5 at. % Cr-5Ti, over cycles 1-100 FIGS. 26E and F are absorption and desorption curves, respectively, for Mg-7 at. % Cr-13Ti, over cycles 1-115;

FIGS. 28A-B are pressure-composition isotherms from absorption and desorption data, respectively, for Mg-7 at. % Cr-13Ti;

FIGS. 32A-B are graphs of absorption and desorption behavior, respectively, of Mg-5 at. % Fe-5 at. % Cr at 200° C. Volume calibration was at 200° C., absorption pressure was at 2.7 bar, and desorption pressure was at 0.01-0.02 bar;

FIGS. 35A-B are graphs of absorption and desorption behavior, respectively, of Mg-15 at. % Fe-15 at. % Cr at 200° C. Volume calibration was at 200° C., absorption pressure was at 2.7 bar, and desorption pressure was at 0.01-0.02 bar;

FIGS. 37A-B are graphs comparing the time to absorb and desorb, respectively, 80 weight % of the maximum measured capacity for several different alloys, as a function of sorption cycle number;

FIGS. 41A-B show the results for Mg doped with equiatomic amounts of Cr and V.

FIGS. 41C and D show the sorption performance of a Cr-rich ternary alloy.

FIGS. 42A-B are graphs of pressure-composition-temperature (PCT) absorption and desorption results, respectively, for Mg-7 at. % Cr-13V.

FIG. 61: During-cycle grain size analysis for Mg80V20 and Mg80V10Nb10 in the desorbed state. (A) Mg grain size. (B) Catalyst grain size.

DETAILED DESCRIPTION

The following describes exemplary embodiments of the disclosure, including additional features of the various embodiments. Immaterial changes may be made to the specific embodiments disclosed without departing from what is claimed.

Figure 1:
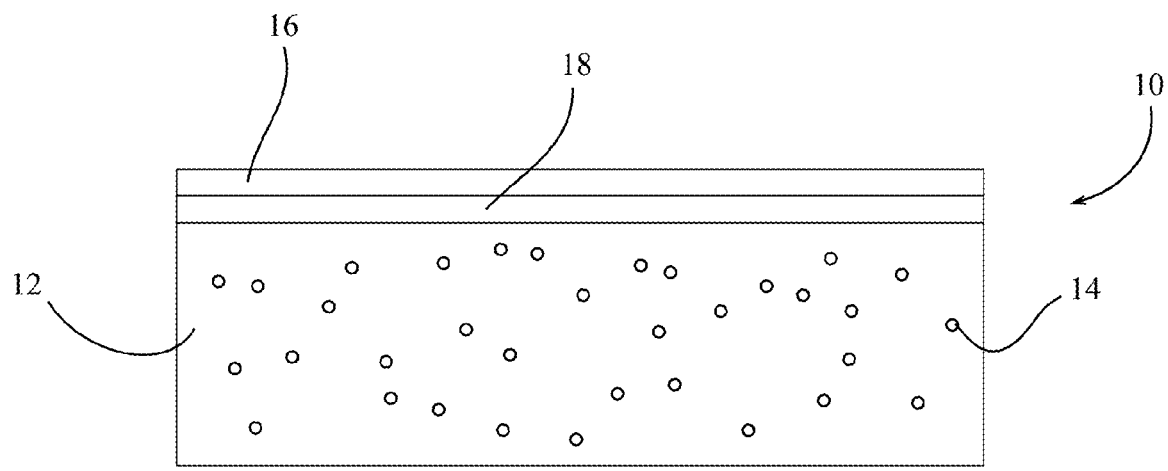
FIG. 1 is a cross sectional side view of a magnesium alloy thin film having a bilayer catalyst on the upper surface of the thin film.

Referring to FIG. 1, a thin film 10 is shown (not to scale) having magnesium 12 with catalyst for the kinetic absorption and desorption of hydrogen 14, such as iron and titanium or iron and vanadium, dispersed throughout the magnesium. The film 10 may be formed by co-deposition of magnesium with a catalyst for the kinetic absorption and desorption of hydrogen. The film may be a uniform film of magnesium and catalyst as shown. The hydrogen absorbing and desorbing material may also be formed of an alloy or codeposition of magnesium with a catalyst for the kinetic absorption and desorption of hydrogen in which the catalyst for the kinetic absorption and desorption of hydrogen forms a dispersed amorphous or nanocrystalline phase in the magnesium. On the surface of the film may be palladium layer 16 and tantalum layer 18 between the palladium and the magnesium, iron and vanadium. The palladium and tantalum layer may be on any suitable surface or portion thereof of the thin film.

Figure 25:
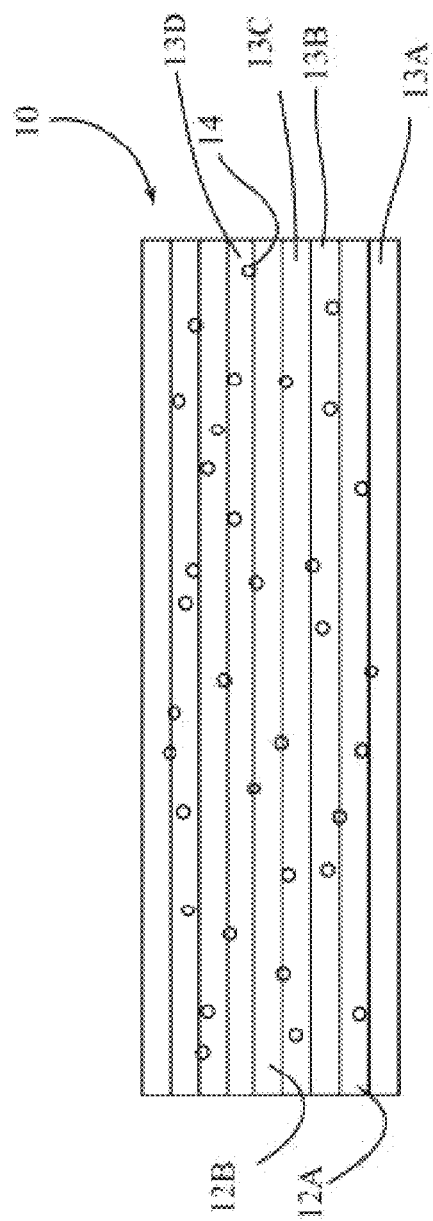
FIG. 25 is a cross sectional side view of a multilayer thin film of magnesium layers alternating with catalyst layers.

Referring to FIG. 25, a hydrogen absorbing and desorbing material may comprise a multilayer film 10 having at least two layers of magnesium, for example layers 12A-B and at least two layers of catalyst for the kinetic absorption and desorption of hydrogen. The layers of catalyst, for example layers 13A, B, C, D, and E, may be layers of single types of catalysts, or may be bimetallic alloys. For example, layers 13A and B may be distinct layers of iron and titanium, respectively, or both bimetallic alloys of iron and titanium. The multilayer film 10 comprises alternating layers of magnesium and catalyst as shown. An underlayer 13A of catalyst may be provided. An underlayer bi-layer catalyst may be deposited on the bottom of the film as well as on the top. The use of an underlayer may accelerate the kinetics further.

The catalyst for the kinetic absorption and desorption of hydrogen may comprise two or more of titanium, vanadium, chromium, and iron. In some embodiments the catalyst for the kinetic absorption and desorption of hydrogen comprises two or more of titanium, vanadium, chromium, aluminum, niobium, and iron.

In some embodiments the catalyst may comprise iron. Further embodiments may comprise titanium or chromium. In one study we tested a catalyst of iron and titanium. This study focused on hydrogen sorption properties of 1.5 micrometer thick Mg-10 at. % Fe-10Ti, Mg-15 at. % Fe-15Ti, and Mg-20 at. % Fe-20Ti films. We show that the alloys display remarkable sorption behavior: At 200° C. the films are capable of absorbing nearly 5 wt. % hydrogen in seconds, and desorbing in minutes. Furthermore this sorption behavior is stable over cycling. In the Mg-15at. % Fe-15Ti alloy there is no kinetic or capacity degradation even after 100 absorption/desorption cycles. Pressure-composition isotherm data for Mg-10 at. % Fe-10Ti indicates that the sorption enhancement is due to improved kinetics rather than any altered thermodynamics. We envision these alloys becoming the material of choice for a variety of sensing and storage applications. As shown, in some embodiments the atomic percentage of iron equals the atomic percentage of titanium plus or minus 5 atomic % of the FeTi total.

The geometry of the samples was a 1.5 μm Mg—Fe—Ti films with a 7.5 nm Pd/7.5 nm Ta bi-layer catalyst on both top and the bottom surfaces. The films had compositions Mg-10 at. % Fe-10Ti, Mg-15 at. % Fe-15Ti and Mg-20 at. % Fe-20Ti. Magnesium and magnesium oxide are known to have poor activity towards hydrogen dissociation, which is the first step in the absorption process. Because of this, Pd catalyst films are normally deposited on the fresh magnesium surfaces to aid the sorption kinetics. Increasingly, these catalysts consist of bi-layers, consisting of Pd on an oxide or a metallic support. This intermediate layer serves the critical role of reducing the highly deleterious interdiffusion between the Pd and the underlying hydrogen storing material. In the first study tantalum is chosen as the intermediate layer because we have found it to be effective in preventing elevated temperature interdiffusion of Pd and the underlying Mg during hydrogen sorption, as detailed in the fourth study detailed below.

The Mg—Fe—Ti films were co-sputtered either onto a Si (100) substrate covered by native oxide layer, or onto same wafer but coated with a hardened (so as not to outgas in the chamber) photoresist. Depositions of the catalysts and of the bulk Mg were performed sequentially without any interruption. We used Ar gas with a purity of 99.999% at a sputtering pressure of $5 \times 10^{-3}$ mbar, with a maximum base pressure of $5 \times 10^{-8}$ mbar. Deposition was performed using a DC-magnetron co-sputtering system (AJA International™). The substrate temperature was maintained near ambient. Deposition was done in a sputter-up configuration with continuous substrate rotation. Film thickness and deposition rates were obtained through the use of crystal deposition rate monitor held at the substrate plane. A separate series of experiments involving ex-situ film thickness measurements versus deposition parameters were used to cross check the thickness/rate accuracies. The deposition rates were the following: Mg 3; Pd 1.7; Ta 0.3 Å/sec; Fe and Ti varied to adjust for stoichiometry.

Volumetric absorption and desorption measurements were performed on a Sieverts hydrogen sorption analysis system (Hy-Energy LLC™. PCTPro-2000™). All the measurements were carried out at 200° C. Mg was absorbed at a pressure near 3 bar and desorbed at a pressure near 0.001 bar. Samples received up to 110 absorption/desorption cycles. X-ray diffraction experiments were performed on a Rigaku™ Rotaflex™ rotating anode Diffractometer using copper Ka radiation source ($\lambda$=1.54 Å). The system was operated at 40 kV voltage and 110 mA current. The data from the XRD database on EVA™ software were used for peak identification. Additional simulation of the peaks was performed using Desktop Microscopist™ commercial electron and x-ray diffraction simulation package using the well-known crystallographic information of the metals, intermetallics and hydrides. The samples analyzed by Sieverts and XRD were in powder form after having been removed from the Si wafer by dissolving the photoresist.

Figure 2A:
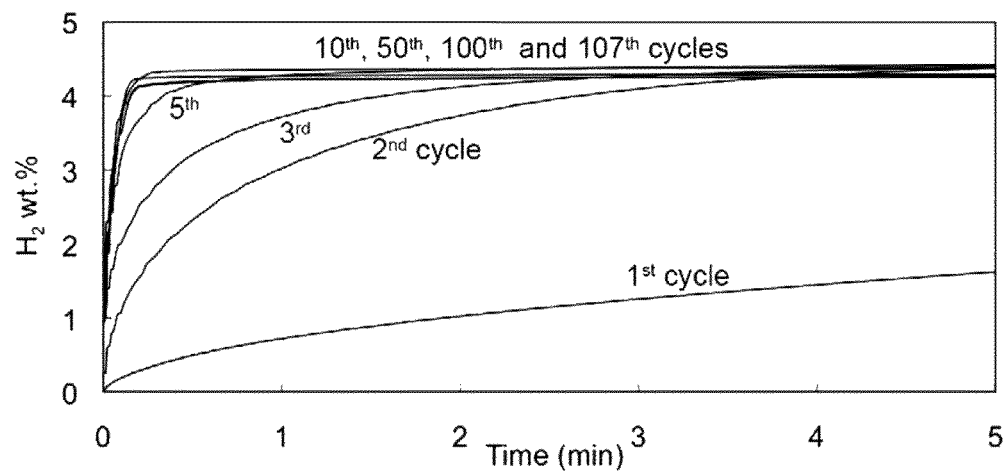
FIG. 2A is a graph of absorption behaviour of Mg-15 at. % Fe-15 at. % Ti alloy at 200° C. over cycles 1-107.
Figure 2B:
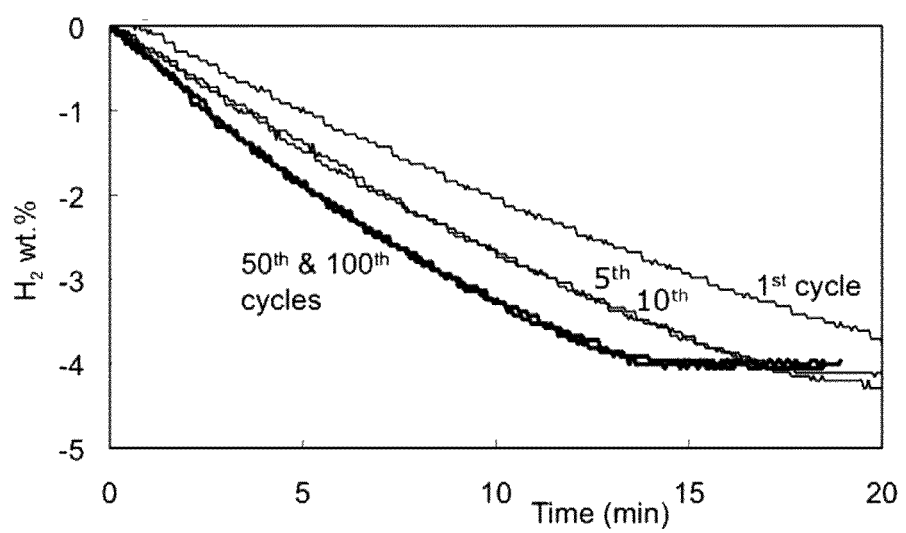
FIG. 2B is a graph of desorption behaviour of Mg-15 at. % Fe-15 at. % Ti alloy at 200° C. over cycles 1-107.

FIGS. 2A and 2B shows the absorption and desorption behavior for the Mg-15 at.% Fe-15Ti alloys, tested at 200° C. The roughness of the desorption curves (FIG. 2B) is due to instrumental noise. There is an activation period where the absorption kinetics are significantly slower (order of magnitude) than at steady-state. On the desorption side an activation period also exists but represents only a moderate slowdown (factor of two) relative to the long-term cycling kinetics. However by cycle #5 both the absorption and the desorption kinetics are stabilized with the system essentially behaving identically from then on. The 10th, 50th and 100th cycles are all identical, with no apparent degradation in either the capacity or the sorption times.

The initial activation period may be due to a variety of microstructural factors. The as-synthesized films were composed of supersaturated solid solutions of Fe and Ti in Mg, with the Mg having a strong [0001] fibre texture. Ultimately the film will decompose into an equilibrium two-phase mixture of magnesium ($\alpha$-MgH$_2$ in sorbed state) and FeTi. At 200° C. neither the Fe nor the Ti have any appreciable solubility in magnesium. However such microstructure may not be rapidly achievable from a solid solution. Most likely it rather evolves during several initial cycles. One hypothesis is that until the minority FeTi phase fully precipitates the kinetics remain sluggish. Another scenario is related to the structure of the bi-layer Pd/Ta surface catalyst used in this work. The activation period may be attributed to the interdiffusion of the two elements to make a catalytic Ta—Pd alloy, or to the ultimate formation of a tantalum hydride phase. Interestingly, the slow kinetics period lasting up to 5 cycles along with the subsequent steady-state behavior was a prominent feature of every composition tested in this study.

Figure 3:
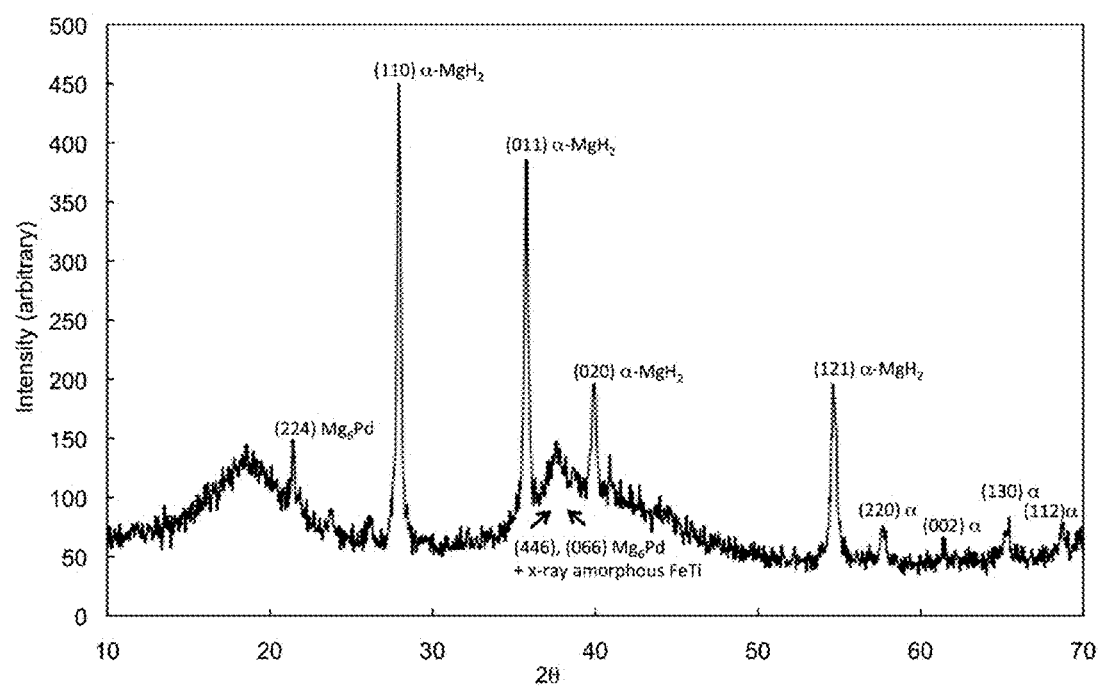
FIG. 3 is a graph of the indexed XRD pattern of the post-cycling, steady-state sorbed microstructure of the Mg-10 at. % Fe-10Ti alloy.

FIG. 3 shows the indexed XRD pattern of the post-cycling, steady-state sorbed microstructure of the Mg-10 at. % Fe-10Ti alloy. The broad peak centered at $2\theta \sim 18.5°$ is due to the quartz mounting slide used to support the powders. The most prominent peaks may be unambiguously indexed to belong to $\alpha$-MgH$_2$ phase, with no detectable variation of the lattice parameter from the literature-reported values. The $\alpha$-MgH$_2$ phase is tetragonal with the space group P42/mnm (136), the lattice parameters a=0.45176 and c=0.30206 Å, and Wyckoff Positions Mg (2a): 0, 0, 0, and H (4f): 0.304, 0.304, 0. Mg$_6$Pd peaks are also present, indicating that the catalyst did react with the base material. The Mg$_6$Pd phase is cubic with the space group F-43m (216) and a lattice parameter of 20.108 Å. Three of the most intense Mg$_6$Pd peaks, (224), (066) and (446) are labeled in the figure. In addition there appears to be a broad "x-ray amorphous" peak (which could be due to an amorphous phase, a nanocrystalline phase or a mixture of both) that overlaps with the (446) and (066) Mg$_6$Pd peaks. This broad peak is centered around $2\theta = 37.5°$ and is likely due to an amorphous/nanocrystalline FeTi phase since no characteristic FeTi peaks were detected.

The fact that Mg$_6$Pd forms despite the presence of a Ta underlayer is an interesting result. When using a single layer Pd catalyst thermal effects drive the interdiffusion of Mg and Pd, and the subsequent formation of Mg$_6$Pd and MgO. However even when a refractory underlayer is present, similar interediffusion may occur. Since Pd and Ta have appreciable mutual solubility at 200° C. (~9 at. % Pd in Ta, and ~15 at. % Ta in Pd) the formation of Mg$_6$Pd after multiple cycles is feasible. It is not possible to conclusively identify or negate the presence of $\beta$-TaH$_{0.5}$ since its XRD peaks overlap those of Mg$_6$Pd. For example the most intense peak of $\beta$-TaH$_{0.5}$, (111)

at 2θ=37.5°, would experimentally overlap with the second most intense peak of Mg$_6$Pd, (066) at 2θ=38°. The (020), (200), (002) and (220) peaks of β-TaH$_{0.5}$ would similarly do that.

Figure 4A:
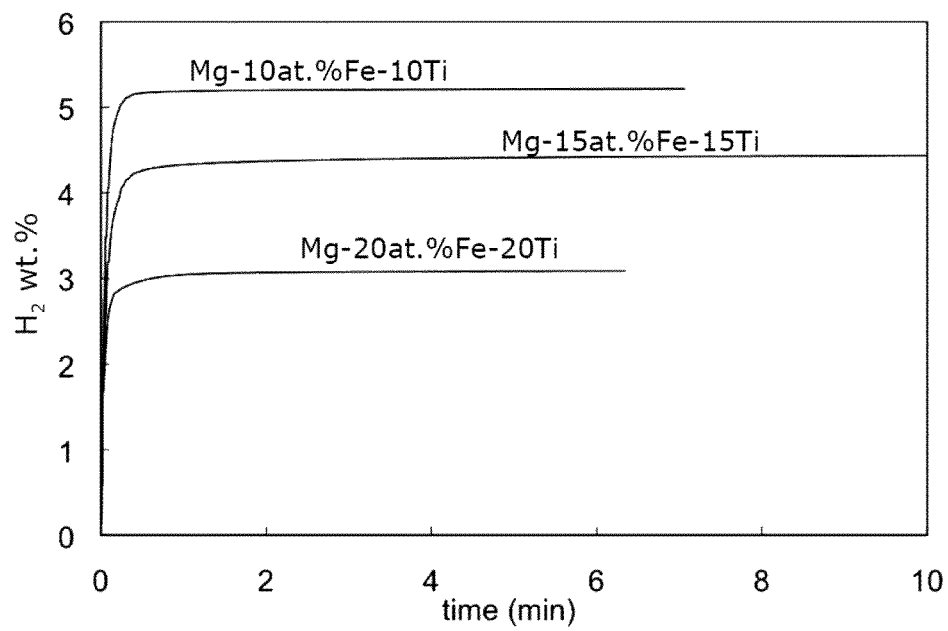
FIG. 4A is a graph of the 6$^{th}$ cycle absorption behaviour of thin films for three different values of Fe and Ti content.
Figure 4B:
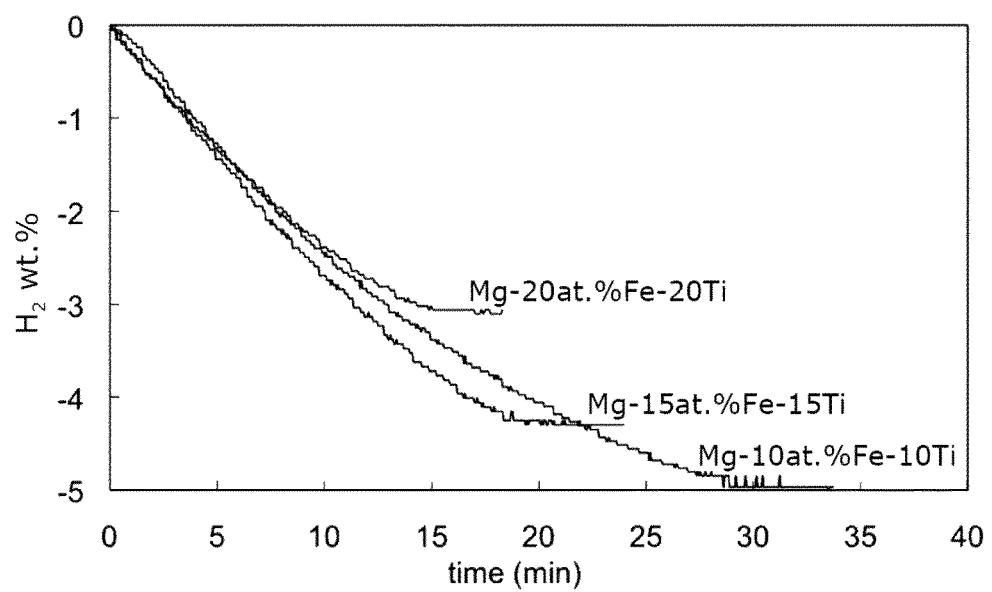
FIG. 4B is a graph of the 6$^{th}$ cycle desorption behaviour of thin films for three different values of Fe and Ti content.

FIG. 4 compares the steady-state (6th cycle) absorption (FIG. 4A) and the desorption (FIG. 4B) behavior of the films as a function of Fe/Ti content. The alloys display quite similar kinetics. A comparison of the absorption and desorption curves implies analogous microstructures and sorption enhancement mechanisms for the three alloys. However the three alloys possess different hydrogen capacities. Assuming that α-MgH$_2$ is the only hydrogen storing phase present in the microstructure and neglecting the catalyst layers, the theoretical hydrogen capacities of the Mg-10 at. % Fe-10Ti, Mg-15 at. % Fe-15Ti, Mg-20 at. % Fe-20Ti alloys are 5.1, 4.1 and 3.2 wt. %. Comparing these values to FIG. 5 and allowing for some (less than 10%) capacity reduction due to the presence of the catalysts layers we can conclude that the system is quite close to being fully sorbed.

Figure 5A:
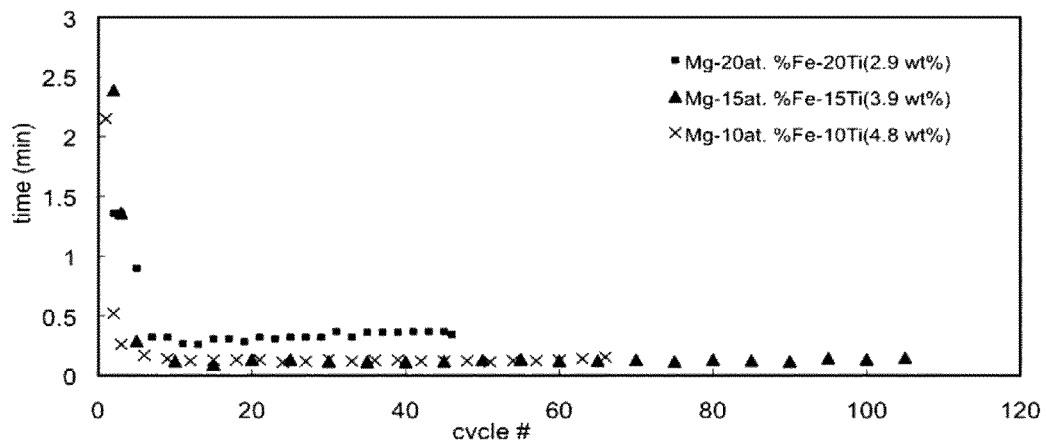
FIG. 5A is a graph of the time to absorption as a function of cycle number for three different values of Fe and Ti content.
Figure 5B:
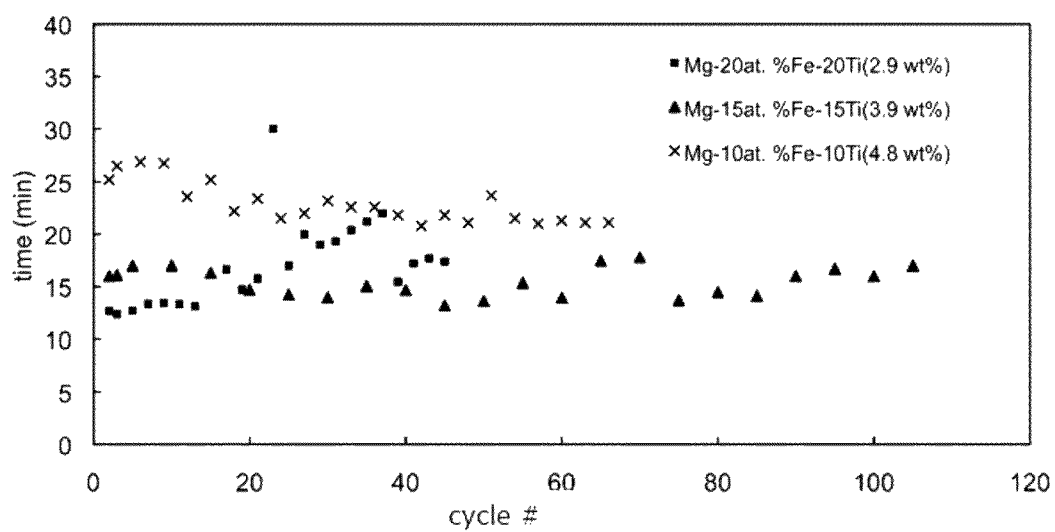
FIG. 5B is a graph of the time to desorption as a function of cycle number for three different values of Fe and Ti content.

FIG. 5 compares the time to absorption (5A) and time to desorption (5B) as a function of cycle number and alloy content. There is a noticeable induction period during the first several cycles of absorption. Interestingly at steady-state the higher FeTi content alloy (Mg-20 at. % Fe-20Ti) actually absorbs hydrogen at a slower rate than the lower content alloys. The absorption times observed for Mg-15 at. % Fe-15Ti alloys are the fastest ever reported for a relatively thick (1.5 micrometer) Mg-based film. FIG. 5B indicates that the optimum desorption performance, both in terms of the rates and in terms of the stabilities, is achieved in the Mg-15 at. % Fe-15Ti alloy. The lower Fe/Ti content film has slower kinetics, while the higher alloy content film begins to display some kinetic degradation after about 20 cycles.

Figure 6A:
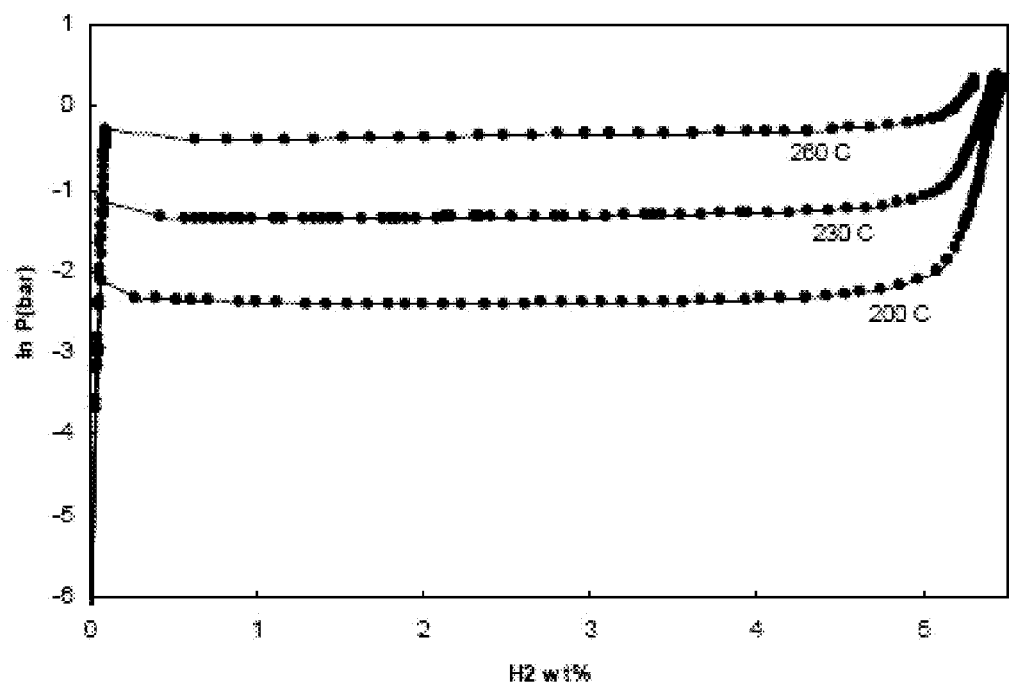
FIG. 6A is a graph of pressure as a function of hydrogen content for absorption by Mg-10 at. % Fe-10Ti at three different temperatures.
Figure 6B:
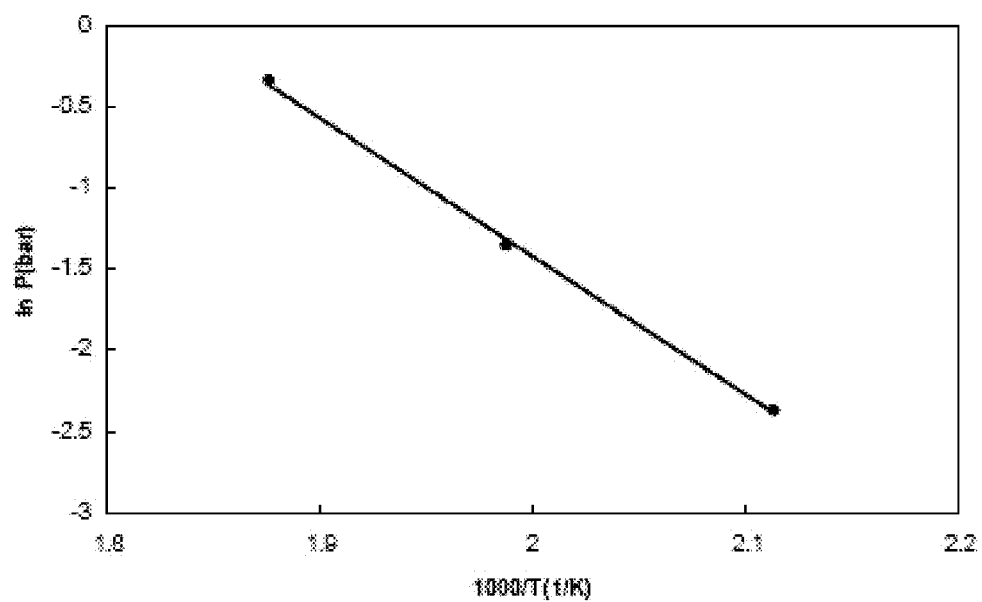
FIG. 6B is a graph of absorption plateau pressure as a function of temperature for Mg-10 at. % Fe-10Ti.
Figure 6C:
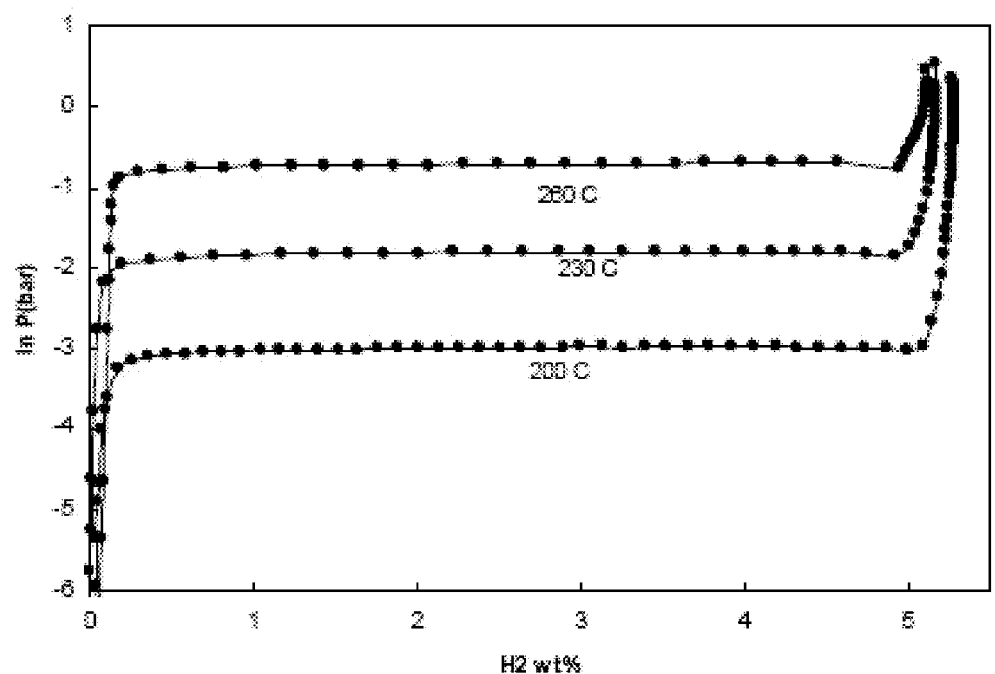
FIG. 6C is a graph of pressure as a function of hydrogen content for desorption by Mg-10 at. % Fe-10Ti at three different temperatures.
Figure 6D:
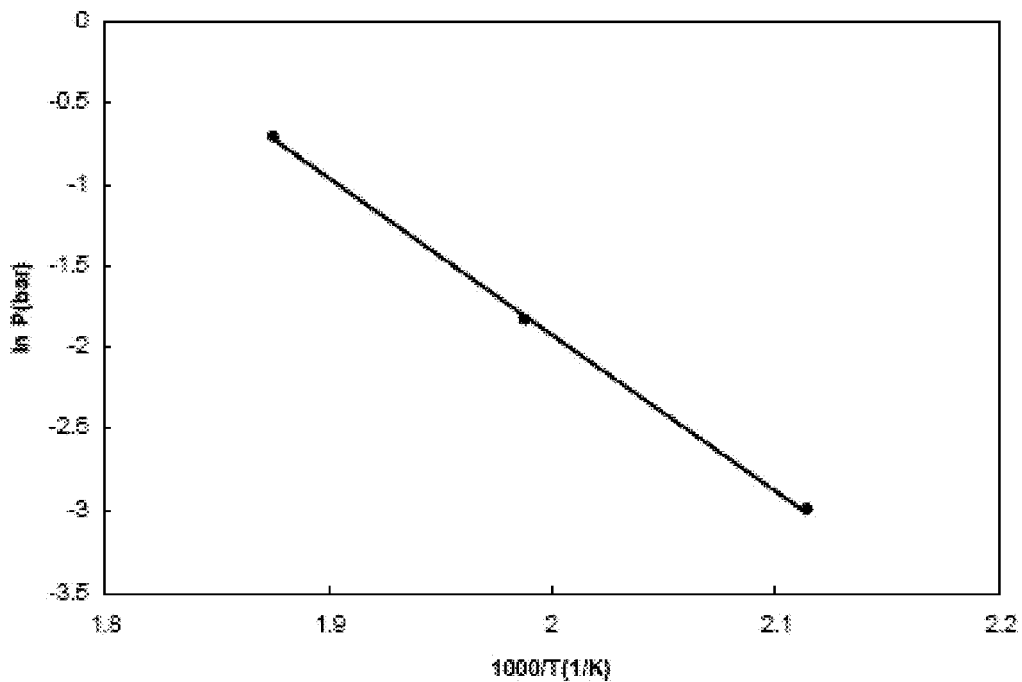
FIG. 6D is a graph of desorption plateau pressure as a function of temperature for Mg-10 at. % Fe-10Ti.

Whether the sorption enhancemement is due to improved kinetics or fundamentally different thermodynamics depends on the hydride phases that are formed. For the system to be significantly destabilized the well-known rule of reversed stability should be operative. The generic representation of the net enthalpy for the dissociation of the hydride and the formation of the intermetallic may be written as a mole-fraction normalized arithmetic subtraction: $\Delta H_{(system)} = \Delta H_{(hybride)} - \Delta H_{(intermetallic)}$. There are two possible binary intermetallic phases formed in the non-hydrided state: TiFe and TiFe$_2$. The heats of intermetallic formation are −31 for FeTi and −28 kJ/mol for Fe$_2$Ti. When the main hydrogen-storing phase is α-MgH2, no net reduction of its heat of formation is possible by the formation of TiFe or TiFe$_2$ upon desorption. Since there is no evidence of ternary hydride Mg$_2$FeH$_6$, and no evidence that the α-MgH$_2$ possesses a fundamentally different structure (i.e. destablized due to alloying), we have to conclude that rapid sorption behavior of the films is due to better kinetics. This conclusion, at least for the Mg-10 at. % Fe-10Ti alloy, is supported by the pressure-composition isotherm absorption and desorption data shown in FIG. 6. FIG. 6A shows pressure-composition isotherm absorption data for the Mg-10 at. % Fe-10Ti alloy, with one curve at each of 200° C., 230° C. and 260° C. FIG. 6B graphs the plateau pressures for these curves v. the temperatures. FIGS. 6C and 6D are analogous to FIGS. 6A and 6B respectively but show data for desorption rather than absorption. The absorption data produces a calculated enthalpy and entropy of ΔH=−70.7 kJ/mole and ΔS=129.5 J/mole and the desorption data produces a calculated enthalpy and entropy of ΔH=−79.6 kJ/mole and ΔS=143.4 J/mole. Within experimental error the calculated enthalpies agree with 72-79 kJ/mol H$_2$ values commonly reported in literature for the Mg to α-MgH2 transformation.

For FeTi, the heat of hydride formation varies with the hydrogen content (multiple plateaus), but is in the −28 to −35 kJ/mol H$_2$ range. The standard Van't Hoff equation is used to calculate the plateau pressure with respect to temperature: $\ln(P/P_0) = \Delta H/RT - \Delta S/R$ where ΔH is the enthalpy of hydride formation, ΔS=−130 J/Kmol H$_2$, and P$_0$=1 bar. At 200° C. and 3 bar none of the FeTi-hydride phases will be stable, though hydrogen will remain in the intermetallic as an interstitial solid solution. From a kinetic point of view, Ti and Fe are known to be individually catalytic for hydrogen dissociation/re-association in the magnesium system. Combining these elements may be synergistic. Moreover hydrogen diffusivity FeTi solid solution is rapid. If this phase is continuously dispersed throughout the MgH$_2$ grains it may act as an effective pathway for hydrogen diffusion in and out of the system.

In some embodiments, the catalyst for the kinetic absorption and desorption of hydrogen may comprise iron and vanadium. In a study we examined hydrogen sorption in 1.5 μm thick Mg—Fe—V films, using the binary alloys as baselines. At 200° C. both Mg—V and Mg—Fe—V absorb in tens of seconds, and desorb in tens of minutes. The ternary alloys show minimal kinetic or capacity degradation even after 105 absorption/desorption cycles. Pressure-composition isotherms yield the well-known enthalpies of α-MgH$_2$ formation (decomposition), agreeing with XRD results. The x-ray spectrum also shows a broad hump centered near (011) reflection of CsCl-type Fe—V phase. Thus, at least some of the iron and vanadium may form a dispersed CsCl-type phase in the magnesium. Our hypothesis is that a densely distributed nanoscale Fe—V acts both as a potent hydrogen dissociation catalyst and a heterogeneous nucleation site. As we show in this document, bi-metallic Fe—V catalysts substantially improve hydrogenation kinetics of magnesium, in some cases even above the performance achieved in binary Mg—V. In some embodiments at least some of the iron and vanadium forms a dispersed sigma phase in the magnesium.

Thin film alloys are useful for understanding and improving bulk hydrogen storage materials, being amiable to fast and accurate synthesis via a variety of techniques, and suffering less from contamination issues compared to milled powders. In this study we utilize relatively thick films (1.5 micrometers) as model systems. It will be demonstrated that upon hydrogen sorption cycling these films break up to the dimensions comparable to those of loose powders. Fe—V catalytic additions may also have use for tremendously enhancing the performance of Mg-based thin film devices such as hydrogen sensors, switchable mirrors and solar absorbers.

The geometry of the samples was a 1.5 μm Mg—Fe—V films with a 7.5 nm Pd/7.5 nm Ta bi-layer catalyst on both top and the bottom surfaces. The films had compositions Mg-13 at. % Fe-7V, Mg-10 at. % Fe-10V, Mg-10 at. % Fe-20V, Mg-15 at. % Fe-15V, Mg-20 at. % V and Mg-20 at. % Fe. Magnesium and magnesium oxide are known to have poor activity towards hydrogen dissociation, which is the first step in the absorption process. Because of this, Pd catalyst films are normally deposited on the fresh magnesium surfaces to aid the sorption kinetics. Increasingly, these catalysts consist of bi-layers, consisting of Pd on an oxide or a metallic support. This intermediate layer serves the critical role of reducing the highly deleterious interdiffusion between the Pd and the underlying hydrogen storing material. When using a single layer Pd catalyst thermal effects drive the interdiffusion of Mg and Pd, and the subsequent formation of Mg$_6$Pd and MgO. In the second study as in the first study tantalum is chosen as the intermediate layer because we have found it to be effective in preventing elevated temperature interdiffusion of Pd and the underlying Mg during hydrogen sorption, as detailed in the fourth study detailed below.

The films were sputtered onto a nominally room temperature 4 inch Si (100) substrate that was coated with a hardened (so as not to outgas in the chamber) photoresist. Inside the sputter system the thin films stack had following sequence: vacuum/7.5 nm Pd/7.5 nm Ta/1.5 mm Mg—Fe—V/7.5 nm Ta/7.5 nm Pd/photoresist/Si wafer. Depositions of the catalysts and of the bulk Mg were performed sequentially without any interruption. We used Ar gas with a purity of 99.99999% at a sputtering pressure of $5\times10^{-3}$ mbar, with a maximum base pressure of $5\times10^{-8}$ mbar. Deposition was performed using a DC-magnetron co-sputtering system (AJA International™). The substrate temperature was maintained near ambient. Deposition was done in a sputter-up configuration with continuous substrate rotation. Film thickness and deposition rates were obtained through the use of crystal deposition rate monitor held at the substrate plane. A separate series of experiments involving ex-situ film thickness measurements versus deposition parameters were used to cross check the thickness/rate accuracies. The deposition rates were the following: Mg 3; Pd 1.7; Ta 0.3 Å/sec; Fe and V varied to adjust for stoichiometry.

After deposition the photoresist was washed away using acetone allowing the films to be fully released from the Si wafer. Release from the substrate allowed the films to be treated as free flakes, in turn allowing for both accurate volumetric sorption testing and XRD analysis. During the release step the films developed cracks perpendicular to their surface, disintegrating into millimeter and micron-scale flakes. The ultimate geometry of the films was that of powder-like flakes that were 1.5 micrometers thick with the bi-layer catalysts coating the top and the bottom flake surfaces.

Volumetric absorption and desorption measurements were performed on a Sieverts hydrogen sorption analysis system (Hy-Energy LLC™. PCTPro 2000™). All the measurements were carried out at 200° C. Absorption was performed at a hydrogen pressure of 2.7-2.5 bar, while desorption was done in the 0.01-0.02 bar range. Samples received over 105 absorption/desorption cycles. The system automatically switched from absorption to desorption (and vise versa) once the rate fell below 0.004 wt. %/min.

Figure 7A:
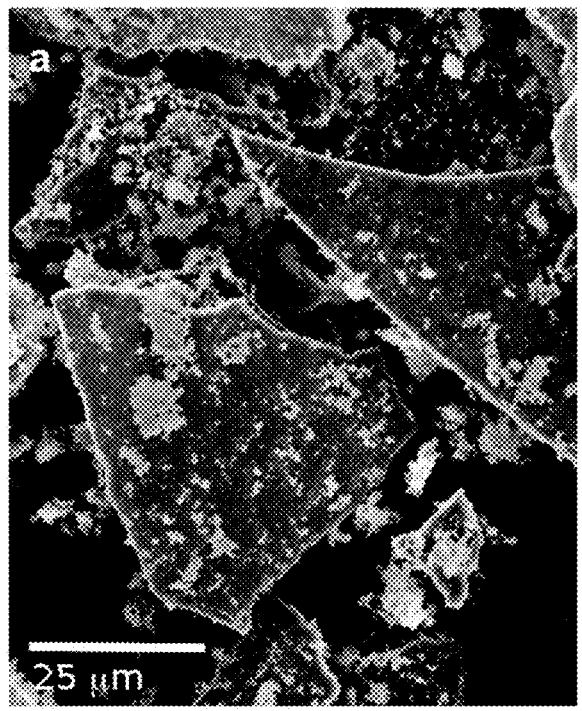
FIG. 7A is an SEM micrograph of hydrogen absorbed Mg-13 at. % Fe-7V thin film flakes after 105 absorption/desorption cycles.
Figure 7B:
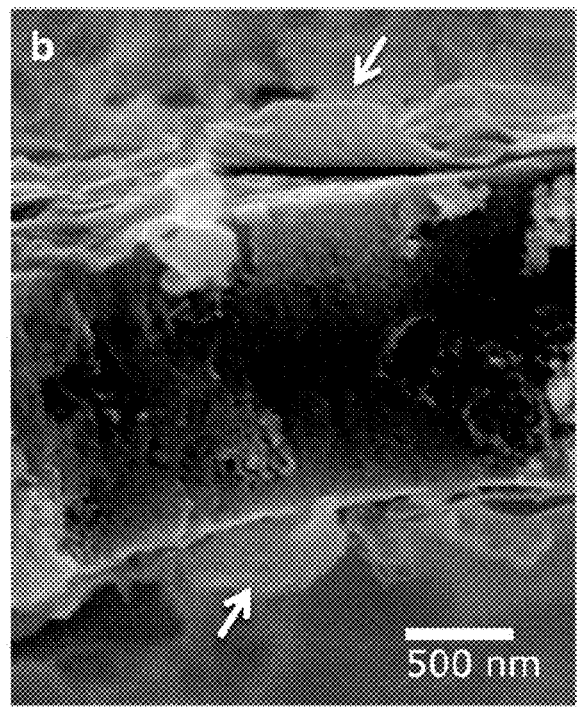
FIG. 7B is a cross sectional SEM micrograph of a sorbed flake surface revealing the Ta/Pb bilayer catalyst that has peeled off from both sides of the intact film during cycling.

FIGS. 7A and 7B show SEM micrographs of the Mg-13 at. % Fe-7V films after they have undergone 105 absorption/desorption cycles. FIG. 7A shows the film flakes in plan view while FIG. 7B shows a film cross-section. FIG. 7A indicates that even after extensive cycling the film flakes largely remain intact, with some finer sub-micron powder particles being present as well. FIG. 7B highlights that during sorption cycling the films remain relatively intact through-thickness as well. FIG. 7B also indicates that much of the catalyst bi-layer on both sides of the film (arrowed) peels away during sorption cycling.

X-ray diffraction experiments were performed on post-cycled film flakes using a Rigaku™ Rotaflex™ rotating anode Diffractometer using copper Ka radiation source ($\lambda=1.54$ Å). The system was operated at 40 kV voltage and 110 mA current. The data from the XRD database on EVA™ software were used for peak identification. Additional simulation of the peaks was performed using Desktop Microscopist™ commercial electron and x-ray diffraction simulation package using the well-known crystallographic information of the metals, intermetallics and hydrides.

Figure 8A:
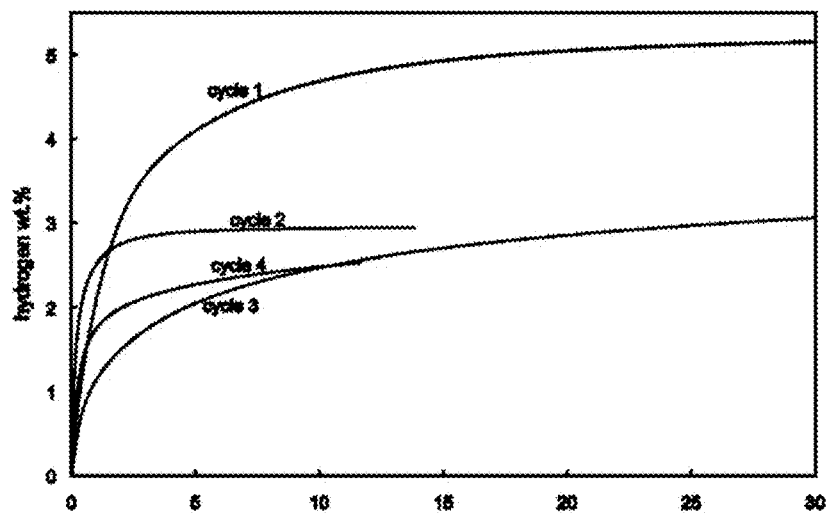
FIG. 8A is a graph of absorption curves for Mg-20 at. % Fe at 200° C., over cycles 1-4.
Figure 8B:
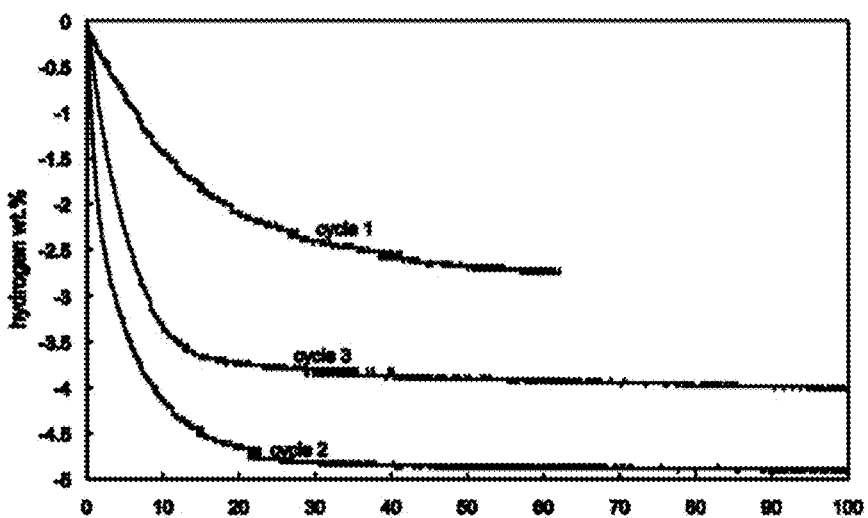
FIG. 8B is a graph of desorption curves for Mg-20 at. % Fe at 200° C., over cycles 1-4.

FIGS. 8A, 8B, 9A, 9B, 10A, 10B, 11A and 11B show the absorption and desorption behavior for the Mg—Fe, Mg—V and Mg—Fe—V, tested at 200° C. The roughness of the desorption curves is due to instrumental noise. FIG. 8A shows the hydrogen absorption and FIG. 8B the hydrogen desorption results for the Mg-20 at. % Fe. During the first hydrogenation the alloy is able to sorb over 4 wt. % hydrogen in less than 10 minutes. The first desorption is however fairly slow, requiring over an hour to release 2.5 wt. % hydrogen. After cycle 2 the capacity of the system degraded. Testing was concluded after hydrogenation cycle 4.

Figure 9A:
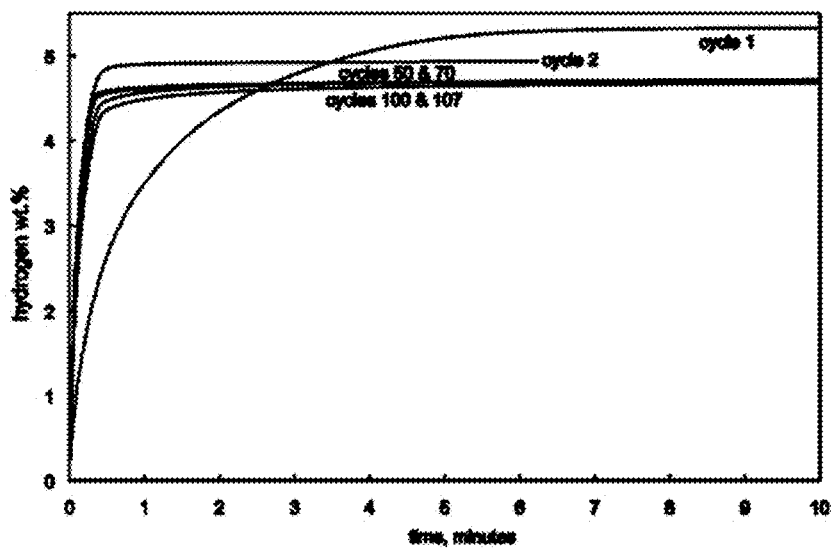
FIG. 9A is a graph of absorption curves for Mg-20 at. % V at 200° C., over cycles 1-107.
Figure 9B:
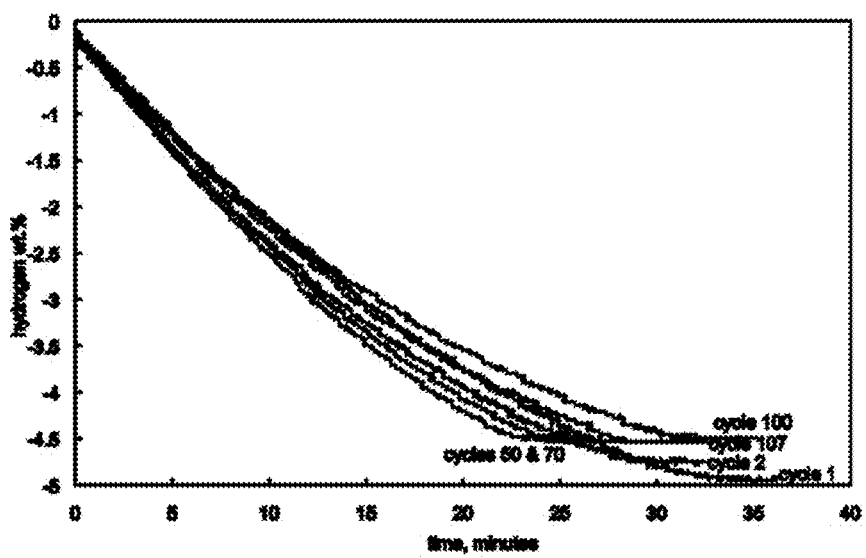
FIG. 9B is a graph of desorption curves for Mg-20 at. % V at 200° C., over cycles 1-107.
Figure 10A:
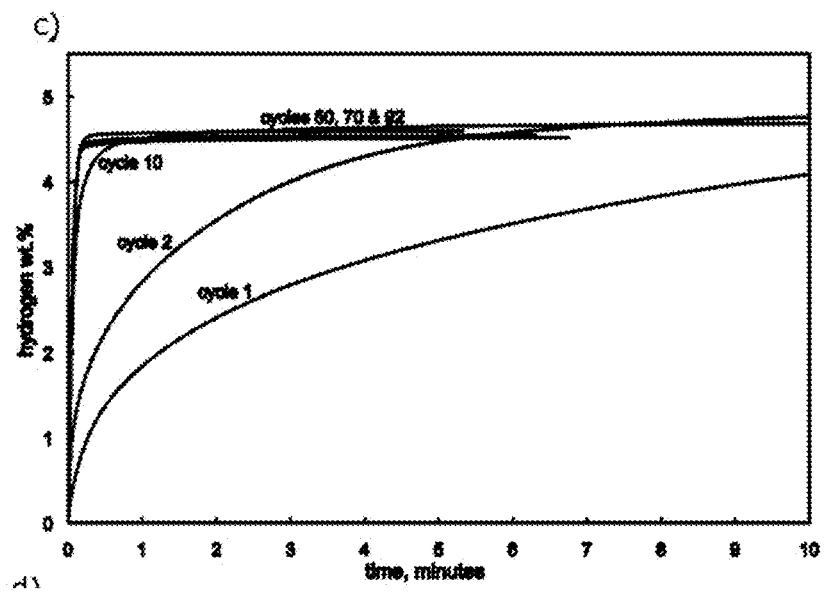
FIG. 10A is a graph of absorption curves for Mg-10 at. % Fe-10 at. % V at 200° C., over cycles 1-92.
Figure 10B:
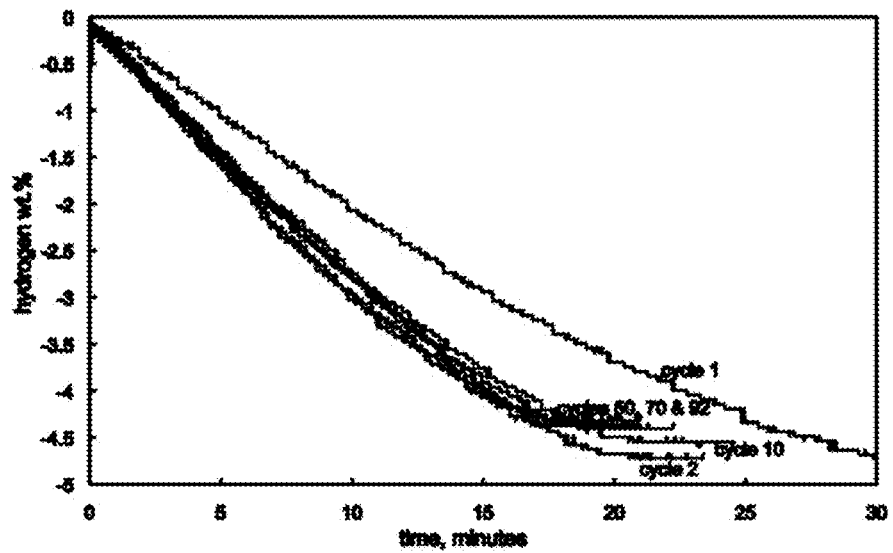
FIG. 10B is a graph of desorption curves for Mg-10 at. % Fe-10 at. % V at 200° C., over cycles 1-92.
Figure 11A:
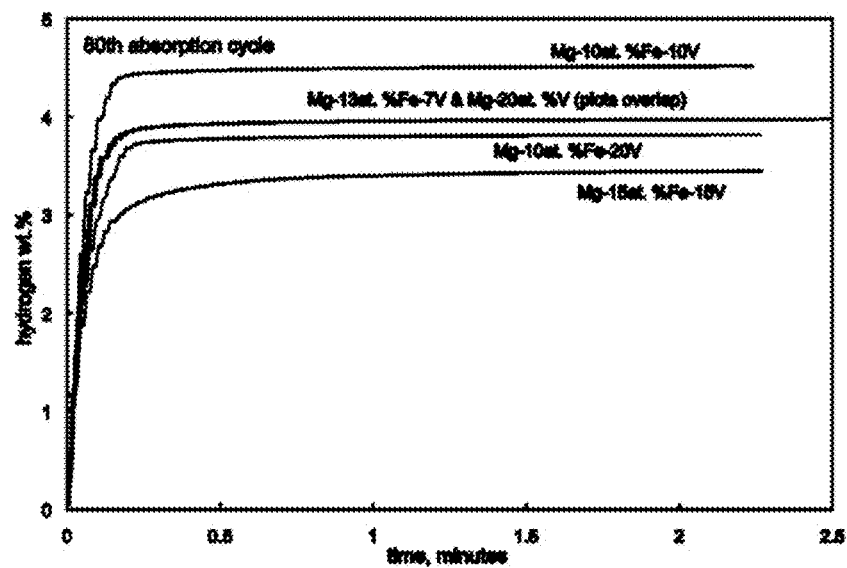
FIG. 11A is a graph of absorption curves for three Mg—Fe—V ternary alloys and for Mg-20 at. % V, over cycle 80.
Figure 11B:
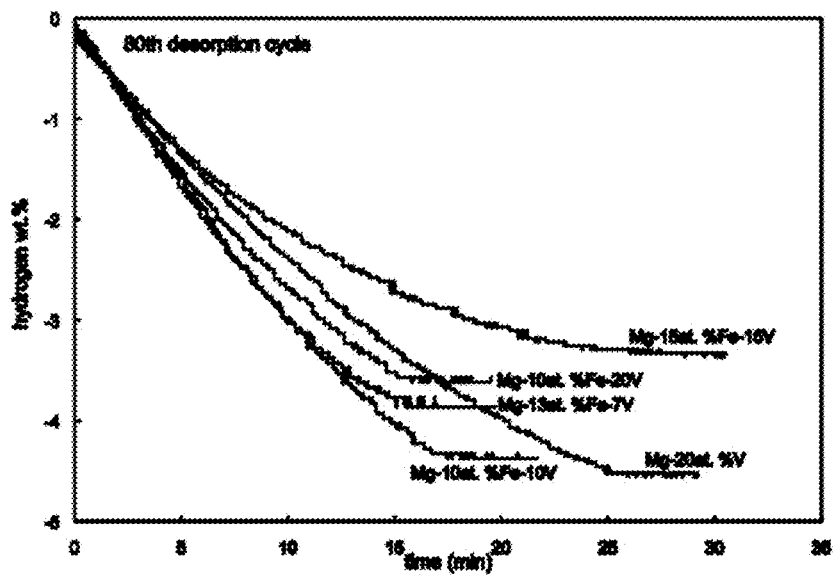
FIG. 11B is a graph of desorption curves for three Mg—Fe—V ternary alloys and for Mg-20 at. % V, over cycle 80.

FIGS. 9A-11B indicate that in the binary Mg-V and in all ternary Mg—Fe—V alloys the situation is quite different: First there is an activation period where the absorption kinetics are significantly slower (order of magnitude) than at steady state. During desorption an activation period also exists but represents only a moderate slowdown (factor of two) relative to the long-term cycling kinetics. This activation period may be due to a variety of microstructural factors such as the time-dependent decomposition of the initially Fe and (or) V supersaturated Mg into the equilibrium nearly pure Mg phase and Fe—V (or V). It may also be due to cycling-induced micro-cracking of the films and the creation of new surfaces. FIG. 9A shows the absorption and FIG. 9B the desorption for Mg-20 at. % V. FIG. 10A shows the absorption and FIG. 10B the desorption for Mg-10 at. % Fe-10 at. % V. FIG. 11A and FIG. 11B show absorption and desorption respectively at the $80^{th}$ cycle for Mg-10 at. % Fe-10 at. % V, Mg-10 at. % Fe-20 at. % V, Mg-13 at. % Fe-7 at. % V, Mg-15 at. % Fe-15 at. % V, and Mg-20 at % V. As shown, the ratio of iron to vanadium in atomic percent may be between 3:1 and 1:9, although other ranges may be used.

By cycle #5 both the absorption and the desorption kinetics are stabilized. For these alloys the absorption kinetics are extremely rapid being on the order of 10 seconds to reach full hydrogen capacity. The desorption kinetics are also relatively fast; ranging from 15 minutes for the Mg-10 at. % Fe-10V alloy to 25 minutes for Mg-15 at. % Fe-15V. Interestingly, these absorption curves do not have the sigmoidal shape characteristic of slow nucleation (nucleation-limited) reactions. Such sigmoidal shapes are normally observed for hydrogenation of magnesium. Rather the slope consistently decreases with increasing time. This has been attributed to a hydride formation process that proceeds evenly on the entire surface of the reactant phase. The hydrogen desorption curves similarly possess decreasing slopes with increasing amount of transformed phase (time). The kinetics of Mg—Fe—V and Mg—V alloys may be qualitatively compared to what was measured in pure Mg films. The pure Mg samples had identical preparation, identical dimensions and identical bi-layer Pd—Ta catalysts. They were tested at 250° C. with absorption (desorption) pressures of 2.5 and 0.05 bar, respectively. The post-activation period times to absorb(desorb) were on the order of 40 minutes and 2 hours.

Another key characteristic of these alloys is that after the initial activation period the samples did not display any capacity degradation during subsequent testing. The capacities shown at cycle 80 (FIGS. 11A and 11B) were identical to the capacities at cycle 6 and at cycle 100. The measured hydrogen capacities of the alloys are somewhat lower than what would be expected with complete conversion of magnesium to $\alpha$-$MgH_2$ and no other hydride phase being present. Assuming only $\alpha$-$MgH_2$, alloys Mg-20 at. % V, Mg-10 at. % Fe-10V, Mg-13 at. % Fe-7V, Mg-10 at. % Fe-20V, and Mg-15 at. % Fe-15V can hold 5.12, 5.04, 5.02, 4.09 and 4.07 weight percent, respectively. The bi-layer catalysts coating both sides of the films add negligible hydrogen storage capacity but have a non-negligible weight. This would lower the above capacities by approximately 10%.

Figure 12A:
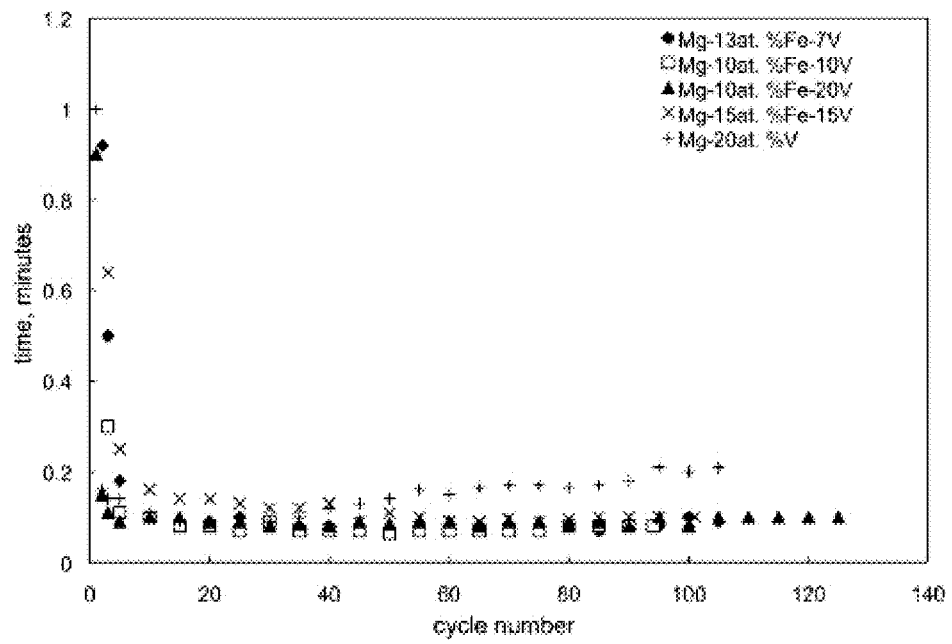
FIG. 12A is a graph comparing the time to absorb 80 weight % of the maximum measured capacity for several different alloys, as a function of sorption cycle number.
Figure 12B:
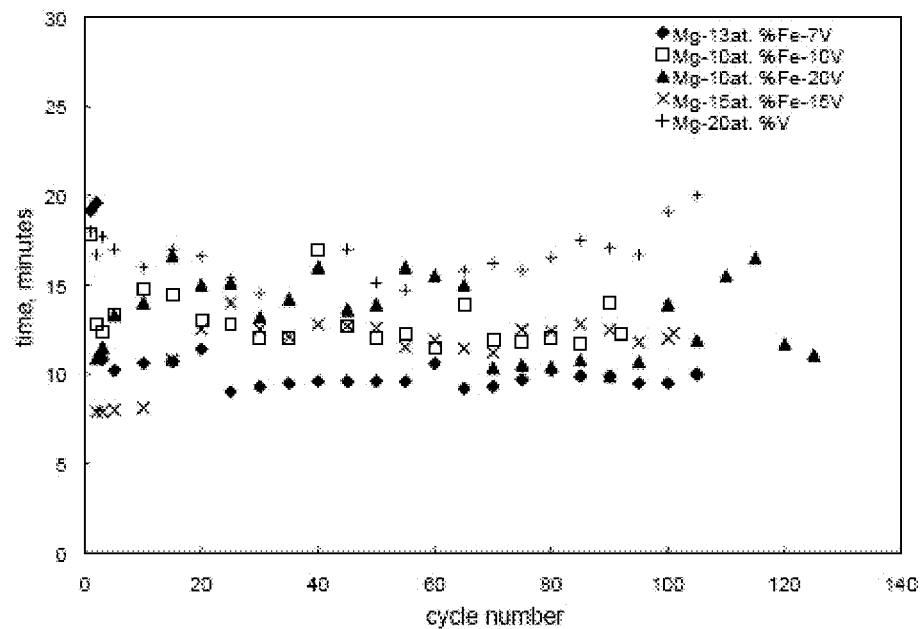
FIG. 12B is a graph comparing the time to desorb 80 weight % of the maximum measured capacity for several different alloys, as a function of sorption cycle number.

FIGS. 12A and 12B compare the Mg—Fe—V and the Mg—V alloys, showing the time to absorb 80 wt. % of the measured hydrogen absorption capacity (FIG. 12A) and the time to desorb 80 wt. % of the measured hydrogen desorption capacity (FIG. 12B). The absorption data highlights the activation period present for all alloys during the initial cycles. More importantly it highlights a key difference in the hydrogenation behavior between the binary Mg—V alloy and the ternary Mg—Fe—V: Starting at about 40 sorption cycles the kinetics of Mg-20 at. % V begin to display some degradation. Conversely the absorption kinetics of the Mg—Fe—V alloys remain constant over the 100+ cycles of testing. The desorption data in general shows more experimental scatter making a clear interpretation of the trends more difficult. The kinetics are also markedly slower than for absorption, though still very fast relative to other Mg-based systems. In Mg-20 at. % V there does seem to be a trend of prolonged (80+) cycling leading to some degradation of the desorption kinetics. The Mg-10 at. % Fe-20V may degrade analogously to the Mg-20 at. % V alloy. In the remaining Mg—Fe—V alloys the data points to either very minor kinetic degradation or to none at all.

Figure 13A:
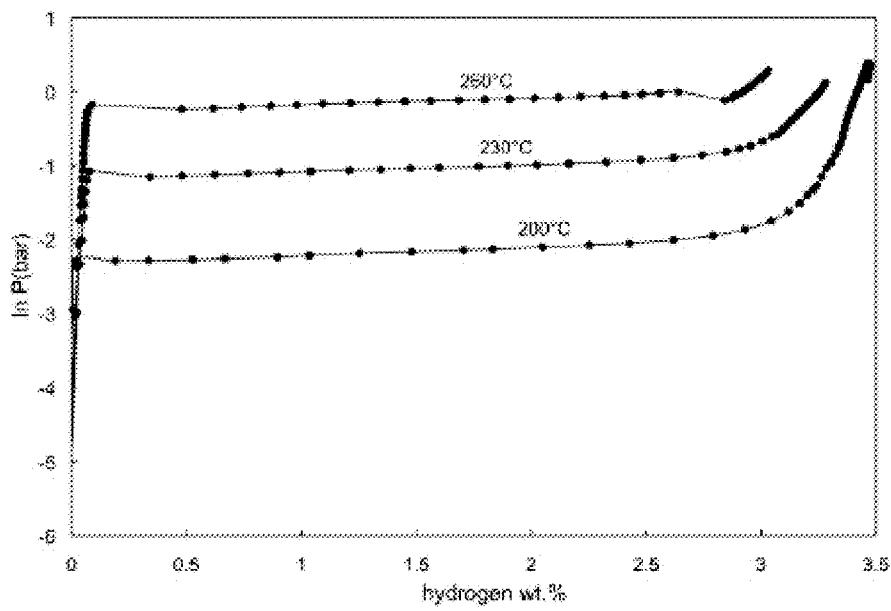
FIG. 13A is a graph showing pressure-composition isotherm absorption data for Mg-15 at. % Fe-15V at 200° C., 230° C. and 260° C.
Figure 13B:
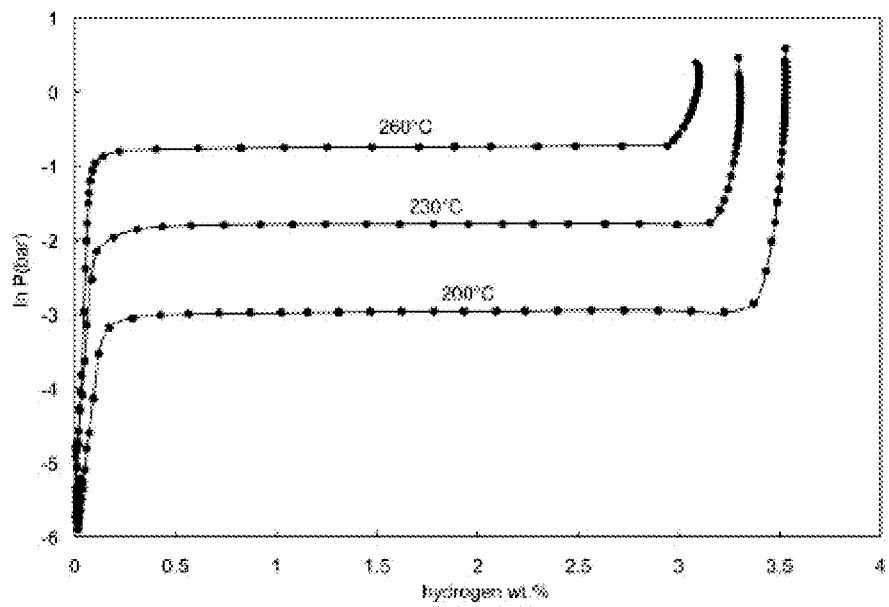
FIG. 13B is a graph showing pressure-composition isotherm desorption data for Mg-15 at. % Fe-15V at 200° C., 230° C. and 260° C.

FIGS. 13A and 13B shows the pressure-composition-isotherm plots for the Mg-15 at. % V-15 at. % Fe alloy for absorption (FIG. 4A) and desorption (FIG. 4B). As expected there is a quantifiable hysteresis between the hydride formation plateau and the hydride decomposition plateau. The calculated enthalpy for hydride formation is −71 kJ/mol $H_2$ while the enthalpy for hydride decomposition is 73 kJ/mol $H_2$. The calculated entropy is in the 130 J/Kmol $H_2$ range. This difference between absorption and desorption thermodynamics is associated with the asymmetry of the nucleation barrier for the hydride versus the metal and the irreversible work associated with each. From these results we can conclude that Fe—V does not alter the system thermodynamics and the sorption enhancement is purely kinetic. While the enthalpy of hydride formation for any Fe—V phases are unknown, it can be safely assumed that the value will be somewhere between that of pure V and of pure Fe. $VH_{0.5}$ has an enthalpy of formation in the range of −35 to −42 kJ/mol H, while iron hydrides are unstable ($\Delta H$ $FeH_{0.5}$ is +10 kJ/mol H). At 200° C. and 2.7 bar a stable Fe—V hydride is not expected. Another possibility is the formation of the $Mg_2FeH_6$ phase, which has a similar enthalpy of formation to $\alpha$-$MgH_2$. As the next figure will demonstrate, there is little evidence for $Mg_2FeH_6$ formation.

Figure 14:
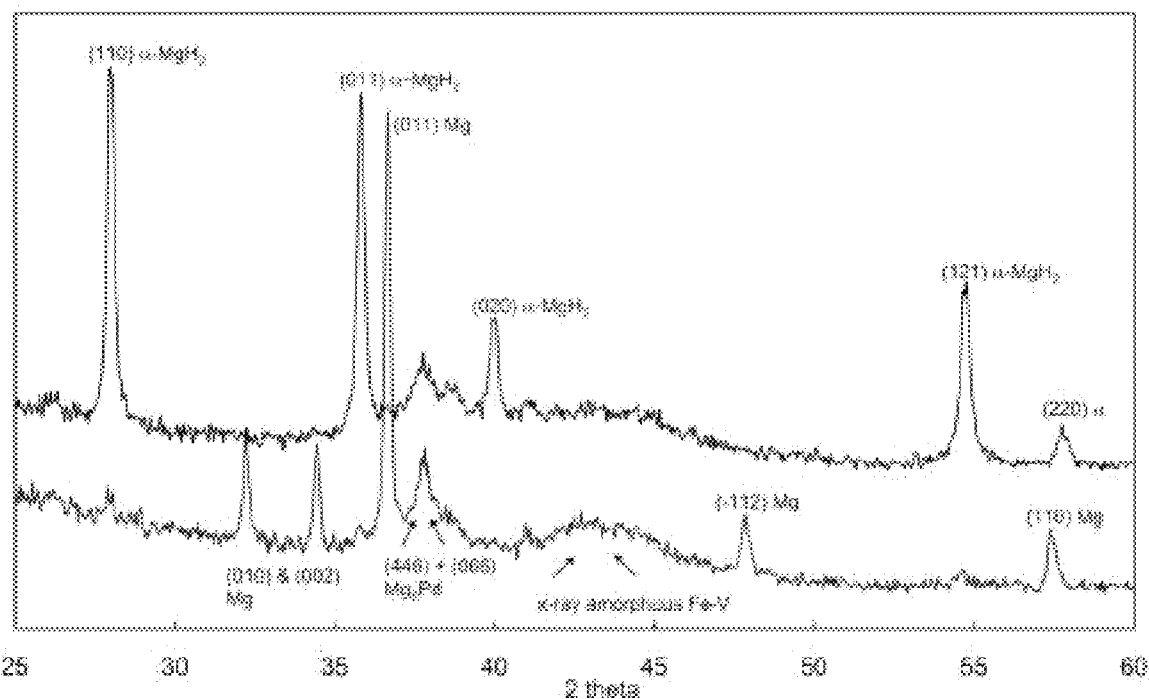
FIG. 14 is a graph showing the indexed X-Ray diffraction pattern of Mg-10 at. % Fe-10V alloy after cycling, absorbed (upper line) and desorbed (lower line)

FIG. 14 shows the indexed XRD pattern of the hydrogentated and desorbed Mg-10 at. % Fe-10 at % V films. The top curve shows the XRD pattern after absorption and the bottom curve shows the XRD pattern after desorption. The samples, which were in loose flake form, were analyzed after undergoing over 100 sorption cycles. Hence the microstructure may be considered as "steady-state". The most prominent peaks are unambiguously indexed to belong to $\alpha$-$MgH_2$ phase, with no detectable variation of the lattice parameter from the literature-reported values. A simulation was run to predict the peaks belonging to $Mg_2FeH_6$, with the results clearly showing it not being present. We also simulated the equilibrium tetragonal $\sigma$-FeV phase, which was unambiguously absent.

We were however able to confirm the presence of the $Mg_6Pd$ intermetallic, with its most intense peaks being relatively prominent. The experimentally overlapping (446) and (066) $Mg_6Pd$ peaks are labeled in the figure, while the detected (224) peak present at $2\theta=21.6°$ is not shown. The most intense $Mg_6Pd$ peak (111) would be at $2\theta=7.59°$, and was outside the range of the detector. The presence of $Mg_6Pd$ indicates that the Pd catalyst did react with the base material despite the use of a Ta diffusion barrier. In the $2\theta=40$ to $2\theta=45°$ range there is a broad "x-ray amorphous" hump.

The hump may be caused by an amorphous phase (being peaked at the average near-neighbor distance), a nanocrystalline phase or a mixture of both. The peak is more prominent in the desorbed sample, being centered at roughly $2\theta=42.7°$. The most intense peak for pure $\alpha$-Fe would be (011) centered at $2\theta=44.7°$. The most intense peak for pure V is (011) centered at $2\theta=42.3°$. The metastable CsCl-type Fe—V phase has its most intense (011) peak centered at $2\theta=43.8°$, though the lattice spacing and hence position is expected to vary with the relative composition. The (001) CsCl-type Fe—V peak centered at $2\theta=30.5°$ is much weaker and is not expected to show up in the pattern. Thus there is a good possibility that the Fe and V atoms, which possessing a negative enthalpy of mixing but are negligibly soluble in Mg, are clustered into a nanocrystalline CsCl-type phase. Other combinations of catalyst may form such a phase.

Since there is no evidence of ternary hydride $Mg_2FeH_6$, and no evidence that the $\alpha$-$MgH_2$ possesses a fundamentally different structure (i.e. destabilized due to alloying), we conclude that rapid sorption behavior of the films is due to the presence of this nanocrystalline and/or amorphous Fe—V phase. From a kinetic point of view, V and Fe are known to be individually catalytic for hydrogen dissociation/re-association. Combining these elements in a nanocrystalline structure may be synergistic. Moreover if this Fe—V phase is densely and continuously dispersed throughout the $Mg(MgH_2)$ grains, it may act as an effective pathway for hydrogen diffusion in and out of the microstructure. It should also act as a heterogeneous nucleation site for both magnesium hydride and for metallic magnesium. That would explain the observed non-sigmoidal shape of the absorption and desorption curves, since copious nucleation events would occur. One can also argue that since elemental Fe and V have a negative heat of mixing and consequently reduced diffusivities in Mg, a phase consisting of both elements should be more resistant to microstructural coarsening relative to pure V or Fe phases. This may explain the unique prolonged cyclic stability of the ternary system.

In some embodiments, the hydrogen absorbing and desorbing material disclosed herein compris a catalytic surface formed by a process comprising the steps of: depositing a layer of tantalum on the hydrogen absorbing and desorbing material; and depositing a layer of palladium on the layer of tantalum. In other embodiments, the material may comprise a palladium-tantalum bilayer catalyst deposited on the hydrogen absorbing and desorbing material to improve the rate of absorption or desorption of hydrogen in the hydrogen absorbing and desorbing material.

In a study we analyzed the elevated temperature volumetric hydrogen sorption behavior of magnesium thin films catalyzed by nano-scale bi-layers of Pd/Ta, Pd/Nb, Pd/Ti and Pd/Fe. Sorption of magnesium catalyzed by pure Pd was determined as a baseline. Sorption cycling demonstrated that when utilizing pure Pd and the Pd/Fe bi-layer catalysts the sorption kinetics of the Mg films rapidly degraded. However with the Pd/Nb, Pd/Ti and Pd/Ta bi-layer catalysts the composite remained cycleable. After multiple sorption cycles the Pd/Nb and Pd/Ti catalyst combinations possessed the fastest kinetics. X-ray diffraction analysis showed that $NbH_{0.5}$ and $TiH_2$ are formed during testing. Basic thermodynamic analysis indicates that $NbH_{0.5}$ and $TiH_2$ should be stable both during absorption and during desorption. We believe that this is why Nb and Ti are the most effective intermediate layers: The elements form stable hydrides at the Mg surfaces preventing complete Pd—Mg interdiffusion and/or acting as hydrogen catalysts and pumps.

This study provides a systematic comparison of the sorption cycling behavior for a range of bi-layer catalysts using identical sample geometries and sorption conditions for each one. We chose bi-layer combinations of Pd/Nb, Pd/Ti and Pd/Fe, Pd/Ta, using pure Pd as a baseline. Tantalum is well-known as an excellent diffusion barrier for metals. It also possesses a very high hydrogen permeability ($1.3 \times 10^{-7}$ mol/ms Pa$^{1/2}$ at 500° C.). Pure magnesium represents the simplest case in terms of the equilibrium phases formed upon hydrogen sorption ($\alpha$-MgH2) and has well defined equilibrium binary phase diagrams with both the Pd and the intermediate layers.

The samples consisted of 1.5 mm Mg films coated with bilayer 7.5 nm Pd/7.5 nm Fe (or Ti or Nb or Ta) catalysts on both the top and the bottom Mg surfaces. The transition metal served as an intermediate layer between the Mg and the Pd. A 15 nm Pd single-layer film, on both top and bottom, was used as a baseline. The films were sputtered onto a nominally room temperature 4 inch Si(100) substrate that was coated with a hardened (so as not to outgas in the chamber) photoresist. Inside the sputter system the thin films stack had following sequence: vacuum/7.5 nm Pd/7.5 nm transition metal/1.5 mm Mg/7.5 nm transition metal/7.5 nm Pd/photoresist/Si wafer.

Figure 15A:
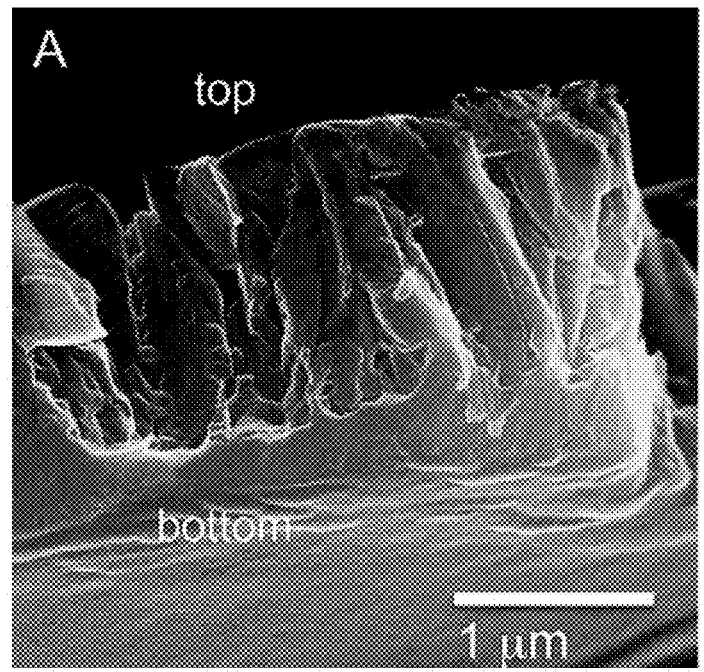
FIG. 15A is an SEM micrograph of a cross section of a Pd/Nb catalyzed film flake after removal from the wafer and testing.
Figure 15B:
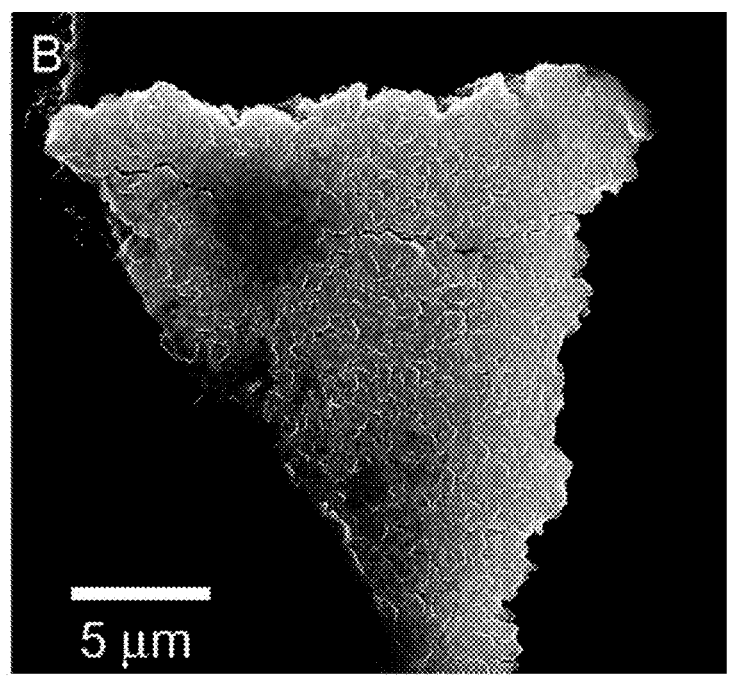
FIG. 15B is a plan view SEM micrograph of the top surface of the flake shown in FIG. 7A.

After deposition the photoresist was washed away using acetone allowing the films to be fully released from the Si wafer. Release from the substrate allowed the films to be treated as free powders, in turn allowing for both accurate volumetric sorption testing and XRD analysis. During the release step the films developed cracks perpendicular to the surface, disintegrating into millimeter and micron-scale flakes. The ultimate geometry of the films was that of powderlike flakes that were 1.5 μm thick with the bi-layer catalysts coating the top and the bottom flake surfaces. FIG. 15A shows a SEM micrograph of a cross section of the Pd/Nb catalyzed Mg thin film flake after removal from the wafer and prior to testing. The bi-layer catalyst, although not discernable in the figure, coats the Mg film conformally, with the Nb being in contact with the Mg. FIG. 15B shows a plan-view SEM micrograph of the top flake surface revealing the morphology of the Mg grains. The Mg is microcrystalline with columnar grain morphology.

Depositions of the catalysts and of the bulk Mg were performed sequentially without any interruption. We used Ar gas with a purity of 99.999% at a sputtering pressure of $5 \times 10^{-3}$ mbar, with a maximum base pressure of $5 \times 10^{-8}$ mbar. Deposition was performed using a DC-magnetron cosputtering system (AJA International™). The substrate temperature was maintained near ambient. Deposition was done in a sputter-up configuration with continuous substrate rotation. Film thickness and deposition rates were obtained through the use of crystal deposition rate monitor held at the substrate plane. A separate series of experiments involving ex-situ film thickness measurements versus deposition parameters were used to cross check the thickness/rate accuracies. The deposition rates were the following: Mg 3; Pd 1.7; Ta 0.3; Ti 0.4; Nb 0.4; and Fe 0.7 Å/s.

Volumetric absorption and desorption measurements were performed on a Sieverts hydrogen sorption analysis system (Hy-Energy LLC™. PCTPro-200™). All the measurements were carried out at 250° C. All specimens were absorbed at a starting pressure near 2.5 bar and desorbed at a starting pressure near 0.05 bar. Samples received up to 8 absorption/desorption cycles.

We used scanning electron microscopy (SEM) to analyze the morphology of the films. A Hitachi™ S-4800™ SEM was operated at 7 kV accelerating voltage. Imaging was performed in secondary electron mode. The loose film flakes here mounted onto SEM stubs using conductive carbon tape.

X-ray diffraction experiments were performed on a Bruker AXS™ diffractometer (Bruker Discover 8) using a copper $K_\alpha$ radiation source ($\lambda$=1.541 Å) that was monochromized using a single Göbel mirror. Geometry of the system was in the Bragg-Brentano Geometry with a general area 2-dimensional detection system (GADDs). The data from the XRD database on EVA™ software were used for peak identification. Additional simulation of the peaks was performed using Desktop Microscopist™ commercial electron and X-ray diffraction simulation package using the well-known crystallographic information of the metals, intermetallics and hydrides. The samples were analyzed by XRD directly after the last sorption cycle shown in the accompanying figure. The samples analyzed by Sieverts and XRD were in powder form after having been removed from the Si wafer by dissolving the photoresist.

Figure 16A:
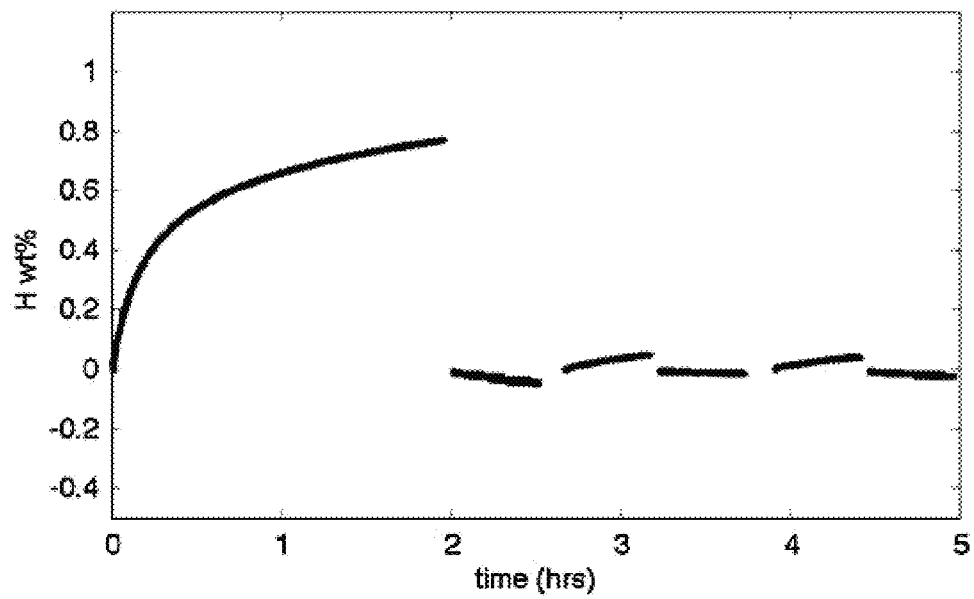
FIG. 16A is a graph of the cycled kinetics of magnesium with Pd catalyst layers.
Figure 16B:
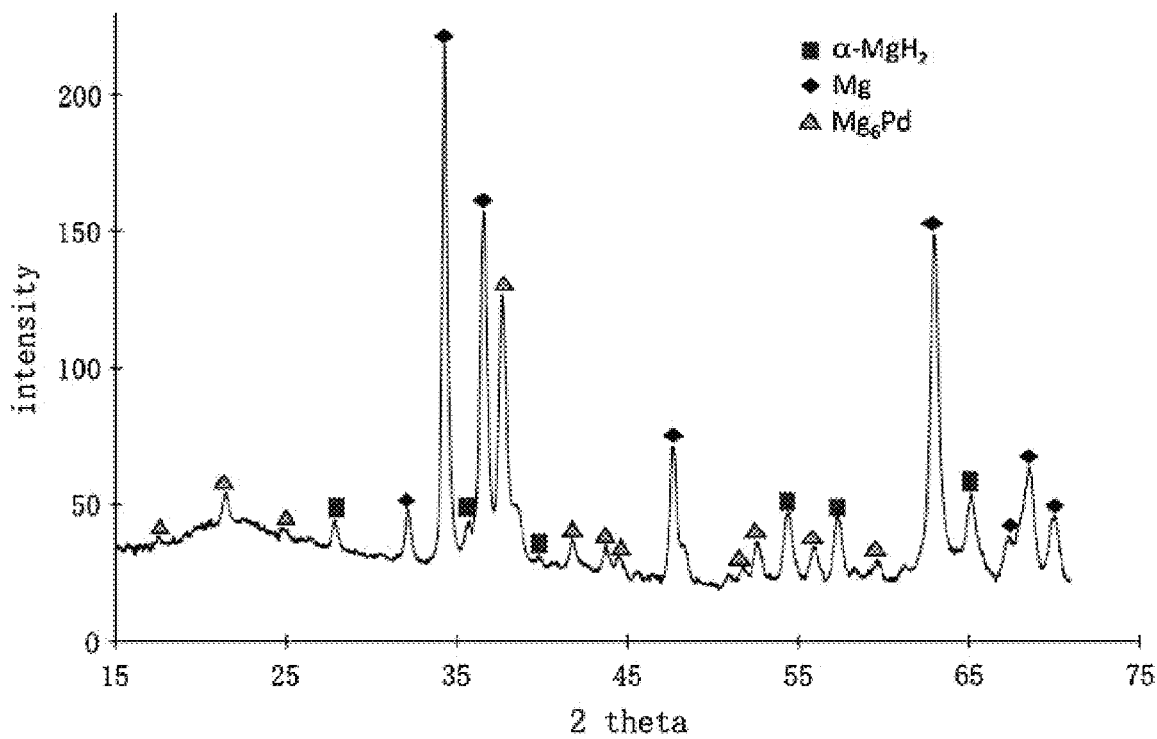
FIG. 16B is a graph of the XRD pattern of the magnesium with Pd catalyst layers whose kinetics are shown in FIG. 8A, after the last sorption cycle (partial desorption)

FIG. 16A shows the absorption and desorption data of the Mg films with the baseline 15 nm Pd capping layers. For all samples in this study absorption was at 2.5 bar hydrogen and desorption was at 0.05 bar hydrogen. The testing temperature was 250° C. At 250° C. the kinetics are very slow, agreeing with the commonly reported observation that pure magnesium requires temperatures in excess for 300° C. for appreciable sorption. The absorption time for the first cycle was 2.5 h. While the magnesium would have taken on more hydrogen if held for longer times the point was to demonstrate the sluggishness of the baseline reaction. After two and a half hours, less than 1 wt. % hydrogen is absorbed (theoretical capacity of MgH$_2$ is 7.6 wt. %) and the majority of the magnesium remains metallic. The sample was even slower in desorption, essentially possessing negligible rates at the 0.05 bar hydrogen pressure. Subsequent attempts to absorb and desorb this microstructure were not successful. As we will demonstrate in the rest of the figures, the sorption rates achieved with various bi-layer catalysts are orders of magnitude higher at identical pressure/temperature sorption conditions. FIG. 16B shows that XRD pattern obtained from the sample after the last attempted desorption cycle (desorption data taken from 4.5 to 5 h). As expected the base material microstructure is a mixture of magnesium that displays peaks of the highest intensity and some $\alpha$-MgH$_2$. No Pd peaks were detected. Instead clear and relatively intense Mg$_6$Pd intermetallic peaks were present, indicating almost complete (within the detection limits of the XRD analysis) reaction of the Pd with the Mg at elevated temperatures.

Figure 17A:
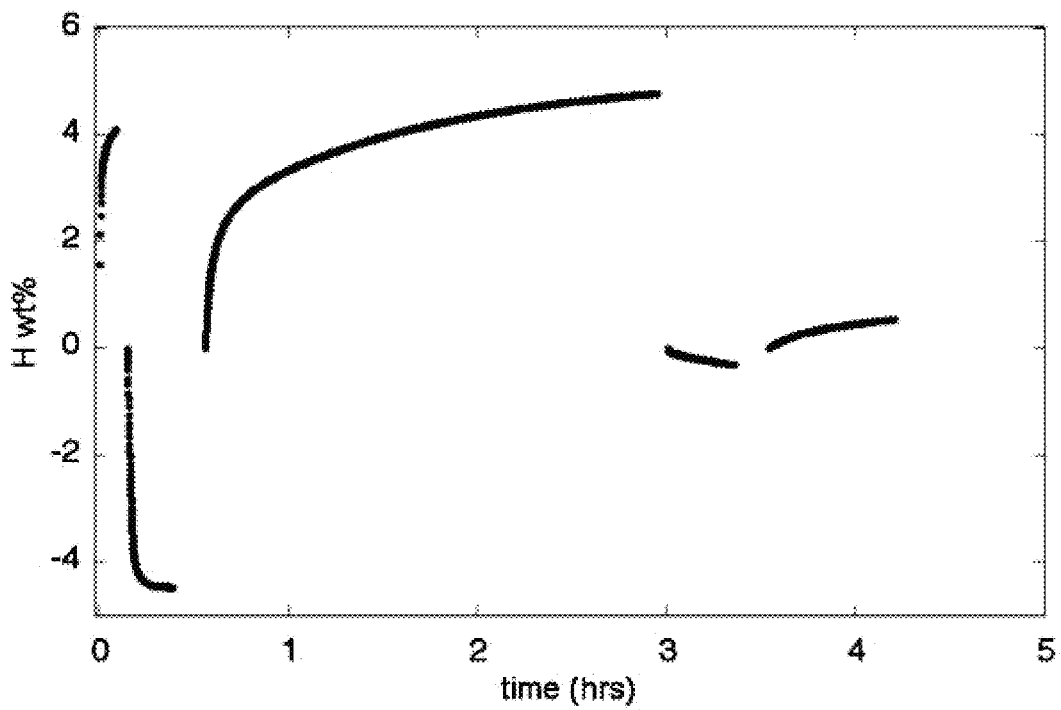
FIG. 17A is a graph of the cycled kinetics of magnesium with Pd/Fe bi-layer catalysts.

FIGS. 17A-20B show the sorption and the XRD data for the Pd/Fe, Pd/Ta, Pd/Nb and Pd/Ti bi-layer catalysts. FIGS. 21A and 21B provide a comparison of the absorption (FIG. 21A) and desorption (FIG. 21B) times for each of these systems as a function of sorption cycle number. Pd/Ti is marked as A, Pd/Ta as B, Pd/Nb as C, and Pd/Fe as D. FIG. 17A demonstrates that the initial absorption/desorption behavior of Mg with the Pd/Fe bi-layer catalysts is markedly different from the case when single-phase Pd was used. In the first sorption cycle the Pd/Fe sample absorbs over 4 wt. % hydrogen in 10 min. The first desorption cycle is also quite encouraging: 12 min to fully desorb. However the subsequent sorption cycle is much less impressive, with the required time to absorb 4 wt. % hydrogen being an hour. Subsequent desorption is not possible, with the sample losing only about 0.5 wt. % before the kinetics become very sluggish. For this reason there is only one data point for the Pd/Fe graph D in FIG. 21B, which essentially coincides with the corresponding data point for the Pd/Nb graph C and so is not visible in the figure.

Figure 17B:
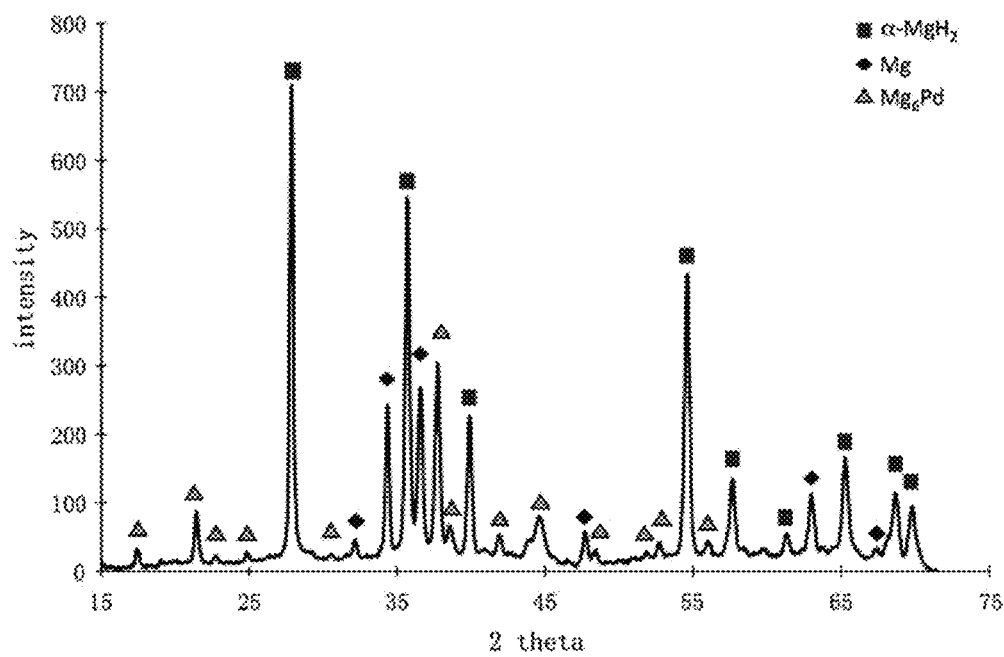
FIG. 17B is a graph of the XRD pattern of the magnesium with Pd/Fe bi-layer catalysts whose kinetics are shown in FIG. 17A, after the last cycle (absorption)

The XRD pattern shown in FIG. 17B is of the specimen of Mg with the Pd/Fe bi-layer catalysts of FIG. 17A after the last sorption cycle. The sample should nominally contain 4 wt. % hydrogen, and hence be only partially sorbed. The theoretical capacity for pure $MgH_2$ is 7.6 wt. %. The theoretical capacity of the composite should be lower due to the presence of the bi-layer catalysts on both film surfaces. As expected the XRD pattern shows the presence of $\alpha$-$MgH_2$ as well as unsorbed Mg. Interestingly the other dominant phase that is clearly present in the material is the $Mg_6Pd$ intermetallic. This is somewhat surprising considering that the Mg and the Pd were not in contact in the as-synthesized films. This result can be qualitatively understood by considering the phase diagrams for Mg—Fe, Mg—Pd and Fe—Pd. Magnesium and Fe are virtually immiscible and do not form any intermediate phases. Magnesium and Pd form a series of intermetallics with the $Mg_6Pd$ being the stable phase on the Mg-rich side. The Fe—Pd phase diagram consists of an $\alpha$-Fe phase, with negligible solubility for Pd at 250° C., in equilibrium with ordered Fe—Pd having the prototype AuCu structure. At higher Pd compositions the ordered $FePd_3$ phase is formed (prototype $AuCu_3$). This phase is unlikely since at a bi-layer film thickness of 7.5 nm/7.5 nm there is not enough Pd to fully react with the Fe. A possible scenario is that at elevated temperatures the Pd and Fe interdiffuse, forming a Fe—Pd alloy that is in contact with the underlying Mg. The formation of $Mg_6Pd$ then ensues with the accompanying loss of catalytic activity for hydrogen dissociation/reassociation.

Figure 18A:
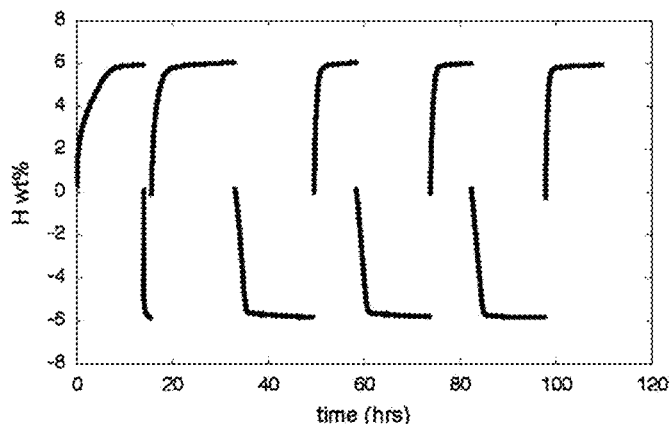
FIG. 18A is a graph of the cycled kinetics of magnesium with Pd/Ta bi-layer catalysts.
Figure 18B:
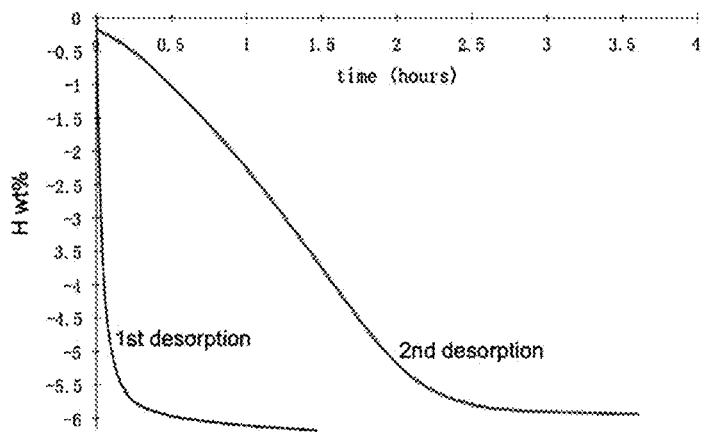
FIG. 18B is a graph of the first and second desorptions of FIG. 18A.
Figure 18C:
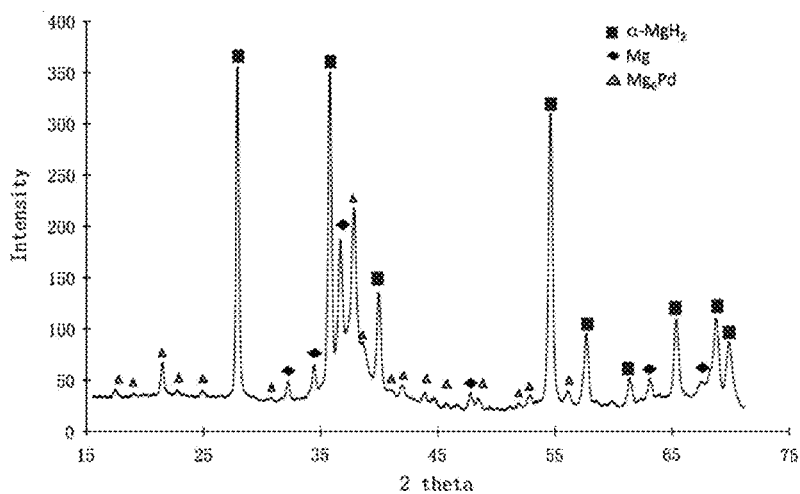
FIG. 18C is a graph of the XRD pattern of the magnesium with Pd/Ta bilayer catalysts of FIG. 18A, after the last sorption cycle (absorption)

FIGS. 18A-18C show the cycling and the XRD data for the Pd/Ta bilayer samples. FIG. 18A shows the cycling data in its entirety while FIG. 18B highlights the first and the second desorption cycle. The initial absorption cycle is quite slow, taking 5.5 h to absorb 5 wt. % hydrogen. However the first desorption is extremely fast, where 5 wt. % is released in 6 min. Interestingly, the second absorption cycle becomes faster (2 h) while the second desorption cycle becomes slower (also 2 h). The XRD data, shown in FIG. 18C, from the sorbed specimen indicates that $\alpha$-$MgH_2$ coexists with remaining Mg and with $Mg_6Pd$. Since Pd and Ta have appreciable mutual solubility at 250° C. (~9 at. % Pd in Ta, and ~15 at. % Ta in Pd) the formation of $Mg_6Pd$ is feasible. It is not possible to conclusively identify or negate the presence of $\beta$-$TaH_{0.5}$ since its XRD peaks overlap those of $Mg_6Pd$. For example the most intense peak of $\beta$-$TaH_{0.5}$, (111) at $2\theta=37.5°$, would experimentally overlap with the second most intense peak of $Mg_6Pd$, (066) at $2\theta=38°$. The (020), (200), (002) and (220) peaks of $\beta$-$TaH_{0.5}$ would similarly do that.

Figure 19A:
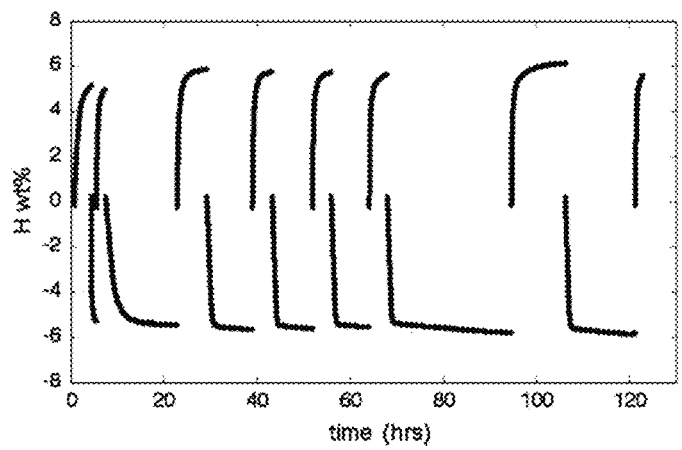
FIG. 19A is a graph of the cycled kinetics of magnesium with Pd/Nb bi-layer catalysts.
Figure 19B:
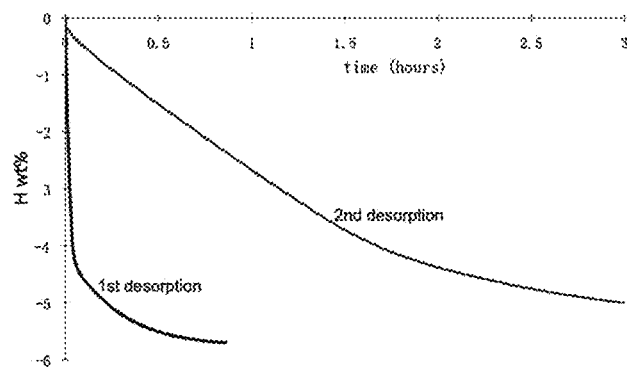
FIG. 19B is a graph of the first and second desorptions of FIG. 19A.
Figure 19C:
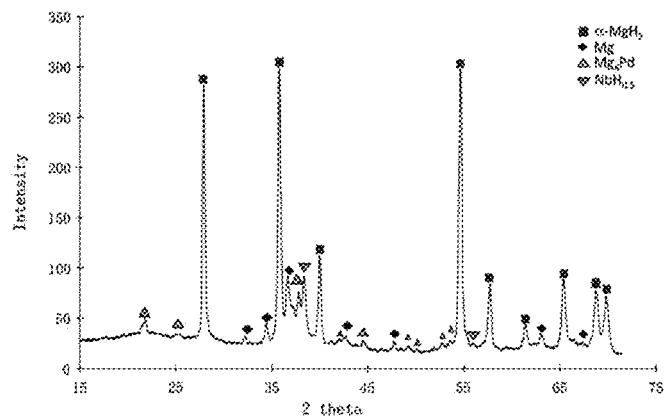
FIG. 19C is a graph of the XRD pattern of the magnesium with Pd/Nb bilayer catalysts of FIG. 19A, after the last sorption cycle (absorption)

FIGS. 19A-19C show the results for the Pd/Nb system, which behaves similarly to Pd/Ta. FIG. 19A shows the cycling data and FIG. 18B shows the first and second desopriton cycles from the cycling data, while FIG. 18C shows the XRD data for the system. The first absorption cycle is slow, taking over slightly over 2 h to reach 5 wt. % hydrogen content. First desorption is very rapid, achieving fully metallic state in just 13 min. As in the case of Pd/Ta, the second desorption cycle is slower while the second absorption cycle becomes faster. The XRD pattern shows the presence of $\alpha$-$MgH_2$, Mg, $Mg_6Pd$ and $NbH_{0.5}$ phases. Niobium and Pd have nearly 20 at. % mutual solubility and thus allow for the formation of $Mg_6Pd$.

Figure 20A:
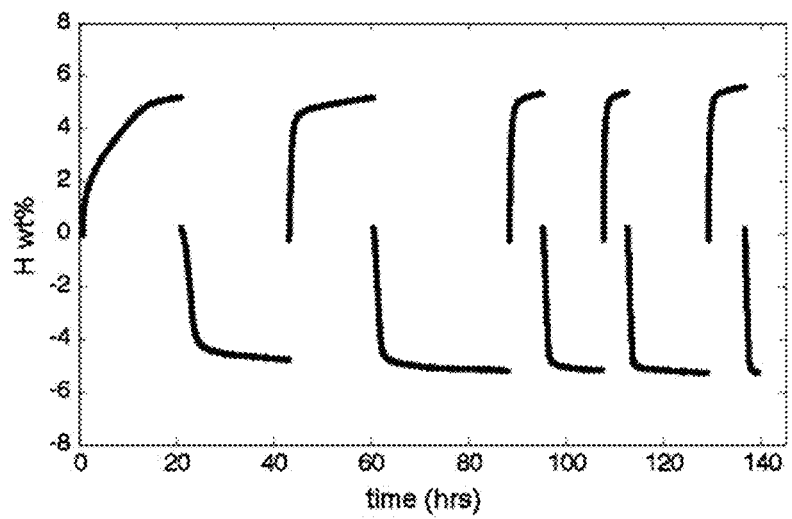
FIG. 20A is a graph of the cycled kinetics of magnesium with Pd/Ti bi-layer catalysts.
Figure 20B:
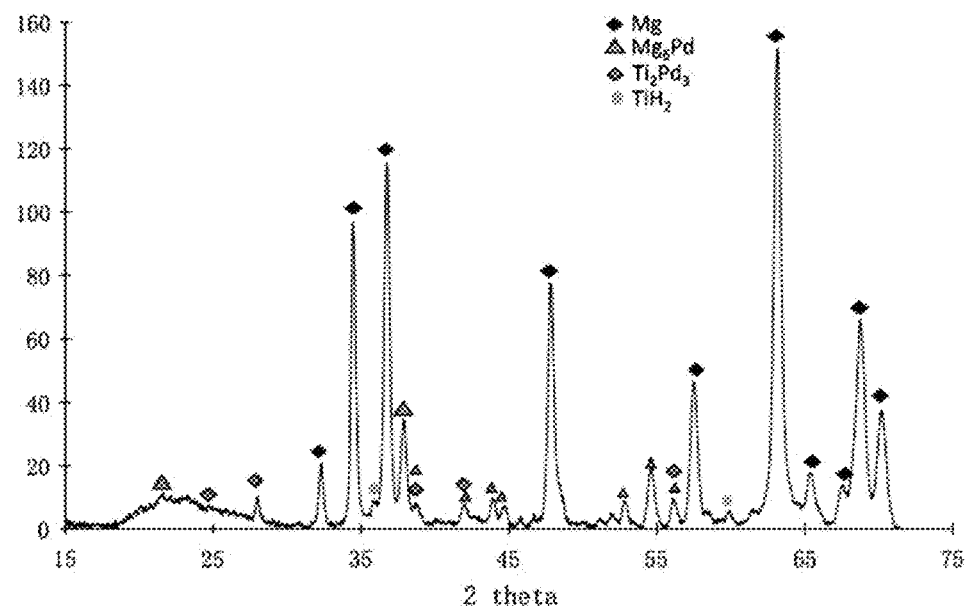
FIG. 20B is a graph of the XRD pattern of the magnesium with Pd/Ti bi-layer catalysts of FIG. 20A after the last sorption cycle (desorption)
Figure 21A:
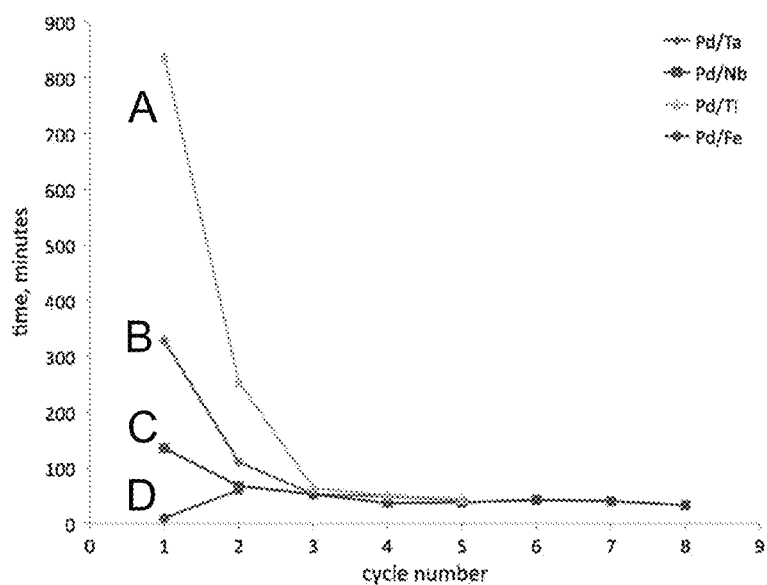
FIG. 21A is a graph of the time to absorb 5 wt. % hydrogen (4 wt. % for Pd/Fe) with respect to cycle number for four different catalysts.
Figure 21B:
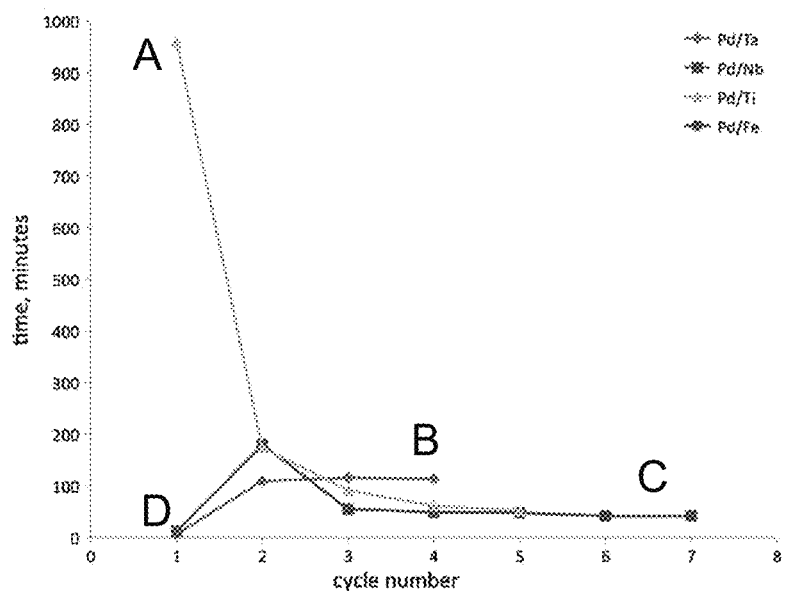
FIG. 21B is a graph of the time to desorb 5 wt. % hydrogen (4 wt. % for Pd/Fe) with respect to cycle number for four different catalysts.

FIG. 20A shows cycling data and FIG. 20B XRD data for the the Pd/Ti system. The initial time to absorb 5 wt. % hydrogen is 14 h. The time to desorb is even longer: 16 h. However, with cycling the sorption behavior improves. On the second cycle the time to absorb is 4 h, while the time to desorb is 3 h. With addition cycling the sorption times improve. The XRD pattern obtained after the last desorption cycle indicates the presence of $Ti_2Pd_3$ intermetallics as well as $TiH_2$ (really a substoichiometric $TiH_{1.7}$) in addition to metallic Mg.

FIG. 21A compares the absorption behavior and FIG. 21B the desorption behavior of each of the bi-layer catalyst systems versus the number of cycles. In the figure "cycle 1" indicates the first absorption cycle, "cycle 2" indicates the second absorption cycle, etc. In all cases the bi-layer catalyst systems perform better (faster rates, higher stability) than the baseline single layer Pd. The baseline Pd data is not included in FIG. 21A or FIG. 21B because the samples did not sufficiently absorb. Magnesium catalyzed with Pd absorbed less than 1 wt. % hydrogen, versus the bilayer systems that absorbed over 4 wt. % at the identical temperature/pressure conditions.

Interestingly both the absorption data and the desorption data indicate a fundamentally different behavior during the first two cycles versus consequent cycling. For cycle 1 Pd/Fe clearly shows the fastest absorption, followed by Pd/Nb and Pd/Ta. Pd/Ti has the slowest absorption of all the bi-layer catalyst combinations. The first cycle desorption for Pd/Fe, Pd/Nb and Pd/Ta are all similarly fast: 12, 13 and 6 min. However Pd/Ti takes almost two orders of magnitude more time to desorb than the others.

The sorption behavior observed in these composites during the first several cycles is quite complex. Comparing the initial rates of hydrogen sorption of the various bi-layers versus the pure Pd there certainly appears to be a strong support effect. This may be understood in terms of the heats of hydride formation and the hydrogen diffusivities through the intermediate layers, using the methodology established by Pasturel et al. in "Influence of the chemical potential on the hydrogen sorption kinetics of $Mg_2Ni/TM/Pd$ (TM=transition metal) trilayers", Chemistry of Materials 2007; 19:624. It is also perhaps due to a fundamentally different catalytic behavior of the Pd on various supports.

By cycle 3 the Pd/Nb and Pd/Ti catalysts begins to reach a nearly identical steady-state behavior, for both absorption and desorption. The desorption time in Pd/Ta also reaches a steady state though at a higher value; 110 min vs. approximately 50 min for Pd/Nb and Pd/Ti. However the absorption behavior of samples with the Pd/Ta catalytic layers does begin to show slight kinetic degradation with increasing number of cycles. Despite having very rapid initial sorption rates the composite with the Pd/Fe bi-layer is not cycleable beyond the first adsorption/desorption.

A fundamental question that arises from the results summarized by FIG. 13 is why is it possible to cycle Mg with Pd/Nb, Pd/Ta and Pd/Ti catalysts, whereas Mg covered with Pd or Pd/Fe rapidly and irreversibly degrade? One hypothesis is that the bilayers that are stable during sorption preserve some Pd (not Pd-based intermetallic) coverage. This, in turn, is a result of having the underlying transition metal transform to a hydride that remains stable during desorption. Unlike its metallic counterpart, these hydrides have negligible solubility for atomic Pd and hence are much more effective in separating the catalyst form the base Mg. An alternative explanation is that the transition metal hydrides are sufficiently active towards hydrogen dissociation/reassociation and transport that the observed stable kinetic behavior is actually due the their presence on the Mg surface, rather than due to any remaining Pd. A similar argument was put forward by Huot et al. for the case of $MgH_2$—Nb powder composites. In both scenarios, however, the key is the hydride's thermodynamic stability.

If we consider the heats of hydride formation for Pd, Fe, Ta, Nb and Ti, the cycling stability trends are relatively consistent with the above hypothesis. The test temperature in this study was 250° C. and the hydrogen desorption pressure was 0.05 bar, while the absorption pressure was 2.5 bar. The standard Van't Hoff equation is used to calculate the plateau pressure with respect to temperature: $\ln(P/P_0)=(\Delta H/RT)-(\Delta S/R)$ where $\Delta H$ is the enthalpy of hydride formation, $\Delta S=-130$ J/KmolH$_2$, and $P_0=1$ bar. Magnesium hydride ($\alpha$-MgH2) with a heat of formation equal to $-74$ kJ/mol has a plateau pressure of 0.25 bar; an order of magnitude higher than the desorption pressure. $PdH_{0.6}$ has a heat of formation of $-40$ kJ/mol and a plateau pressure of 634 bar. This indicates that Pd will be in its metallic state throughout absorption and desorption. $FeH_{0.5}$ has a positive heat of hydride formation of 10 kJ/mol and will remain metallic throughout the entire test as well. An ordered alloy of Fe and Pd should similarly not form hydrides at the test conditions.

The heat of formation for $NbH_{0.5}$ is $-88$ kJ/mol, giving a pressure plateau of 0.01 bar. $TiH_2$ has an enthalpy of formation of $-134$ kJ/mol and a pressure plateau of $2.5\times10^{-7}$ bar. Thus once these hydrides are formed, they will remain for the remainder of the test. The presence of $Mg_6Pd$ intermetallics in the XRD pattern of the Pd/Ti and Pd/Nb samples is likely due to the interdiffusion that has taken place during the initial sorption cycle before the hydrides could form. This may also be the origin of the kinetic variations in the sorption behavior observed during the first few cycles: Once stable hydrides are formed, steady-state sorption behavior is achieved.

Ta is the one outlier. Beta-$TaH_{0.5}$ has a heat of formation equal to $-76$ kJ/mol. Thermodynamically it should be a hydride during sorption and metallic during desorption. However in the case of Ta, the prolonged catalytic activity may be related to its elevated temperature stability. Metallic Ta may be utilized as a nano-scale barrier for hydrogen storing thin films, minimizing the interdiffusion of Mg and Al with the Pd catalyst. Alternatively the observed relatively stable cycling behavior may actually be due to the catalytic properties of Pd—Ta alloys that form during desorption. A theoretical study (Greely et al., "Alloy catalysts designed from first principles", Nature Materials 2004; 3:810) has predicted the Ta/Pd system to be very effective for hydrogen catalysis.

This study focused on the elevated temperature (250° C.) hydrogen sorption behavior of magnesium catalyzed by nanoscale bi-layers of Pd/Ta, Pd/Nb, Pd/Ti and Pd/Fe. The bi-layers, which were 7.5/7.5 nm in thickness, were sputter deposited on each side of 1.5 mm thick pure Mg thin films. For a baseline we also examined a standard single-layer Pd catalyst deposited on each side. Volumetric sorption cycling demonstrated two fundamentally different behaviors: With the pure Pd and the Pd/Fe catalysts, the sorption kinetics of the Mg films rapidly degraded. The samples with Pd failed to appreciably take up hydrogen even in the first absorption cycle, while the samples with Pd/Fe catalyst could only absorb/desorb once before deteriorating. Conversely the Pd/Ta, Pd/Nb and Pd/Ti catalysts remained active throughout multiple sorption cycles, reaching what appeared to be steady-state kinetics. For example, Mg catalyzed by Pd/Nb is able to sorb 5 wt. % hydrogen in approximately 40 min during cycles 5-8.

Our hypothesis is that the cycling stability of the Mg film depends on the intermediate metal layer's enthalpy of hydride formation. Palladium and Fe remain metallic throughout sorption. This allows for rapid interdiffusion of the elements and the complete transformation of the Pd catalyst to $Mg_6Pd$. Metals with high negative heats of hydride formation, such as Ti and Nb, remain as hydrides during sorption cycling, acting as more effective diffusion barriers to stabilize the Pd catalyst. In addition the $NbH_{0.5}$ and $TiH_2$ may actively catalyze hydrogen dissociation/reassociation and provide transport paths in and out of the Mg microstructure.

In a study we used a nanoscale (5 nm Ta/5 nm Pd) bilayer catalyst to achieve remarkable desorption kinetics for thin films. Full hydrogen desorption occurred at 100° C. with a noticeable desorption even at room temperature. This is a significant improvement relative to the 175° C. needed to fully desorb an identical film with a single Pd layer acting as the catalyst. Neutron reflectometry confirmed that the Ta/Pd bilayer remained intact both after hydrogen absorption and following the hydrogen desorption. We used x-ray diffraction analysis to gather complementary information regarding the crystal structure of the as-synthesized, sorbed and desorbed film.

In this work we explore the bilayer catalyst system Ta/Pd. $Mg_{0.7}Al_{0.3}$ films were cosputtered onto a Si (100) substrate with a native oxide layer of about 1 nm thickness. The films were absorbed for 24 h at 125° C. and 40 bar hydrogen. Desorption was performed in a 1 bar Ar atmosphere in a sample cell equipped with a heater. When varying the temperature for the desorption experiment, the sample was always kept at the various temperatures for 1 h before starting the neutron measurement.

The neutron reflectometry (NR) experiments were performed on the D3 reflectometer at the neutron research reactor National Research Universal (NRU) in Chalk River. For reflectometry the interaction with the film is reduced to a one-dimensional problem and for grazing incidences the reflectivity can be described with an optical potential $V_j$, known as Fermi's pseudopotential, $Vj=2\pi\hbar/mN_jb_j$, (1) where m is the neutron mass, $N_j$ is the number density, $b_j$ is the coherent nuclear scattering length, and the product $N_jb_j$ is the scattering length density (SLD) in layer j. The SLD depends on the elements and their isotopes in the sample. With Eq. (1) the neutron refractive index and the Fresnel reflectivity arising at interfaces can be calculated based on the Parratt recursion algorithm. A layer model is fit to the measured data by varying the SLD, layer thickness, and interface roughness of each individual layer j.

FIG. 22 shows the neutron reflectivity curves of a Si(100)/Ta/$Mg_{0.7}Al_{0.3}$/Ta/Pd film structure (a) before hydrogen absorption, (b) after hydrogen absorption, measured at 25° C., and (c) fully desorbed, measured at 100° C. The fits, displayed as solid lines, were calculated using the software PARRATT32™. The changes in the film structure can be best visualized by plotting the SLD profile, i.e., the SLD along the surface normal z of the film. The SLD profiles corresponding to the fits are shown in FIG. 1 as insets. In all cases the model consisted of a Si substrate with a native $SiO_2$ layer, a Ta buffer layer, a MgAl layer, and a Ta/Pd bilayer.

The effect of hydrogen absorption on the SLD profile can be easily seen by comparing the SLD profile of the sorbed [inset FIG. 1(b)] to the unsorbed film [inset FIG. 1(a)]. The negative scattering length $b_H=-3.739$ fm of the hydrogen causes the SLD to drop from $2.2\times10^{-6}$ Å$^{-2}$ for the unsorbed MgAl film to $7.3\times10^{-8}$ Å$^2$ for the sorbed MgAl film. From this decrease in the SLD we can calculate that 4.7 wt % hydrogen are stored in the MgAl film. After annealing the film to 100° C. for 1 h, the SLD of the MgAl film goes back up to $2.0\times10^{-6}$ Å$^{-2}$ [see part (c) of FIG. 22] proving that the hydrogen has been released. The SLD of the desorbed film does not reach exactly the SLD value of the unsorbed film because the whole film structure expands by about 15% due to the hydrogen absorption creating cracks and voids that result in a lower SLD of the layers. Furthermore, we can deduce from the SLD profile that the hydrogen is uniformly dispersed within the MgAl layer and no hydrogen is stored in the Pd layer. The SLD of the Ta layer decreases during the desorption process further from $3.6\times10^{-6}$ Å$^{-2}$ to $3\times10^{-6}$ Å$^{-2}$, which is an indication of a small amount of hydrogen being stored in the Ta layer after the annealing to 100° C. The SLD profiles shown in FIG. 22 prove that the Ta/Pd bilayer is still intact at the applied temperatures. In earlier experiments on MgAl films with single Pd catalyst layers we found that Pd diffuses into the MgAl layer.

FIG. 23 shows the total hydrogen content y of the $Mg_{0.7}Al_{0.3}H_y$ film capped with a Ta/Pd bilayer (solid dots) as calculated from the SLD, plotted as a function of temperature. For comparison the earlier data (from H. Fritzsche, M. Saoudi, J. Haagsma, C. Ophus, E. Luber, C. T. Harrower, and D. Mitlin, Appl. Phys. Lett. 92, 121917 (2008)) for a $Mg_{0.7}Al_{0.3}$ film capped with a single Pd layer are included as open circles. That demonstrates that the bilayer catalyst lowers the temperature necessary to achieve full hydrogen desorption to 100° C. from 170° C. for the single Pd layer. Both samples were annealed for 1 h at the respective temperature prior to the NR scan, which took 11 h for the sample with the Pd layer and 2 h for the sample with the Ta/Pd bilayer.

Figure 24:
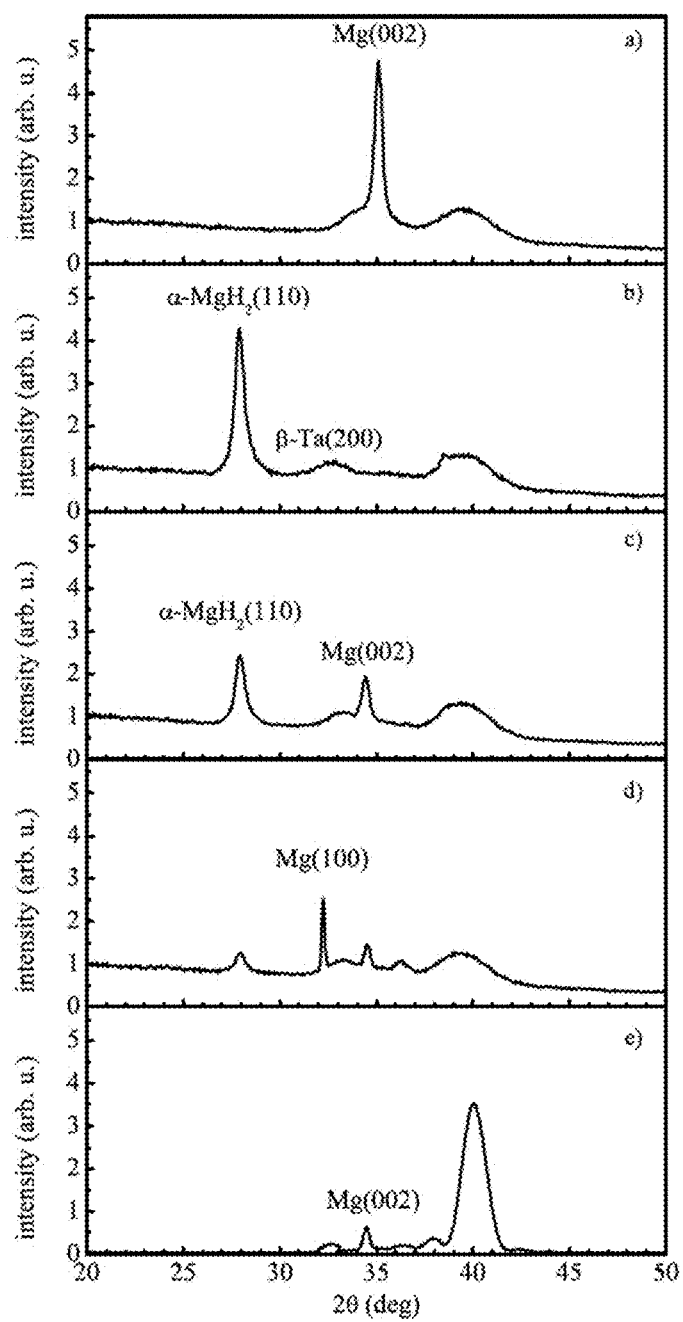
FIG. 24 is a series of graphs showing XRD patterns of a 27 nm thick $Mg_{0.7}Al_{0.3}$ film prepared on a Si(100) wafer with a 10 nm Ta buffer layer and capped with a (5 nm Ta/5 nm Pd) bilayer: (a) as prepared, (b) measured immediately after hydrogen absorption, (c) after 30 h at 25° C., (d) after 30 h at 100° C., and (e) an XRD scan of a sample that was investigated with NR after 3 h at 125° C.

FIG. 24 shows the x-ray diffraction (XRD) results for an as-synthesized thin film (a), measured immediately after hydrogen absorption (b), stored at room temperature for 30 h after absorption (c), and annealed at 100° C. in argon d). It is the same film structure as investigated with NR but it is not the identical film. The XRD scan of the sample that was investigated with NR is displayed in part (e) of FIG. 24, measured after the annealing at 125° C. for 3 h. Because the films are strongly textured, not all possible reflections appear in the x-ray scan.

The as-synthesized microstructure consists of a supersaturated solid solution of Al in Mg. In the diffraction pattern we can clearly identify the Mg(002) peak at $2\theta=35.1°$ [part (a) of FIG. 24] which is shifted from the pure Mg(002) peak at $2\theta=34.4°$ to larger angles due to the slightly smaller lattice constant of the alloy. After sorption [part (b) of FIG. 24] the Mg(002) peak disappears and at the same time an $\alpha$-$MgH_2$ (110) peak occurs at $2\theta=27.9°$. There is no evidence of any ternary hydride formation and no Mg peaks are present, indicating a full transformation to $\alpha$-$MgH_2$. The diffraction pattern after storage at room temperature for 30 h is shown in part (c) of FIG. 24. The relative intensity of $\alpha$-$MgH_2$ to Mg is decreased. This clearly indicates that some hydrogen desorption has occurred at room temperature. After 30 h at 100° C., shown in part (d) of FIG. 24, the microstructure consists of Mg phase with a small amount of $\alpha$-$MgH_2$. The x-ray pattern shows no evidence of $Mg_{17}Al_{12}$ or other binary intermetallic formation. There is a small $MgH_2$ peak still visible in part (d) of FIG. 24, whereas the XRD scan of the sample that was investigated with NR after 3 h annealing at 125° C. [displayed in part (e) of FIG. 24] shows no $MgH_2$ peaks.

In this study we used NR and XRD to investigate the low temperature hydrogen sorption properties of $Mg_{0.7}Al_{0.3}$ thin films catalyzed with a nanoscale (5 nm Ta/5 nm Pd) bilayer. We have demonstrated that a bilayer catalyst is much more effective than a single Pd layer catalyst, lowering the temperature necessary to achieve full hydrogen desorption to 100° C. versus 170° C. Our experimental findings are in agreement with calculations of properties of alloy catalysts where the Ta/Pd alloy surface has the lowest hydrogen binding energy among the investigated Pd alloys.

Hydrogen Storage Cycling of $MgH_2$ Thin Film Nanocomposites Catalyzed by Bimetallic Cr Ti In some embodiments the catalyst for the kinetic absorption and desorption of hydrogen comprises chromium. Further catalysts may comprise titanium. One study examined hydrogen storage cycling of 1.5 mm thick magnesium thin films containing a bimetallic chromium titanium catalyst. At 200° C. the nanocomposites made absorb 5 wt. % hydrogen in several seconds, and desorb in 10-20 minutes. In several compositions, there is negligible hydrogenation kinetics or capacity degradation even at over 100 cycles. Equally importantly, the ternary films require minimal activation, achieving rapid magnesium hydride formation and decomposition from cycle one. Pressure-composition isotherms display well-known enthalpies of $MgH_2$. Transmission electron microscopy analysis supports a hypothesis that such extreme kinetics is due to the presence of a nanodispersed CrTi phase in Mg matrix.

Mg-based thin films can be employed as model system for designing and understanding bulk hydrogen storage materials. One method is through catalytic additions of secondary phases including unsupported transition metals [i] or varying (trace to significant) quantities of transition metals supported by carbon nanostructures. Binary Mg—Ti and Mg—Cr films have been reported to posses fast sorption kinetics when tested electrochemically. However little is known regarding the synergy of Cr—Ti catalyst additions.

The geometry of the samples was a 1.5 μm thick Mg—Ti—Cr film, capped with a 7.5 nm Pd/7.5 nm Ta bi-layer on both the top and the bottom surface. We produced alloys with 90 at. % Mg and 80 at. % Mg, with 1:1, 1:2 and 2:1 ratios of Cr to Ti, as well as binary systems of Mg—Cr and Mg—Ti. The atomic percentage of titanium may equal the atomic percentage of chromium plus or minus 10 atomic % of the CrTi total, although other ranges may be used. Hydrogen was absorbed at a starting pressure of 3 bar (finishing at 1.5 bar) and desorbed at a starting pressure of 5 mbar (finishing at 15-20 mbar). The system automatically switched from absorption to desorption, and vice versa, once the sorption rate fell below 0.004 wt. %/min. Transmission electron microscopy (TEM) analysis was performed using the JEOL 2200FS microscope, operating at 200 kV accelerating voltage. After prolonged hydrogen cycling the samples resembled loose powder that could be analyzed directly without additional thinning.

Figure 26A:
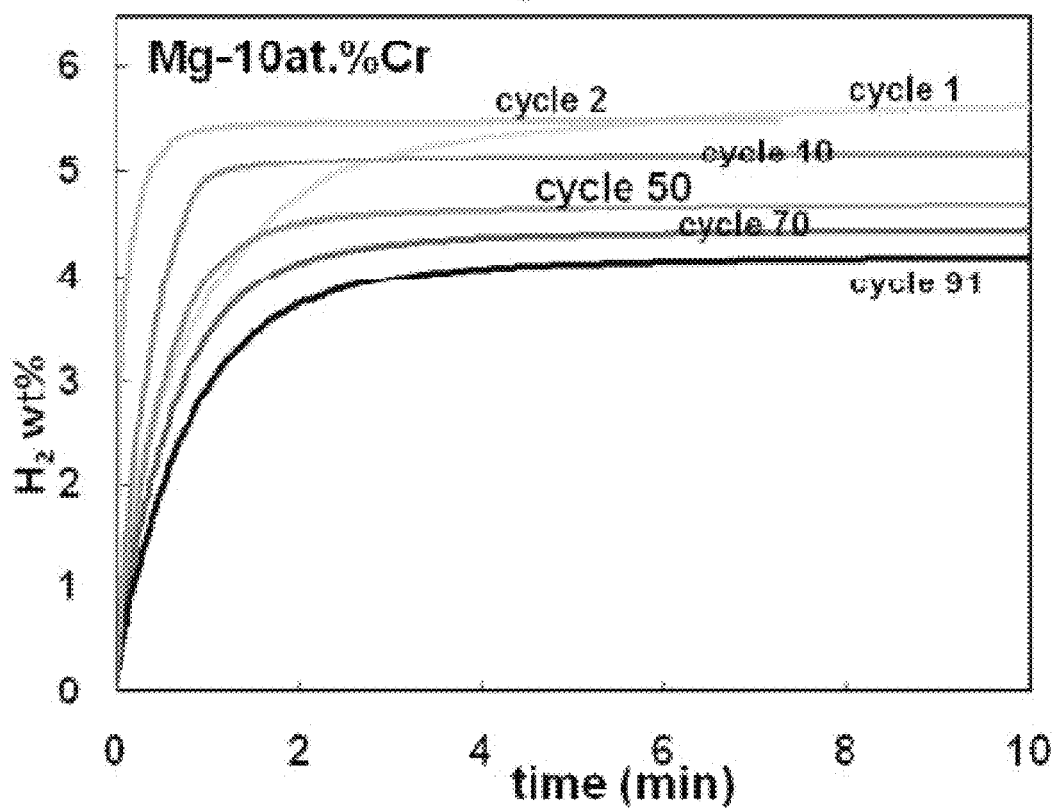
FIGS. 26A-F are graphs of absorption and desorption behavior of binary Mg—Cr and Mg—Cr—Ti at 200° C.
Figure 26B:
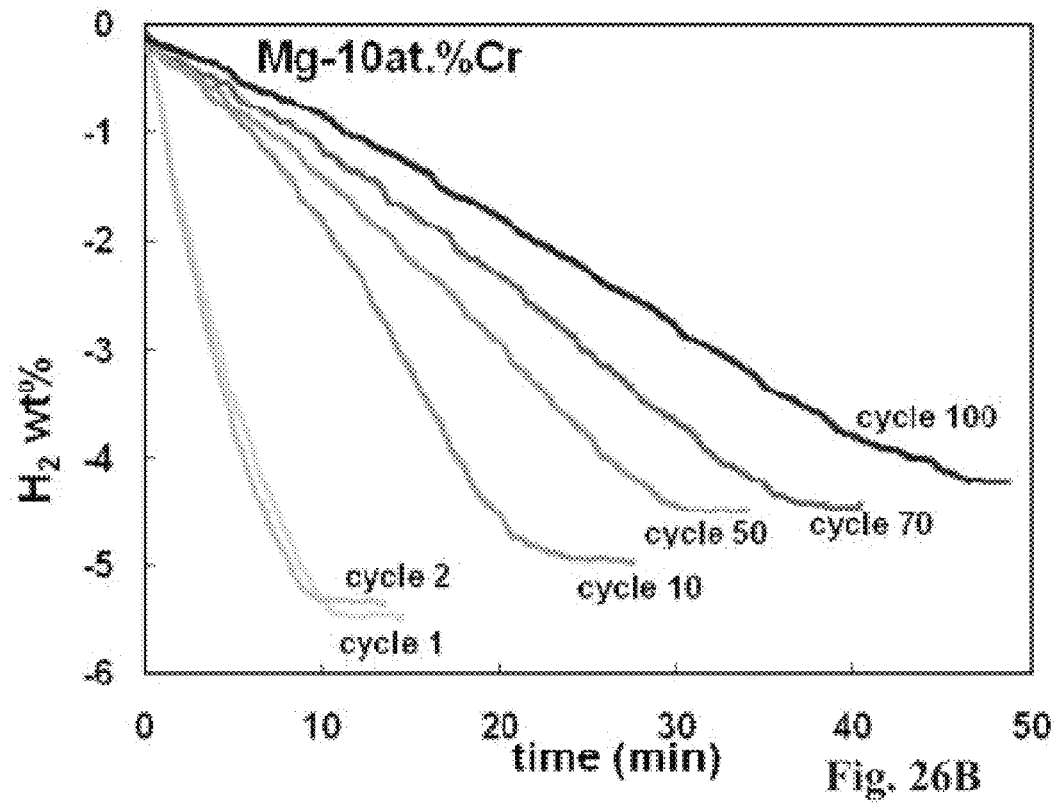

FIGS. 26A-F show the absorption and desorption behavior for the Mg—Cr and Mg—Cr—Ti, tested at 200° C. FIGS. 26A, C, and E show hydrogen absorption while FIGS. 26B, D, and F show hydrogen desorption. The initial absorption behavior of the binary Mg—Cr film is relatively fast, being on the order of seconds. However the hydrogen gravimetric capacity does show significant degradation, dropping from approximately 5.5 wt. % at cycle 1 to below 4 wt. % by cycle 91. Desorption kinetics are both much slower and show more degradation with increasing cycling. At cycle 1, it took 10 minutes to desorb, while by cycle 100 desorption took an hour. Sorption results for binary Mg—Ti, previously tested at analogous geometries and sorption conditions, show that the hydrogen capacity of this alloy rapidly degrades due to the irreversible formation of $TiH_2$.

Figure 26C:
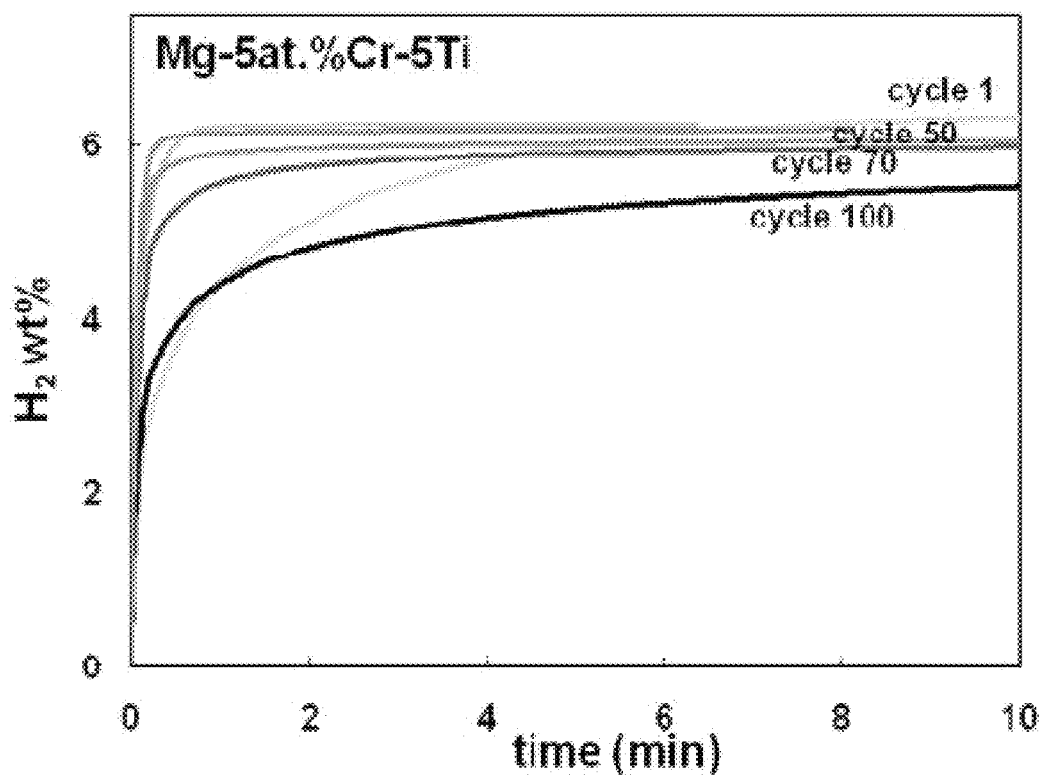
Figure 26D:
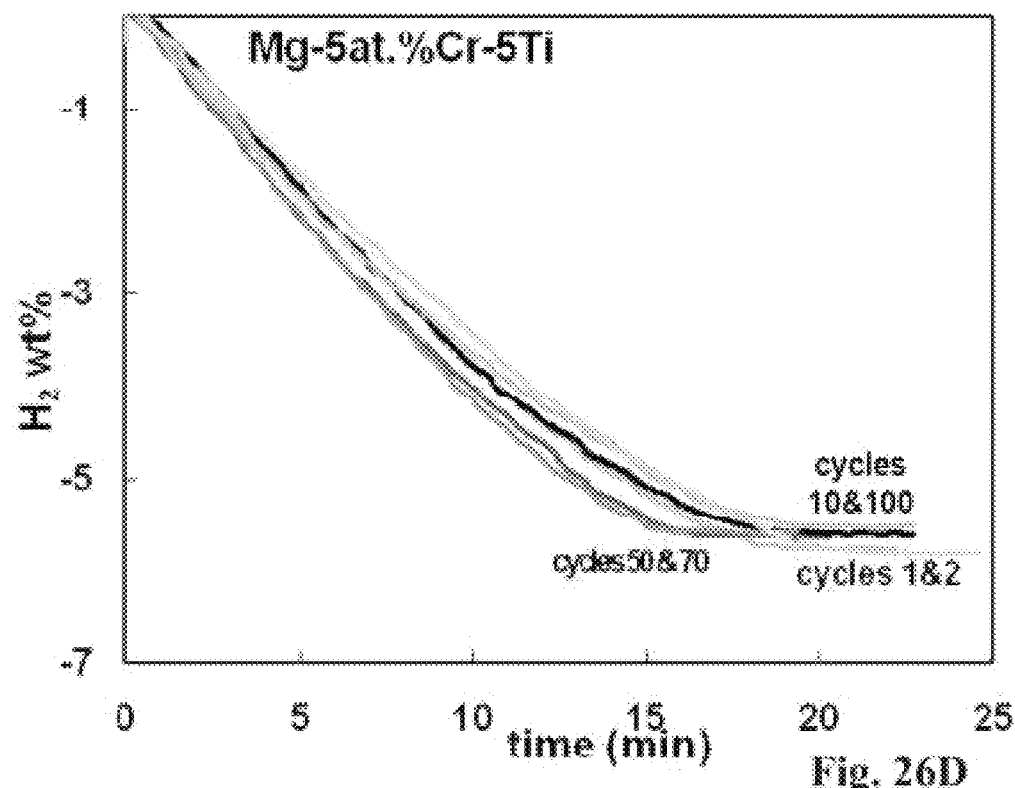
Figure 26E:
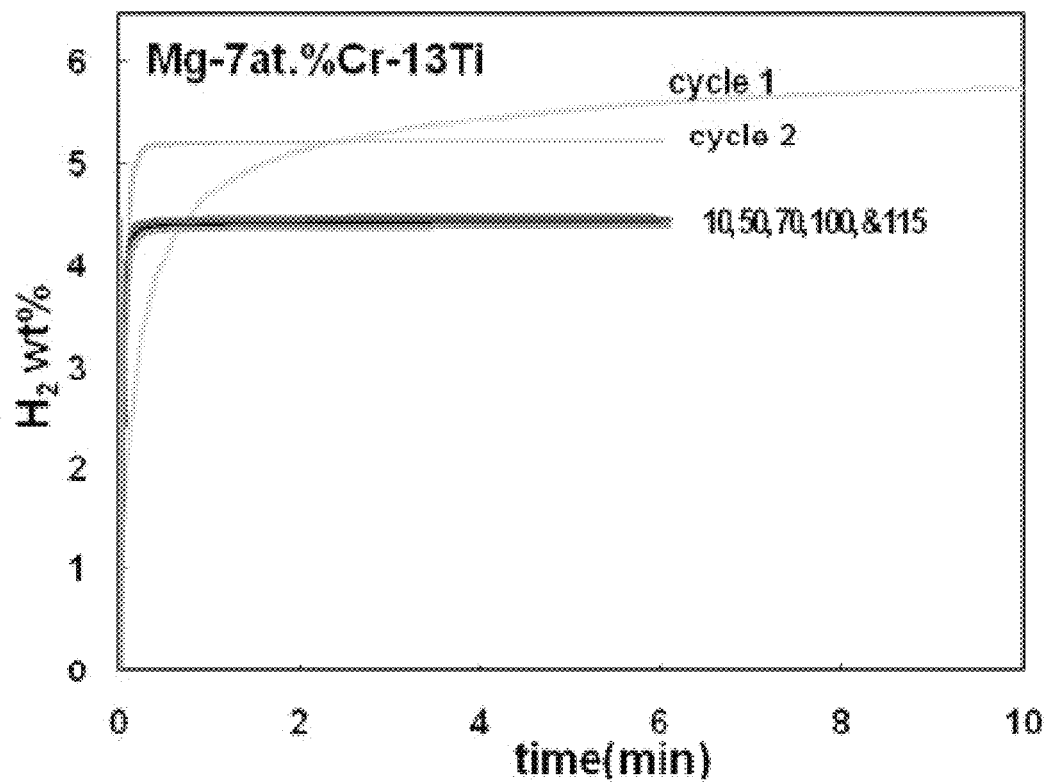
Figure 26F:
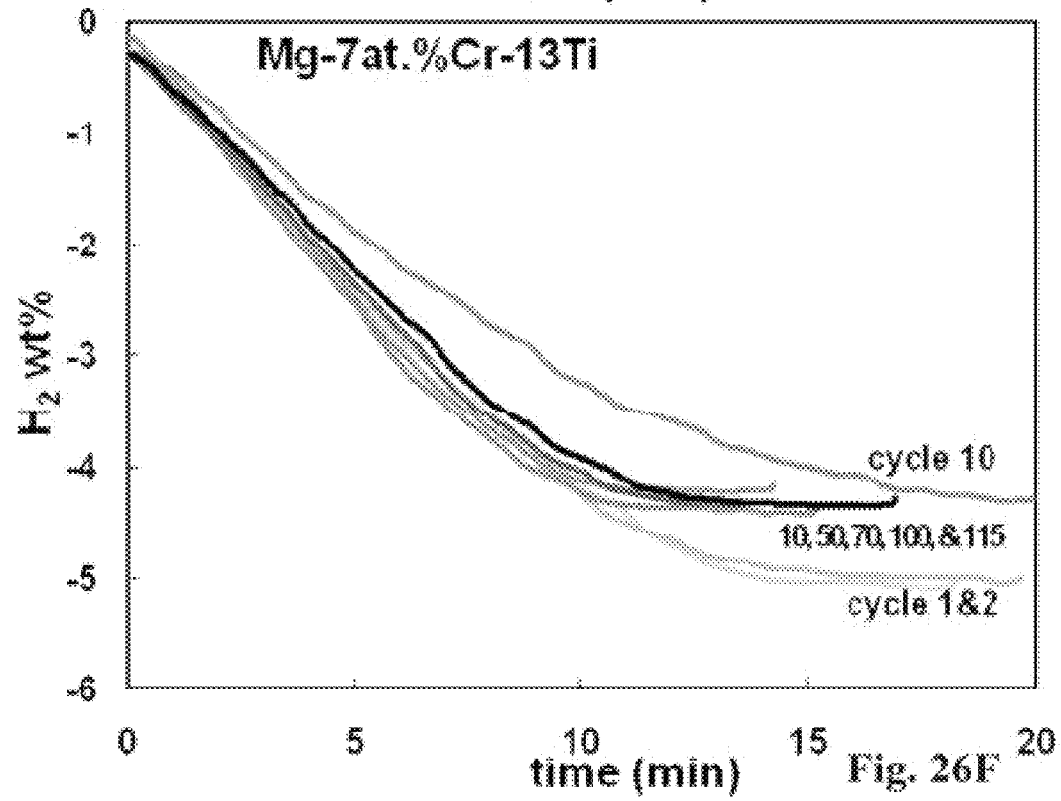

By contrast, the Mg—Cr—Ti alloys, with comparable levels of secondary additions in terms of atomic percent, display much more rapid and stable desorption kinetics. FIGS. 26C-D illustrate this for the Mg-5Cr-5Ti alloy. The absorption kinetics is comparable to that of the binary Mg—Cr alloy. However the desorption kinetics are markedly different, with little degradation occurring even by cycle 100. Here it consistently takes 15-20 minutes to achieve desorption. With increasing Cr—Ti additions, the hydrogen capacity is expectedly reduced. However, the sorption kinetics is improved even further. Even at cycle 115, Mg-7 at. % Cr-13 at. % Ti takes only several seconds to absorb, and approximately 10 minutes to desorb.

Figure 27A:
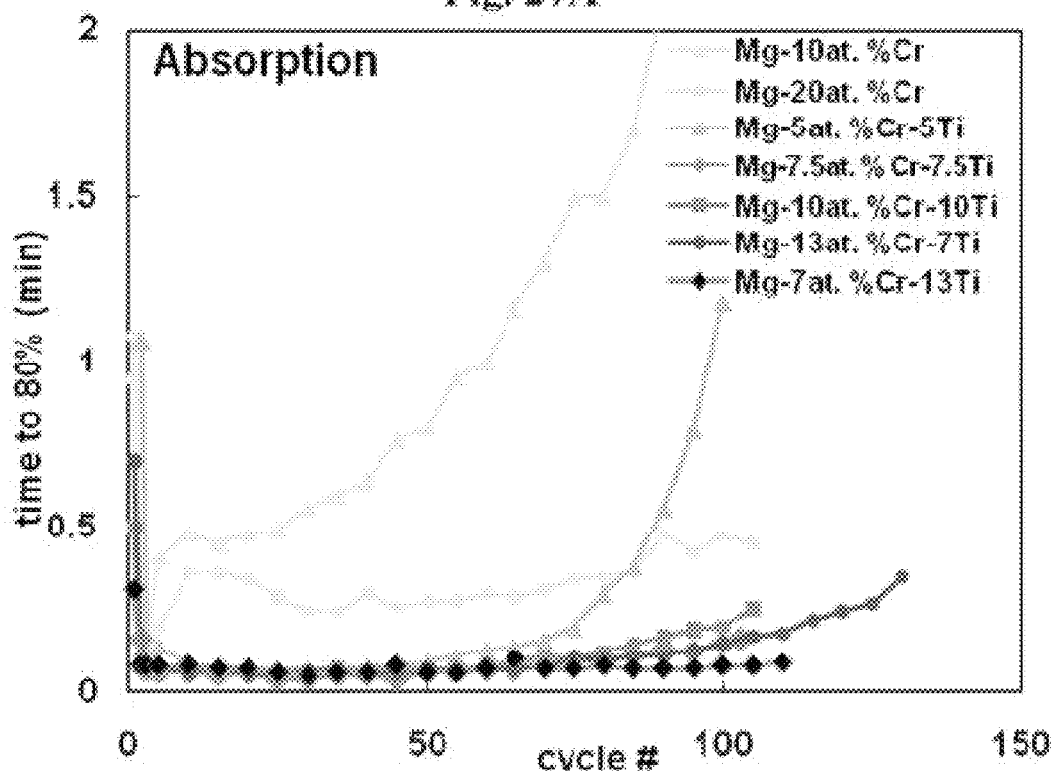
FIGS. 27A-B are graphs that illustrate a comparison of the time to sorb 80% of the average maximum hydrogen gravimetric capacity for each composition, as a function of sorption cycle number.
Figure 27B:
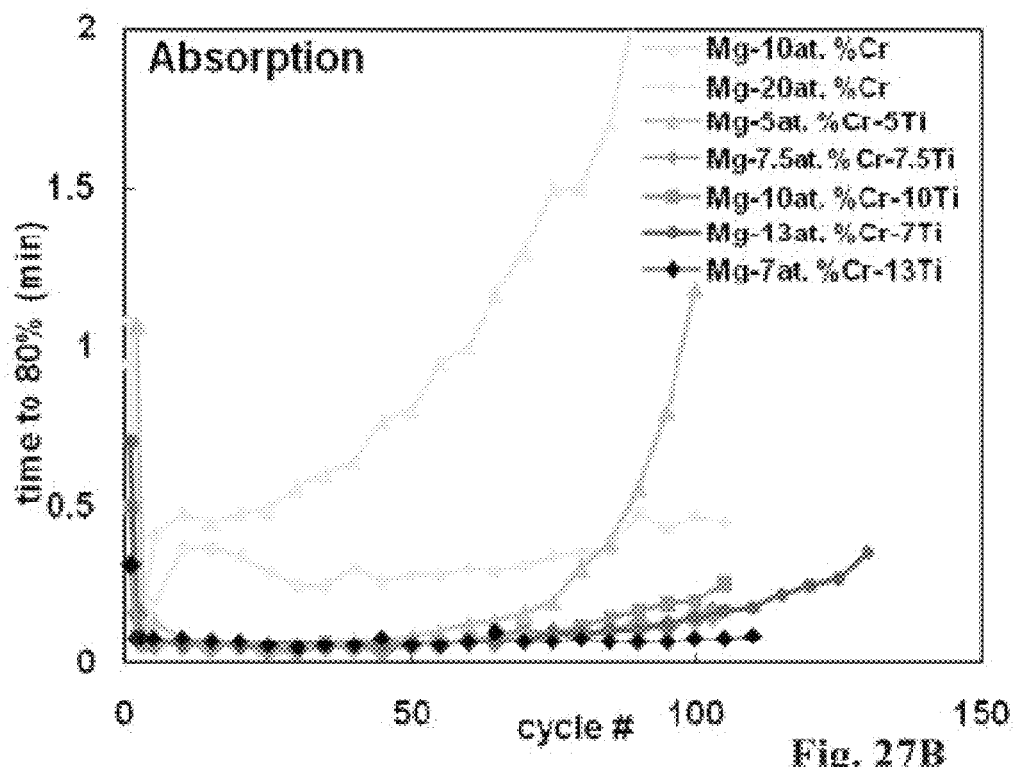

FIGS. 27A-B compare the Mg—Cr—Ti and the Mg—Cr alloys, showing the time to absorb and the time to desorb 80% of the mean maximum hydrogen gravimetric capacity for each composition. These results highlight two fundamentally attractive features of the Mg—Cr—Ti system: First, the higher alloy content (systems with above 5 at. % of each element) show either none or very minor kinetic degradation throughout the sorption cycling. Even the alloy Mg-13 at. % Cr-7Ti, which seems to show some cycling degradation, still outperforms the baseline Mg—Cr systems both in the absorption and even more so in the desorption times. Second, and equally importantly, these systems display only a very minor "activation" period during the first several cycles. An activation period is usually the norm for Mg-based systems, with the first several absorption-desorption cycles being orders of magnitude slower than the subsequent ones.

FIGS. 28A-B show the pressure-composition-isotherm plots for the Mg-7 at. % Cr-13Ti alloy. As expected there is a quantifiable hysteresis between the hydride formation plateau and the hydride decomposition plateau. The calculated enthalpy for hydride formation is −73 kJ/mol $H_2$ while the enthalpy for hydride decomposition is 79 kJ/mol $H_2$. These enthalpies agree with the well-known formation/decomposition $\Delta H$ values for $\alpha$-$MgH_2$. From these results we may conclude that Cr—Ti does not alter the Mg($MgH_2$) thermodynamics and the sorption enhancement is purely kinetic. The entropy for hydride formation and decomposition is −134 and 144 J/K mol $H_2$, respectively, though more data points would be desirable to increase the accuracy of this calculation.

Figure 29:
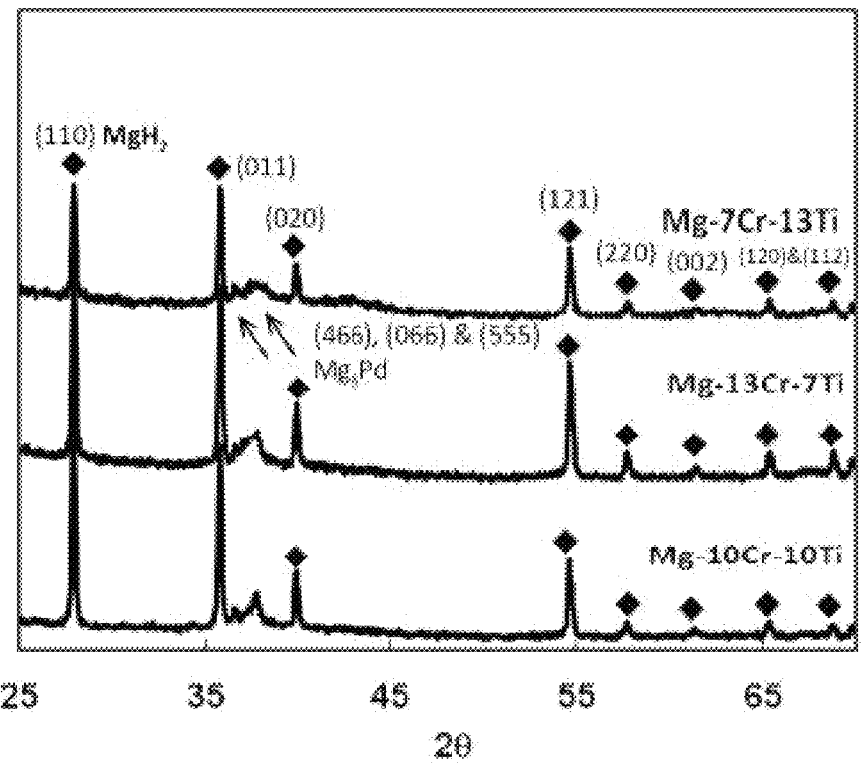
FIG. 29 is a graph of indexed X-ray diffraction pattern of the post-cycled Mg—Cr—Ti alloys in the absorbed state.
Figure 30:
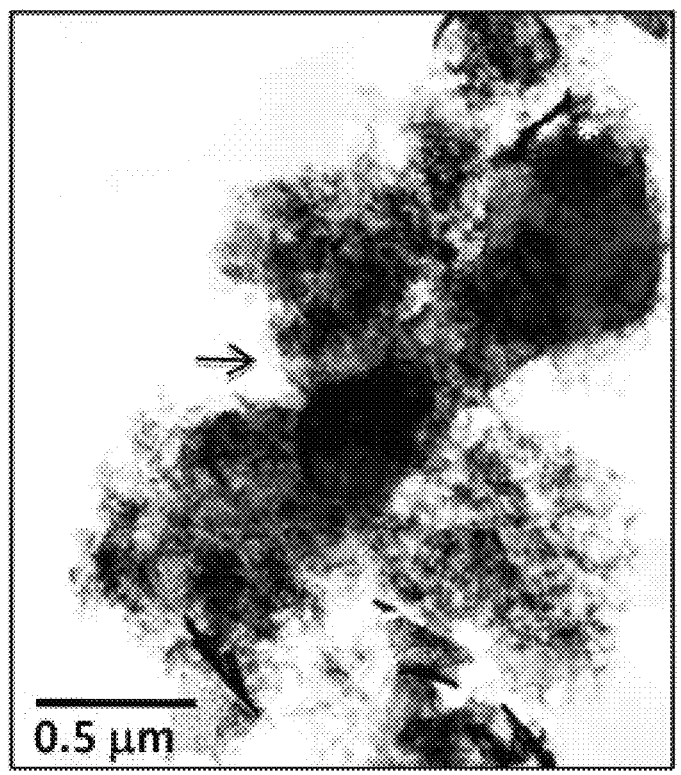
FIG. 30 is a Bright field STEM micrograph and FIGS. 31A-D are EDXS elemental maps of Mg, Cr, Ti and Ta in the Mg-10 at. % Cr-10 at. % Ti post-cycled (absorbed) samples. An arrow points to the same region in the micrographs, an asterisk marks a Ta flake.
Figures 31A, 31B:
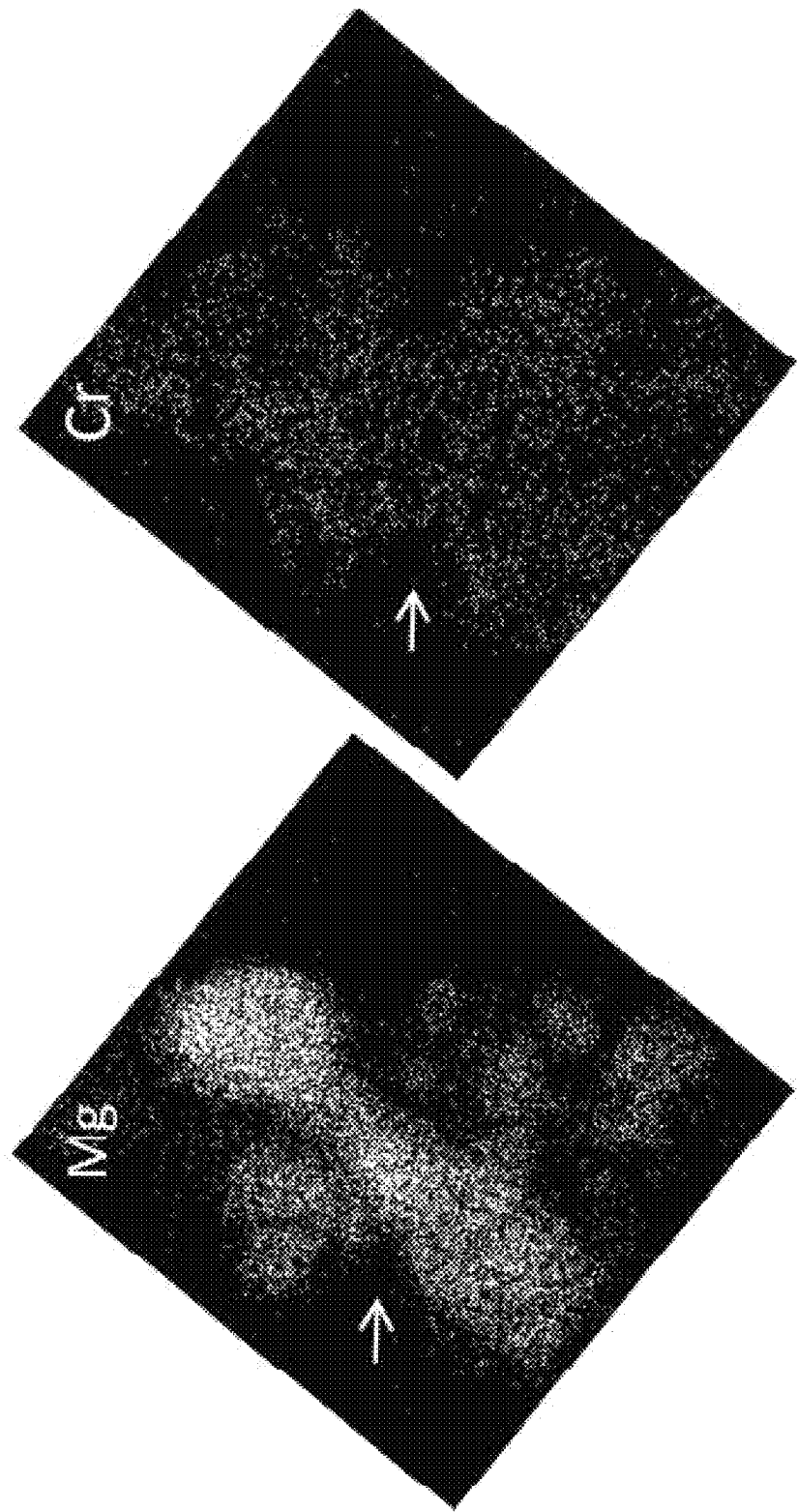
Figures 31C, 31D:
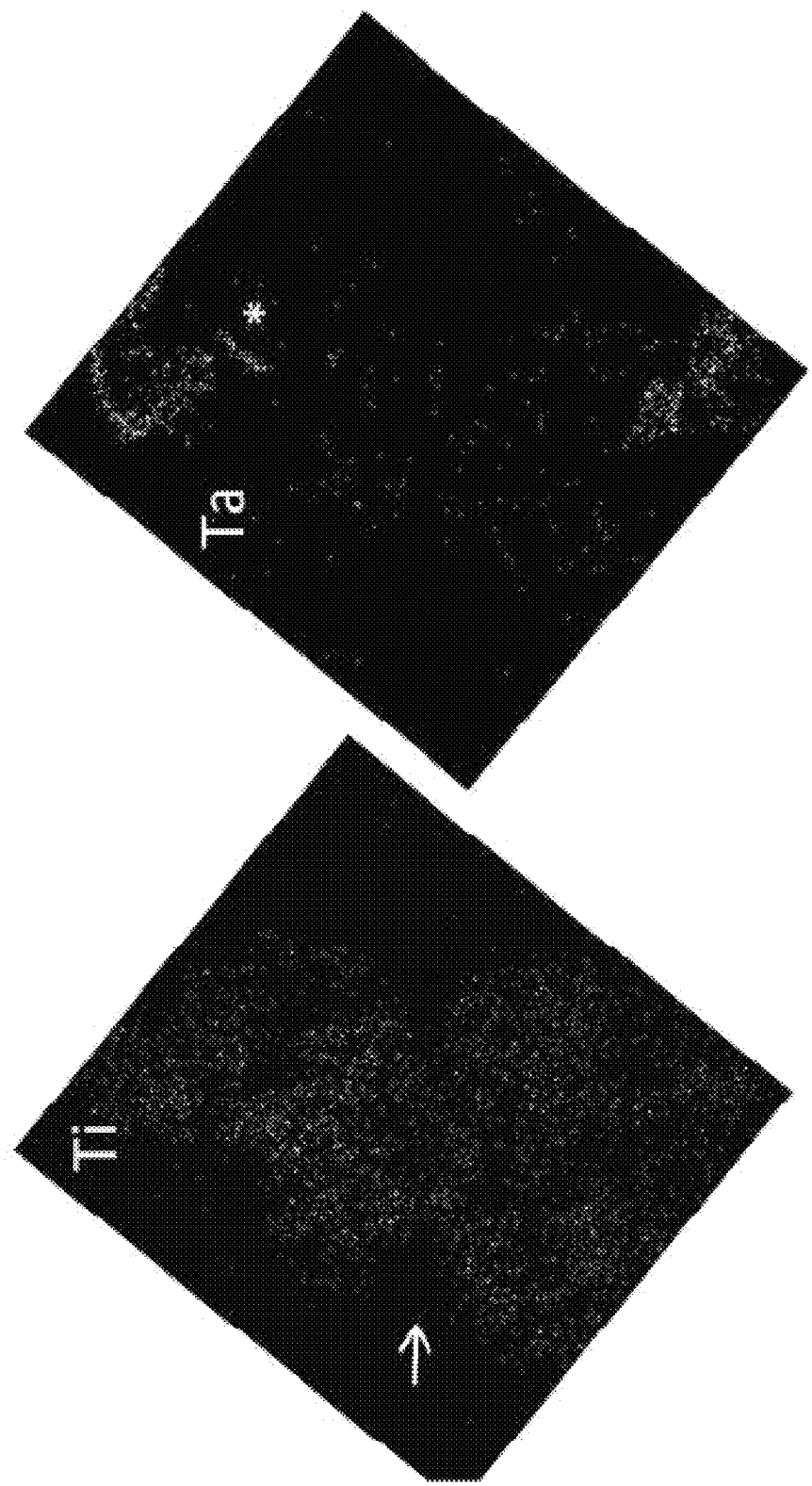
Figure 33A:
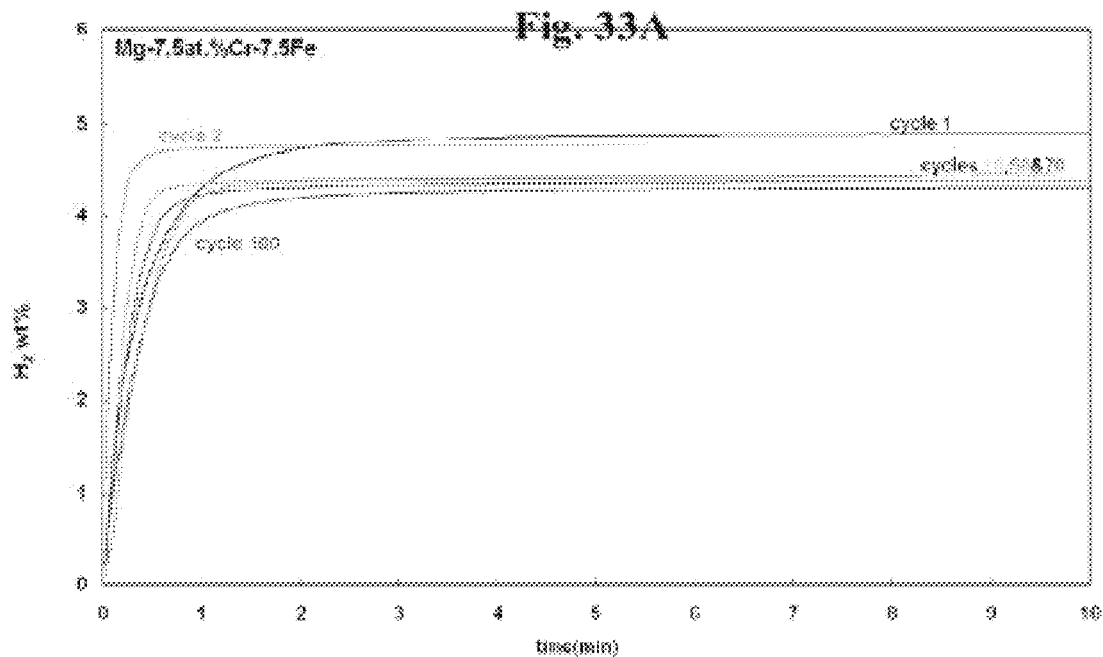
FIGS. 33A-B are graphs of absorption and desorption behavior, respectively, of Mg-7.5 at. % Fe-7.5 at. % Cr at 200° C. Volume calibration was at 200° C., absorption pressure was at 2.7 bar, and desorption pressure was at 0.01-0.02 bar.
Figure 33B:
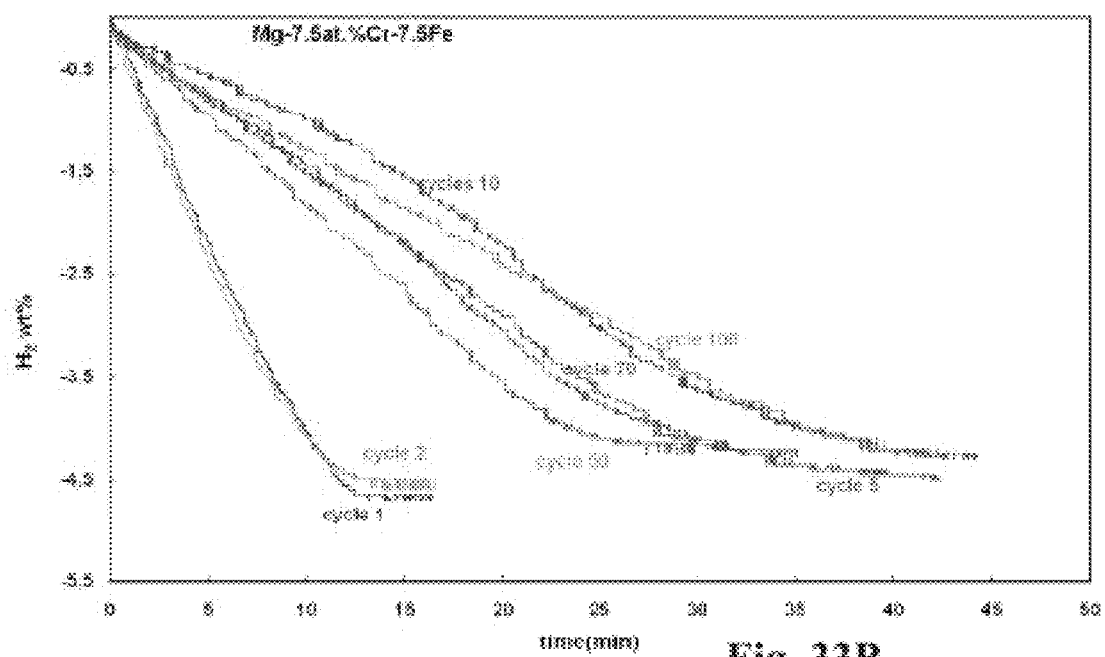
Figure 34A:
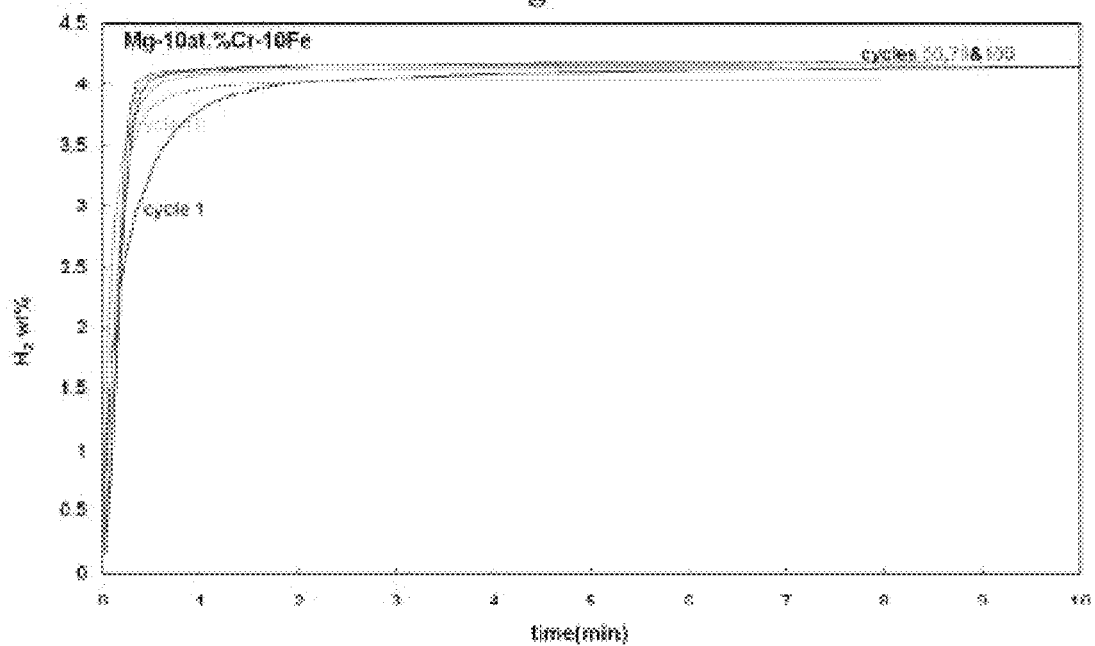
FIGS. 34A-B are graphs of absorption and desorption behavior, respectively, of Mg-10 at. % Fe-10 at. % Cr at 200° C. Volume calibration was at 200° C., absorption pressure was at 2.7 bar, and desorption pressure was at 0.01-0.02 bar.
Figure 34B:
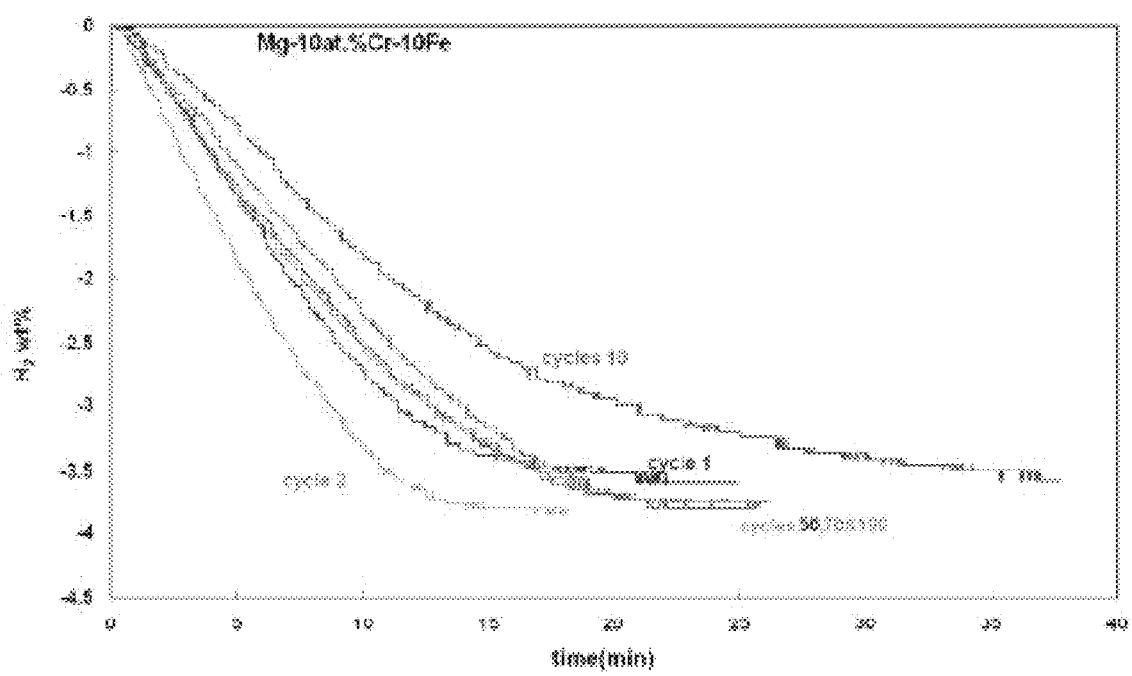
Figure 36A:
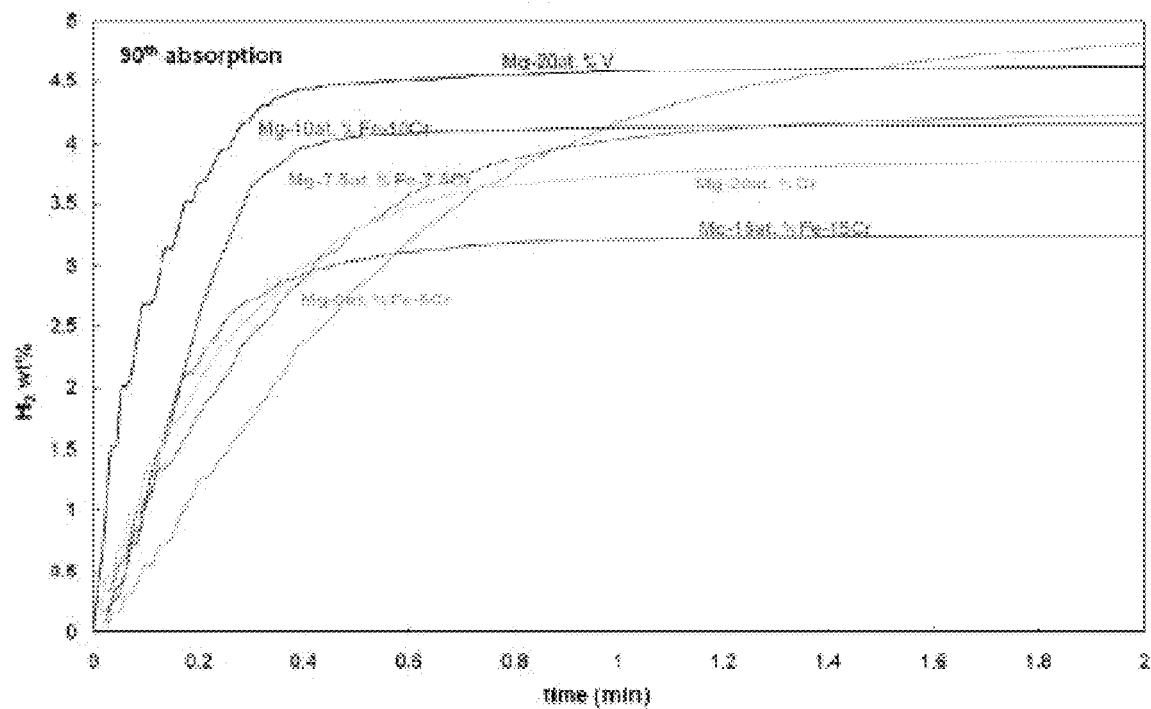
FIGS. 36A-B are graphs that compare absoprtion and desoprtion behavior, respectively, of various Mg—Fe—Cr alloys. Data was taken from the 90 cycle for both Figs.
Figure 36B:
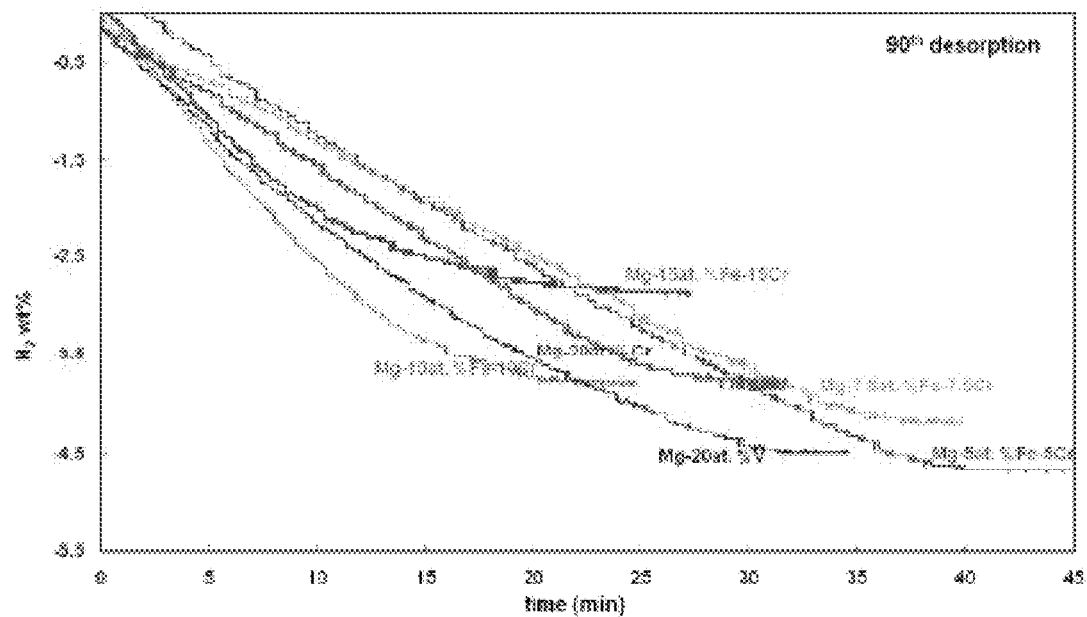
Figure 38A:
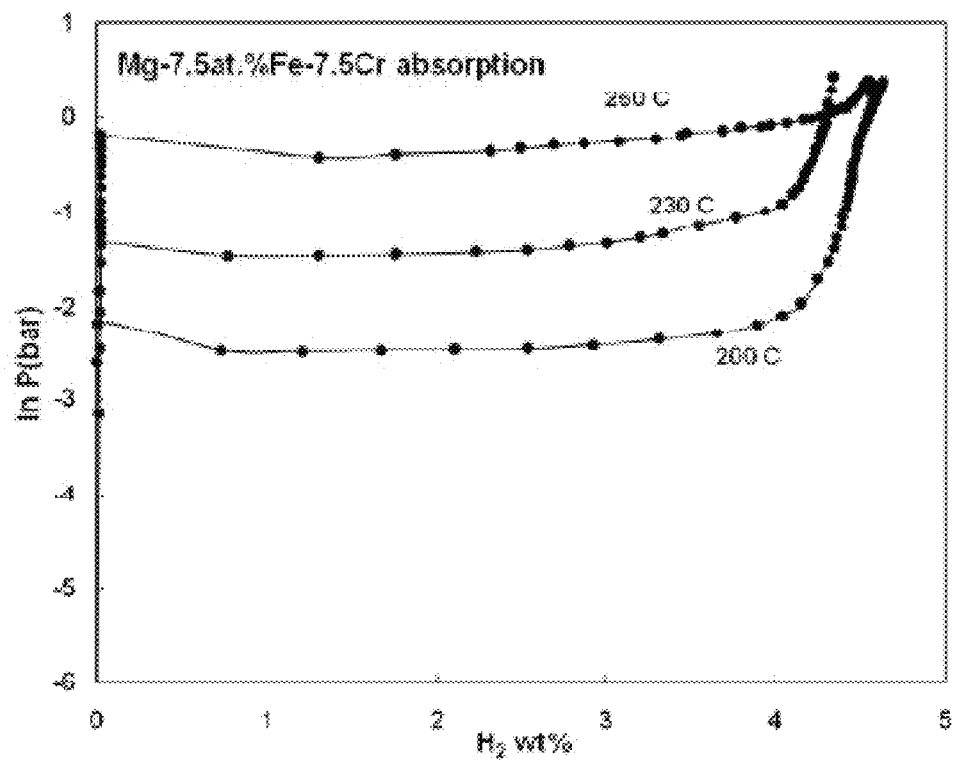
FIG. 38A is a graph showing pressure-composition isotherm absorption data for Mg-7.5 at. % Fe-7.5Cr at 200° C., 230° C. and 260° C.
Figure 38B:
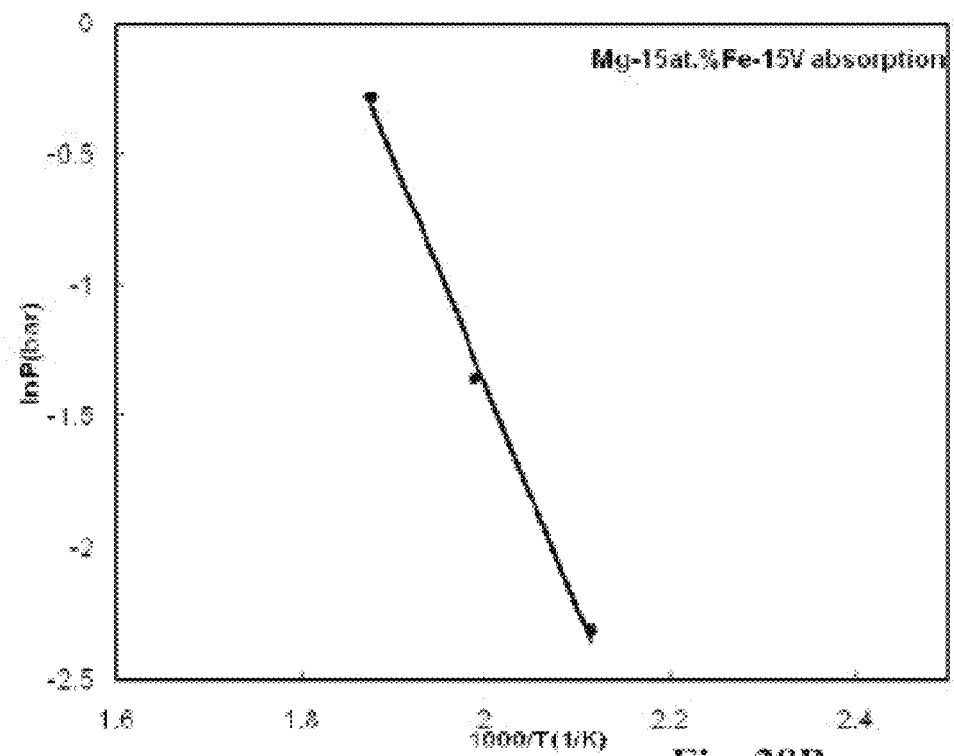
FIG. 38B is a graph of lnP(bar) v. 1000/T(1/K) for Mg-7.5 at. % Fe-7.5V.
Figure 39A:
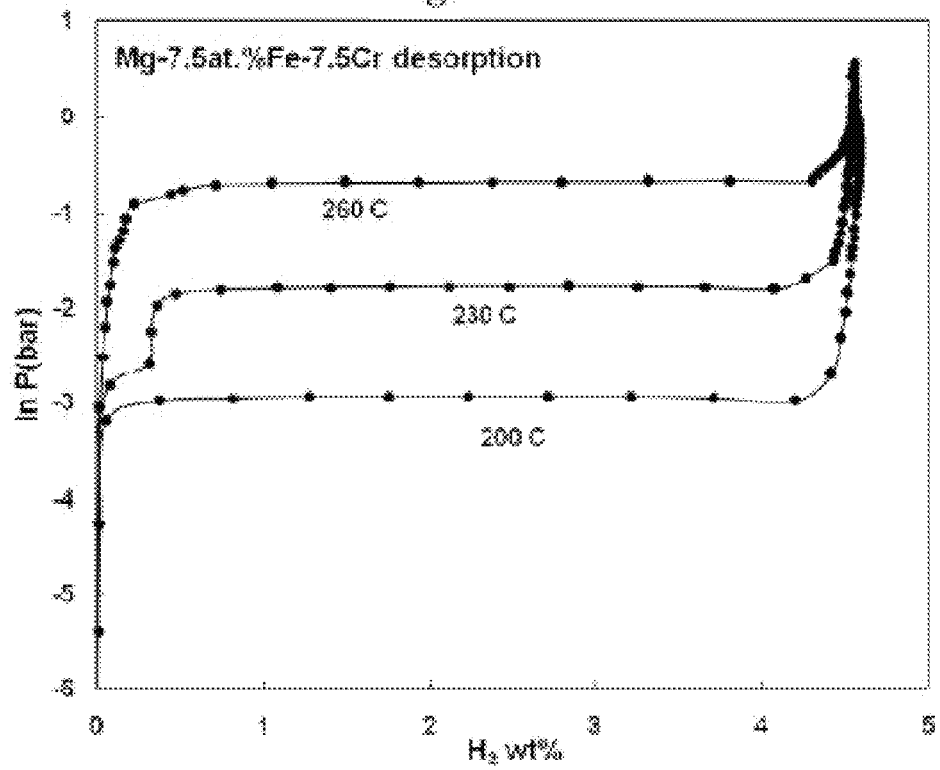
FIG. 39A is a graph showing pressure-composition isotherm desorption data for Mg-7.5 at. % Fe-7.5Cr at 200° C., 230° C. and 260° C.
Figure 39B:
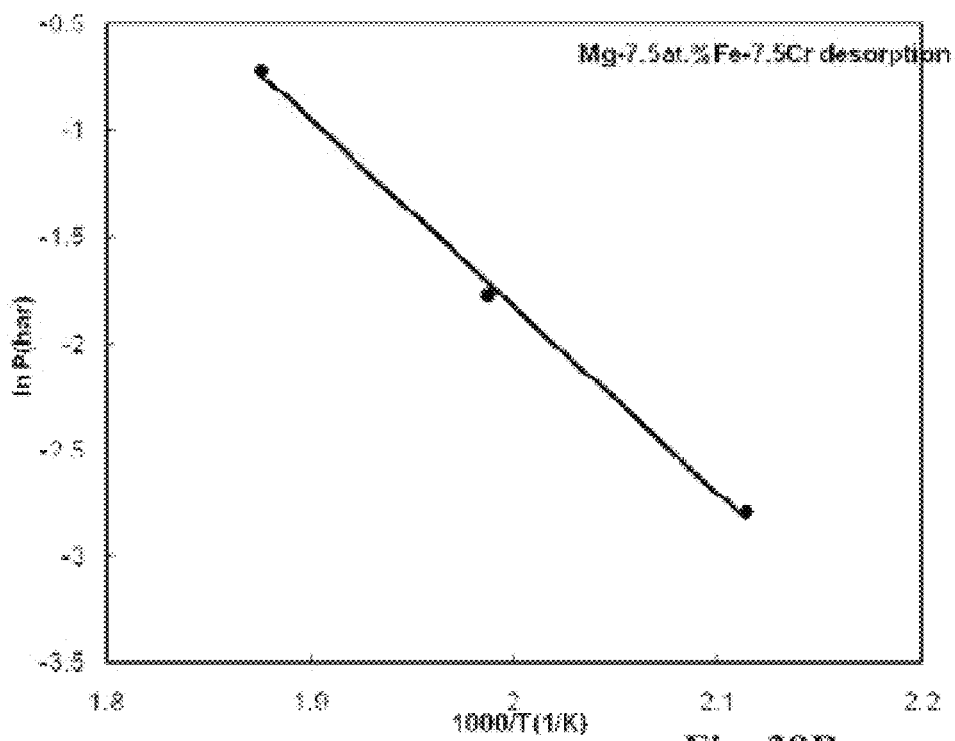
FIG. 39B is a graph of lnP(bar) v. 1000/T(1/K) for Mg-7.5 at. % Fe-7.5C.
Figure 40A:
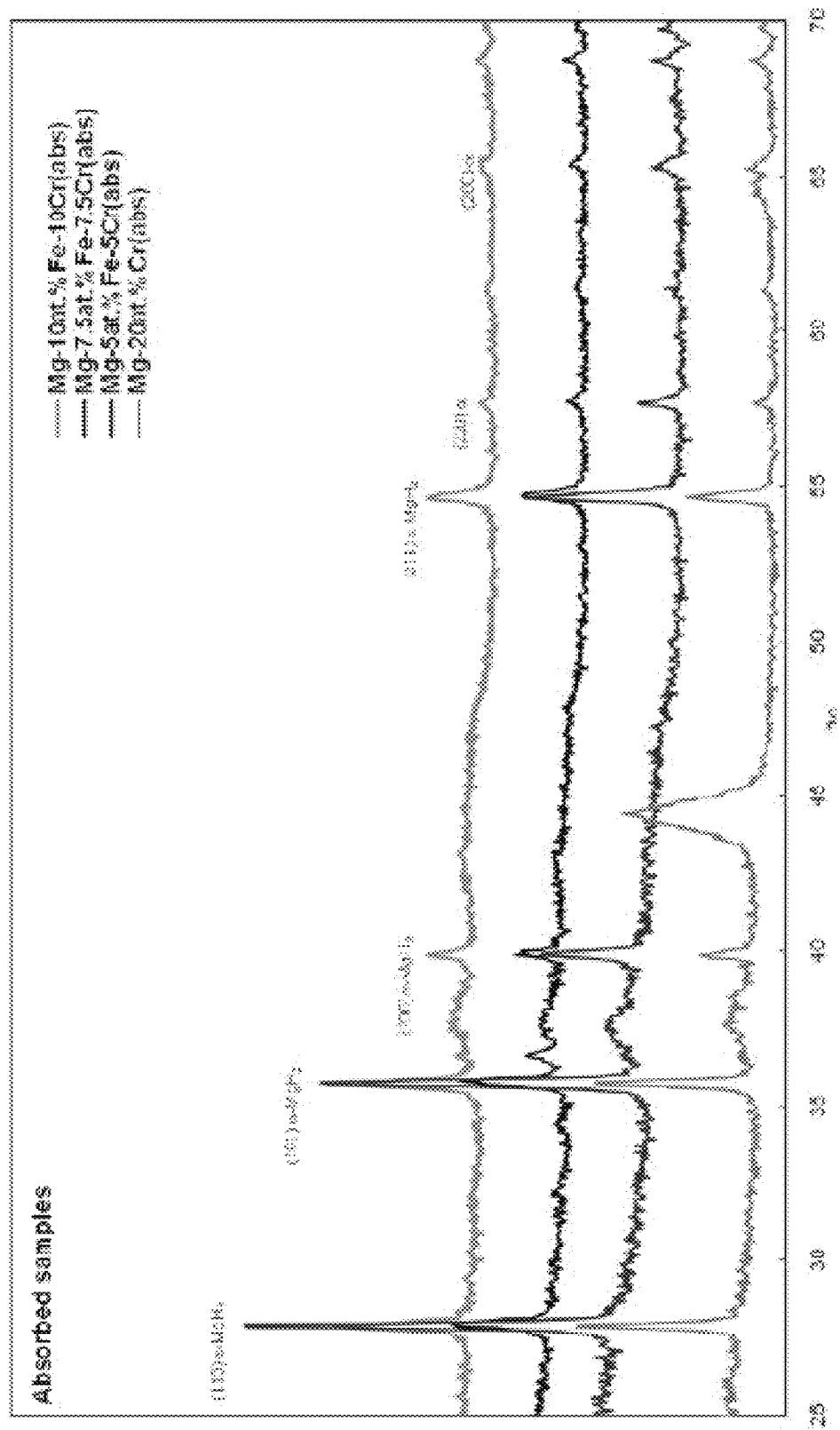
FIG. 40A is a graph of indexed X-ray diffraction patterns of various post-cycled Mg—Fe—Cr alloys, all in the absorbed state.
Figure 40B:
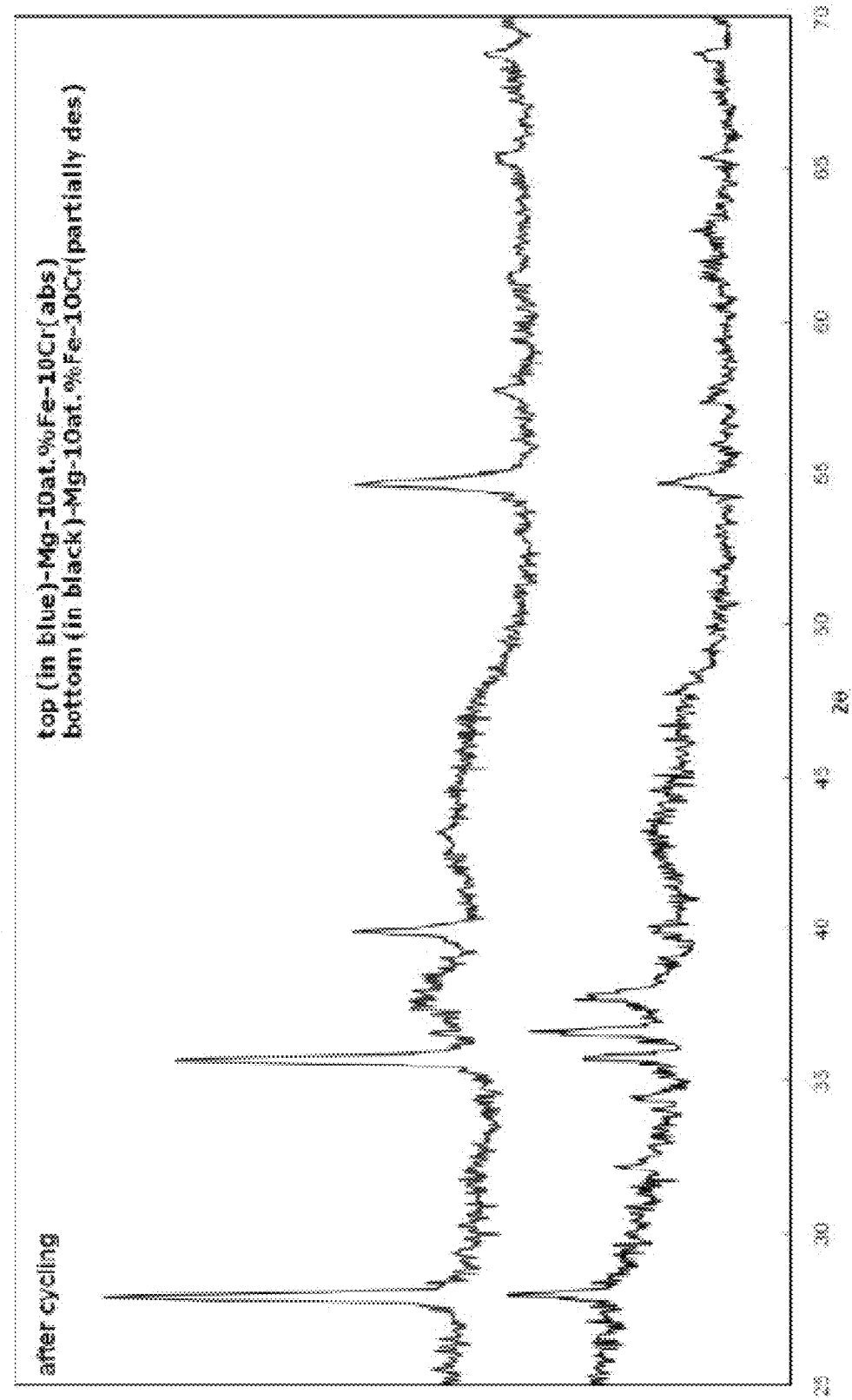
FIGS. 40B-C are a graph showing the indexed X-Ray diffraction pattern of Mg-10 at. % Fe-10Cr and Mg-5 at. % Fe-5Cr alloy after cycling, absorbed (upper line) and desorbed (lower line), respectively.
Figure 40C:
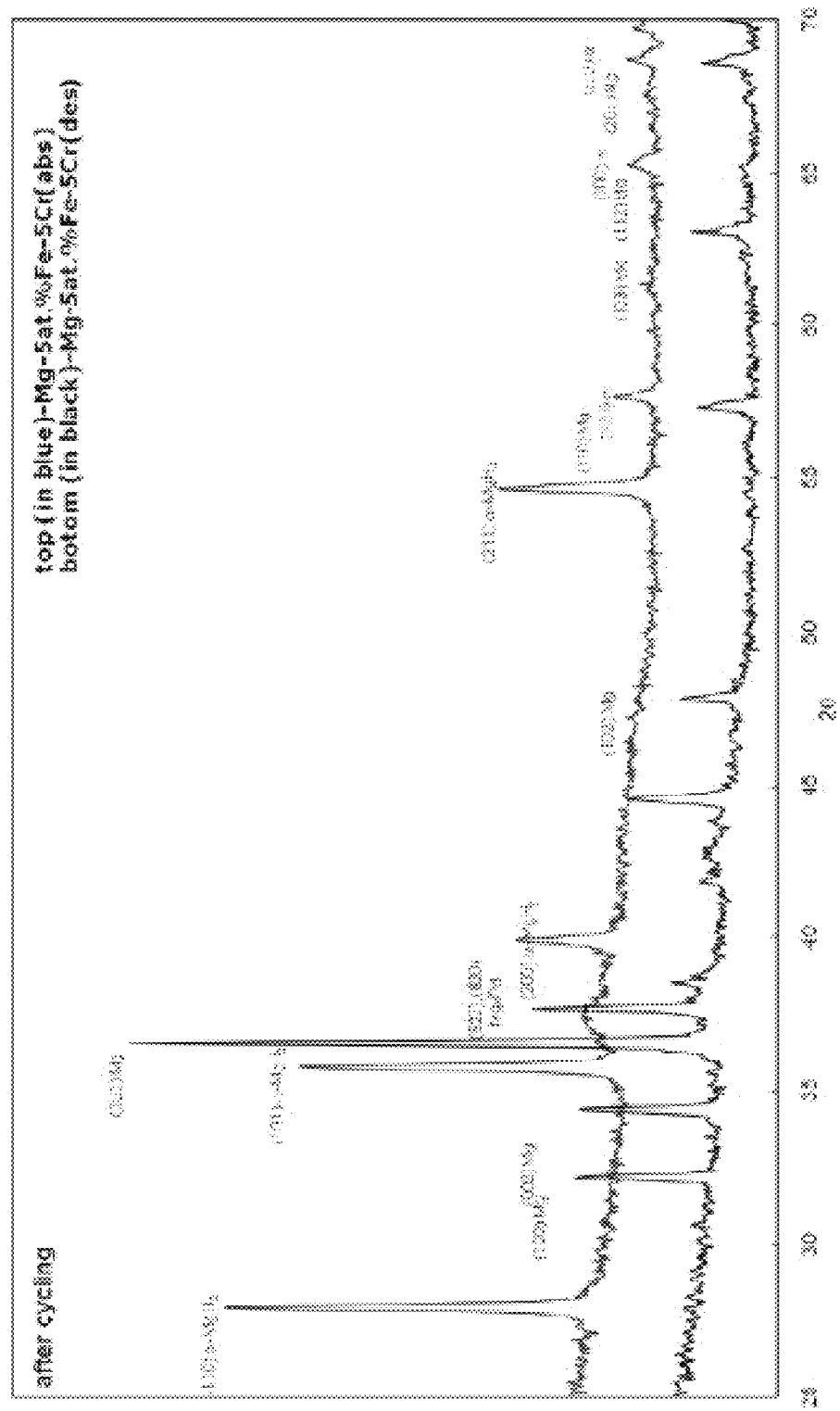

FIG. 29 shows indexed XRD patterns of Mg—Cr—Ti films, in the absorbed state. The samples, which were in loose flake form, were analyzed after undergoing over 100 sorption cycles. The most prominent peaks are unambiguously indexed to belong to $\alpha$-$MgH_2$ phase, with no detectable variation of the lattice parameter from the literature-reported values. A simulation was run to predict the peaks belonging to the various equilibrium phases of Cr—Ti intermetallics reported in literature. The results clearly showed those structures not being present. We also simulated the equilibrium $\alpha$-$TiCr_2$, $\alpha$-Cr, $\alpha$-Ti phases, and $\beta$-Ti, all of which were unambiguously absent. We did not detect the three strongest $TiH_2$ peaks (111) at $2\theta=34.9°$, (002) at $2\theta=40.6°$, and (022) at 58.7°. However the first two peaks would be quite near the $\alpha$-$MgH_2$ peaks, making the two experimental patterns difficult to separate. Thus we are leaving the presence of a minor amount of $TiH_2$ as a possibility. Neither CrH, with a $\Delta H$ of −6 kJ/mol, nor $CrH_{0.5}$ with $\Delta H$ of −4 kJ/mol would be present at these testing conditions. We were able to confirm the presence of the $Mg_6Pd$ intermetallic, with its more intense peaks being relatively prominent. There is limited evidence of an "amorphous x-ray hump" being present at $2\theta=42-43°$, in particular for the Mg-7Cr-13Ti sample. However even in that composition, the hump's intensity is not far from that of the background.

STEM/EDXS mode TEM analysis was used to examine the post-cycled Mg-10 at. % Cr-10 at. % Ti samples in their absorbed state. This is shown in FIG. 30 and FIGS. 31A-D, which confirms that Cr and Ti are densely distributed throughout the microstructure even after 100 sorption cycles. The remnant Ta surface cap (marked by an asterisk) is easily resolved from the underlying $MgH_2$. Relatively large chunks of $Mg_6Pd$ were also present, but are not shown in this image. The Cr and Ti, whose signals are far above the background noise in the EDXS spectrum, appear to be continuously distributed throughout the $MgH_2$ matrix. This is most likely due to a nano-scale second phase distribution that is below the spatial resolution limit of this microscope. It is highly unlikely that either element is in solid solution of $\alpha$-$MgH_2$.

It is generally recognized that for enhancing hydride sorption kinetics a secondary phase must of course be catalytic towards hydrogen dissociation, must allow for hydrogen diffusion through it, and must be microstructurally stable during sorption cycling. However the secondary phases' role as a heterogeneous nucleation site is often neglected. Because of the significant volume and chemical interfacial energy mismatch between hexagonal close-packed metallic magnesium and rutile-type $\alpha$-$MgH_2$, there is a large nucleation barrier for bulk formation of either one in the other. This is another fundamental kinetic impediment, which manifests as relatively large but sparsely spaced nucleated grains observed during partial sorption, and the acceleration of sorption kinetics by the introduction of other heterogeneous nucleation sites such as dislocations. A dense distribution of a secondary phase that holds and transports hydrogen while being volumetrically/elastically mismatched with the magnesium ($MgH_2$) matrix should serve as an ideal heterogeneous nucleation template. With many more nucleation sites available, the diffusion distances are subsequently reduced and so are the times for full absorption/desorption.

Low Temperature Hydrogen Storage Cycling without Activation in $MgH_2$ Thin Films Doped with a Nanodispersed Cr—V Catalyst As indicated above, the catalyst may comprise chromium. Further embodiments may include vanadium as the catalyst along with chromium. In a study we created a bimetallic hydrogen storage catalyst for magnesium, based on Cr and V. Thin films of Mg—Cr—V (1.5 μm thick) display extremely rapid and stable hydrogenation cycling kinetics at 200° C. Reversible absorption of 5 weight % hydrogen takes tens of seconds, while desorption is under twenty minutes. During the activation period the kinetics are only marginally slower. Mg-13 at. % Cr-7V shows minimal degradation even after 225 sorption cycles. X-ray diffraction indicates that bcc Cr—V phase is nanocrystalline and that magnesium hydride is unaltered. Transmission electron microscopy (TEM) of Mg-7Cr-13V thin film reveals a nanoscale dispersion of Cr—V in a matrix of $MgH_2$.

Hydrogen storage for Fuel-Cell based power generation is an active area of research with existing commercial markets. Because of its high gravimetric capacity of 7.6 wt. % and low cost, $MgH_2$ has attracted significant attention as a suitable solid-state storage medium. While being less attractive for automotive applications because of its strong bonding ($\Delta H^0$ $MgH_2$ formation ~−77 kJ/mol), magnesium is a candidate for small-scale portable and stationary backup where the absorption heat management concerns and desorption temperatures are less stringent. Magnesium-based alloys, in thin film form, also attract interest for model studies of hydrogen in metals, optical hydrogen sensing, switchable mirrors and solar absorber applications.

To improve magnesium's kinetics over many sorption cycles, transition metals may be added. Mg—V shows good gravimetric and volumetric hydrogen densities that vary with the alloy content. Researchers have reported significantly accelerated kinetics in binary Mg—V systems relative to other Mg-based alloys. In fact, Mg—V powder composites display some of the fastest hydrogen sorption kinetics of any magnesium-based system. The heat of formation for the most commonly reported form of vanadium hydride $VH_{0.5}$ is −35 to −42 kJ/mol H. Thus one would not expect this phase to be stable at the hydrogenation temperatures/pressures utilized for magnesium. Authors did report the presence of $VH_{0.81}$ phase in the hydrogenated Mg—V powders, deduced from X-ray analysis. However the plateau pressure-composition-temperature (PCT) data for the composite was identical to that of α-$MgH_2$.

While the sorption behavior and structure of Mg—V system has been widely investigated, Mg—Cr has received less attention. Similar to other of transition metals, Cr should improve the sorption behavior of Mg by lowering the dissociation energy barrier of hydrogen molecules. This has been proved by theoretical calculations on transition metal-doped Mg surfaces. CrH possesses an enthalpy of formation of −6 kJ/mol H, and will not form at elevated temperatures under usual testing pressures. However Kyoi et al. reported a new ternary $Mg_3CrH_x$ hydride produced under high hydrogen pressure. The ternary hydride decomposes to Mg and Cr mixture at 643 K resulting in an irreversible sorption process. The electrochemical sorption behavior of Mg—Cr thin film has also shown an improved kinetics as compared to pure Mg with a reversible capacity of 4.9 wt. % for Mg-20 at. % Cr. However, in the same study, the kinetics and reversible capacity were demonstrated to be superior for Mg-20 at. % Ti compared to Mg-20 at. % Cr. Authors have also investigated the interplay of enthalpy of hydrogen solution and of hydrogen diffusion in $Mg_2Ni$/Cr/Pd trilayer thin films.

While the kinetic performance of binary Mg-based alloys is clearly improved with respect to pure Mg, even faster sorption rates combined with retained kinetic stability throughout prolonged cycling is desirable. That is the aim of our work. Here we focus on the unexplored ternary Mg—Cr—V system. We utilize model materials consisting of co-sputtered 1.5 micrometer thick films. Thin films are conducive for alloy design, allowing for excellent control of material's composition and microstructure. In this study we also report the sorption properties of binary Mg—V, used as a baseline. The kinetics of binary Mg—Cr alloys are known.

Thin films were deposited (AJA International™ DC-magnetron co-sputtering system) onto a nominally room temperature 4 inch Si (100) substrate that was coated with a hardened (so as not to outgas in the chamber) photoresist. Magnesium and magnesium oxide are known to have poor activity towards hydrogen dissociation, which is the first step in the absorption process. When using a single layer Pd catalyst thermal effects drive the interdiffusion of Mg and Pd, and the subsequent formation of $Mg_6Pd$ and MgO. In this study tantalum is chosen as the intermediate layer because it has been demonstrated to be effective in preventing elevated temperature interdiffusion of Pd and the underlying Mg during hydrogen sorption. Inside the sputter system the thin films stack had following sequence: vacuum/7.5 nm Pd/7.5 nm Ta/1.5 µm Mg—Cr—V/7.5 nm Ta/7.5 nm Pd/photoresist/Si wafer. The deposition rates were the following: Mg 3; Pd 1.7; Ta 0.3 Å/sec; Cr and V varied to adjust for stoichiometry. The films had compositions Mg-5 at. % Cr-5V, Mg-7.5 at. % Cr-7.5V, Mg-10 at. % Cr-10V, Mg-7 at. % Cr-13V, Mg-13 at. % Cr-7V, and Mg-10 at. % V (not shown), Mg-20 at. % V. Depositions of the catalysts and of the bulk Mg were performed sequentially without any interruption.

During deposition the substrate temperature was maintained near ambient. We used Ar gas with a purity of 99.99999% at a sputtering pressure of $5 \times 10^{-3}$ mbar, with a maximum base pressure of $5 \times 10^{-8}$ mbar. Deposition was done in a sputter-up configuration with continuous substrate rotation. Film thickness and deposition rates were obtained through the use of crystal deposition rate monitor held at the substrate plane. A separate series of experiments involving ex-situ film thickness measurements versus deposition parameters were used to cross check the thickness/rate accuracies. After deposition the photoresist was washed away using acetone allowing the films to be fully released from the Si wafer. Release from the substrate allowed the films to be treated as free flakes.

Volumetric absorption and desorption measurements were performed using a Sieverts hydrogen sorption analysis system (Hy-Energy LLC. PCTPro 2000). All the measurements were carried out at 200° C. Hydrogen was absorbed at a starting pressure of 3 bar (finishing at 1.5 bar) and desorbed at a starting pressure of 5 mbar (finishing at 15-20 mbar). The system automatically switched from absorption to desorption, and vice versa, once the sorption rate fell below 0.004 wt. %/min. Transmission electron microscopy (TEM) analysis was performed using the JEOL 2200FS microscopes, operating at 200 kV accelerating voltage. In scanning transmission electron microscopy (STEM) mode, the probe diameter was approximately 1 nm. After prolonged hydrogen cycling the samples resembled loose powder that could be analyzed directly without additional thinning. The powders were supported by amorphous carbon on a copper grid, with care being taken to minimize the length of air exposure between testing and subsequent TEM analysis. X-ray diffraction (XRD) analysis was done using a Bruker AXS diffractometer (Bruker Discover D8) with Cu—$K_\alpha$ radiation source ($\lambda$=1.5406 Å).

Figure 41A:
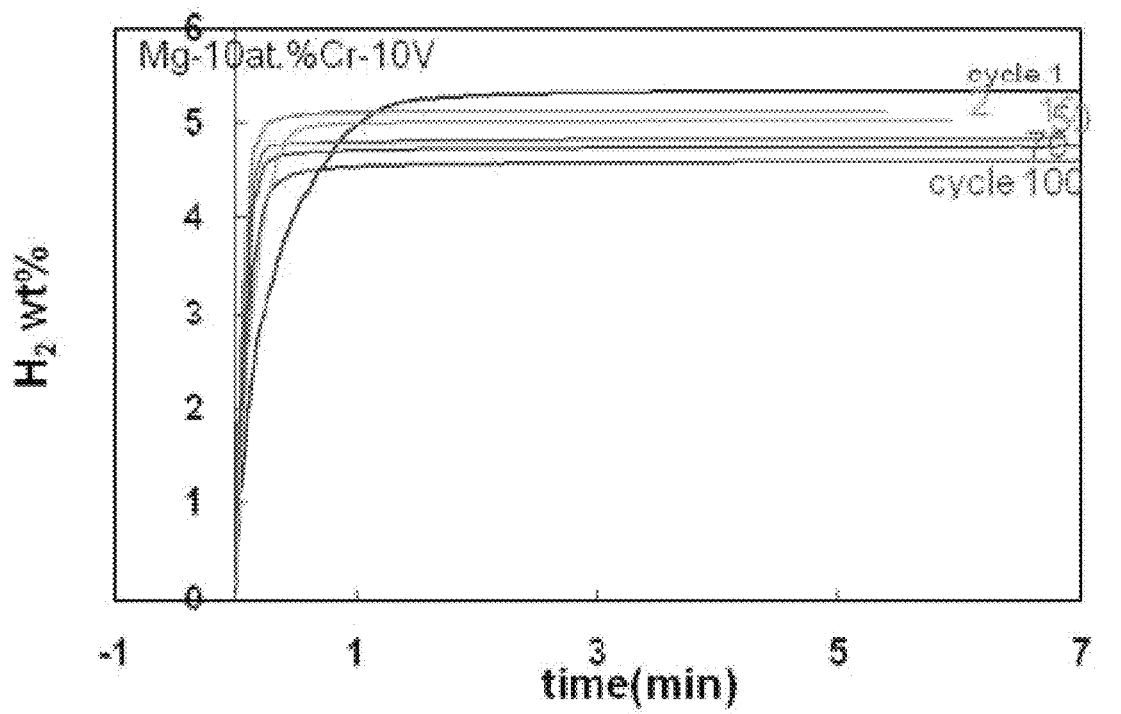
FIGS. 41A and B are graphs of absorption and desorption hydrogenation cycling data, respectively, for two ternary Mg—Cr—V alloys.
Figure 41B:
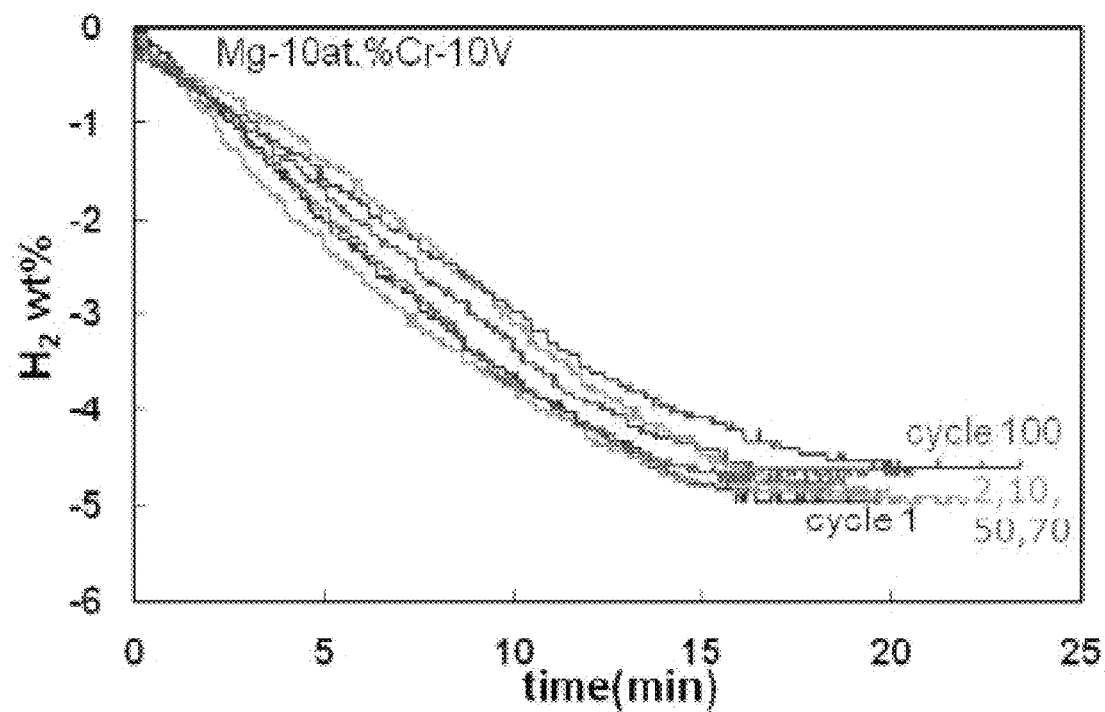
Figure 41C:
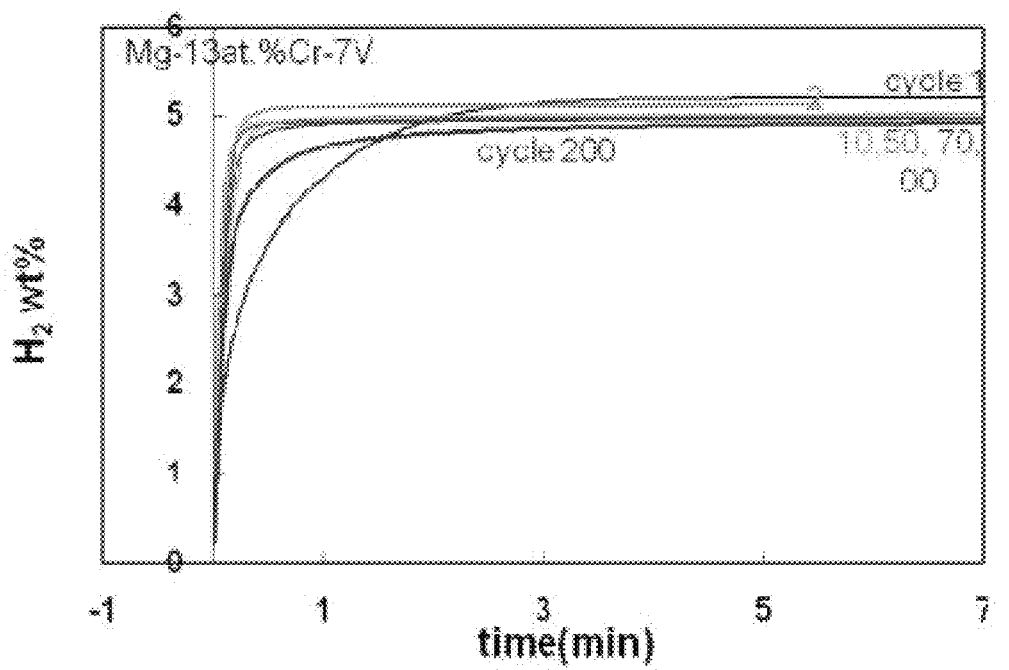
FIGS. 41C and D are graphs of absorption and desorption hydrogenation cycling data, respectively, for two ternary Mg—Cr—V alloys.
Figure 41D:
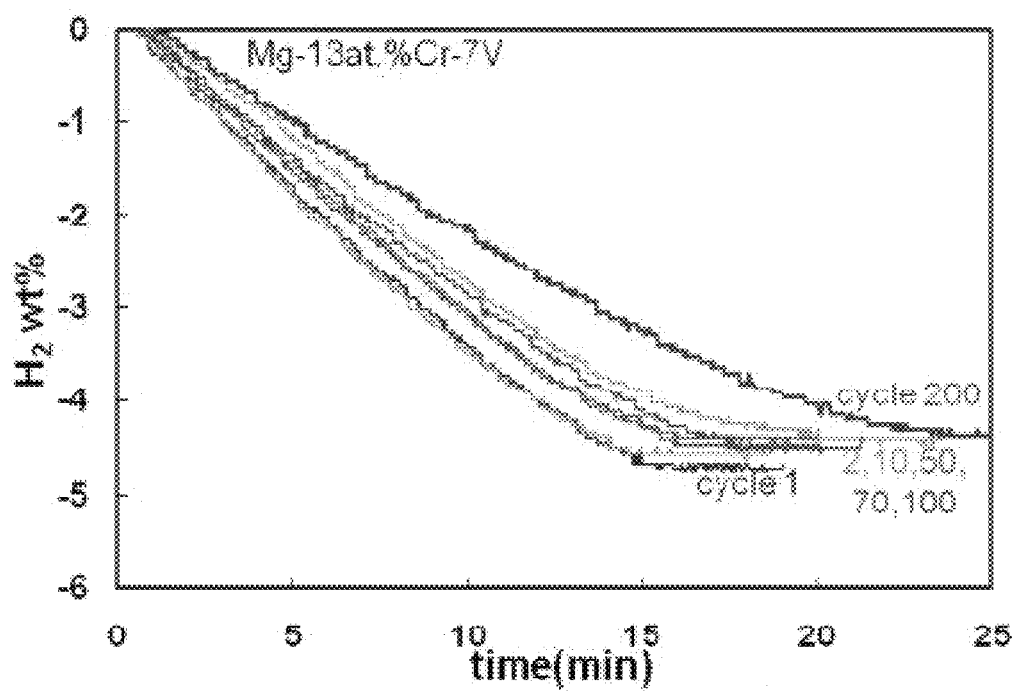

FIGS. 41A-D show the absorption and desorption hydrogenation cycling behavior of a magnesium thin film doped with 20 atomic percent Cr and V in a 1:1 atomic ratio. The atomic percentage of vanadium may equal the atomic percentage of chromium plus or minus 10 atomic % of the CrV total, although other ranges may be used. FIGS. 41C-D show the sorption performance of magnesium also doped with 20 atomic percent bimetallic catalyst, but now with the Cr:V ratio roughly 2:1. The graphs show the sorption data for cycles 1, 2, 10, 50, 70 and 100. The Mg-10 at. % Cr-10V alloy was cycled to 115 absorption/desorption cycles before the test was interrupted, while Mg-13 at. % Cr-7V was cycled to 225 cycles. At 200° C. absorption is on the order of tens of seconds, while desorption is takes place in under 25 minutes.

Referring to FIGS. 42A-B, the pressure-composition-temperature (PCT) plots for the Mg-7 at. % Cr-13Valloy are shown. There is a quantifiable hysteresis between the hydride formation plateau and the hydride decomposition plateau. This is due to the difference in the irreversible work associated with the nucleation of the hydride in the metal versus the other way. From the three testing temperatures, the enthalpy for hydride formation is −74 kJ/mol $H_2$, while the enthalpy for hydride decomposition is 80 kJ/mol $H_2$. The hydride decomposition enthalpy is a bit high relative to what is commonly reported in literature, being on the order of ~77 kJ/mol $H_2$. Data collected several additional temperatures is needed to establish a more accurate value. Nevertheless one can conclusively state that the Cr—V additions do not thermodynamically destabilize $MgH_2$, and the reported extremely rapid sorption rates are due to enhanced kinetics. The entropy for hydride formation and decomposition is −134 and 145 J/K mol $H_2$, respectively. Again more data points would be desirable to increase the accuracy of this calculation.

Figure 43:
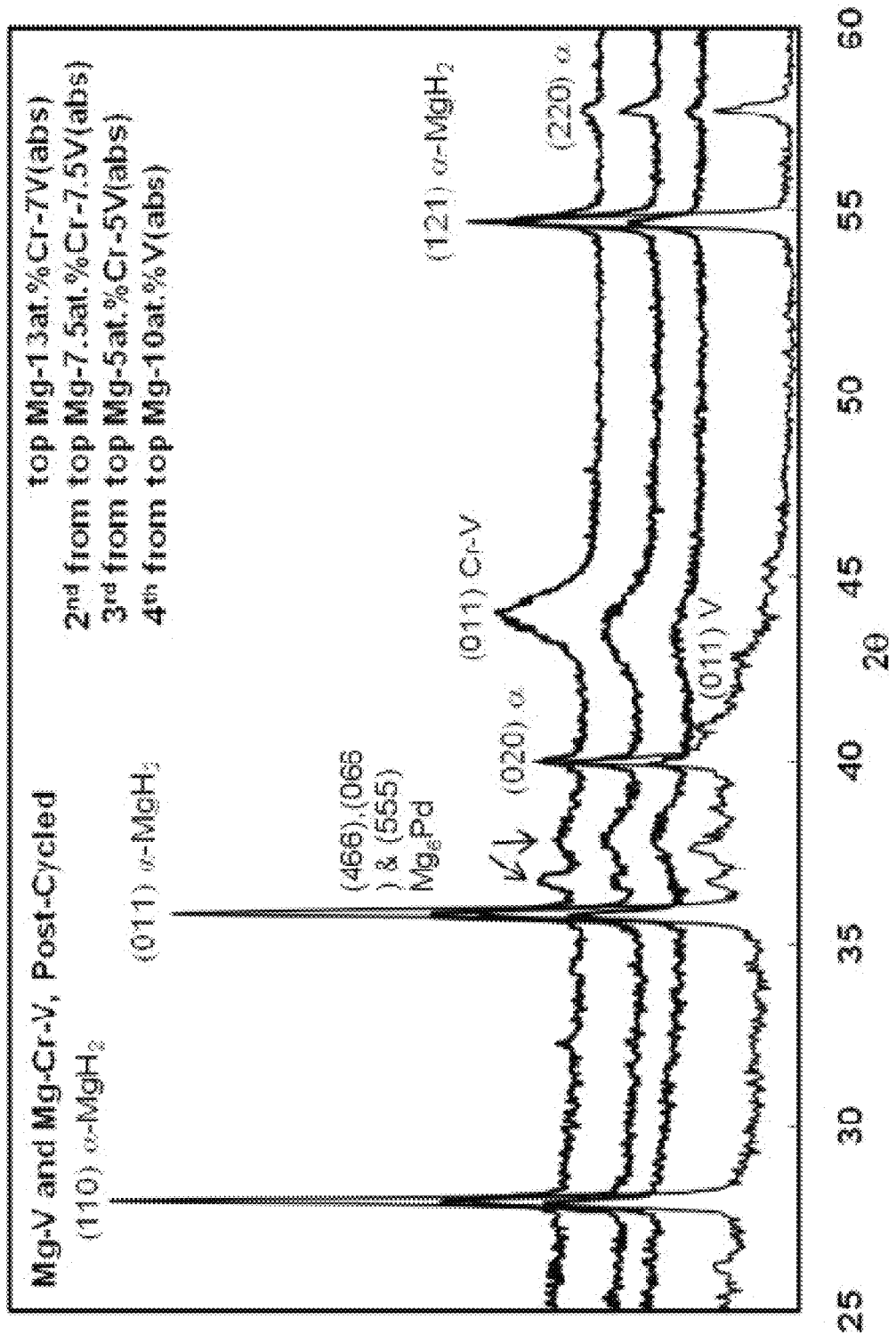
FIG. 43 is a graph of indexed X-ray diffraction patterns of the post-cycled Mg-5 at. % Cr-5V, Mg-7.5 at. % Cr-7.5V, Mg-13 at. % Cr-7V, and Mg-10 at. % V films, all in the absorbed state.
Figure 44A:
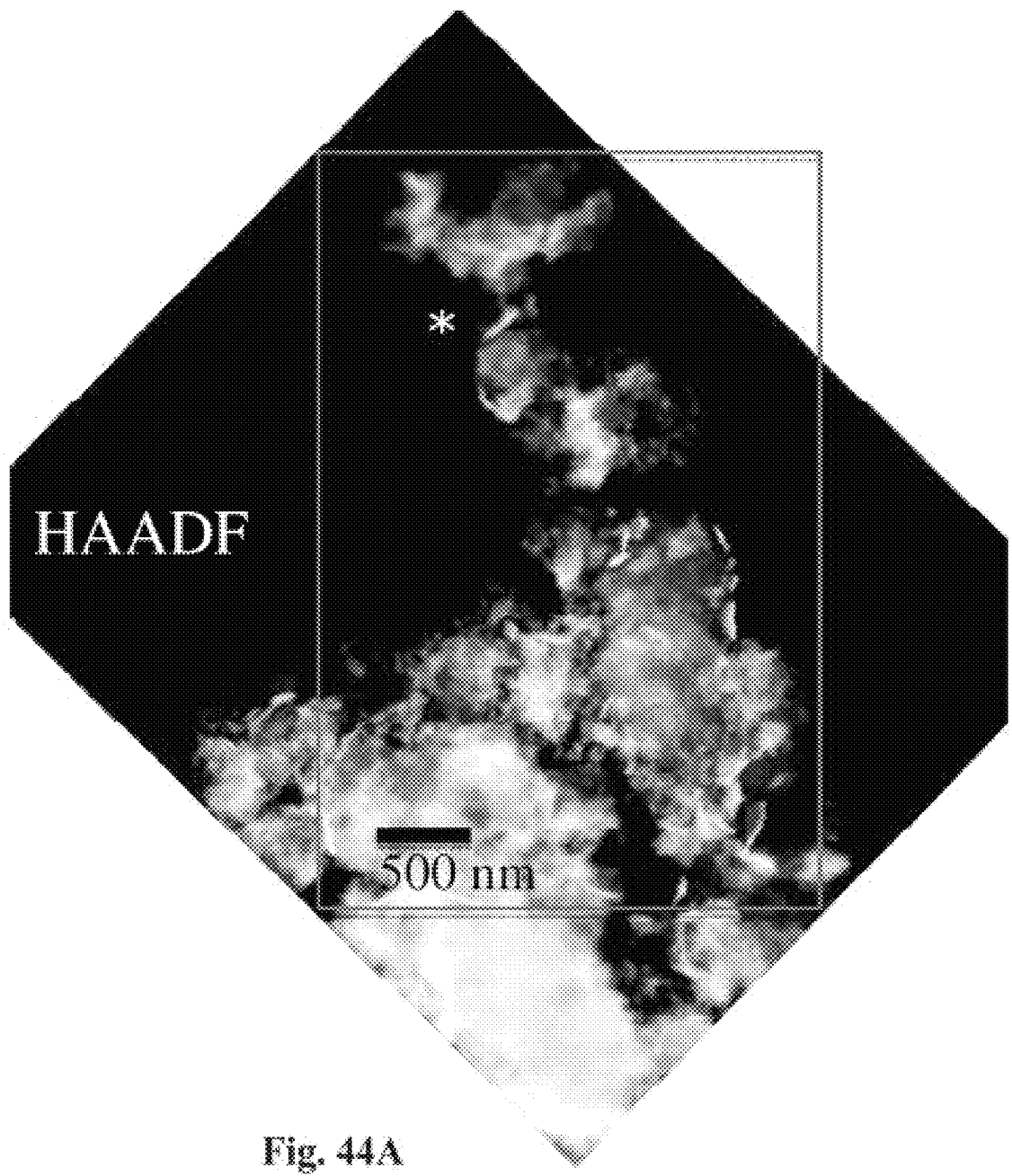
FIG. 44A is a Bright field STEM micrograph and FIGS. 44B-E are EDXS elemental maps of Mg, Ta, V and Cr in the Mg-7 at. % Cr-13 at. % V samples in their absorbed state An asterisk points to the same region in the micrographs.
Figure 44B:
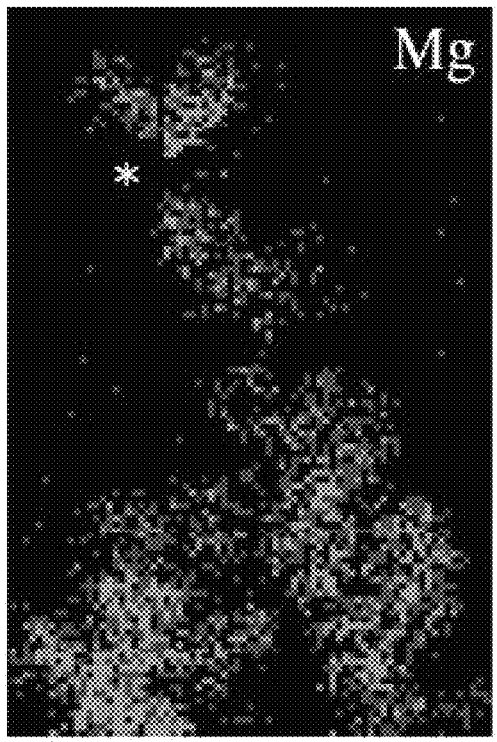
Figure 44C:
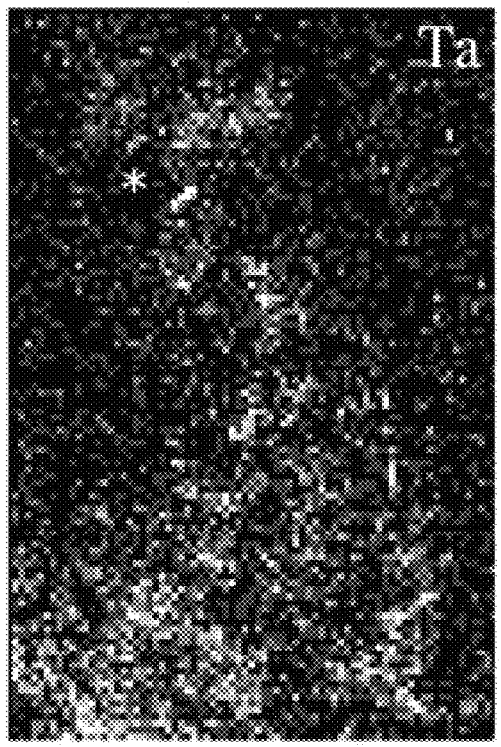
Figure 44D:
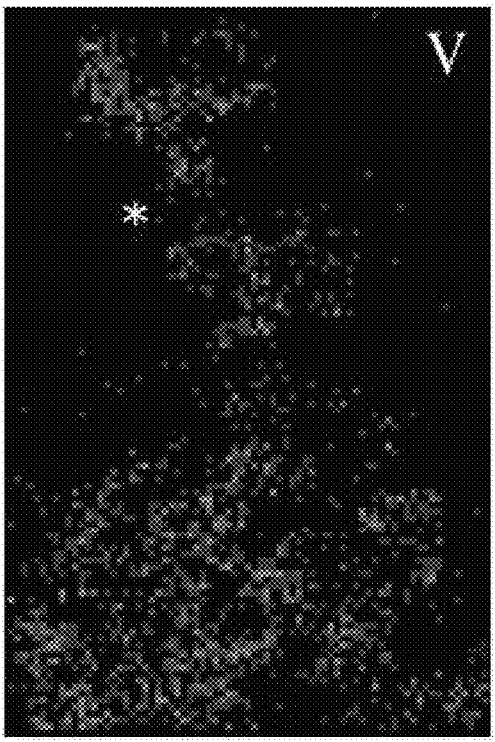
Figure 44E:
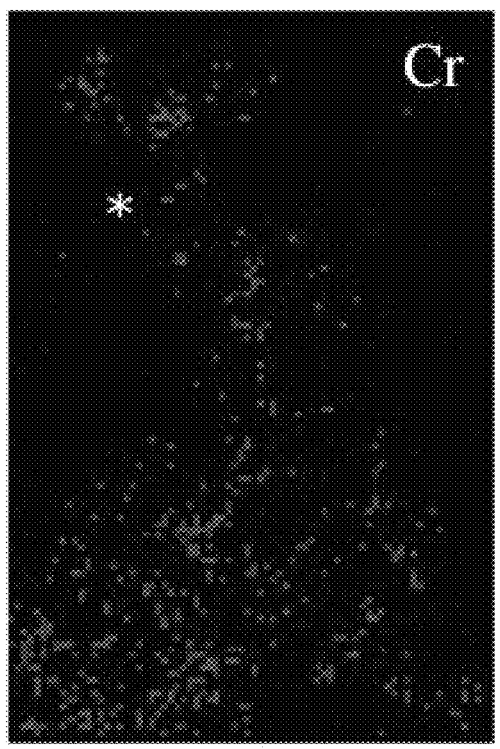

FIG. 43 shows the indexed X-ray diffraction (XRD) curves for three ternary alloys and Mg-10 at. % V, after they were sorption cycled. The samples are shown in the absorbed state. As is indicated in the data, the primary hydrogen-storing phase is tetragonal α-$MgH_2$. There is no detectable variation of the α-$MgH_2$ lattice parameters from the literature-reported values. Identical XRD analysis was performed the post-cycled samples in the desorbed state (not shown). In that case, α-MgH$_2$ was replaced by equilibrium magnesium with no variation from the literature reported lattice parameter. Despite the Ta underlayer, the Mg$_6$Pd intermetallic still formed. The experimentally overlapping (446), (066) and (555) Mg$_6$Pd peaks are labeled in the figure. The detected (224) Mg$_6$Pd peak present at 2θ=21.6° is not shown, while (111) Mg$_6$Pd at 2θ=7.59° was outside the range of the detector.

The XRD patterns contained characteristic bcc solid solution Cr—V (011) and (200) reflections. The center of these peaks depended on the Cr:V atomic ratio, roughly obeying Vegard's law. The (200) reflections, being in the range of 63°, are not shown. In the unhydrided state the (200) peak almost directly overlaps with the (01-13) Mg reflection. Both (011) and (200) were quite broad even at the higher Cr—V content, such as in the Mg13 at. % Cr-7V films. This indicates that the structure of the Cr—V phase is nanocrystalline. At lower Cr—V contents both peaks become more diffuse and less intense. The former effect indicates an increasing amount of disorder in the Cr—V structure. The decreasing relative intensity is due to both more disorder and a decreasing volume fraction. As expected, Cr—V phase did not hydride at the testing conditions, with the shape of the (011) peaks being effectively the same in the absorbed and the desorbed materials.

FIGS. 44A-E show the results of TEM analysis performed on the post-cycled Mg-7 at. % Cr-13 at. % V samples in their absorbed state. The high-angle annular dark field/energy-dispersive X-ray spectroscopy (HAADF/EDXS) results confirm that both Cr and V are densely distributed throughout the microstructure even after 125 sorption cycles. As PCT and XRD results indicate, neither element should be in solid solution of α-MgH$_2$. Both at 200° C. and at ambient, Cr and V possess negligible solubility in Mg, forming no intermediate phases with it. Much more likely the Cr—V phase is present as a nano-scale distribution of precipitates both in the bulk of the MgH$_2$ and at its grain boundaries. Remaining fragments of the Ta surface cap are resolved both in the HAADF image and in EDXS map. One such Ta fragment has an asterisk adjacent to it. Relatively large chunks of Mg$_6$Pd were also present, but are not shown in this image.

Figure 45A:
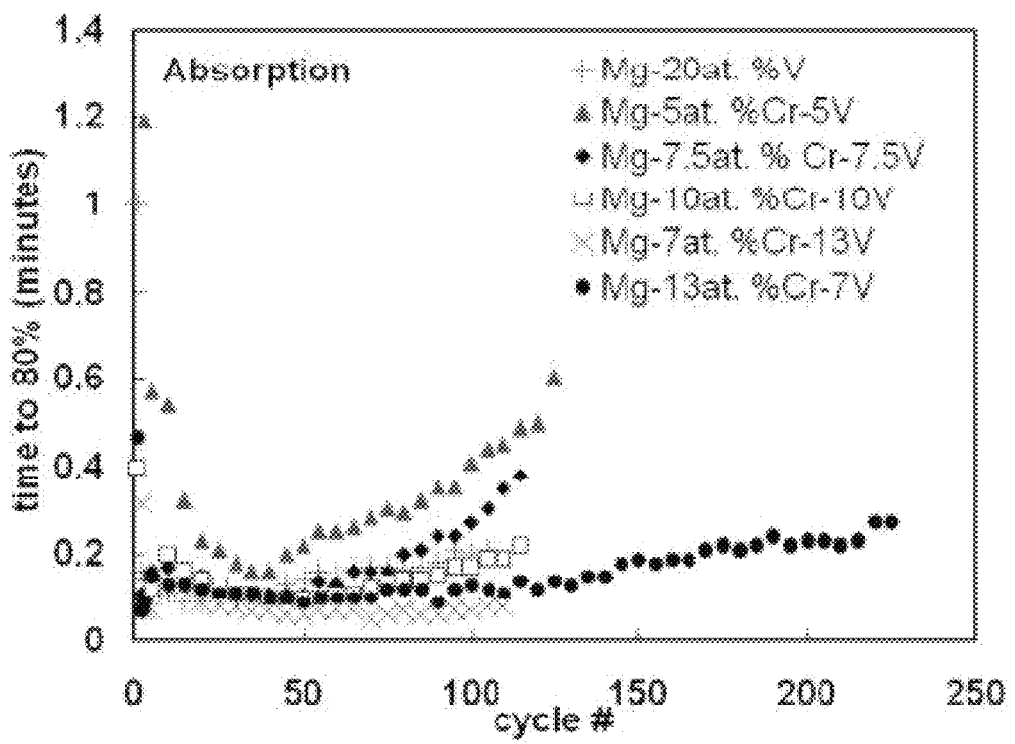
FIGS. 45A-B are graphs that illustrate the time to absorb and desorb, respectively, 80 weight % of the maximum measured capacity, as a function of sorption cycle number, for various Mg—Cr—V alloys studied.
Figure 45B:
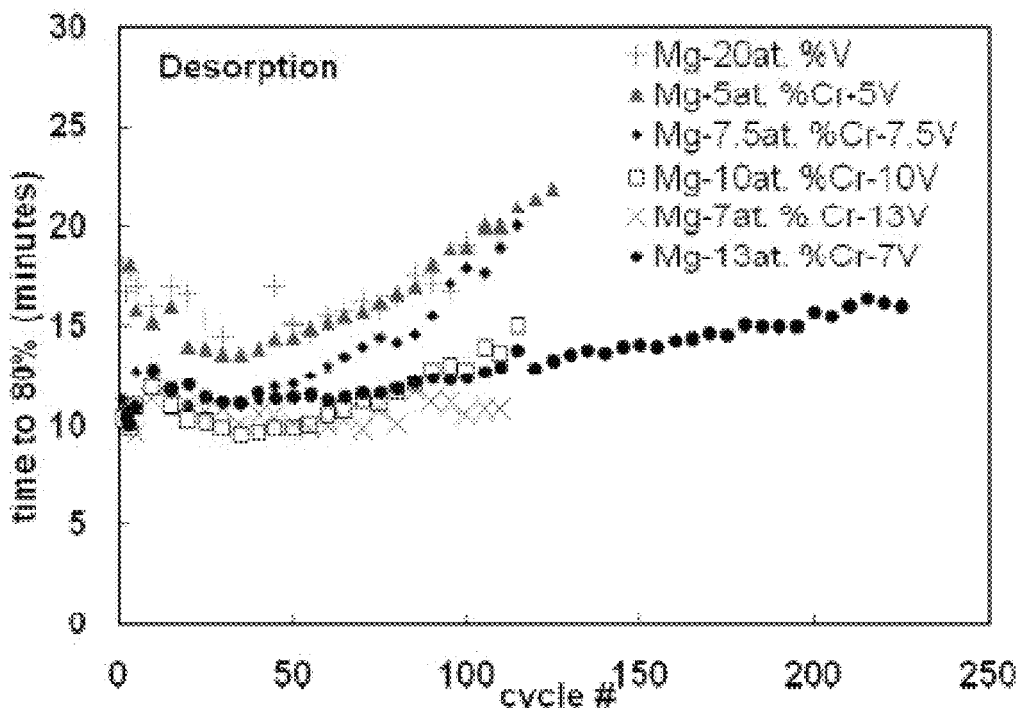

Referring to FIGS. 45A-B, a composite plot for the time to absorb and the time to desorb 80% of the mean maximum hydrogen gravimetric capacity is shown. All the ternary compositions that were tested are shown, with the exception of the binary Mg-10 at. % V. We performed extended cycling on the Mg-13 at. % Cr-7V film. Even towards the end of the 225 absorption/desorption cycles, this system is able to maintain exquisite sorption rates, absorbing in less than 30 seconds and desorbing in 16 minutes.

At lower Cr—V content, such as Mg-5 at. % Cr-5V, the catalysts lose their efficacy with increasing cycle number. The kinetics are still relatively fast, e.g. by cycle 125 the Mg-5 at. % Cr-5V takes about 40 seconds to absorb and 22 minutes to desorb, but the clear trend is towards performance degradation. This result illustrates a critical point of catalyst design for hydrogen storage materials: a sufficient three-dimensional dispersion is necessary, which may correspond to a relatively high volume fraction of the catalyst phase. In this case the 5/5 and the 7.5/7.5 atomic percent is insufficient, with clearly better performance being achieved in the Mg-10 at. % Cr-10V alloy.

A significant difference between magnesium with Cr:V ratio of 1:1 and that of 2:1 or 1:2 is in the faster rate of kinetic degradation of the alloys with the equiatomic catalyst. Since the instrument automatically cycled from absorption to desorption and vise versa once a minimum rate was reached, the slowing of the kinetics also resulted in a slight but progressive capacity degradation. The baseline Mg—V systems had the same issue. This is an admittedly intriguing result that may be related to the variation of the microstructural stability of the catalyst compositions. For example, a catalytic phase with a Cr to V atomic ratio of 2:1 may be more resistant to Oswald Ripening than one with an atomic ratio of 1:1. This may also be related to the differences of the various Cr—V compositions in their interaction with hydrogen, including the capability for hydrogen dissociation/reassociation, solubility and transport. The last two features—hydrogen solubility and hydrogen transport—are important for catalytic additions to magnesium, since hydrogen diffusivity in both Mg and particularly in MgH$_2$ is well-known to be very sluggish. Any phase densely dispersed throughout the bulk of the system that acts as a short-circuit path, i.e. a hydrogen pump, for hydrogen transport in and out of the microstructure would tremendously accelerate the kinetics.

Remarkably, these alloys, with the exception of binary Mg-20 at. % Cr, Mg-10Cr, and Mg-5 at. % Cr-5V, had a negligible activation period during the first several cycles. During the activation period, which is also known as the induction period, the sorption kinetics are markedly slower than during the remainder of the cycling. The activation period begins at cycle 1, and may last up to the first 5 full absorption/desorption cycles even in alloys with optimized catalytic additions. This initial severe kinetic slowness has several well-documented explanations. The first, termed "surface activation", is a prolonged stability of the surface oxide layer that needs to be disrupted so as to allow for hydrogen ingress in the material. This would not be an issue for our materials due to the Pd/Ta surface cap. Another explanation is related to the need to generate sufficient density hydrogen-exposed surfaces via cracking. Since this does not occur instantly, or even during the first several cycles, the kinetics are slowed by the larger diffusion distances. Such a scenario appears more plausible in bulk metallurgical samples and in coarse powders, rather than in thin films.

Another scenario is the time/cycle dependence for the formation of a steady-state microstructure. If such a microstructure sorbs hydrogen faster than the as-synthesized material, the initial cycles are termed activation. Conversely if the steady-state microstructure sorbs slower, then the alloy is said to degrade during cycling. The as-synthesized films are a supersaturated solid solution of Cr and V in Mg. It is likely that such a non-equilibrium microstructure will very quickly decompose during sorption, providing a dense template of Cr—V catalyst particles. Furthermore the driving force, and hence the phase separation kinetics, should be faster in the systems with higher supersaturated alloy content. However a detailed TEM-based microstructural investigation of the initial sorption cycles needs to be performed in order to make a firm conclusion.

As indicated the catalyst may comprise chromium. Referring to FIGS. 32-40, experimental data for a combination of chromium and iron used as the catalyst are provided. Volumetric absorption and desorption measurements were performed on a Sieverts hydrogen sorption analysis system (Hy-Energy LLC™. PCTPro-2000™). All the measurements were carried out at 200° C. Mg was absorbed at a pressure near 3 bar and desorbed at a pressure near 0.01 bar. Referring to FIGS. 38A-B and 39A-B, the absorption data produces a calculated enthalpy and entropy of ΔH=−71.4 kJ/mole and ΔS=130 J/mole and the desorption data produces a calculated enthalpy and entropy of ΔH=−72.7 kJ/mole and ΔS=130.25 J/mole.

Other combinations of catalyst may be used. For example, the catalyst for the kinetic absorption and desorption of hydrogen may comprise titanium and vanadium. Although test results for a combination of titanium and vanadium are not disclosed, such a combination is predicted to work based on the success of the individual component of titanium and vanadium in other compounds, as well as the success of titanium and vanadium individually with magnesium in binary combinations.

In addition, combinations of 3 or more of the listed elements may be used as the catalyst.

Applications of the material disclosed herein include for example application in a sensor, mirror, solar absorber, hydrogen storage device, heat storage material, heat storage device, energy storage material, energy storage device, or sour natural gas filter. Example sensors include one or more of a corrosion monitor and a pH meter. Other applications not disclosed may be used.

The hydrogen absorbing and desorbing materials disclosed herein may comprise magnesium in an amount of at least 50%, for example more than 50%, by atomic percentage of the material. In a preferred embodiment, more than 5/7 of the material by atomic percentage comprises magnesium. Higher percentages of magnesium are desirable in order to increase the hydrogen absorption capacity of the material.

Film thicknesses may be between 10 nm and 10 microns in some embodiments.

Microstructural evolution during low temperature sorption cycling of multilayer Mg—Al—Ti nanocomposites The catalyst for the kinetic absorption and desorption of hydrogen may comprise aluminum and titanium. The at least two layers of magnesium may comprise catalyst. For example, we studied the hydrogen storage behavior of sputtered Mg—AlTi multilayers where nanometric Mg or Mg—Al—Ti layers were confined by 2 nm thick layers of AlTi. With decreasing the thickness of Mg layers, we were able to achieve 5.1 wt. % H capacity without significant degradation in over 200 cycles. However, for the samples with pure Mg layers degradation eventually occurred at higher cycle numbers. In multilayers of 34 nm thick Mg degredation was followed by disintegration of the films into sponge-like flakes. Alloying Mg layers with Al and Ti through cosputtering improved the performance of the multilayer composites. This improved resistance of the microstructure against coarsening while AlTi particles were well dispersed. Moreover, the stability of the multilayers enhanced to an extent that the multilayers preserved their physical integrity to some degree and maintained their superior kinetics up to over 250 cycles.

In this study, we propose Mg—AlTi multilayered structures. Both Al and Ti are widely used to enhance sorption behavior of magnesium hydrogen systems. For cosputtered Mg-based thin films, the ternary Mg—Al—Ti system has enhanced performance compared to binary Mg—Ti or Mg—Al in terms of cycling stability and kinetics. Since Al reacts more strongly with Ti than Mg, the intermetallic AlTi forms enhance the kinetic and hydrogen sorption behavior. Employing AlTi layers may be desirable due to good catalyst activity and high mechanical properties rather than individual Ti or Al layers.

The kinetics and capacity of the multilayers are studied as a function of Mg layer thickness, and the evolution of their microstructure is studied by electron microscopy techniques and X-ray diffraction (XRD). The ability of AlTi layers as coarsening barriers has been clarified. Furthermore, the effect of addition of Al and Ti to the individual magnesium layers is investigated. Multilayers consisting of co-sputtered Mg—Al—Ti layers sandwiched between AlTi layers show enhanced kinetics and improved cyclability and mechanical stability.

Experimental Techniques

Magnetron sputtering system (AJA International) was used to deposit Mg/AlTi multilayer thin films of 1.5 μm thickness coated with 7.5 nm Pd/Ta bi-layers. Palladium can protect samples from oxidation and catalyze hydrogen dissociation while tantalum suppresses the interdiffusion of magnesium and palladium. All samples were prepared under mean base pressure of approximately $8*10^{-8}$ bar and argon (purity of 99.999%) gas flow of 5 μbar.

We made different Mg/AlTi multilayer thin films with fixed 2 nm AlTi (Al:Ti ratio of 1:1) layers and different magnesium layers of 10, 20 and 34 nm. In choosing the thicknesses for the Mg layers, final capacities and overall compositions were considered. For simplicity we denote samples X/Y name in which X is the thickness of magnesium (M) and Y is the thickness of intermetallic AlTi layers in nm. We prepared one sample with the Mg layers co-sputtered with Al and Ti. This sample consisted of cosputtered 20 nm Mg-7% at.Al-7% Ti layeres and 2 nm AlTi layers, had the same number of layers as the 20/2 multilayers, and had a capacity close to that of the 10/2 multilayer. This sample is denoted the co-sputtered 20/2 multilayer.

Sievert's apparatus (HyEnergy LLC. PCTPro 2000) was used to run cyclic kinetic measurements. Test samples mass varied between 10-15 mg. Absorption Pressure was 2.5±0.1 bar, while desorption was run under low vacuum in a 1025 ml reservoir. The sorption process was automatically cut when the sorption rate fell below 0.005 wt. %/min.

For X-ray diffraction analysis, we used a Bruker AXS diffractometer (Bruker Discover 8) operating with Cu—Kα radiation. To determine the grain size, we incorporated integral breath analysis (IBA) in which the following relation is used:

$$\frac{(\delta 2\theta)^2}{\tan\theta_o} = \frac{k\lambda}{D} \frac{\delta 2\theta}{\sin\theta_o \tan_{\theta_o}} + 16e^2$$

while δ2θ is the integral breath of each peak and $\theta_o$ is the position of pick maximum. The slope of linear fitted curve from the plot of $(\delta 2\theta)^2/\tan\theta_o$ vs $\delta 2\theta/k\lambda \tan\theta o \sin\theta_o \tan\theta_o$ being kλ/D was used to determine the grain size. The value of k was assumed as 0.9 and x-ray wavelength was 1.54 Å. We performed TEM analysis using JEOL 2010 and JEOL 2200FS operating at 200 kV. JEOL 2200FS enabled us to run EDX elemental mapping in STEM mode. With the help of FIB-SEM (Zeiss NV vision 400) system we were able to take cross-sectional images of multilayered samples even after cycling. The FIB technique was also used to prepare cross sectional TEM ready samples.

Results

Kinetics

Figure 46:
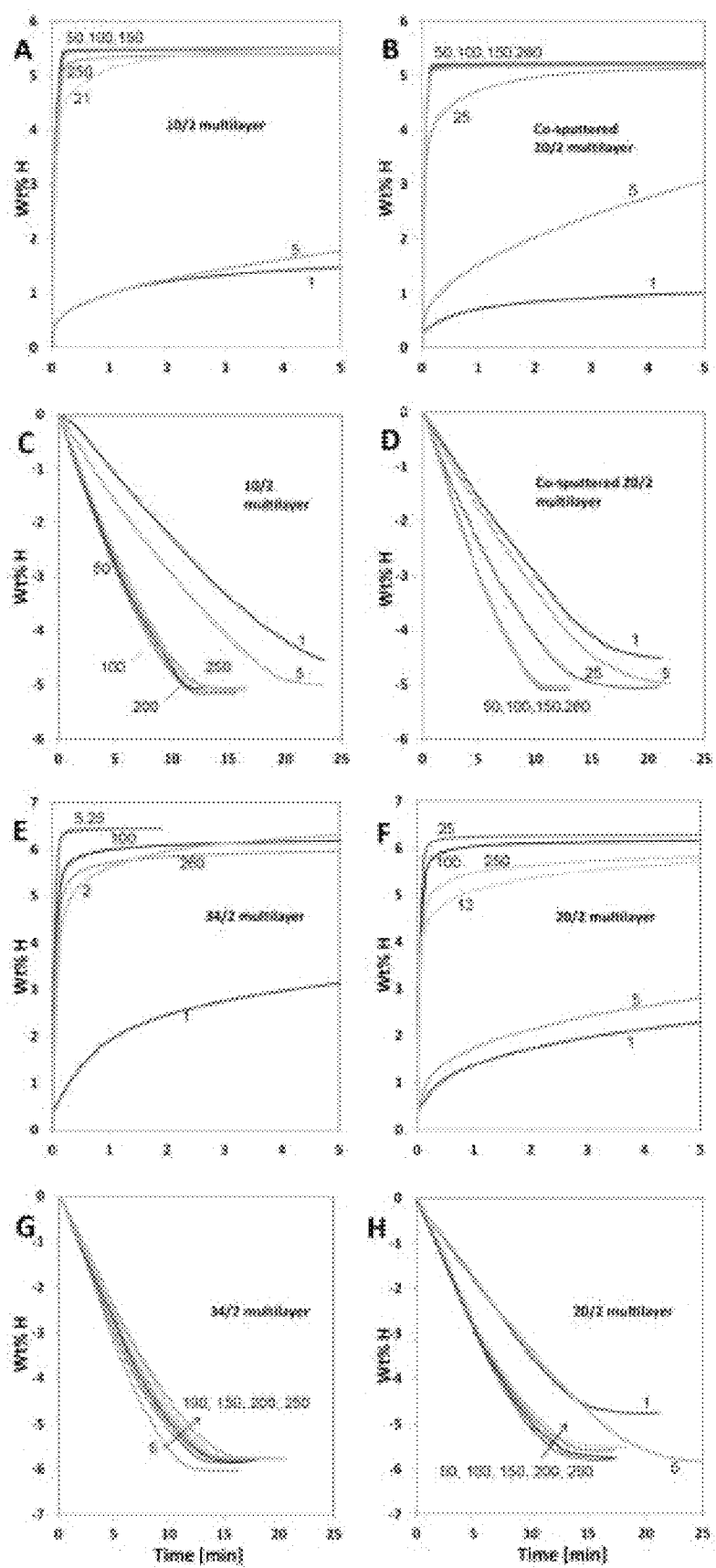
FIG. 46: Absorption and desorption behaviour of 10/2 (A,C), co-sputtered 20/2 (B,D), 34/2 (E,G) and co-sputtered 20/2 (F,H) multilayer samples.

FIG. 46 depicts the absorption and desorption behavior of 10/2 and co-sputtered 20/2 multi-layer samples up to 250 cycles. An activation period is a common feature of every sample and increases as the thickness of magnesium layer decreases, that is, when the periodicity increases. In this case, 34/2 multilayer has the lowest activation period in which only 4 cycles were needed to activate the material; albeit the initial cycles during activation period are very slow and more than one hour is required to obtain fully absorbed material. As shown in the time to 90% capacity as a function of cycling in the inset of FIG. 47A, during activation the kinetics of absorption is very sluggish for all the composites; whereas, after activation it occurs within seconds. As for desorption, as illustrated in FIG. 47B, it takes approximately 25 minutes for the samples to desorb in the initial cycles, while after activation desorption time reduced by a factor of 2 for 10/2 multilayer and 2.5 for cosputtered 20/2 multilayer to desorb completely.

Figure 47:
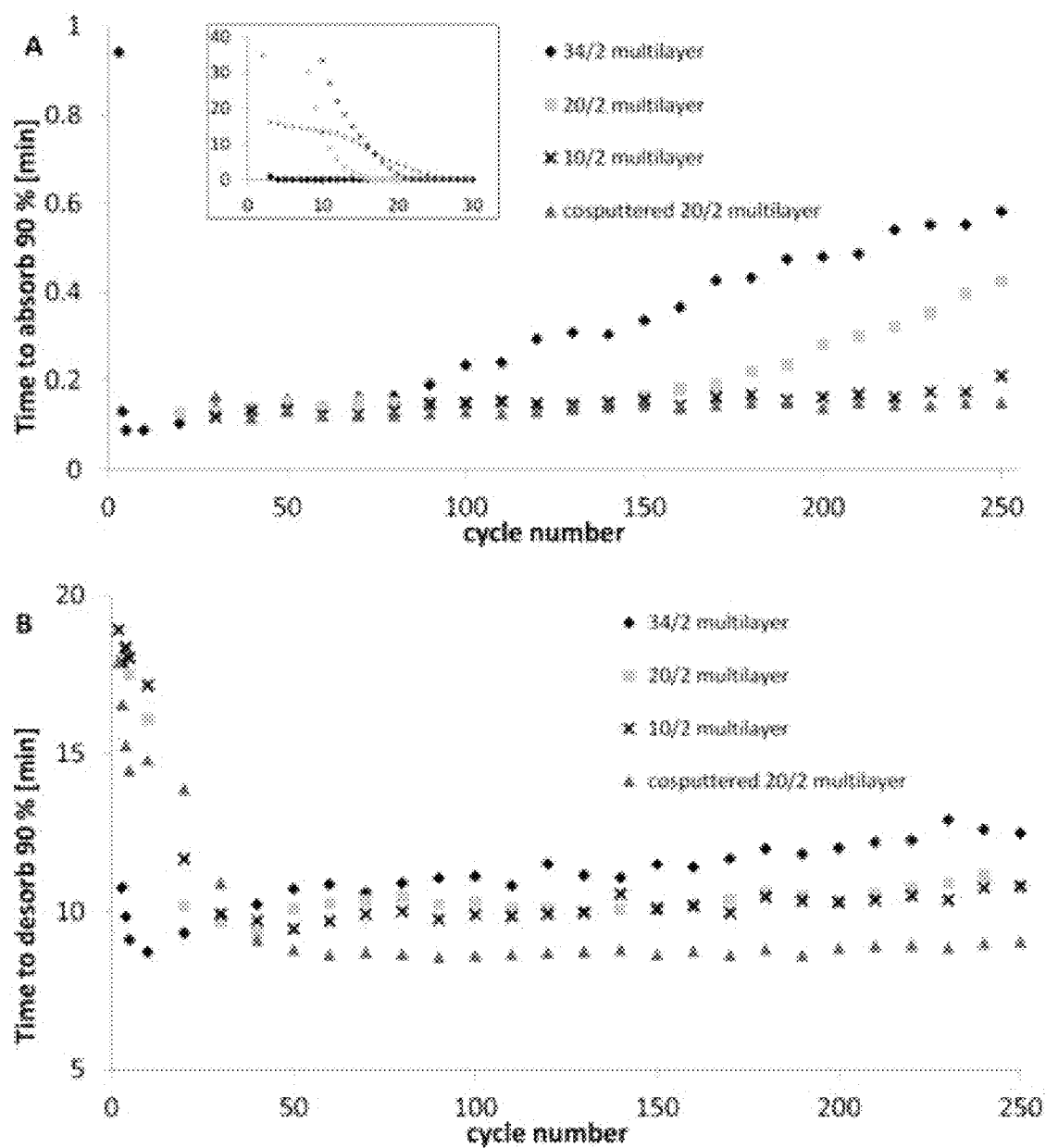
FIG. 47: The time to reach 90% of average maximum capacity as a function of cycle number for absorption (A) and desorption (B).

According to FIG. 47 cosputtered 20/2 multilayer shows the best cycling performance being stable up to 250 cycles, while the samples with pure magnesium layers tend to degrade slowly after having a stable cycling period. Among samples with pure Mg layers, 10/2 multilayer has comparable behavior to cosputtered 20/2 multilayer; however, the former starts to degrade eventually as is clearly reflected in the absorption curves. Apparently, with increasing the magnesium thickness, the onset for degradation moves towards lower cycle numbers. Comparing the cosputtered 20/2 to 20/2 multilayer with the same structural configuration, it appears that cosputtering of magnesium layers with Al and Ti (Mg-7% Al-7Ti) enhances the stability of the material. The inset, in the absorption plot shows the first 40 cycles and points out the longer activation period for the sample with thinner magnesium layers with the exception of cosputtered multilayer, which has the longest activation period but faster kinetics during activation.

Thermodynamics

Figure 48:
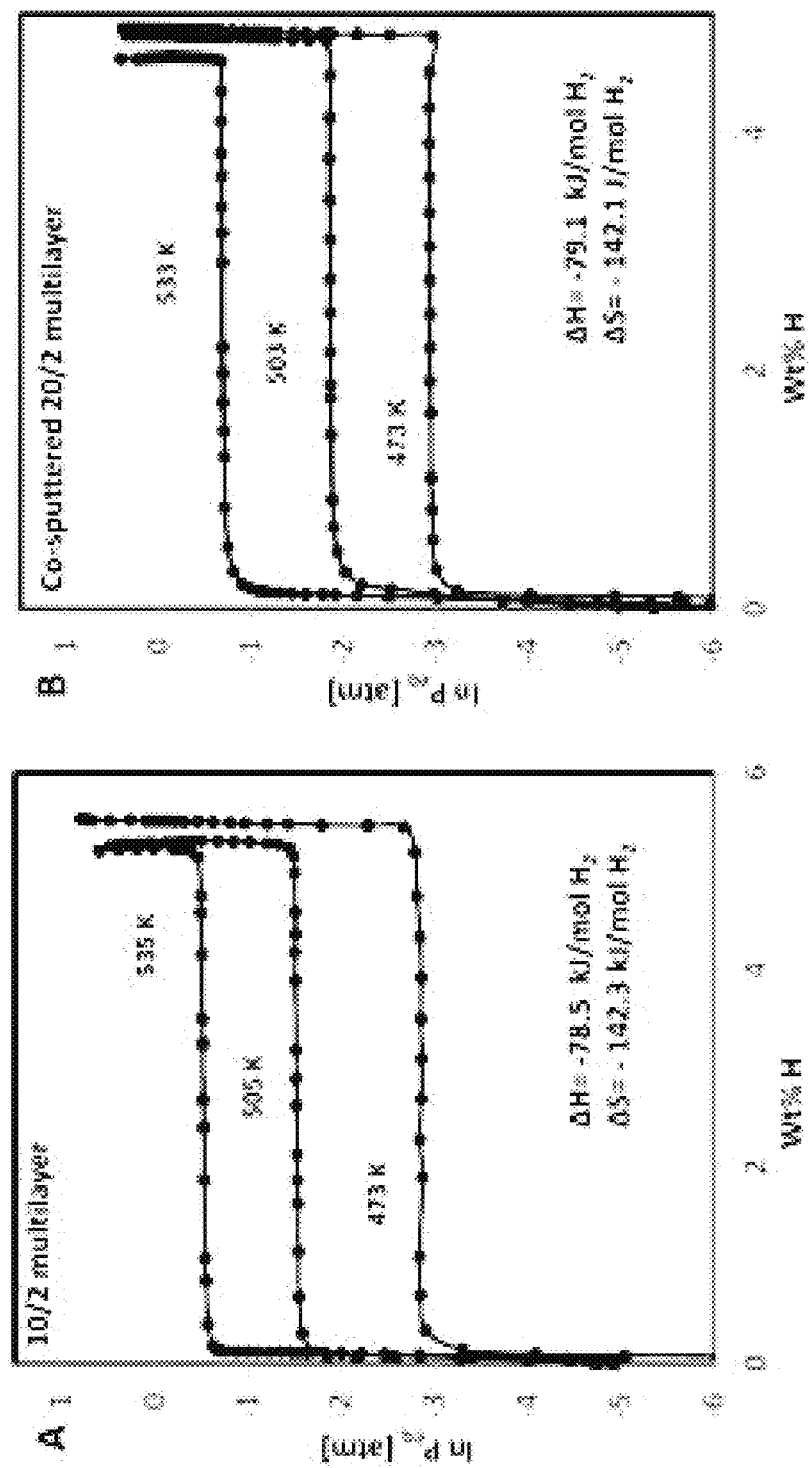
FIG. 48: Pressure-composition isotherms of 10/2 (A) and cosputtered 20/2 (B) multilayers.

Based on PCT measurements depicted in FIG. 48 pressure-composition isotherms of 10/2 and cosputtered 20/2 multilayers show values for enthalpy and entropy similar to those of pure Mg and no sign of destabilization is observed. Thus, the improved performance of samples may be merely kinetics and the thermodynamics may not be altered.

Microstructural Analysis

Figure 49:
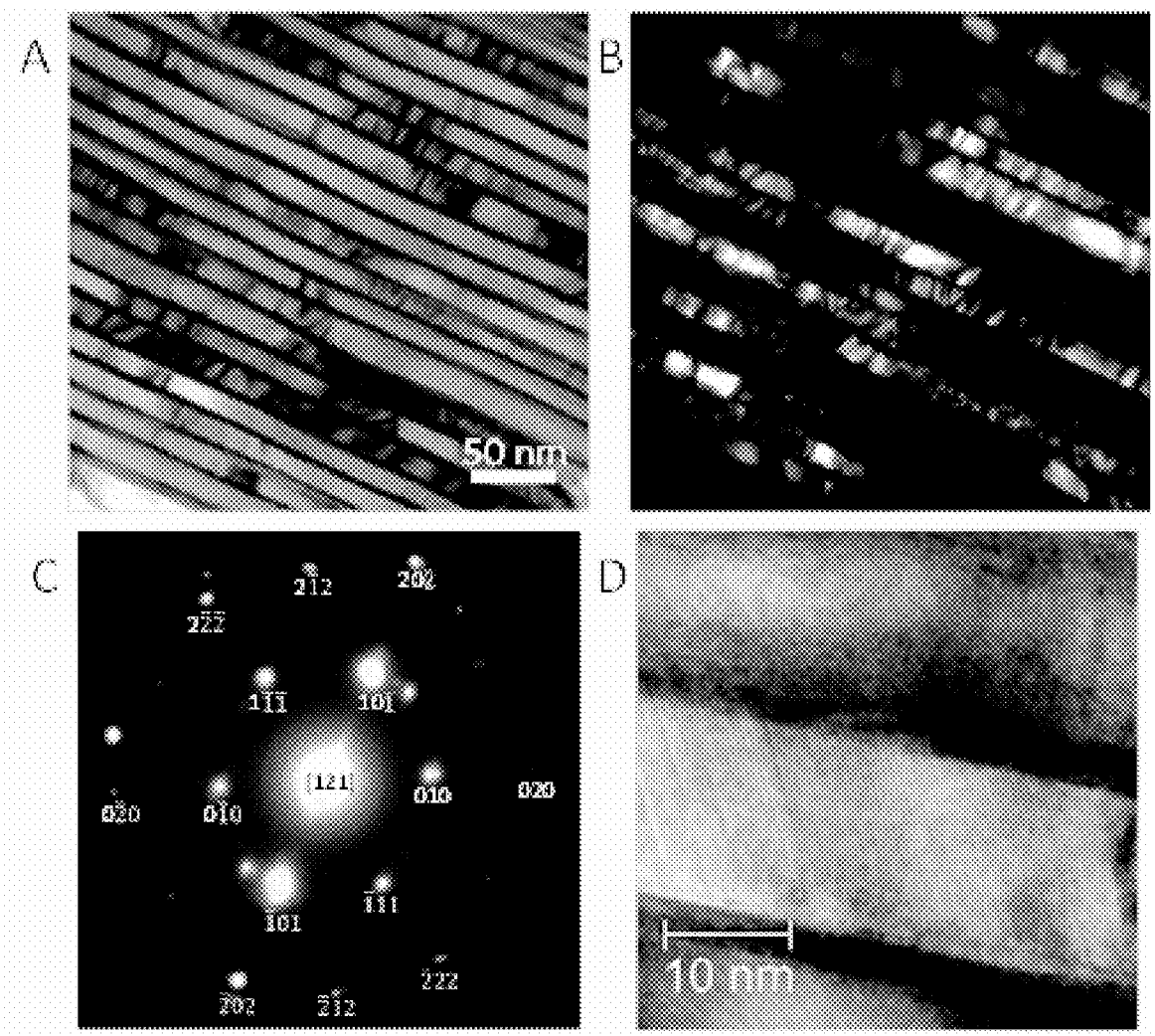
FIG. 49: Bright field (A) and dark field (B) images and corresponding SAD of 10/2 multilayer after 10 cycles. The SAD (C) shows a [121] zone axis of Mg and the bright field is taken using (010) reflection. HRTEM image (D) shows intimate contact between Mg atomic planes and AlTi amorphous/nano crystalline layers.

Bright Field and dark field TEM images of a 10/2 multilayer sample after 10 sorption cycles is depicted in FIG. 49 along with its selected area diffraction pattern (SAD) and a high resolution image showing a stack of a few Mg and AlTi layers. The diffraction pattern represents [121] zone axis of hcp magnesium. The high resolution image shows how Mg and AlTi layers are in intimate contact with no detectable flaws in the interface. After 10 cycles, some deformation is apparent in some parts of the sample. Considering the nominal layers thickness, a small expansion is observed.

Figure 50:
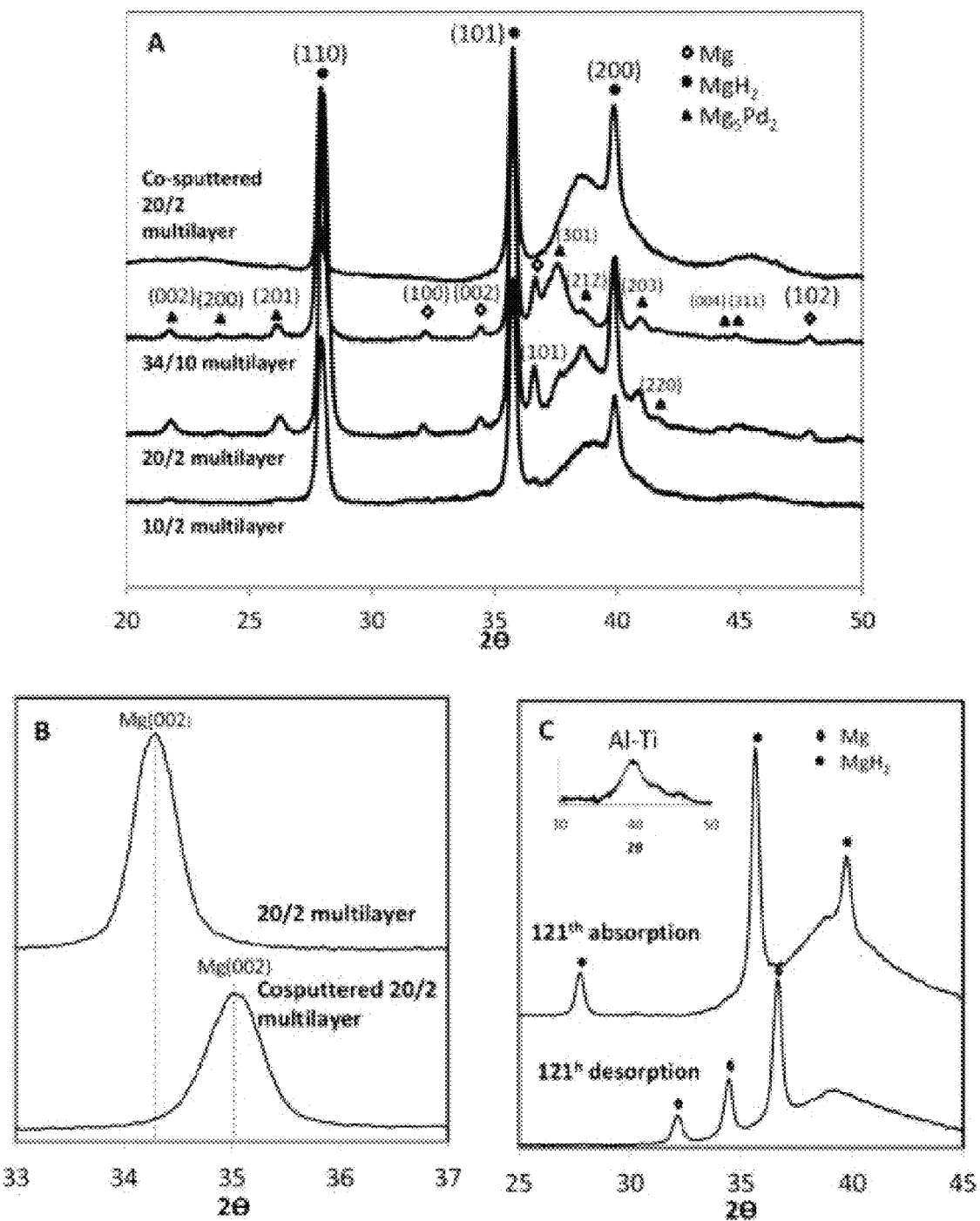
FIG. 50: (A) X-ray diffraction patterns of the studied multilayer composites after cycling; (B) a comparison between as deposited samples 20/2 and co-sputtered 20/2 showing the shift in Mg(002) crystalline peak from 34.3 to 35 due to formation of metastable solid solution between Mg, Al and Ti through sputtering; (C) XRD pattern of a multilayer sample with extra thick (50 nm) Al—Ti layer after 121 sorption cycles before and after cycling to highlight the AlTi intermetallic nanocrystalline/amorphous hump. The inset in C shows XRD scan of a 150 nm co-sputtered Al—Ti film treated at same condition as the multilayers in absorbed state.

In the as deposited state, as shown in FIG. 50(B), (002) peak of Mg from 20/2 multilayer is close to that of hexagonal Mg, while for the cosputtered 20/2 this peak is shifted to 35° indicating complete solid solution of Ti and Al with Mg. This shift in the position of (002) peak is in agreement with Vegard's law. After cycling as seen in FIG. 50 all assigned MgH2 reflections in samples with pure Mg layers represent rutile α-MgH2. Since no shift in the position of hydride peaks is observed in the cosputtered case, we can conclude that neither Al nor Ti are in solid solution with Mg and most probably have formed intermetallic AlTi.

Despite the attempt to prohibit the interaction of Mg and Pd by using Ta, Mg5Pd2 reflections with the strongest peaks of (301), (212), and (201), also appear in the diffraction patterns of 20/2 and 34/2 multilayers. However, the patterns of 10/2 and cosputtered 20/2 multilayers do not show evidence of Mg—Pd compound formation. The presence of Mg in the fully absorbed state of 20/2, and 34/2 samples points out the inability of the material to fully absorb hydrogen. Note that the samples were tested right after kinetic measurements.

The hump appeared in the X-ray diffraction pattern of samples is most likely related to an amorphous or nanocrystalline AlTi phase. However, it overlaps with Mg5Pd2 reflections. To have a more intense peak of AlTi, a 10/2 sample with an extra thick AlTi layer (50 nm) below Pd/Ta protective layer was produced and cycled under the same conditions. The 121th absorption and desorption are shown in FIG. 50C. In the absence of Mg5Pd2, aside from MgH2 and Mg, the only detectable phase which has a broad reflection centered at $2\theta=39$ is suggested to be amorphous/nanocrystalline AlTi intermetallic compound. Also, a 50 nm thick film of cosputtered Al—Ti was produced and treated with the same condition as absorbed samples and a similar shift was observed as shown in the inset of 5 C.

The variation of MgH2 grain size as a function of cycle number is depicted in FIG. 61. For 34/2 multilayer, the grain size increases from 19 to 51 nm during cycling. However, the grain growth is much slower for 10/2 where thin Mg layers are constrained by AlTi layers; which shows an average grain size of 25 nm at the end of cycling. The grain size in cosputtered 20/2 multilayer remains almost constant after activation. It is also worth mentioning that the XRD results from this sample at the early stages of cycling demonstrated the textured characteristics of sputtered thin films and the grain size measurements were not conclusive.

Figure 52:
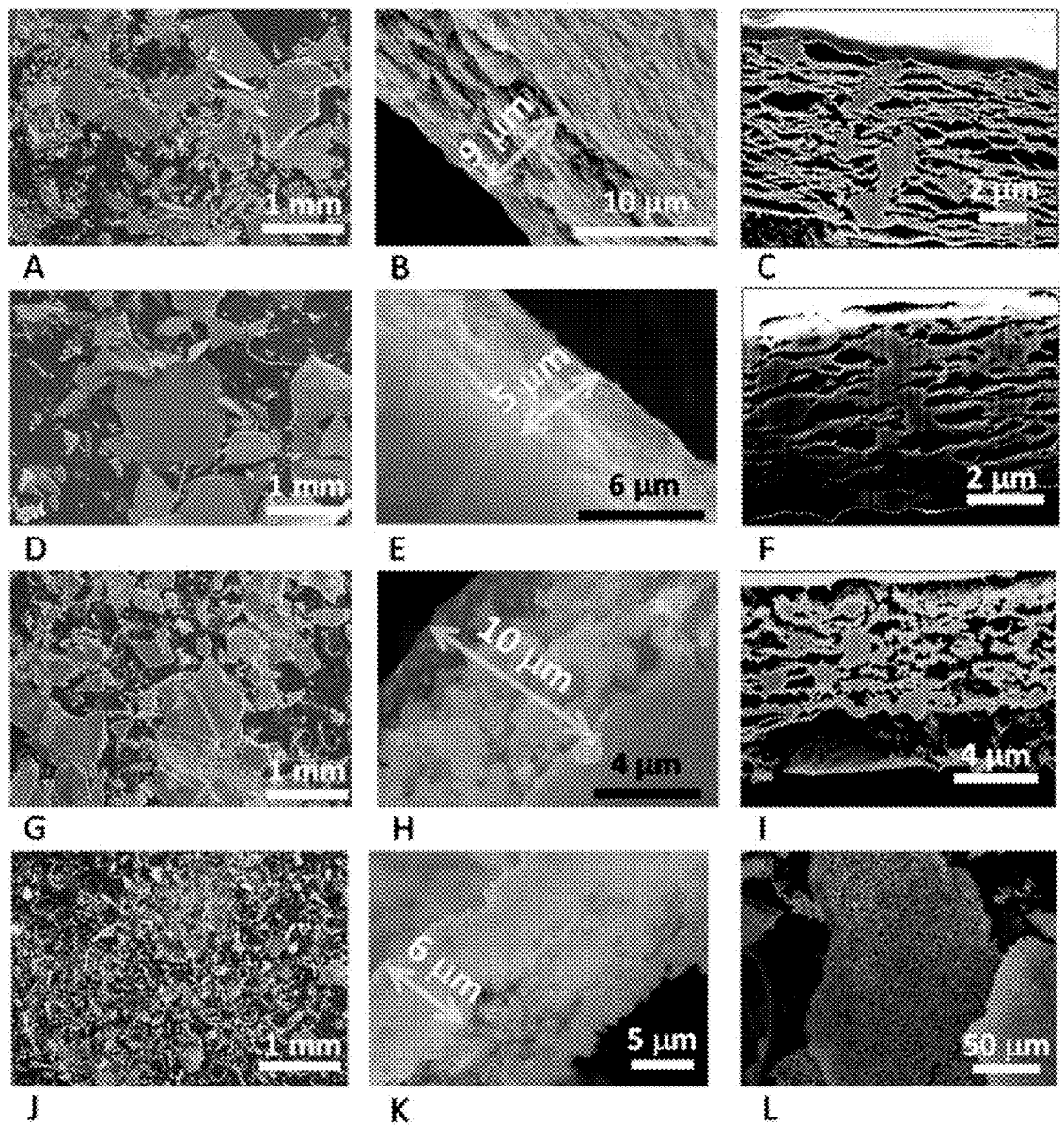
FIG. 52: SEM images cycled composites: (A) macroscopic view of 10/2 showing multilayer films preserving their original shapes, (B) microscopic cross sectional view of 10/2 showing expansion after cycling, (C) FIB image of the cross section showing void formation between the AlTi layers and a few particles diffused through the AlTi layers and coalesced; (D) macroscopic view of co-sputtered 20/2 showing multilayer films preserving their original shapes, (E) microscopic cross sectional view of co-sputtered 20/2 showing smaller expansion after cycling, (F) FIB image of the cross section view of co-sputtered 20/2 showing void formation between the AlTi layers and some grains diffused through the AlTi layers and coalesced; (G) macroscopic view of 20/2 showing some disintegration in original films shapes, (H) microscopic cross sectional view of co-sputtered 20/2 showing large expansion after cycling, (I) FIB image of the cross section view of co-sputtered 20/2 showing severe void formation between the AlTi layers and deformation of AlTi layers while new large interlayer particles formed; (J) macroscopic view of 34/2 showing original films disintegrated into small flakes, (K) microscopic cross sectional view of 34/2 showing smaller expansion after cycling, (L) microscopic top view of the 34/2 flakes showing spongy structure after cycling.

Upon cycling the initial structure of multilayers with continuous Mg and AlTi layers, due to expansions and contractions following metal-hydride phase transformation undergoes severe changes. Upon hydrogenation of a Mg layer capped with Pd at 373 K and 0.2 MPa H2), the Mg film swells and after dehydrogenation (at 343-423 K), the Mg film retains the swelled thickness by incorporating voids. A similar phenomenon was seen in present multilayer composites as seen in cross sectional SEM images of FIG. 52. The SEM micrograph of 10/2, 20/2, cosputtered 20/2 and 34/2 samples after 250 cycles are illustrated in FIG. 52. Macroscopic views of 10/2, cosputtered 20/2 and to some extent 20/2 multilayers in FIGS. 52A, D and G, show that these multilayer samples could keep the initial thin film forms with almost no disintegration. As for the 34/2 sample, the original films are disintegrated into small flakes and the top Ta/Pd layers are completely removed as seen in images 7J and L. The thickness of these multilayers are marked in FIGS. 52B,E,H and K to highlight the extent of expansion upon cycling in these samples. The expansion is more severe for 20/2 while it appears that addition of Al and Ti to co-sputtered 20/2 was effective in preventing the multilayer from extensive expansion. The cross section images of 10/2, cosputtered 20/2 multilayers after 250 cycles (FIGS. 52B-C and E-F respectively) show that despite the fact that repetitive volume expansion/contraction during sorption cycling causes the AlTi barrier layers to severely deform, the layered structure is somehow preserved and the sintering occurs in very localized sections of some neighbouring layers. Even the Ta/Pd layers are seen intact, which is in agreement with the absence of Mg—Pd compound in the XRD results. However, for the 20/2 multilayer (FIG. 52H-I) with the same configuration as cosputtered 20/2, the continuous AlTi layers are ruptured more severely and in most part of sample, isolated Mg particles has formed. Comparing the structure of co-sputtered 20/2 and 20/2 samples suggests the significant effect of Al and Ti addition to Mg layers of cosputtered 20/2 on the integrity of multilayers. It is worth mentioning that the extended cycling leads to the formation of voids and new surfaces thus contributing to faster sorption by exposing more material to the hydrogen flow.

Figure 53:
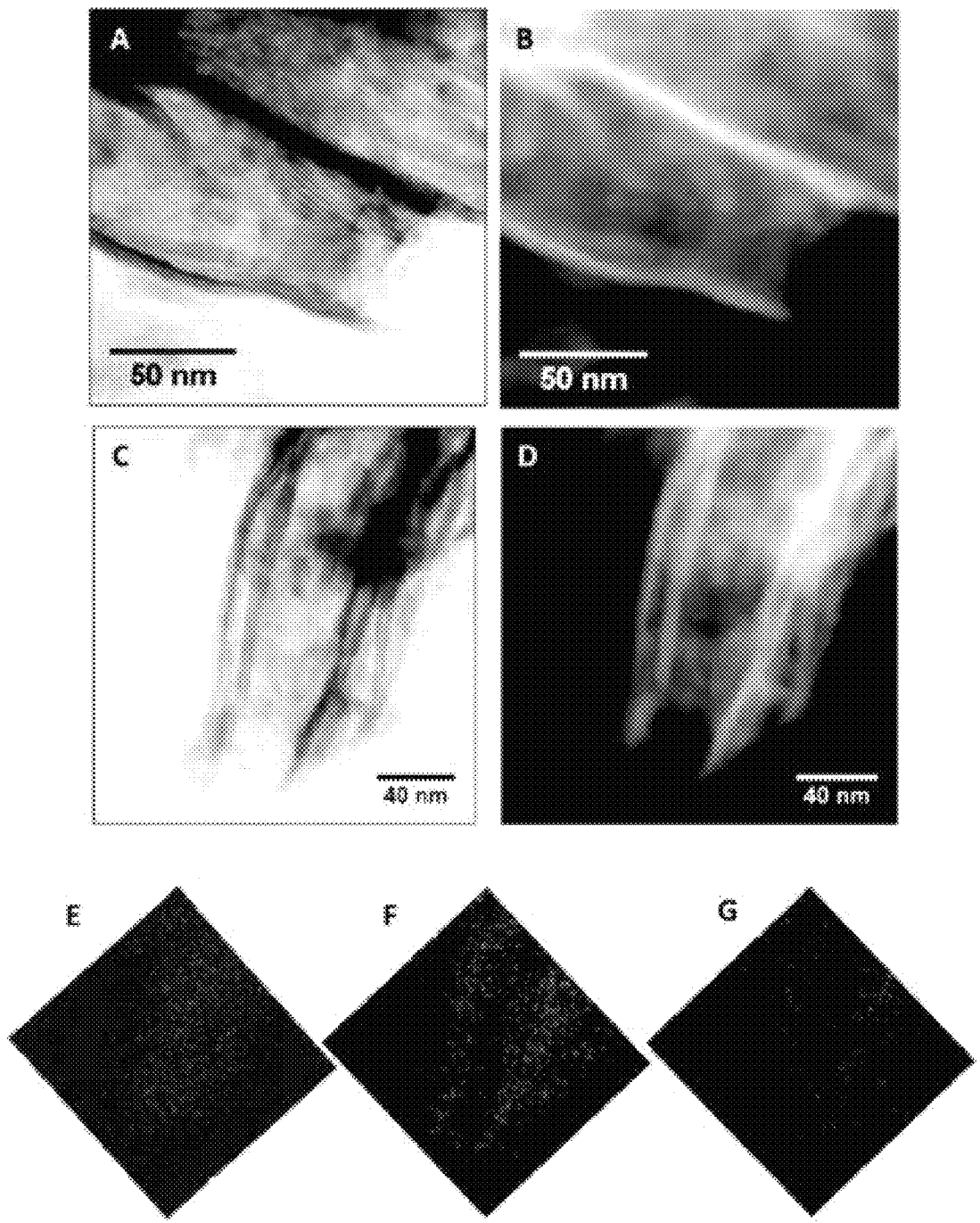
FIG. 53: Bright-field and high angle annular dark field images of cosputtered 20/2 sample after 60 cycles along with the elemental mapping of Mg, Ti and Al

STEM Bright-field and high annular dark field images of cosputtered 20/2 sample after 60 cycles along with the elemental mapping of Mg, Ti and Al are shown in FIG. 53. Note that in order to prepare electron transparent particles for TEM, original films had to be pulverized by mechanical means. These images show that even after mechanical pulverization particles preserved their layered structure. Z-contrast high annular dark field STEM images show brighter spots where Al and/or Ti are present in Mg matrix. This is further confirmed by EDS elemental maps given in FIG. 53E-G.

Figure 54:
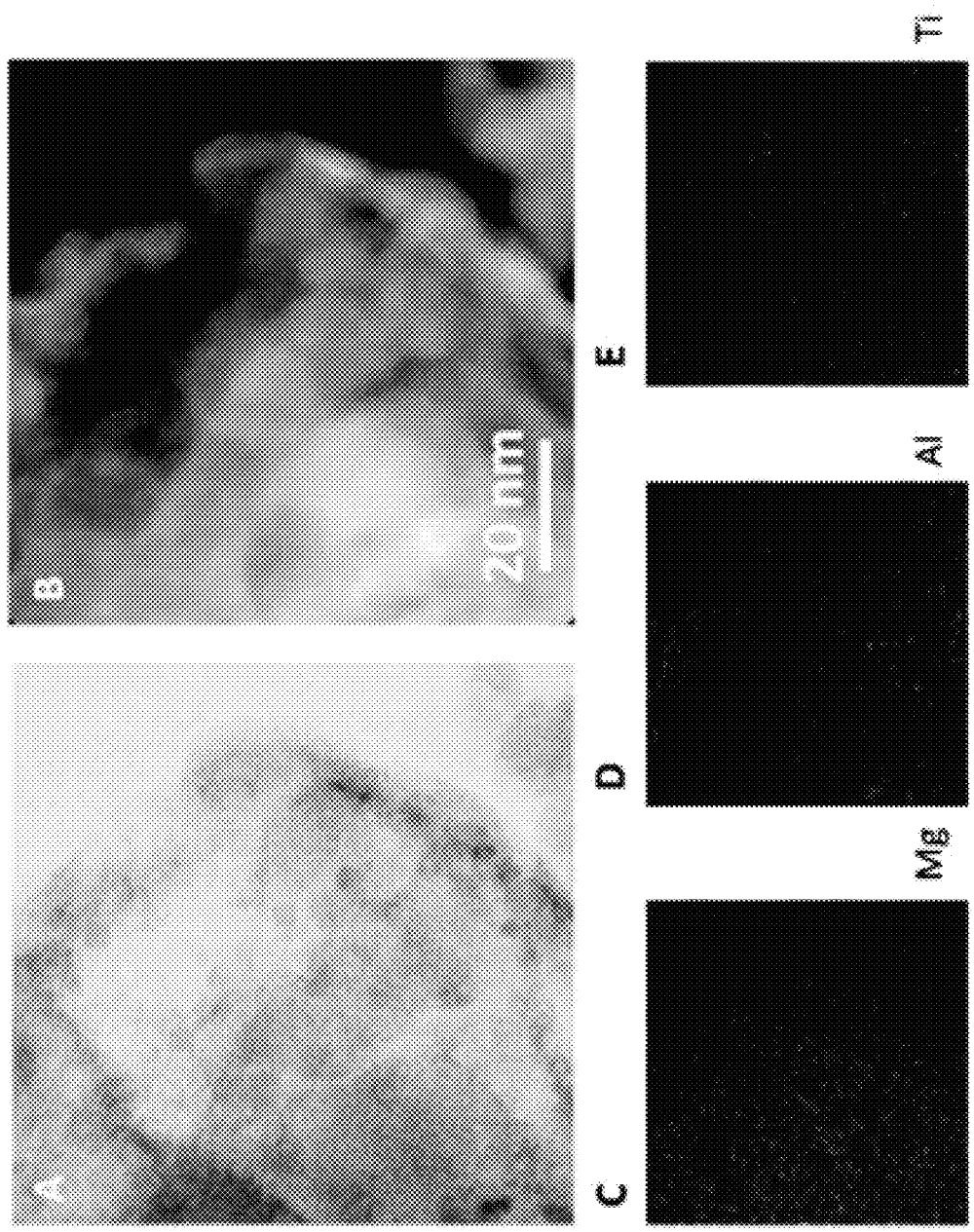
FIG. 54: STEM Bright-field (A) and high angular annular dark field (B) images of a Mg particle of cosputtered 20/2 sample after 260 cycles along with the elemental mapping of Mg(C), Al (D) and Ti (E)

FIG. 54 shows a large particle after 260 cycles of co-sputter 20/2. Higher concentration of Al and Ti on the edges of the particle as shown in FIGS. 54D and E, suggests formation of nanometric AlTi particles on the surface; since according to XRD results and thermodynamics data, these materials do not stay in solid solution with Mg beyond the first cycle.

Discussion

The multilayers of Mg—AlTi showed cyclability with remarkable kinetics. Constraining the Mg layer by reducing its thickness and employing more AlTi layers resulted in better performance as seen for multilayers of 10 nm Mg thickness (10/2) as opposed to 20/2 and 34/2. Adding Al and Ti to Mg layers enabled co-sputtered 20/2 composite to have a comparable performance, if not improved, with 10/2 without sacrificing much capacity. Using AlTi layers proved effective in keeping the multilayer Mg-based thin films from disintegration during cycling. However, although successful size limitation of Mg grains to below 50 nm was achieved, no thermodynamic destabilization occurred. The kinetic data shown in FIGS. 46 and 47 when combined with characterization data shown in FIGS. 52 and 53 suggest that the co-sputtered 20/2 sample with the most stable kinetics was also the most resistant against mechanical decrepitation. The AlTi layers in this sample kept the Mg particles from expansion in the thickness direction to some extent, as can be seen in FIG. 52E, while AlTi particles formed on the surface (FIG. 54) and probably in grain boundaries kept the grains from growing too large and coalescing together. Note that co-sputtered 20/2 and 10/2 have relatively the same amount of Al—Ti catalyst addition.

Cross sectional images shown in FIGS. 52C, F and I suggest that formation of small voids is a necessary process occurring during activation. It also suggests that for multilayers with a higher number of layers (e.g. 10/2) the reason the activation takes a higher number of cycles, as implied by FIG. 47, lies in the difficulty of void formation in more compact samples of thinner Mg layers. It seems that further cycling induces a network of voids which might facilitate hydrogen transportation. Thus, we attribute the activation period to the certain number of cycles required for material to reach a steady state cyclability in which the hydrogen transportation through voids is easily achieved and more AlTi surfaces are exposed to hydrogen. This process leads to faster sorption rates after activation. It should be noted that formation of voids is a result of expansion of Mg layers during hydrogenation and their contraction in the reverse reaction.

It can be seen in the SEM images of 10/2 (FIG. 52C) and 20/2 (FIG. 52I) that as AlTi layers rupture due to extended cycling, magnesium layers can coalesce and form relatively large Mg particles and lose their contact with AlTi catalyst layers. This effect is more severe for the 20/2 multilayer, which has more fractured AlTi layers and more isolated Mg particles. Thicker Mg layers can induce higher expansion stresses. At this point, the dissociated hydrogen has to diffuse through Mg particles, which in turn have larger grains. In larger grains hydrogen diffusion could be a sluggish process due to the low diffusivity of hydrogen through the growing hydride layer. However, samples 20/2 and co-sputtered 20/2 with identical structures and number of layers behaved differently in activation. From the inset in FIG. 47A it is clear that the former needs 20 cycles to activate while it takes about 10 cycles for the latter to fully activate.

Figure 51:
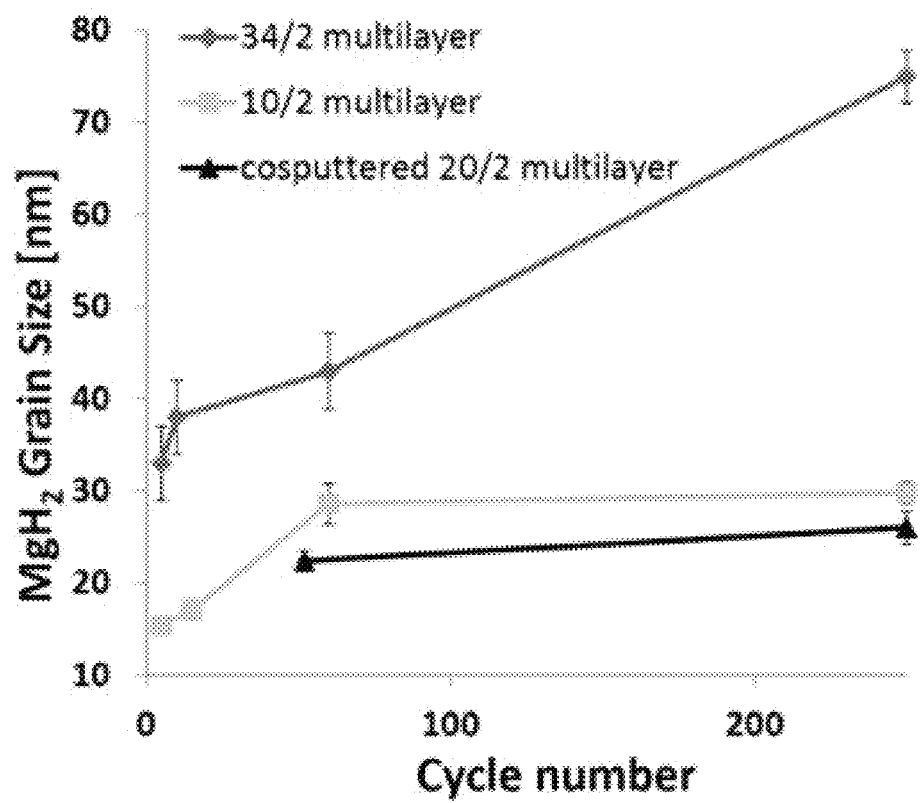
FIG. 51: Variation of MgH2 grain size as a function of cycle number.

The time to reach 90 wt. % capacity plot shows that after a stable cycling period, the 10/2, 20/2 and 34/2 samples start to degrade slightly and sorption times increases consequently. Besides, IBA grain results show that in degraded samples, grain growth is a common phenomenon. In this case, 10/2 has better performance than 34/2 multilayer by further constraining Mg layers and restraining grain growth. As seen in FIG. 51, the grain size for co-sputtered 20/2 multilayer does not change in an appreciable manner from cycle 60 to 260 and as FIG. 47 implies, the corresponding sorption times remain steady during cycling. This indicates that the cycling stability of the material is dependent on its resistant against grain growth, which in general is a bi-product of structural disintegration.

In case of cosputtered 20/2, in addition to AlTi layers, AlTi nano-particle formation may restrict the movement of Mg grain boundaries and make the material more resistant to structural coarsening. Such small particles are shown in FIG. 54. The SEM image of cosputtered 20/2 also shows that agglomeration of magnesium is prevented when compared to 10/2 and 20/2 multilayers. When Al and Ti are added to magnesium, the network structure of precipitated AlTi nanoparticles may act as a barrier to boundary motion and limit the formation of large isolated pure Mg particles which is detrimental to the performance of the material.

A similar behavior was observed in studying multilayers of Mg/FeTi. When compared to co-sputtered Mg—Fe—Ti thin films, FeTi layers seemed to be not as effective as FeTi particles in restricting the grain growth. Similar to the present case, magnesium grains grew more rapidly in Mg/FeTi multilayers than in Mg—Fe—Ti co-sputtered thin film. By combining these effects we could produce multilayers with controlled particle size by constraining Mg layers with AlTi layers and controlled grain size by incorporating nanometric AlTi particles on the surface of Mg grains and in grain boundaries.

Conclusions

By restricting the particle size and controlling the grain size of Mg in multilayers of co-sputtered Mg—Al—Ti sandwiched by AlTi layers we were able to achieve composites with high cycling stability as well as mechanical integrity. We showed that Al and Ti when co-sputtered form amorphous/nanocrystalline particles that do not react with magnesium and are mechanically stable enough to preserve multilayers during hydrogen sorption cycling. In the case of pure Mg layers, when the thickness of layers is greater than 20 nm, although activation occurs faster the degradation is also more severe. For multilayers of 34 nm Mg, expansion of Mg layers upon cycling leads in disintegration of multilayers and formation of sponge-like small flakes.

Although the example in this section has the same catalyst (AlTi) present in the magnesium layers and the catalyst layers, in some embodiments a different catalyst may be present in the magnesium layer than the catalyst present in the catalyst layers.

In some embodiments, the at least two layers of magnesium each have a thickness of 25 nm or less, for example 10 nm or less. A thickness of each of the at least two layers of magnesium may be less than or equal to a thickness of the at least two layers of catalyst. The at least two layers of catalyst may each have a thickness of 50 nm or less, for example 20 nm or less. If the layers of magnesium have catalyst, the at least two layers of magnesium may each have a thickness that is less than a mean catalyst particle spacing in the at least two layers of magnesium. The magnesium layers may be from 0.1 nm-50 nm, for example from 5-15 nm. The multilayer film may comprise at least 20 layers of magnesium and at least 20 layers of catalyst, for example up to 200 layers of magnesium and 200 layers of catalyst. Other numbers of layers are possible.

Other suitable catalysts may be used in the catalyst layer. For example, catalysts may be used that constrain magnesium hydride grain growth between catalyst layers. For further example, the catalyst may comprise transition or rare earth elements. Actinides, Lanthanides, Alkali metals, and other catalyst elements may be used. Example catalysts include Al, B, Ba, C, Ca, Cr, Co, Cu, Fe, Ge, Hf, Ir, Li, La, Mn, Mo, Nb, Ni, Os, Pd, Pt, Rb, Re, Rh, Ru, Sc, Si, Ta, Ti, U, V, W, Y, Zr. Combinations of elements may be used.

The hydrogen absorbing and desorbing material may be formed by accumulated roll bonding, which would make the Mg films scalable to bulk samples. The hydrogen absorbing and desorbing material may also be formed by other techniques, such as alloying, codeposition, and cosputtering.

Cycling Hydrogen Storage in Bimetallic Nb—V Catalyzed $MgH_2$ Films with Stabilized Sorption Kinetics and Microstructure In some embodiments the catalyst for the kinetic absorption and desorption of hydrogen comprises niobium. This section reports the hydrogen storage properties of 1.5 μm thick Magnesium film catalyzed by bimetallic niobium-vanadium, using Mg—V and Mg—Nb films as baselines. Magnesium catalyzed by the state-of-the-art catalyst Vanadium shows clear degradation after 100 hydrogen cycles. Conversely, Mg catalyzed by several bimetallic Nb—V show significantly improved hydrogen cycling stability without compromising the sorption kinetics. In specific, $Mg_{80}V_{10}Nb_{10}$ shows minimal kinetic degradation up to 500 hydrogen sorption cycles, being able to absorb and desorb 3.1 wt. % of H within 12 seconds and just above 8 minutes respectively at 200° C. Extensive XRD, SEM and TEM microstructural characterizations examined the concurrent microstructural evolution of selected co-sputtered films during hydrogen cycling sorption. After extended cycles, the microstructure of co-sputtered film is analogous to powder-like material, such that the catalytic phases are distributed on the surface of sintered Mg particle. The results of kinetic analyses in combined with TEM analyses on partially absorbed $Mg_{80}V_{20}$ sample at cryogenic temperature demonstrate the spatial correlation between the preferential $MgH_2$ nucleation sites and surface catalytic phases, which also suggest that the stabilized distribution of bimetallic Nb—V on Mg surfaces directly contributes to the superior cycling stability of $Mg_{80}V_{10}Nb_{10}$ over $Mg_{80}V_{20}$. Fundamentally, it emphasizes the functionality of bimetallic catalysts in improving the cycling hydrogen sorption properties of Mg nanocomposites.

In the present section, the hydrogen sorption kinetics, cycling stability and thermodynamic properties of co-sputtered Mg-rich ternary Mg—V—Nb films are investigated, using co-sputtered binary Mg—V and Mg—Nb films as baselines. As can be seen later, $Mg_{80}V_{20}$ and $Mg_{80}V_{10}Nb_{10}$ have rapid sorption kinetics but dramatically different cycling stability. Therefore, we use them as model systems to investigate the possible microstructural factors responsible for materials' different cycling stability. A comparative study, including detailed XRD, SEM and TEM microstructural characterizations is combined with kinetic analyses at different cycling stages. The concurrent microstructural evolution of these co-sputtered materials during extended hydrogen cycling sorption is also examined.

The $Mg_{80}V_xNb_{20-x}$ (x=0, 7, 10, 13, 20) sample films consist of 1.5 μm Mg-based alloy layer coated with 7.5 nm Pd/7.5 nm Ta bi-layer catalyst on top and bottom of the stack. Deposition was performed using a DC-magnetron co-sputtering system (AJA International), in a sputter-up configuration with continuous substrate rotation. The substrate temperature was maintained near ambient for all depositions. Ar gas with a purity of 99.999% was used at a sputtering pressure of $5\times10^{-3}$ mbar, and the maximum base pressure was $5\times10^{-8}$ mbar. The Si substrates were first coated with a layer of photoresist to enable lift-off of the films in acetone after deposition. The deposition rates were the following: Mg 2.3 A°/s, Pd 1.6 A°/s, Ta 0.3 A°/s; the deposition rate of Mg was kept constant for all compositions, and the rates of secondary addition phases V and Nb varied accordingly to adjust for different stoichiometry.

Volumetric absorption and desorption kinetic measurements and the desorption pressure-compositions isotherms (PCT-desorption) were performed on an automated Sieverts type hydrogen sorption analysis system (Hy-Energy LLC. PCTPro 2000). Cycling kinetics measurements were performed at 200° C., with the pressure in the absorption reservoir (11.89 ml) being set to 3 bar and the pressure in the desorption reservoir (1025 ml) being initially set to primary vacuum. The absorption and desorption steps were terminated when an average rate lower than 0.005 wt. % $min^{-1}$ was measured over a period of 4 minutes.

X-ray diffraction experiments were performed on a Bruker AXS diffractometer (Bruker Discover 8) using a Cu—Kα radiation source (λ=1.5406 Å) that was monochromatized using a single Gobel mirror. The diffractometer was equipped with a HiStar general area 2-dimensional detection system (GADDs) with sample-detector distance of 15 cm. Powder diffraction patterns from both simulated results and XRD database on DIFFRAC$^{plus}$EVA™ software were used for peak identifications. The grain size (D) analyses were performed by using Scherrer equation:

$$D = \frac{k\lambda}{\beta\cos\theta_0},$$

where k is a constant taken as 0.9, λ is the x-ray wavelength, β is the full width half maximum of the peak (FWHM) in radius with instrumental broadening effect corrected, and $\theta_0$ is the position of peak maximum. For each analysis, the grain size was obtained as the average value from the best resolved peaks. Peak fitting using Voigt function and necessary deconvolution of overlapping peaks were performed on Fityk commercial software. The instrumental broadening was carefully determined by using standard $LaB_6$ material and subtracted from the measured line broadening.

Scanning electron microscopy (SEM) observations were performed on a Zeiss NV vision 400 equipped with a gallium liquid metal ion source. The cross-section sample of internal film structure was prepared using focused ion beam (FIB) lift-out. The FIB was operated at 30 kV and down to a lowest probe current of 80 pA to polish the surface of the cross-section sample.

Conventional bright-field (BF), dark-field (DF) imaging and selected-area electron diffraction (SAED) were performed on JEOL 2100 at 200 kV accelerating voltage. The transmission electron microscopy (TEM) analyses on partially absorbed materials are performed using cryogenic holder held near 93 K. At cryogenic temperature, the beam-induced degradation of hydride phase occurred relatively slowly. The TEM powder samples were prepared by dry dispersion of the powders on copper grids coated with ultrathin carbon film supported by a lacey carbon film. Commercial software Desktop Microscopist and Crystal Maker are used to simulate electron diffraction patterns.

Cycling Hydrogen Sorption Behaviors

Figure 55:
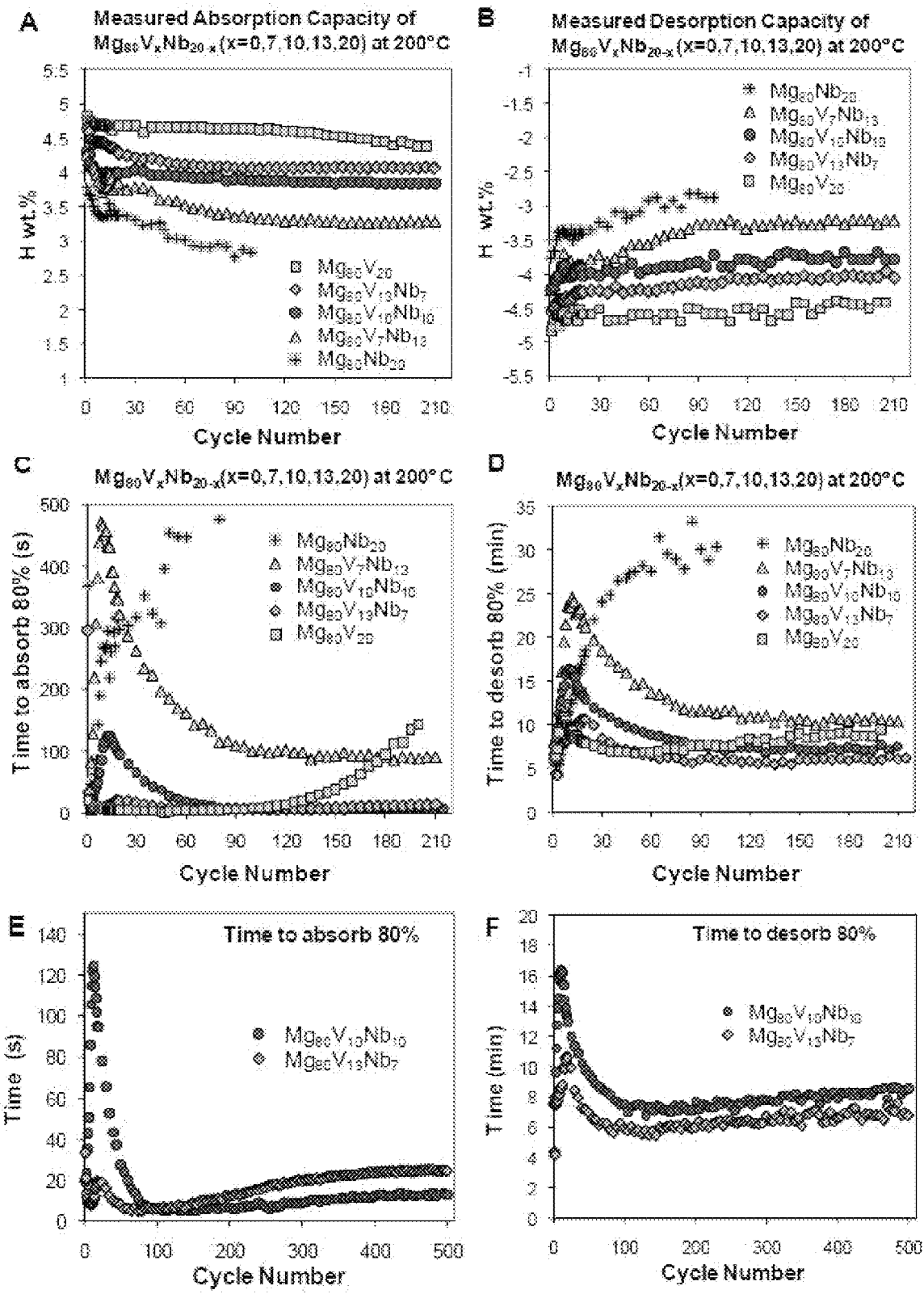
FIG. 55—Cycling hydrogen sorption behaviors of 1.5 μm thick Mg80VxNb20-x (x=0, 7, 10, 13, 20) films capped with Pd/Ta bi-layer catalyst at 200° C. (A, B) show the measured hydrogen absorption and desorption capacities for each composition as a function of sorption cycle number. (C, D) show the time to absorb and desorb 80% of the average measured capacity for each composition as a function of sorption cycle number up to 210 cycles. (E, F) show the cycling hydrogen sorption behaviors of Mg80V10Nb10 and Mg80V13Nb7 up to 500 cycles at 200° C.

FIG. 55 compares the cycling hydrogen sorption behaviors of $Mg_{80}V_xNb_{20-x}$ (x=0, 7, 10, 13, 20) films at 200° C. The measured H absorption/desorption capacities and the time to absorb/desorb 80% of the average measured H capacity for each composition as a function of cycle number are depicted in A-D respectively. All five samples have comparable levels of secondary additions in terms of atomic percentage. As can be seen, binary $Mg_{80}V_{20}$ exhibits the fast sorption kinetics at early cycling stage; however, after about 90 sorption cycles, binary $Mg_{80}V_{20}$ begins to display obvious kinetic degradation, which is especially manifested in absorption. It takes 40 times longer to absorb 80% of the average capacity at $200^{th}$ cycle, comparing to the time at $45^{th}$ cycle. Since the ab- or desorption step is stopped when the rate falls below 0.005 wt. %/min, this kinetic slowing-down also leads to the decrease in reversible capacity after $90^{th}$ cycle. It is also clear to see that, without the appearance of V, the sorption kinetics of binary $Mg_{80}Nb_{20}$ quickly deteriorates with increasing cycle numbers.

Besides the fact that the reversible hydrogen capacity decreases with increasing Nb content, ternary Mg—V—Nb samples exhibit more favorable cycling hydrogen sorption properties. The cycling sorption data highlight one fundamentally attractive feature: the doping of Nb into binary Mg—V dramatically improves the materials' cycling kinetic stability. All three ternary samples investigated here show almost no kinetic degradation over 200+ cycles of testing. Particularly, the sorption kinetics of both $Mg_{80}V_{10}Nb_{10}$ and $Mg_{80}V_{13}Nb_7$ are also extremely rapid. Therefore, these two samples have been extended cycled up to 500 cycles, with the results shown in FIGS. 55E and F. Relatively $Mg_{80}V_{10}Nb_{10}$ displays the minimum cycling degradation. Even after 500 cycles, it takes about 12 seconds and just above 8 minutes respectively to absorb and desorb 3.1 wt. % of H.

The sorption data highlight another key characteristic for co-sputtered films and especially for ternary Mg—V—Nb films, i.e. the present of activation period. Both absorption and desorption kinetics continue decelerating during the first a few cycles; then after a certain amount of cycles, the sorption kinetics speed up again and reach the fully activated state (before any obvious cycling degradation occurs). The length of this activation period and the magnitude of kinetic deceleration vary with sample compositions. As can be seen, ternary Mg—V—Nb films require up to 90 sorption cycles to be fully activated, and the kinetic slowdown within this period becomes more severe with increasing Nb doping. Similar activation behavior also presents in binary $Mg_{80}V_{20}$ film, but with significantly shorter duration and less severe magnitude. Due to the quick cycling kinetic deterioration, the present of activation period in binary $Mg_{80}Nb_{20}$ film is not observed. It must be mentioned that this activation period does not include the hydrogen absorption during first cycle, which is normally significantly slower than the following sorption cycles. The sluggish kinetics during first absorption may be attributed to the long range atom diffusion involved during the decomposition of the as-synthesized supersaturated Mg solid solution.

Thermodynamic Properties

Figure 56:
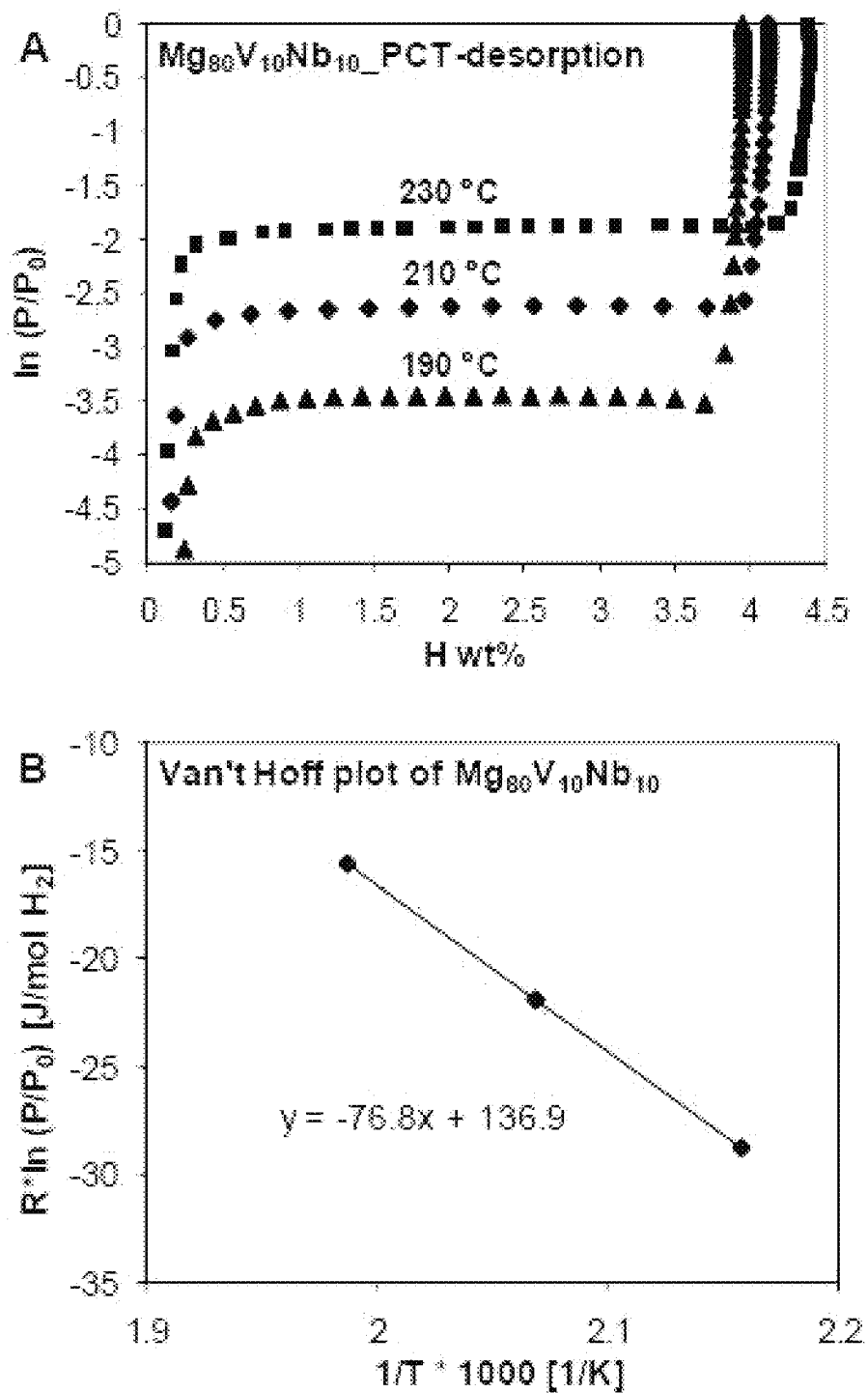
FIG. 56—(A) Pressure-composition isotherms (PCT) of desorption of post-cycling 1.5 μm Mg80V10Nb10 film capped with Pd/Ta bi-layer catalyst at 190° C., 210° C. and 230° C. (B) The corresponding Van't Hoff plots.

PCTs-desorption were measured for the best-performed $Mg_{80}V_{10}Nb_{10}$ in order to check its thermodynamic properties. The PCTs-desorption results for $Mg_{80}V_{10}Nb_{10}$ at three different temperatures, i.e. 190° C., 210° C. and 230° C. with the corresponding Van't Hoff plots for the enthalpy and entropy of hydride formation are shown in FIGS. 56A and B. The PCTs-desorption is measured after 100+ hydrogen sorption cycles, so that the sorption kinetics of $Mg_{80}V_{10}Nb_{10}$ has reached steady state. The measured plateaus are 0.031, 0.072 and 0.153 bar, respectively, giving calculated enthalpy and entropy of hydride formation of $-76.8$ kJ/mol $H_2$ and $-136.9$ J/K-mol $H_2$ respectively. The calculated enthalpy is in good agreement with the previously found values for $\alpha$-$MgH_2$, range from $-72$ to $-79$ kJ $mol^{-1}$ $H_2$. Therefore, at least for $Mg_{80}V_{10}Nb_{10}$, it is confirmed that the rapid sorption behavior of the film is not due to any thermo-destabilization, but rather better kinetics. This observation is in consistent with other co-sputtered Mg based alloy films, which develop into nanocomposites of Mg with secondary catalyst phases during cycling hydrogen sorption.

XRD Characterizations

Figure 57:
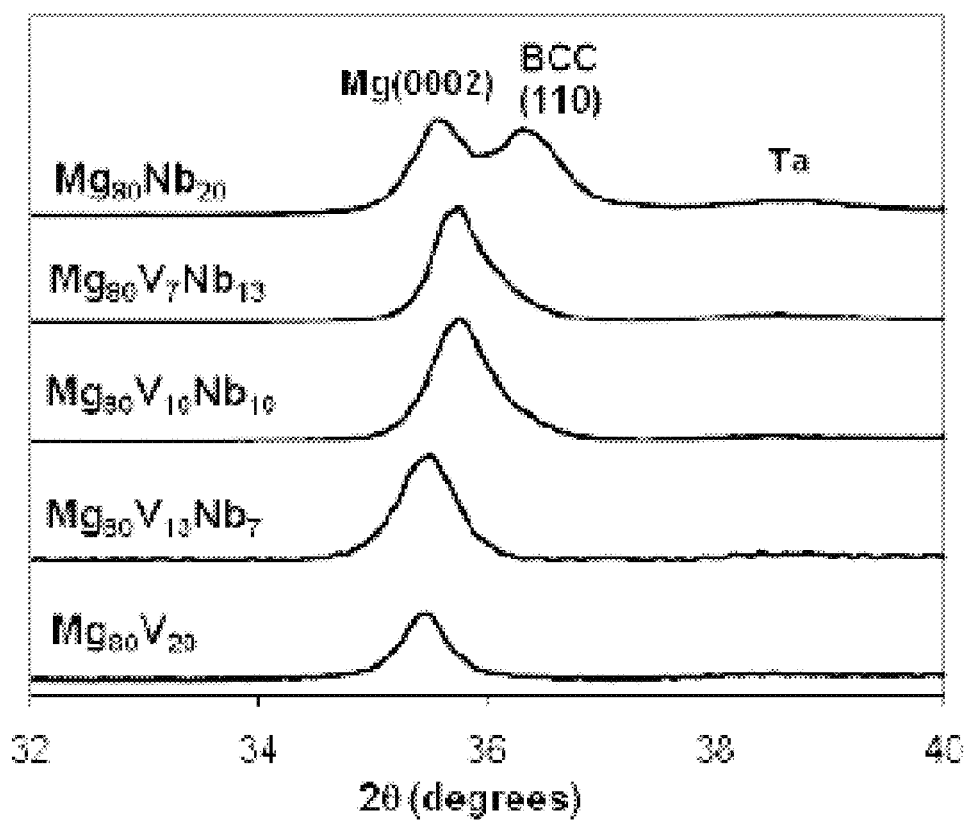
FIG. 57—X-ray diffraction patterns of as-deposited Mg80VxNb20-x (x=0,7,10,13,20) films.

FIG. 57 shows the XRD patterns of the as-deposited $Mg_{80}V_xNb_{20-x}$ (x=0, 7, 10, 13, 20) films. All five films have strong Mg [0001] fiber texture, and the Mg (0002) reflection shifts to higher angles compared to the value of 34.4° for pure Mg. Since the shifts are significant, the amount of V or/and Nb dissolved in Mg is quite high. For as-deposited $Mg_{80}Nb_{20}$ film, it is interesting to see another peak at $2\theta=36.3°$. The peak position is very close to the (110) reflection of a BCC phase previously reported by Shang et al. in mechanically alloyed (Mg+10 wt. % Nb) powders. As an ultrafast cooling-rate technique, it is not surprising for co-sputtering to reproduce a metastable phase which has been synthesized during mechanical alloying.

Figure 58:
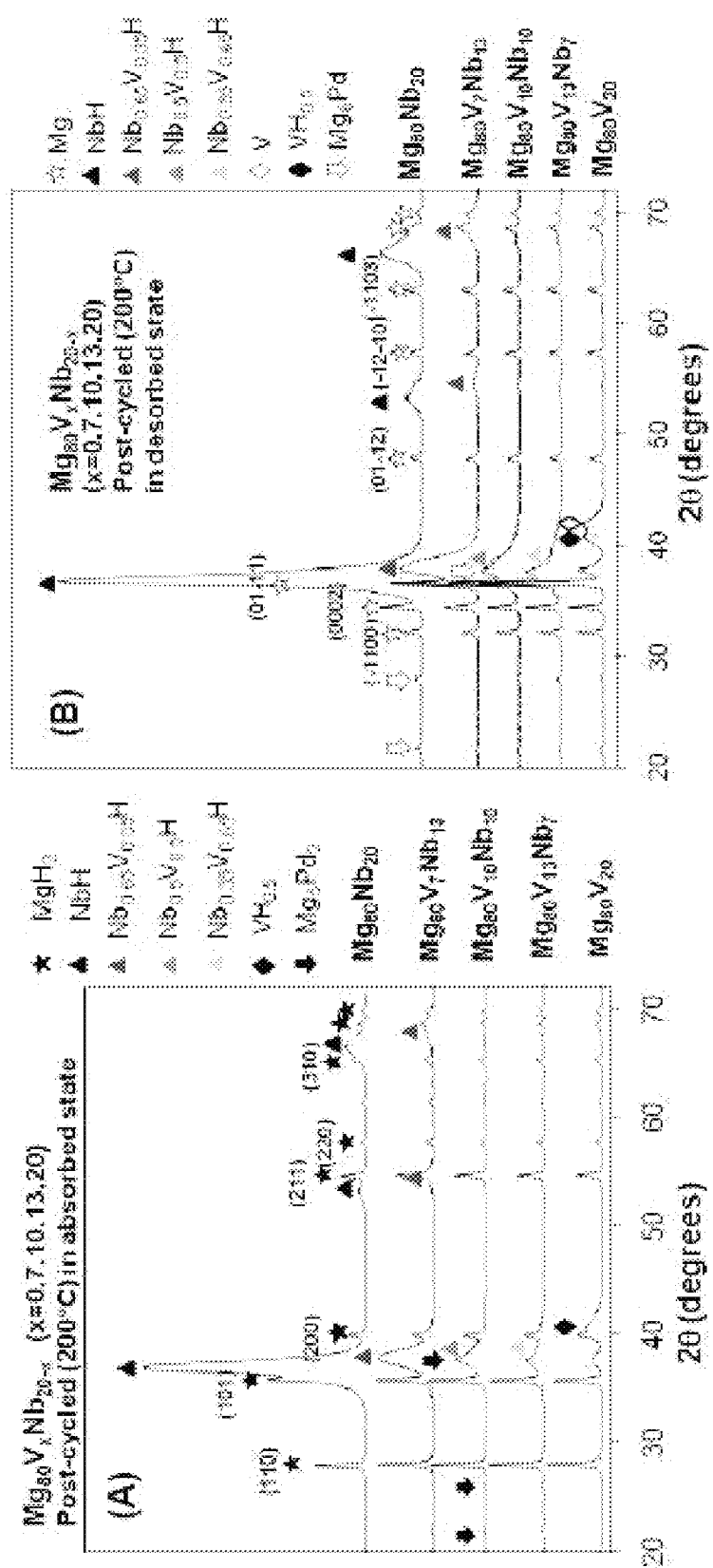
FIG. 58—X-ray diffraction patterns of the post-cycled Mg80VxNb20-x (x=0,7,10,13,20) (A) in absorbed state, and (B) in desorbed state.

FIGS. 58A and B show the x-ray powder diffraction patterns of post-cycled $Mg_{80}V_xNb_{20-x}$ (x=0, 7, 10, 13, 20) in desorbed and absorbed state respectively. As can be seen, all the Mg and $MgH_2$ reflections are at their theoretical positions, which means that the dissolved V and/or Nb have all segregated from the Mg, leaving the lattice parameters of $Mg/MgH_2$ unchanged. This observation is in compliance with the thermodynamic properties of $Mg_{80}V_{10}Nb_{10}$ measured above.

As can be seen in the diffraction patterns of binary cases, clear reflections from the respective catalytic phase can be observed. For $Mg_{80}Nb_{20}$, face-centered orthorhombic β-phase NbH (F222 (NO. 22)) is found in both absorbed and desorbed state. The formation of NbH is in compliance with the chemical compositions of other $MgH_2$—Nb nanocomposites reported in literature. For $Mg_{80}V_{20}$, base-centered monoclinic β-phase $VH_{0.5}$ (C2/m (No. 12)) is found in absorbed state, and a mixture of $VH_{0.5}$ and cubic V (Im-3m (No. 229)) is found in desorbed state. The hydrides of niobium or vanadium with higher hydrogen content i.e. $NbH_2$ and $VH_2$ are not observed here. Based on the thermodynamic data reported in literature for V—H and Nb—H systems, the calculated equilibrium pressures of these hydrides are significantly higher than the applied hydrogen pressure for absorption during cycling sorption at 200° C. The formations of these hydrides are thus not expected. It is known that both $NbH_x$ and $VH_x$ possess an $\alpha$-$\alpha'$ transition with critical points at about 171 and 200° C. respectively. Above these temperatures, no phase transitions occur on hydrogen loading. The $\alpha'$-phase is a disordered solution of H in BCC Nb or V, and depending on the hydrogen pressures, one may find the composition of $\alpha'$-$NbH_x$ in the range of 0<x<1, and $\alpha'$-$VH_x$ in the range of 0<x<2. Under the experimental conditions during cycling, both $NbH_x$ and $VH_x$ are above or at their critical point. Therefore, the active catalytic phases are α'-phases with effective compositions of approximately NbH in $Mg_{80}Nb_{20}$ and $VH_{0.5}$ in $Mg_{80}V_{20}$. The ordered β-phases observed in XRD must form during the cooling procedures after the cycling measurements were terminated.

In the diffraction patterns of ternary $Mg_{80}V_xNb_{20-x}$ (x=7, 10, 13), broad reflections of BCC-structured phases are observed. Again, since Nb and V are mutually soluble for all compositions and not reactive to or soluble in Mg, these broad reflections are most likely due to nanocrystalline Nb—V solid solution or their hydrides. It has been reported that monohydrides of Nb—V, i.e. $(Nb,V)H_{\sim 1}$ crystallize with a BCC structure as well between $Nb_{0.1}V_{0.9}H_{\sim 1}$ and $Nb_{0.7}V_{0.3}H_{\sim 1}$. This range covers the Nb—V compositions, i.e. $Nb_{0.65}V_{0.35}$, $Nb_{0.5}V_{0.5}$ and $Nb_{0.35}V_{0.65}$ contained in the three ternary alloys investigated in this study. With varying relative composition, the lattice spacing and hence the center of these broad peaks are expected to change accordingly. As can be seen, with increasing Nb percent in the material, these reflections not only increase in intensity, but also shift to lower angles. Since Nb is a better x-ray scatterer, and has larger molar volume than V, these trends are as expected. It is noted that in each material, the peak positions of the corresponding BCC phases remain the same in both absorbed and desorbed states. By simulating the x-ray diffraction patterns for both metallic alloys ($Nb_{0.65}V_{0.35}$, $Nb_{0.5}V_{0.5}$ and $Nb_{0.35}V_{0.65}$) and their monohydrides counterparts, it is unambiguously to conclude that monohydrides of Nb—V of the corresponding compositions are formed in the ternary $Mg_{80}V_xNb_{20-x}$ (x=7, 10, 13), and these monohydrides are stable during both absorption and desorption.

$Mg_{80}V_{20}$ vs. $Mg_{80}V_{10}Nb_{10}$

Among the five compositions shown above, binary $Mg_{80}V_{20}$ and ternary $Mg_{80}V_{10}Nb_{10}$ are the most attractive for further investigation. The former represents a system with rapid kinetics but lacking of kinetic stability for prolonged cycles; the latter represents a system with improving cycling stability and without compromising its sorption kinetics. In this session, systematic comparisons between these two materials will be deployed.

Figure 59:
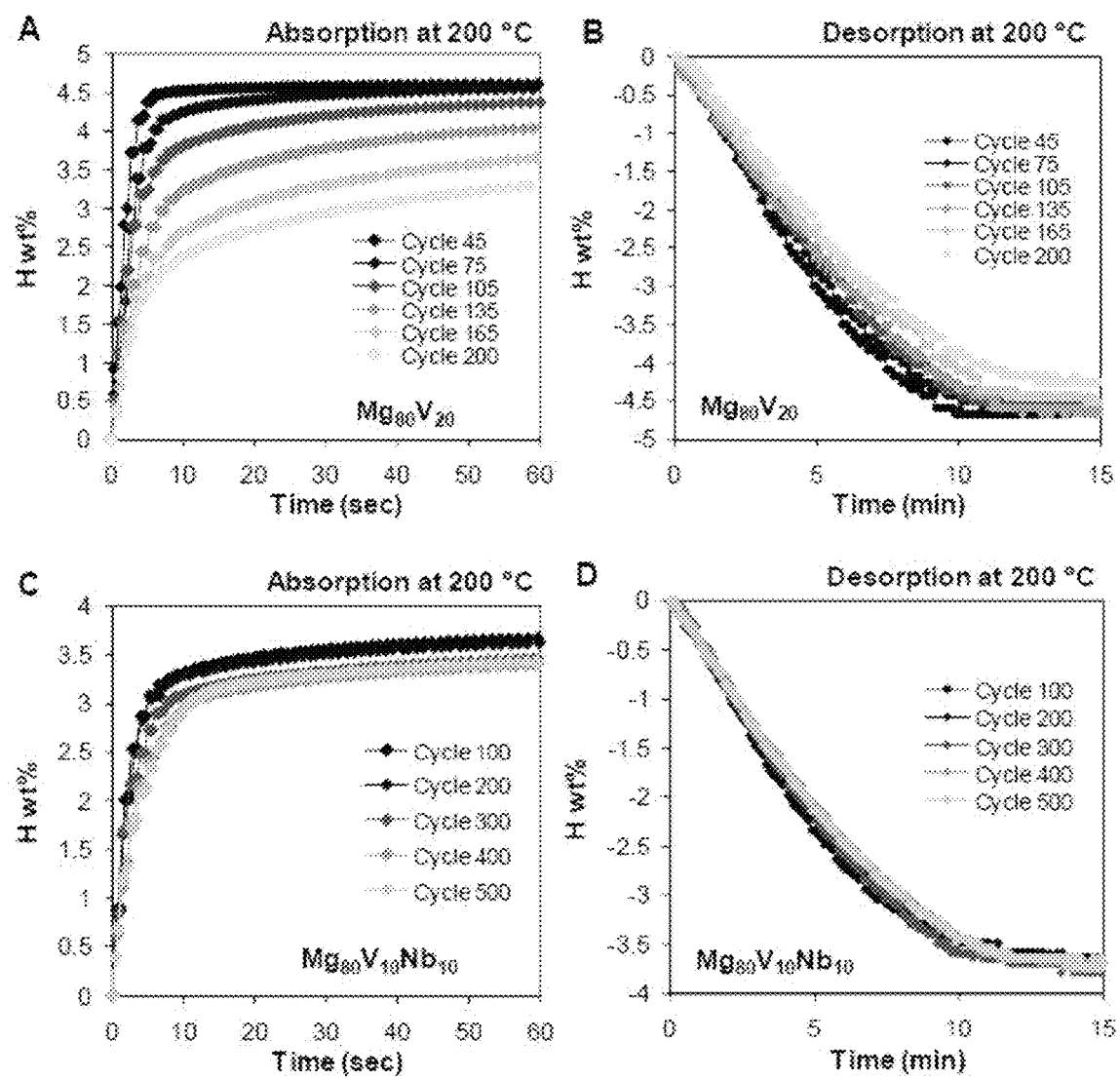
FIG. 59—Comparison of the cycling sorption kinetics between Mg80V20 and Mg80V10Nb10 at 200° C. (A) Selected absorption cycles and (B) selected desorption cycles of Mg80V20. (C) Selected absorption cycles and (D) selected desorption cycles of Mg80V10Nb10.

Selected absorption and desorption cycles at 200° C. for $Mg_{80}V_{20}$ and $Mg_{80}V_{10}Nb_{10}$ are shown in FIG. 59. In this section, the cycles during the activation period are not included, so that the effect cycling kinetic degradation can be easily observed. The absorption behavior of $Mg_{80}V_{20}$ significantly changed. From $45^{th}$ to $200^{th}$ cycles, the amount of H absorbed within 60 seconds decreases from 4.5 to only 3.2 wt. % of H. The desorption behavior, however only changed slightly. The time for complete desorption increases from 10 to 13 minutes. On the other hand, $Mg_{80}V_{10}Nb_{10}$ hardly show any degradation in both absorption and desorption kinetics from 100 to even 500 cycles.

For better analyzing the sorption kinetics and understanding the involved degradation mechanism, the experimental sorption data (first 90% of the transformed fraction) of both $Mg_{80}V_{20}$ and $Mg_{80}V_{10}Nb_{10}$ at different cycling stages are fitted with several kinetic models. Both Johnson-Mel-Avrami (JMA) and contracting volume (CV) models have been taken into considerations. Except the absorption curves of $Mg_{80}V_{20}$ at early cycling stages (i.e. $45^{th}$ cycle), the absorption curves of both materials cannot be fitted by any of these models with single curve fitting. This is especially true with increasing cycle numbers. The best fits to the experimental data are obtained with two JMA functions, similar to the analysis previously reported for Mg-FeTi nano-layered composites. The JMA model is a well-known analytical description of transformation kinetics based on nucleation and growth mechanism and is expressed as $f=1-\exp(kt)^n)$, where f is the transformed fraction and k is the kinetic rate constant. The value of the Avrami exponent n depends on the type of nucleation, dimensionality of growth and the rate-limiting step of growth. In FIGS. 60A and B, experimental data of selected absorption kinetics for $Mg_{80}V_{20}$ ($45^{th}$ and $200^{th}$ cycles) and $Mg_{80}V_{10}Nb_{10}$ ($100^{th}$ and $500^{th}$ cycles) are reported as open diamonds, while fittings are superimposed as solid/dashed red lines. From the plots of $\ln(\ln(1/(1-f))$ vs. int shown above the respective cases, two stages with different slopes are clearly observed for all cases. The first stage is usually rapid and the second stage shows significantly slower kinetics.

$Mg_{80}V_{20}$ and $Mg_{80}V_{10}Nb_{10}$ exhibit very different cycling stability in terms of the degree of transformation during the first absorption stage. For $Mg_{80}V_{20}$, the transformed fraction within first stage significantly degrades 50% with increasing sorption cycles, decreasing from f=0.95 at $45^{th}$ cycle to only 0.45 at $200^{th}$ cycle. The onset point of second stage towards a smaller reaction fraction means larger fraction of hydrogen content has to be stored during the second stage, which results in a degrading overall absorption kinetics. For $Mg_{80}V_{10}Nb_{10}$, the degree of transformation within first stage however only degrades ~4% during extended cycling, slightly decreasing from f=0.81 at $100^{th}$ cycle to 0.78 at $500^{th}$ cycle. The very different cycling stability can be also noticed in terms of the rate constant k of the first absorption stage, which is shown in FIG. 60C. While the n values of the first stage for both materials remain near 1 in the course of cycling, the k value for $Mg_{80}V_{20}$ quickly decreases from 0.48 $s^{-1}$ to 0.13 $s^{-1}$ from $45^{th}$ to $200^{th}$ cycle, but the k value for $Mg_{80}V_{10}Nb_{10}$ decreases much slower from 0.29 $s^{-1}$ to 0.18 $s^{-1}$ from $100^{th}$ to $500^{th}$ cycle.

The desorption curves for both materials can be fitted with single JMA function. FIG. 60D shows the desorption curves of $Mg_{80}V_{20}$ ($200^{th}$ cycle) and $Mg_{80}V_{10}Nb_{10}$ ($500^{th}$ cycle), with the experimental data reported as solid black dots and the fittings superimposed as red lines. The obtained values of n are 1.44 and 1.38 for $Mg_{80}V_{20}$ and $Mg_{80}V_{10}Nb_{10}$ respectively.

Figure 62:
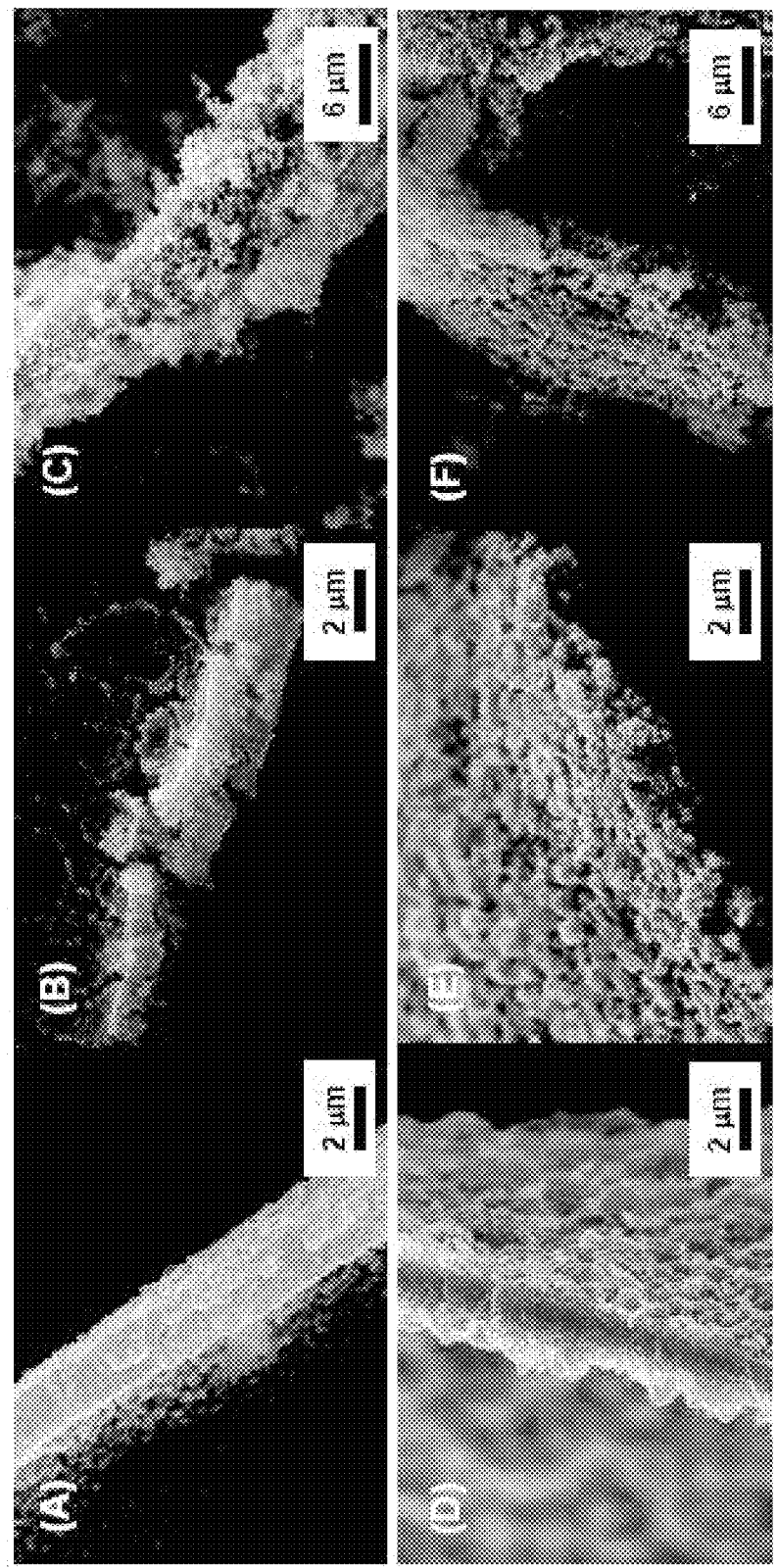
FIG. 62 SEM micrographs of Mg V (first row) and Mg V Nb (second row) after selected cycles at 200° C. (A, D) after 45 cycles; (B, E) after 90 cycles; (C) after 200 cycles; (F) after 500 cycle.

In order to elucidate the possible factors contributing to the different cycling kinetic stability observed above, a variety of microstructure characterizations have been conducted to examine the concurrent microstructural evolution. FIG. 61A shows the average Mg grain size as a function of cycle number determined by Scherrer equation. For $Mg_{80}V_{20}$, the Mg grain size increases from 35.1 nm after 45 cycles to 55.5 nm and 84.4 nm after 90 and 200 cycles respectively. For $Mg_{80}V_{10}Nb_{10}$, the Mg grain size increases from 23.7 nm after 45 cycles to only 37, 41.6 and 68.6 nm after 90, 200 and even 500 cycles respectively. It is obvious that the coarsening rate of Mg grains in the latter case is much slower. FIG. 61B shows the grain size of catalytic phase in $Mg_{80}V_{20}$. In order to determine the grain size of $VH_{0.5}$, the overlapping peaks near between 40° and 43° were first deconvoluted. The grain size of $VH_{0.5}$ increases from ~4 nm after 45 cycles to ~8 nm after 200 cycles. The grain size of catalytic phase in $Mg_{80}V_{10}Nb_{10}$ is not shown here, due to the complex overlapping between the (110) reflection of $Nb_{0.5}V_{0.5}H$ with other peaks. However, it is quite clear that reflection of $Nb_{0.5}V_{0.5}H$ remain broad even after 500 cycles, which suggests finer nanocrystalline structure than the catalytic phase in $Mg_{80}V_{20}$ Progressive film disintegrations have occurred in both $Mg_{80}V_{20}$ and $Mg_{80}V_{10}Nb_{10}$ films during cycling sorption. However, as could be seen in low magnification SEM micrographs not included in this document, $Mg_{80}V_{20}$ film disintegrated much faster. After 90 cycles, while $Mg_{80}V_{10}Nb_{10}$ film remains as large flakes, majority of $Mg_{80}V_{20}$ film turn into powder/small flake form. FIG. 62 shows the SEM micrographs of both materials after selected cycles at 200° C. These micrographs at higher magnifications reveal the cross-section and surface structure of the post-cycled films. For $Mg_{80}V_{20}$, high density of surface cracks are clearly observed after 45 cycles, propagating perpendicularly into the flake bulk (FIG. 62A). The cracks have developed into a more advanced stage after 90 cycles (FIG. 62B), such that cracks in the direction parallel to the film surface are also observed. For $Mg_{80}V_{10}Nb_{10}$, cracking is not the prevalent way for film structure to pulverize. After 45 cycles the film structure holds its integrity quite well (FIG. 62D), with pulverization observed just on the film surface layer. After 90 cycles, the pulverization process has extended from the surface layer into the bulk, such that the flake bulk is composed of packed particles (FIG. 62E). It is worth notice that during cycling sorption the surface area of both $Mg_{80}V_{20}$ and $Mg_{80}V_{10}Nb_{10}$ films must increase, regardless of the different ways the film structures are developing.

After 200 and 500 cycles respectively, both $Mg_{80}V_{20}$ and $Mg_{80}V_{10}Nb_{10}$ films pulverized into powders from a macroscopic perspective. At higher magnification (FIGS. 62C and F), even though flake edges several micrometers long are still present, the bulk of the residual flakes should be very porous. This can be judged by the flake thickness for both materials, which significantly expanded from the original 1.5 μm to as thick as 6 μm. This is in consistent with the previous reported porous Mg structure upon dehydrogenation of $MgH_2$ thin films. Detailed microstructural characterizations for both materials at this cycling stage are of extremely importance, because any characteristic features observed here may be directly responsible for the distinct cycling stabilities. Herein, more SEM analyses at higher magnifications and site-specific TEM analyses were performed.

Figure 63:
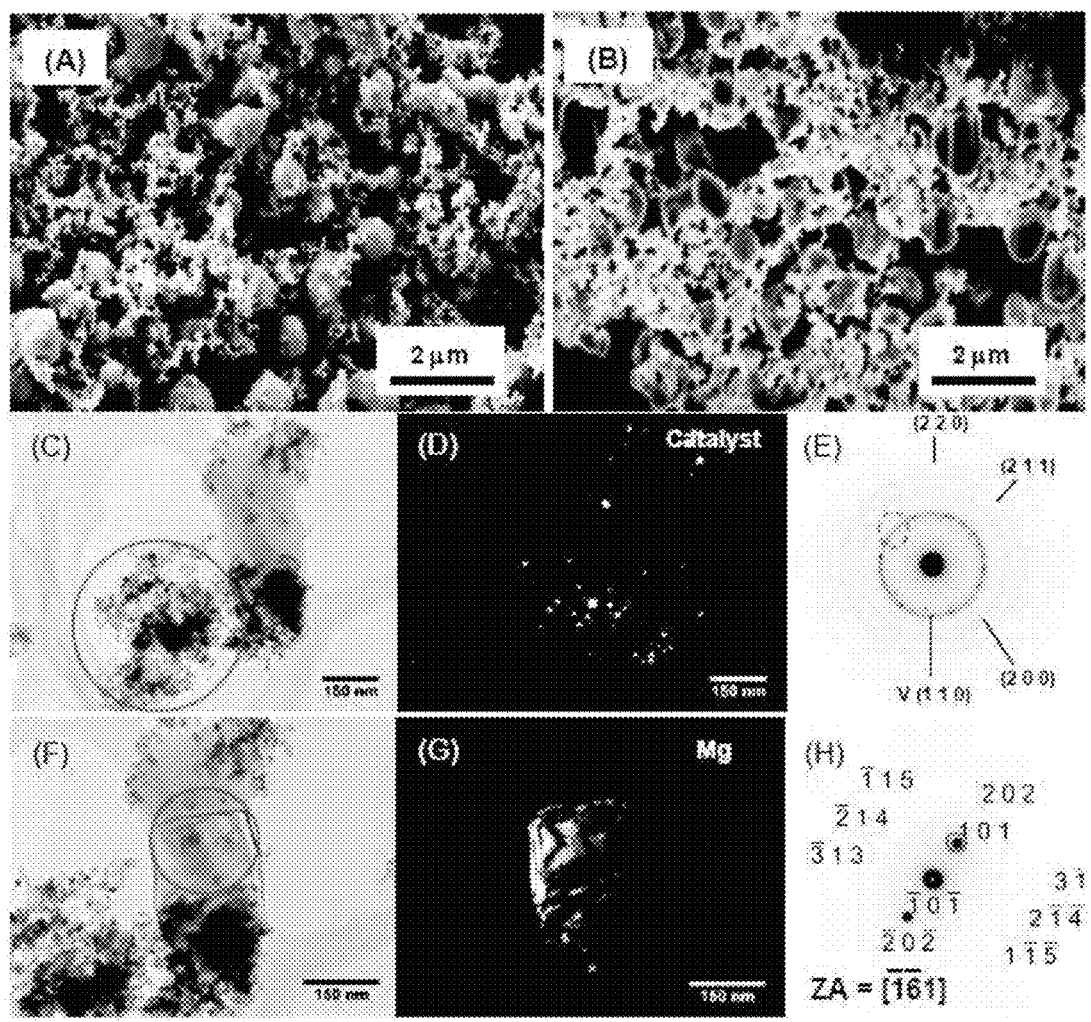
FIG. 63—SEM and TEM micrographs of Mg80V20 after 200 cycles at 200° C. in desorbed state. SEM micrographs of (A) typical residual flake surface and (B) internal structure of residual flake prepared using FIB lift-out. (C) BF micrograph of a typical particle. (D) DF micrograph of the catalytic phase V obtained using a portion of the V (110) ring indicated as dashed red circle in SAED; (E) corresponding SAED pattern acquired from a detached cluster of small particles, indicated as red circle in (C). (F) BF micrograph of the same region, but centered on the large particle. (G) DF micrograph of Mg obtained using g=101 reflection; (H) corresponding SAED pattern acquired from a region of large particle with least surface coverage, indicated as red circle in (F).

FIG. 63 shows the SEM and TEM micrographs of typical sample region of post-cycled $Mg_{80}V_{20}$ in desorbed state after 200 cycles. As can be seen in the SEM (FIG. 63A) and BF TEM micrographs (FIG. 63C), two types of microstructures can be clearly identified and isolated, namely, large particles in the size range from hundreds of nanometers to near-micrometer and some agglomerations of fine powders, which either in contact with or completely detached from the surface of the large particle. The internal structure of residual flake (FIG. 63B) is very porous. The large particles are loosely spaced, which are most likely being held together by the backbone formed by fine powders agglomerations. FIB was used here to reveal the internal structure. The SAED pattern (FIG. 63H) acquired from a region of large particle with least surface coverage (indicated by red circle in FIG. 63F) can be indexed to single crystalline Mg (P63/mmc (NO. 194)) with ZA=[$\bar{1}6\bar{1}$]. The DF micrograph of Mg (FIG. 63G) from Mg 101 reflection (marked by red circle in the SAED pattern) highlights the fact that the large particle consists of more than one Mg grains. The size of the imaged magnesium grain in the DF micrograph is about 200 nm, which is larger than the average grain size estimated from XRD data. This can be explained by the fact that the width of x-ray peak profiles is more affected by the small grains and the grain size derived from x-ray peak profiles accounts for the domain sizes that scatter the incoming x-ray coherently, which is generally smaller than that obtained by TEM. Therefore, such a difference in grain size predicted by these two techniques is expected. The SAED pattern (FIG. 63E) acquired from the detached cluster of small particles (indicated by red circle in FIG. 63C) can be unambiguously indexed to the catalytic phase V (Im-3m (No. 229)) The absence of hydride phase $VH_{0.5}$ which has already been observed in XRD is as-expected. Without using the cryogenic holder in TEM analysis, the in-situ hydride decomposition is inevitable. The DF micrograph of V (FIG. 63D), taken using one part of the most intense ring (marked by red circle in the SAED pattern) displays the distribution of the catalyst phase. It is clear now that after extended sorption cycles the catalytic phase V has fully segregated out of Mg matrix and coalesces into agglomerations. Meanwhile, Mg has sintered into large particles, sparsely in contact with the catalytic phases. It is worth notice that dispersion of V is actually quite poor; large portion of Mg particle has no catalyst attached.

Figure 64:
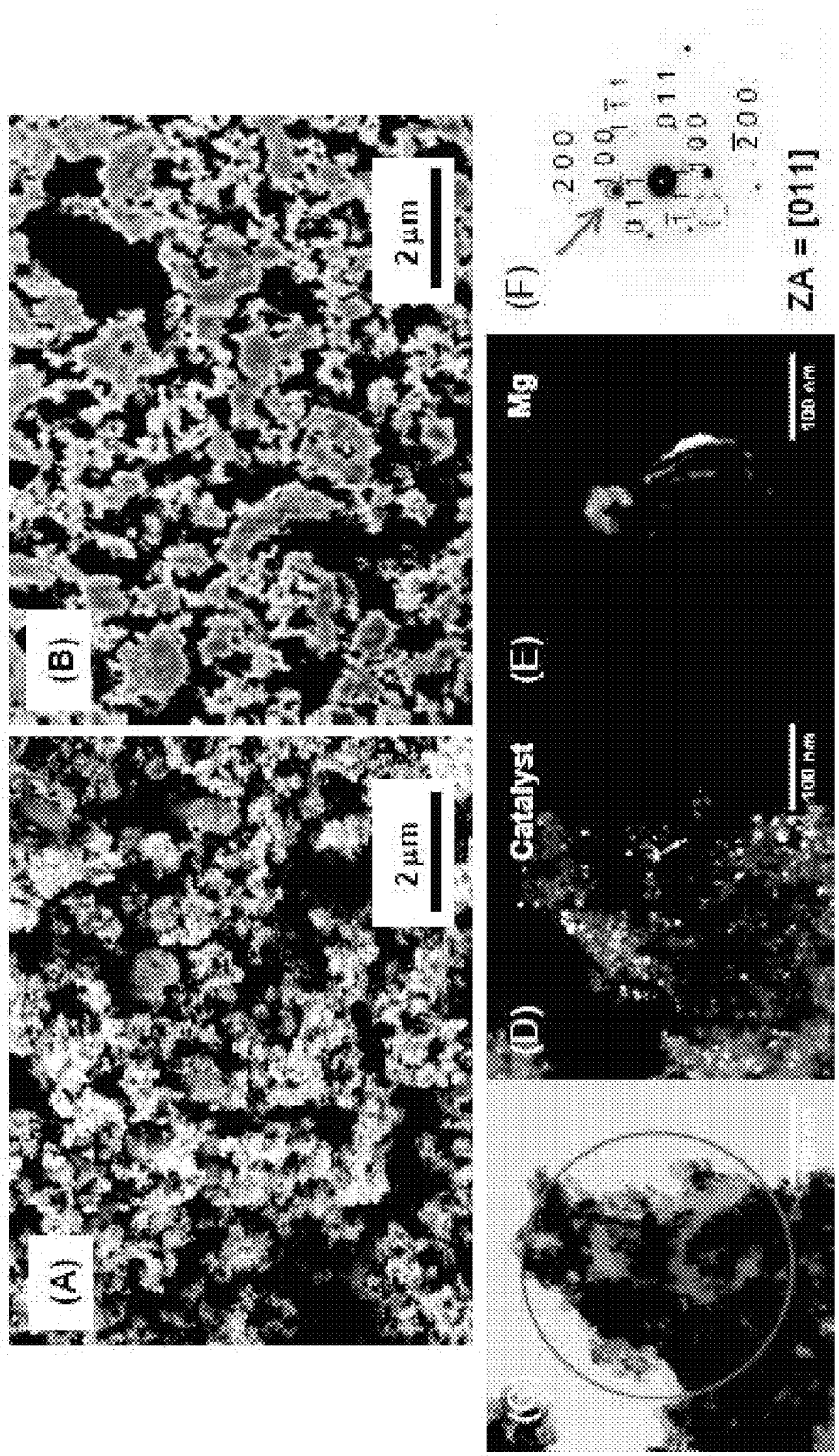
FIG. 64—SEM and TEM micrographs of Mg80V10Nb10 after 500 cycles at 200° C. in desorbed state. SEM micrographs of (A) typical residual flake surface and (B) internal structure of residual flake prepared using FIB lift-out. (C) BF micrograph of a typical particle. (D) DF micrograph of the catalytic phase NbV obtained using a portion of NbV (110) ring indicated as dashed red circle in SAED. (E) DF micrograph of Mg obtained using g=100 reflection. (F) The corresponding SAED pattern acquired from a region indicated by red circle in (C).

FIG. 64 shows the SEM and TEM micrographs of typical sample regions of post-cycled $Mg_{80}V_{10}Nb_{10}$ in desorbed state after 500 cycles. From the SEM micrographs (FIG. 64A) of external surface of residual flake, the material shows very different morphology compared to $Mg_{80}V_{20}$ sample, such that the large particles are well mixed with the fine powders. Based on the cross-section of the internal structure (FIG. 64B), the bulk of residual flake contains a lot of large voids, and the large particles with varied shapes are enwrapped by the fine powders. The SAED pattern (FIG. 64F) obtained from a region (indicated by red circle in BF micrograph (FIG. 64C)) contains two phases. The spot pattern can be indexed to single crystalline Mg with ZA close to [011]; the appearance of few other spots in the SAD pattern which do not belong to the this zone axis suggests the presence of other magnesium grain(s) with different orientations in this region. Suggested by the measured inter-planer spacing (d-spacing) of the most clear ring (2.25 Å), the diffuse ring pattern is most likely due to the diffraction of nanocrystalline NbV (65-4352, Im-3m (No. 229)). This conclusion is in consistent with the broad peaks observed above in the XRD characterizations, with consideration of in-situ hydride decomposition during TEM analysis. The DF micrographs of NbV (FIG. 64D) and Mg (FIG. 64E), obtained using the corresponding portion of reflection (marked by red circle/arrow in the SAED pattern) clearly illustrate the distribution of catalytic phase with respect to Mg. Same as $Mg_{80}V_{20}$, the semi-transparent large particle in BF micrograph is Mg, and the fine powders distributed on surface are the catalytic phase. It has to be emphasized that the catalytic phase NbV in $Mg_{80}V_{10}Nb_{10}$ has a finer crystalline size relative to V. and most importantly the ditribution/coverage of the catalysts on Mg surface is much more uniform in $Mg_{80}V_{10}Nb_{10}$.

Figure 65:
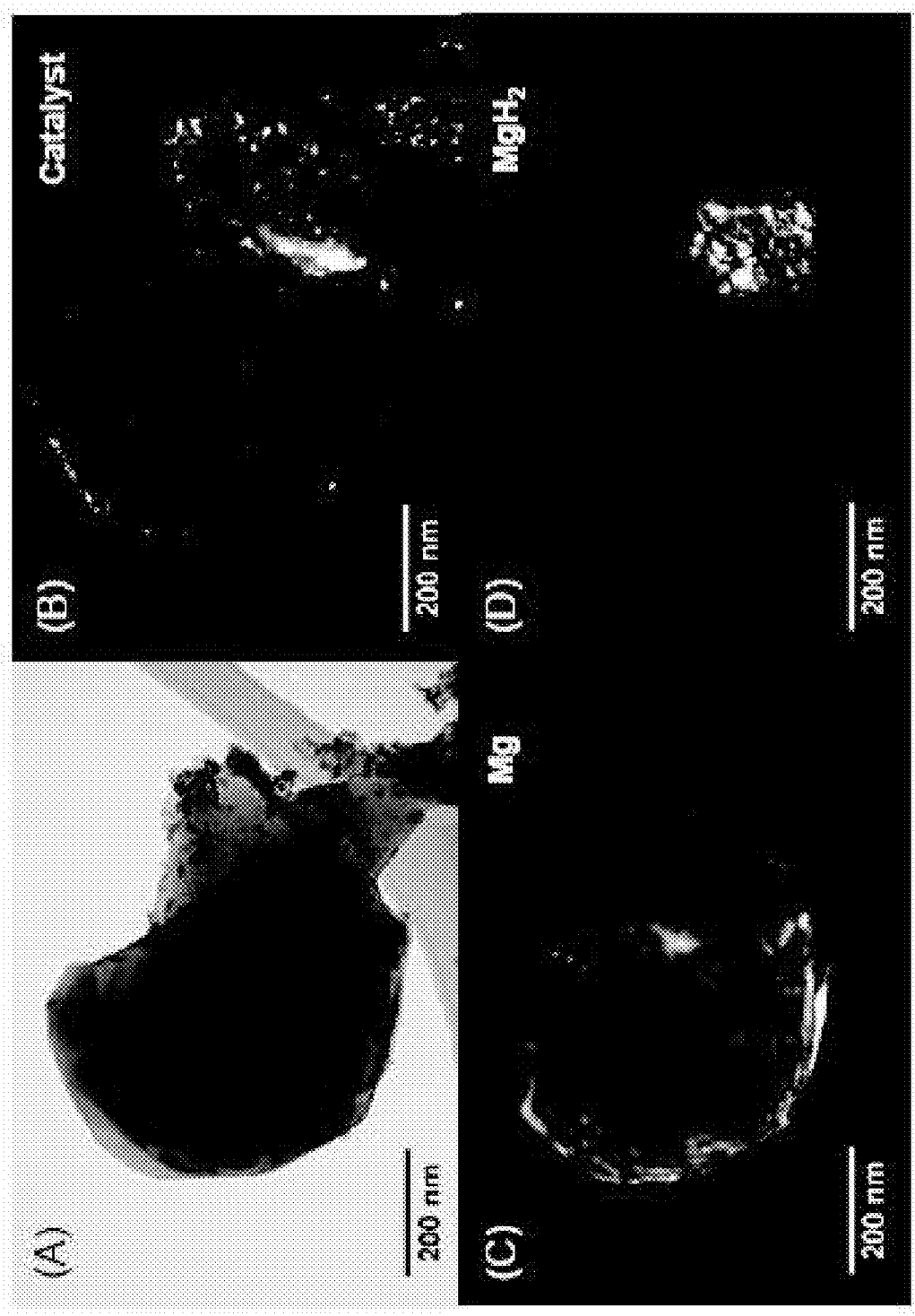
FIG. 65—TEM micrographs of partially absorbed Mg80V20 after 200 cycles at 200° C. (A) BF micrograph of a typical particle. (B) DF micrograph of catalytic phase V. (C) DF micrograph of Mg. (D) DF micrograph of MgH2.

To demonstrate the relation between microstructure and the sorption kinetics, particularly how the distribution of surface catalysts affect the two absorption stages, TEM analyses on partially absorbed $Mg_{80}V_{20}$ at cryogenic temperature were performed. The results are presented in FIG. 65. The material was previously cycled at 200° C. for 200 times, so that both the microstructure and the sorption kinetics are representative for the degraded state. The absorption procedure was interrupted right after the first absorption stage by immediately quenching the sample and then evacuating the hydrogen gas. In this way, we were able to differentiate the portion of materials which absorb hydrogen rapidly during the first stage from the portion of materials which absorb hydrogen slowly during the second stage. As can be seen, the imaged particle is partially transformed to $MgH_2$. By DF imaging of the respective phases, the distributions of catalytic phase (FIG. 65B), Mg (FIG. 65C) and $MgH_2$ (FIG. 65D) are all clearly displayed. The $MgH_2$ grain shown in FIG. 65D has the characteristic mottled contrast related to ionic materials. It is interesting to see that the $MgH_2$ grain only presents at the region with high density of surface catalysts. The large portion of particle with almost no catalyst attached remains unabsorbed. FIG. 65 presents another typical particle partially transformed to $MgH_2$. Here we use the SAED patterns to illustrate the layout of Mg and $MgH_2$. The SAED pattern (FIG. 65C) acquired from region 1 contains two phases. The spot pattern can be indexed to single crystalline (SC) $MgH_2$ with ZA close to [117]. The DF micrograph of $MgH_2$ from $MgH_2$ $1\bar{1}0$ reflection is shown in FIG. 66B. The ring patterns can be indexed to nanocrystalline (NC) $VH_{0.5}$, which is in consistent with the increasing stability of hydride at cryogenic temperature. The SAED pattern (FIG. 66D) acquired from region 2 has hexagonal symmetry, which obviously belongs to single crystalline Mg. The pattern contains Kikuchi lines, which is typical when the specimen is thick enough. It is quite obvious in the BF micrograph that region 1 contains densely dispersed surface catalyst, while region 2 has almost no catalyst attached. It is therefore confirmed that the $MgH_2$ grain would preferentially nucleate in the region with high density of surface catalysts.

Microstructural evolution of co-sputtered films and the effects on sorption kinetics For co-sputtered films, the decomposition of the as-synthesized supersaturated solid solution, most likely during first hydrogenation, results in a dense dispersion of secondary catalytic phases throughout the matrix. However, their catalytic effectiveness may be strongly affected by the actual surface area of the catalytic phases in contact with hydrogen gas, because both hydrogen dissociation/recombination and the migration of hydrogen atoms from the surface into the bulk or vice-versa should scale with it. As can be seen in the SEM micrographs, progressive film disintegration has occurred in both $Mg_{80}V_{20}$ and $Mg_{80}V_{10}Nb_{10}$ films. The free surface areas of both films should also increase with cycling sorption, but may have different speed. At $45^{th}$ cycle, high density of cracks are observed in $Mg_{80}V_{20}$ film. With the appearance of cracks, hydrogen molecules can be dissociated on the newly exposed surfaces of secondary catalytic phases throughout the bulk, with significantly less long-range hydrogen diffusion required. Conversely, cracks are barely found in $Mg_{80}V_{10}Nb_{10}$ film. Since the film structure holds its integrity quite well with only surface layer pulverized, the utilization level of the secondary catalysts in $Mg_{80}V_{10}Nb_{10}$ film is actually very low at $45^{th}$ cycle. The primary catalytically active sites are only on the surface of film, and hydrogen atoms must diffuse into or out from the bulk.

To explain why high density of cracks are observed in $Mg_{80}V_{20}$ film but not in $Mg_{80}V_{10}Nb_{10}$ film after the same amount of cycles, it is important to consider the variation of microstructural stability between monometallic hydride and bimetallic hydride. Based on the results of XRD characterizations shown in FIG. 58 with relevant thermodynamic considerations, the hydrides of Nb, V, and Nb—V are stable or at least partially stable under the experimental conditions of cycling sorption. These hydrides rather than the metallic counterparts are thus the more relevant phases in catalyzing the reactions. Comparing with monometallic hydride catalysts, the bimetallic hydride catalysts exhibit significant improved microstructural resistance to coarsening (i.e. Ostwald Ripening and coalescence). As suggested by grain size analyses and the DF TEM micrographs of catalytic phases, the monohydrides of bimetallic Nb—V in the ternary systems remain very nanocrystalline up to 500 cycles, while the crystalline sizes of $V/VH_{0.5}$ increase from ~4 nm in early cycles to more than 8 nm after 200 cycles. Also, as can be compared in SEM micrographs of samples after extended cycling, the particles of monometallic phase coalesce more severely and form interconnected large agglomerations. The bimetallic catalyst's improved microstructural stability may be attributed to the reduced atomic diffusivity of Nb atoms with large atomic weight and by forming a stable binary Nb—V solid solution, and the.

It is known that the precipitated secondary phases at grain boundaries can act as pinning points to prevent the grain growth of matrix material; however, if the precipitated particles coarsen/coalesce above a certain critical size, grain growth of the matrix phase would occur. In $Mg_{80}V_{20}$ film, the coarser microstructure of the monometallic catalyst leads to the quick growth of Mg grains. Due to the diminishing grain boundary volume in the matrix, the material can no longer accommodate the build-up strain energy, induced by the successive expansion/contraction during repeated hydrogen absorption/desorption. Eventually, structural change i.e. cracking along the grain boundaries must occur to release the stress. In $Mg_{80}V_{10}Nb_{10}$ film, the Mg grain size should increases more slowly due to the very nanocrystalline bimetallic precipitates, which in turn results in a relatively stable film structure. Therefore, the larger Mg grain size in $Mg_{80}V_{20}$ compared to $Mg_{80}V_{10}Nb_{10}$ at $45^{th}$ cycle, as already shown in FIG. 61, is another evidence of quickly disintegrated films and larger free surface area in the former case. Interestingly, the sorption kinetics of $Mg_{80}V_{20}$ film at this cycling stage is not retarded by the larger Mg grains as what is generally believed. Instead, its sorption kinetics is more rapid than any other materials and is faster than its previous cycles. These results strongly suggest the significant impacts of free surface area on the sorption kinetics.

We believe that the rate to generate sufficient hydrogen-exposed surfaces, varied in different films, determines the length of activation period. Before generating sufficient free surfaces, the sorption kinetics is strongly affected by the transportation of hydrogen into or out from the bulk. Due to the sluggish hydrogen diffusivity in Mg and particularly in $MgH_2$, the network of secondary phases, especially the hydride formers such as Nb and V precipitated along the grain boundaries of Mg, could serve as high diffusivity path for hydrogen. This has been considered as one of the most important factors to enormously accelerate the sorption kinetics of co-sputtered films. However, this enhancement attenuates with increasing sorption cycles. In order to lower the excess interfacial energy, microstructural coarsening of this nano-dispersed two-phase mixture resulted by phase segregation is inevitable, even if it is slow in the ternary materials. The resulted diminishing grain boundary volume will significantly reduce the effectiveness of those high diffusivity paths and thus decelerate the sorption kinetics. As can be seen, the sorption kinetics becomes more sluggish in ternary Mg—V—Nb films than their binary baselines during the activation period. This can be explained by the lower hydrogen diffusivities in Nb—V alloys relative to those in pure Nb or V metals, with a very deep minimum at 75 at. % Nb. Of course, the effects of reducing hydrogen diffusivity will be gradually offset by the increasing free surface area, which leads to an accelerating sorption kinetics. Eventually, the surface-to-volume ratio of films reaches a steady state after certain amount of cycles. This number of cycle defines the length of activation period as what we observed in FIG. 55.

The progressive film pulverization continues after "activation period". After extended sorption cycles, the residual flakes become very porous and are composed of loosely packed powder-like materials, which is evidenced by the SEM and TEM micrographs shown in FIGS. 63 and 64. In general, Mg has substantially sintered into large particles, and the secondary catalytic phases have segregated to the surface of the sintered Mg particles.

The effects of microstructure on cycling stability

The most fundamental questions that arise from the cycling sorption behaviors after activation period are what causes $Mg_{80}V_{20}$ kinetically degrading, and why $Mg_{80}V_{10}Nb_{10}$ exhibits an improved cycling stability? The absorption curves of both $Mg_{80}V_{20}$ and $Mg_{80}V_{10}Nb_{10}$ show clear two stages after activation periods. The kinetic analyses shown in FIG. 60 suggest that the cycling degradation of $Mg_{80}V_{20}$ is mostly reflected by the decreasing degree of transformation during the rapid first absorption stage with increasing sorption cycles, and the overall absorption kinetics is retarded by the sluggish second stage. The critical question to address here is what determines the transformed fraction during the first stage. The two-stage phase transformation has been previously ascribed to "site saturation", namely a transition of phase transformation from nucleation-and-growth to growth-only. The saturation of nucleation sites occurs because the nucleation sites are not randomly distributed in the volume, but are concentrated near other nucleation sites. In other words, the degree of transformation during first absorption stage is determined by what volume fraction of Mg can be transformed to $MgH_2$ before the saturation of nucleation sites occurs, and the second absorption stage is attributed to the growth of $MgH_2$ grains. Apparently, the occurrence of saturation of nucleation sites with respect to volume fraction will be strongly affected by the dispersion of potential nucleation sites. Based on the TEM analyses performed on partially absorbed materials shown in FIGS. 65 and 12, there is a spatial correlation between the location of preferential nucleation sites of $MgH_2$ and the distribution of catalytic phases on Mg surface. Since the $MgH_2$ observed in these TEM micrographs directly contribute to the rapid first stage, one can now safely argue that the degree of transformation during first absorption stage is most likely determined by the distribution of catalyst on Mg surface.

The plausible explanation for the intrinsic connection between secondary catalytic phases and potential nucleation sites is that the surface catalytic phases could facilitate the nucleation of $MgH_2$ by lowering the energy barrier. This important role of secondary catalytic phase serving as active nucleation sites has been discussed by other researchers. Due to the significant volume and chemical interfacial energy mismatches between Mg and $MgH_2$, the nucleation of $MgH_2$ in Mg or vice versa is suppressed by the large energetic barrier. This nucleation-limited reaction has been previously evidenced by energy filtered TEM study on partially desorbed $MgH_2$ (T=380° C., $P_{H2}$=primary vacuum), such that isolated Mg grains nucleate heterogeneously on the surface of $MgH_2$ particles. Therefore, for the region with catalysts densely dispersed on surface, the catalyst/Mg interfaces provide dense templates of preferential heterogeneous nucleation sites for Mg to $MgH_2$ phase transformation, and the rapid hydriding kinetics is contributed by both nucleation and growth. For the portion of Mg particle with no or very few catalysts attached, the nucleation of $MgH_2$ should be hard to occur (T=200° C., $P_{H2}$=2.3 bar), and the much slower hydriding kinetics is thus dominated by growth only. This explanation is in accord with the microstructural features observed in $Mg_{80}V_{20}$ and $Mg_{80}V_{10}Nb_{10}$ samples. The extremely poor distribution of catalysts on Mg surface is most likely responsible for the cycling degradation observed in $Mg_{80}V_{20}$. On the other hand, the stabilized uniform distribution of surface catalysts contributes to the improved cycling stability observed in $Mg_{80}V_{10}Nb_{10}$ up to 500 sorption cycles.

One fundamental observation from the TEM analyses on partially absorbed sample is that only one or very few grains of $MgH_2$ formed regardless of the number of potential nucleation sites near or at the surface catalysts. This unexpected observation seems to be contractive to the above explanation such that the surface catalysts facilitate the nucleation of $MgH_2$, because it is still a typical scenario for heterogeneous nucleation with a large energetic barrier. If the nucleation of $MgH_2$ at the catalyst/Mg interface was energetically easy and the dispersion of surface catalyst was dense in that region, one would expect to see many $MgH_2$ nucleation sites and many growth fronts. To account for this, it is necessary to emphasize the importance of actual concentration of atomic H in a localized region within a short time after exposing to hydrogen gas. Upon hydrogenation, the molecular hydrogen must be dissociated to atomic H before dissolving into the bulk of metal. The atomic hydrogen dissolves at the interstitial sites of the host metal and forms a solid solution. When the local atomic hydrogen concentration reaches the saturation limit, the hydride phase starts to precipitate. It is thus the available atomic hydrogen concentration rather than the applied hydrogen pressure determines the real driving force of phase transformation. Ideally the H concentration within the entire solid solution phase is considered to increase with hydrogen pressure following the Sieverts' law. However, this is only true if hydrogen dissociation is always readily to occur instantly or a certain time is give for equilibrium to be reached. The surface reactions on a catalyzed Mg surface include hydrogen dissociation on the catalysts surface, subsequent migration of atomic H away from the dissociation sites, i.e. spillover, and diffusion into the Mg bulk. Even though the energy barriers for the former two steps are significantly decreased by catalytic doping, these processes still do not occur instantly.

Figure 66:
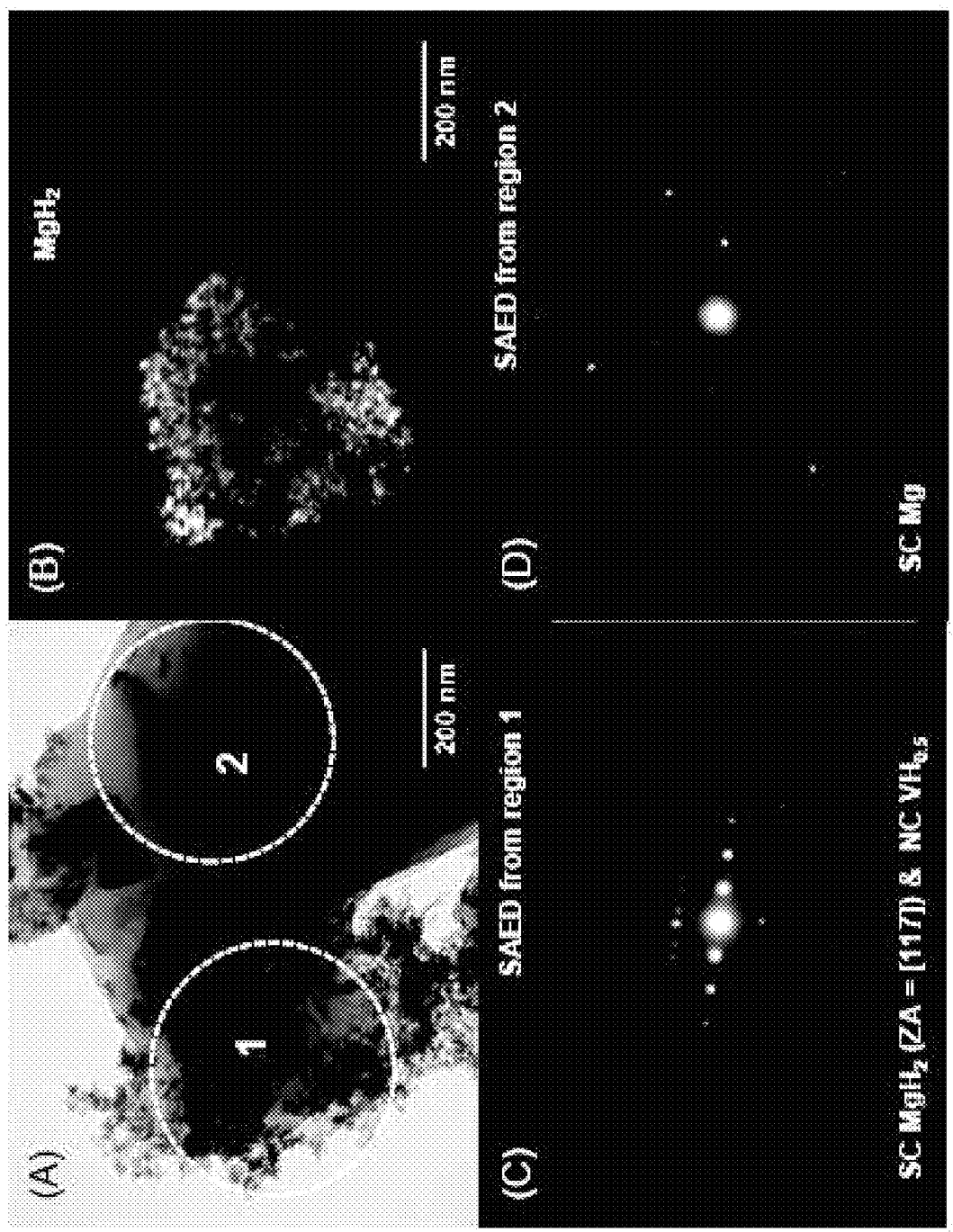
FIG. 66—TEM micrographs of partially absorbed Mg80V20 after 200 cycles at 200° C. (A) BF micrograph of a typical particle. (B) DF micrograph of MgH2 obtained using MgH2 (1-10) reflection. (C) The SAED pattern acquired from region 1 can be indexed to single crystalline (SC) MgH2 with ZA=[117] and nanocrystalline (NC) VH0.5. (D) The SAED pattern acquired from region 2 can be indexed to SC Mg.

At the moment of exposing to hydrogen gas, the concentration of atomic H is not necessarily the same across the surface and within the bulk even inside the region with high density of surface catalysts. Certain locations with supersaturated hydrogen concentration, probably near multiple hydrogen dissociation sites, would nucleate first. Once nucleus of $MgH_2$ forms, it becomes a sink for the nearby H atoms, because it is thermodynamically more stable to form a larger $MgH_2$ grain than to nucleate more nuclei. Also, considering the limited atomic H concentration during a short period of time, a rapid growing $MgH_2$ consumes the surrounding atomic H, which suppresses the nucleation of other nuclei. As can be seen in FIG. 66, the $MgH_2$ grain grows as large as 200 nm within 10 seconds during the first absorption stage. This fact also strongly suggests that the hydride growth front is not propelled by hydrogen atoms diffused through the preformed $MgH_2$ layer. Instead, the H atoms which diffuse along the new formed metal-hydride interface and/or already dissolve in Mg could hop across the Mg—$MgH_2$ interface. This interface-controlled reaction may contribute to the rapid growing hydride front.

Following the same reason, within a short period after exposing to hydrogen gas, the atomic hydrogen concentration may be significantly higher in the region with high density of surface catalysts. For the region with no/very few catalyst attached, even though the applied hydrogen pressure is the same as anywhere else, the actual concentration of atomic H may remain low at least for a certain short period of time. This important role of surface catalysts serving as atomic H pump could be another reasonable explanation that nucleation of $MgH_2$ preferentially occurs in region where surface catalysts are concentrated. One may argue that atomic H could rapid diffuse to the region with no/very few catalyst attached by surface diffusion. Then, the absence of $MgH_2$ in this region further support the fact that catalyst/Mg interfaces serve as heterogeneous nucleation sites for $MgH_2$ with low energetic barrier. In the theory of nucleation, these two important roles of surface catalysts are actually interconnected. The higher concentration of atomic H over the equilibrium would result in lower nucleation energy barrier of $MgH_2$ during hydriding, which is analogous to the effects of larger undercooling $\Delta T$ during solidification.

Besides the distribution of surface catalysts on Mg surface, some other microstructural features also affect the sorption behaviors. This can be reflected by the decreasing rate constant k of the first absorption stage. Both $Mg_{80}V_{20}$ and $Mg_{80}V_{10}Nb_{10}$ have comparable level of secondary catalytic additions, the coarser microstructure of monometallic V relative to bimetallic Nb—V results in the fewer effective catalytic/nucleation centers in the former case. It has been shown that dispersion of amorphous carbon and carbon nano-tubes on Mg surface is an effect way to prevent the Mg particles from sintering. Here, due to the poor distribution of secondary phase on the Mg surface in $Mg_{80}V_{20}$, more substantial sintering of Mg has occurred such that Mg particles near-micron size are clearly observed after extended cycling sorption.

Figure 60:
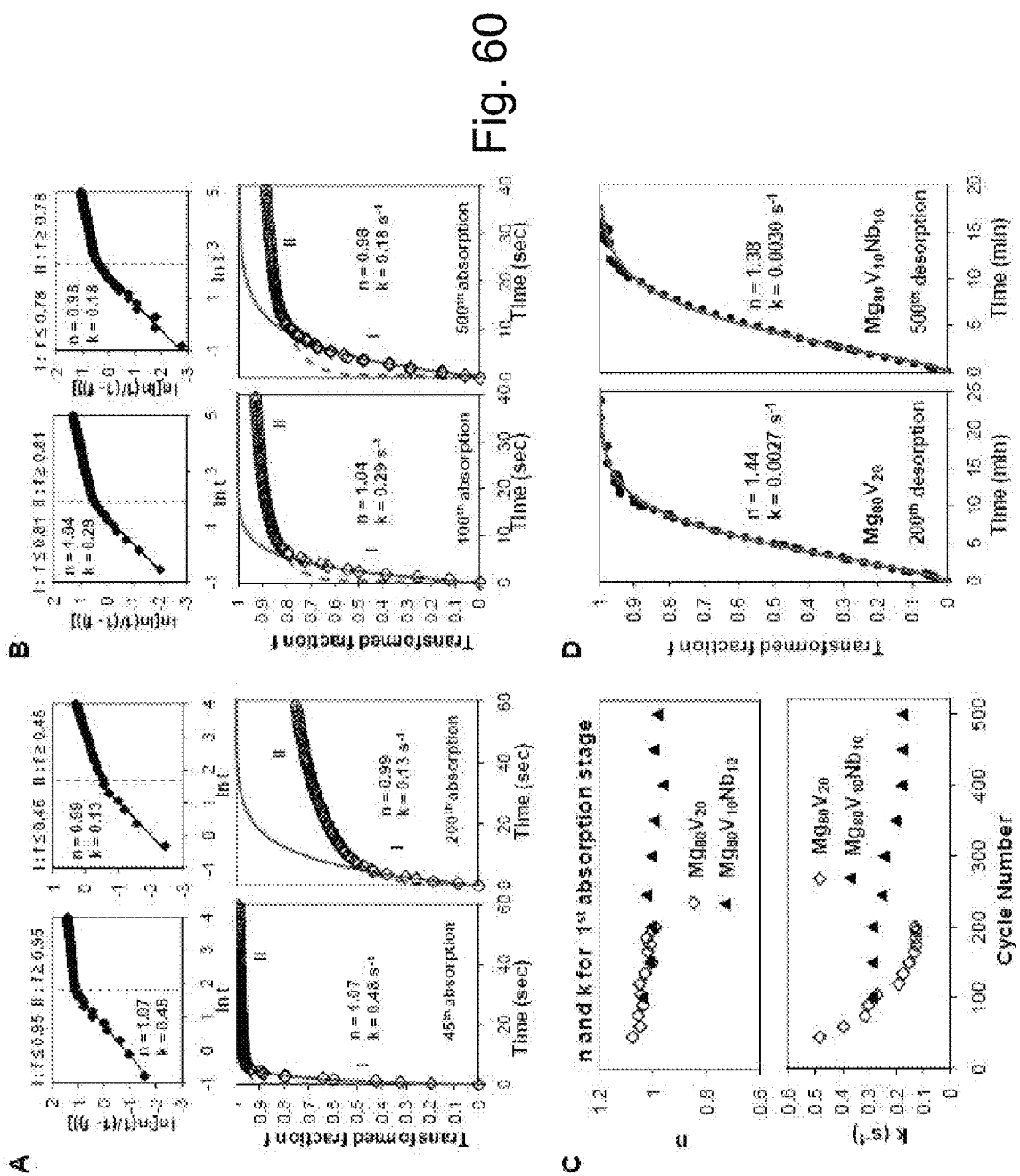
FIG. 60—Kinetic analysis on Mg80V20 and Mg80V10Nb10 at selected cycling stages at 200° C. (A) 45th and 200th absorption cycles for Mg80V20 plotted as transformed fraction f vs. time. The plots on top show the evaluation of the sorption data using. Two stages with different slopes are clearly observed. The JMA kinetic model using the values of n and k obtained from the linear fits are superimposed in the transformed fraction graph (solid/dashed red lines). (B) Same as in (A) but for 100th and 500th absorption cycles for Mg80V10Nb10 (C) The values of n and k of the first absorption stage as a function of cycle number. (D) 200th desorption cycle for Mg80V20 and 500th desorption cycle for Mg80V10Nb10, with the JMA kinetic model fitting superimposed as solid red lines.

As shown in FIG. 60, the n values of the first absorption stage for both materials remain close to 1 regardless of the cycling degradation. This fact further justifies that the rate-limiting step for first absorption stage remain unchanged. Based on the discussion above, the plausible mechanism to interpret the first absorption stage with such n value close to 1 is one-dimensional interface-controlled growth with instantaneous nucleation.

Microstructural evolution during hydrogen sorption cycling of Mg—FeTi nanolayered composites.

This section describes the microstructural evolution of Mg—FeTi mutlilayered hydrogen storage materials during extended cycling. A 28 nm Mg-5 nm FeTi multilayer has comparable performance to a cosputtered material with an equivalent composition (Mg-10% Fe-10% Ti), which is included as a baseline case. At 200° C., the FeTi layers act as a barrier, preventing agglomeration of Mg particles. At 300° C., the initial structure of the multilayer is preserved up to 35 cycles, followed by fracturing of the Mg layers in the in-plane direction and progressive delamination of the FeTi layers as observed by electron microscopy. Concurrently, an increase in the Mg grain size was observed from 32 to 76 nm between cycles 35 and 300. As a result, the absorption kinetics deteriorate with cycling, although 90% of the total capacity is still absorbed within 2 min after as many as 300 cycles. The desorption kinetics, on the other hand, remain rapid and stable, and complete desorption of 4.6 wt. % H is achieved in 1.5 min at ambient desorption pressure. In addition to showing good hydrogen storage performance, multilayers are an excellent model system for studying the relation between microstructure and hydrogen absorption/desorption kinetics.

Mg—FeTi multilayers with periodicities of 100 and 33.3 nm were synthesized by sputter deposition. These multilayers will be denoted hereafter as 85/15 and 28/5 (Mg and FeTi layer thicknesses, respectively). We used Ar gas with a purity of 99.999% at a sputtering pressure of $5\times10^{-3}$ mbar, with a maximum base pressure of $5\times10^{-8}$ mbar. Deposition was performed using a DC magnetron co-sputtering system (AJA International). The substrate temperature was maintained near ambient. Deposition was done in a sputter-up configuration with continuous substrate rotation. Total thickness of the stack was always 1.5 µm. To protect the stacks from oxidation and to catalyze the dissociation of hydrogen on the surface, a Ta/Pd catalyst was deposited on the top and bottom. The Si substrates were first coated with a layer of photoresist to enable lift-off of the films in acetone after deposition.

For multilayers, a large periodicity of 100 nm leads to break-up of the Mg layers which form spherical particles between intact FeTi layers. The kinetics at 200° C. rapidly deteriorates as the Mg particle size is already too large to avoid diffusion limitations. Decreasing the layer thicknesses by a factor three greatly improves the kinetics and cycling stability. At 200° C., a Mg—FeTi multilayer with a periodicity of 33 nm performs as well as a cosputtered material with the same overall composition. The FeTi layers remain intact during cycling and thus constrain grain growth of Mg in the direction perpendicular to the layers.

During cycling at 300° C., the original microstructure of the multilayers is gradually lost. SEM and TEM observations after 35, 150 and 300 cycles showed that the layers fracture in the in-plane direction down to ever smaller sizes. In the final stages of cycling, the FeTi layers delaminate from the Mg layers. This leads to an increase in the Mg grain size from 32 to 76 nm and a slight deterioration of the absorption kinetics; however, the FeTi particles remain effective as a catalyst. Even after 300 cycles, 90% of the total capacity is absorbed within 2 min, whereas desorption of 4.6 wt. % H is complete within 1.5 min.

Cosputtered Mg-10% Fe-10% Ti has very rapid and stable kinetics at 300° C. as well. The absorption time to 90% of the total capacity is only 1 min after 250 cycles. Complete desorption takes place in 1.5 min. This shows that both a layered and randomly dispersed starting microstructure are effective for maintaining rapid absorption and desorption kinetics over hundreds of cycles, despite a gradual increase in the Mg grain size with cycling for both the multilayer and cosputtered alloy.

The values obtained for the JMA exponent n for the multilayers during absorption are consistent with site-saturation when the hydrided fraction reaches 50% and 2-D diffusion-limited growth. This agrees very well with the SEM and TEM observations that all FeTi is in contact with the gas-phase and the shape of the Mg particles remains planar. This relatively straightforward interpretation of the kinetic data opens up possibilities of using multilayers as model systems for evaluating and comparing the performance of different catalysts.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiment of the invention in which an exclusive property or privilege is claimed are defined as follows:

1. A hydrogen absorbing and desorbing material comprising a multilayer film having at least two layers of magnesium and at least two layers of catalyst for the kinetic absorption and desorption of hydrogen, in which the multilayer film comprises alternating layers of magnesium and catalyst, in which the catalyst for the kinetic absorption and desorption of hydrogen comprises iron and vanadium and at least some of the iron and vanadium forms a dispersed CsCl-type phase in the magnesium.

2. The hydrogen absorbing and desorbing material of claim 1 in which the at least two layers of magnesium comprise catalyst.

3. The hydrogen absorbing and desorbing material of claim 1 in which the at least two layers of magnesium each have a thickness that is less than a mean catalyst particle spacing in the at least two layers of magnesium.

4. The hydrogen absorbing and desorbing material of claim 1 in which the at least two layers of magnesium each have a thickness and magnesium concentration sufficient to allow adjacent layers of catalyst to constrain MgH2 grain size during use.

5. The hydrogen absorbing and desorbing material of claim 4 in which a thickness of each of the at least two layers of magnesium is less than or equal to a thickness of the at least two layers of catalyst.

6. The hydrogen absorbing and desorbing material of claim 1 further comprising a palladium-tantalum bilayer catalyst deposited on the hydrogen absorbing and desorbing material to improve the rate of absorption or desorption of hydrogen in the hydrogen absorbing and desorbing material.

7. The hydrogen absorbing and desorbing material of claim 1 further comprising an underlayer of the catalyst.

8. The hydrogen absorbing and desorbing material of claim 1 in which the catalyst for the kinetic absorption and desorption of hydrogen comprises aluminum and titanium.

9. The hydrogen absorbing and desorbing material of claim 1 in which the catalyst comprises one or more of a transition metal, rare earth element, actinide, lanthanide, and alkali metal.

10. A hydrogen absorbing and desorbing material comprising a multilayer film having at least two layers of magnesium and at least two layers of catalyst for the kinetic absorption and desorption of hydrogen, in which the multilayer film comprises alternating layers of magnesium and catalyst, in which the catalyst for the kinetic absorption and desorption of hydrogen comprises iron and vanadium and in which at least some of the iron and vanadium forms a dispersed sigma phase in the magnesium.

11. A hydrogen absorbing and desorbing material comprising a multilayer film having at least two layers of magnesium and at least two layers of catalyst for the kinetic absorption and desorption of hydrogen, in which the multilayer film comprises alternating layers of magnesium and catalyst in which the catalyst for the kinetic absorption and desorption of hydrogen comprises niobium.

12. The hydrogen absorbing and desorbing material of claim 11 in which the catalyst for the kinetic absorption and desorption of hydrogen comprises vanadium.

13. A hydrogen absorbing and desorbing material formed by co-deposition of magnesium with a catalyst for the kinetic absorption and desorption of hydrogen in which the catalyst for the kinetic absorption and desorption of hydrogen forms a dispersed amorphous or nanocrystalline phase in the magnesium, the catalyst further comprising chromium or niobium.

14. The hydrogen absorbing and desorbing material of claim 13 in which the catalyst further comprises one or more of titanium, vanadium, aluminum, niobium, and iron.

\* \* \* \* \*